United States Patent
Brown

(10) Patent No.: US 12,554,884 B2
(45) Date of Patent: *Feb. 17, 2026

(54) SYSTEMS AND METHODS FOR UPDATING AND DISTRIBUTING INFORMATION ASSOCIATED WITH AN INDIVIDUAL

(71) Applicant: True South Partners, LLC, New York, NY (US)

(72) Inventor: Ward H. Brown, Franklin, TN (US)

(73) Assignee: True South Partners, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/991,584

(22) Filed: Dec. 22, 2024

(65) Prior Publication Data
US 2025/0139286 A1 May 1, 2025

Related U.S. Application Data

(63) Continuation of application No. 18/067,867, filed on Dec. 19, 2022, now Pat. No. 12,216,793, which is a
(Continued)

(51) Int. Cl.
*G06F 21/62* (2013.01)
*G06F 16/23* (2019.01)
*H04L 51/42* (2022.01)

(52) U.S. Cl.
CPC .......... *G06F 21/6245* (2013.01); *G06F 16/23* (2019.01); *H04L 51/42* (2022.05)

(58) Field of Classification Search
CPC ....... G06F 21/6245; G06F 16/23; H04L 51/42
(Continued)

(56) References Cited

U.S. PATENT DOCUMENTS 8,150,913 B2 4/2012 Cheah
9,071,660 B1 6/2015 Seshadri
(Continued)

FOREIGN PATENT DOCUMENTS

WO 2021205240 A1 10/2021

OTHER PUBLICATIONS

NPL Search Terms (Year: 2025).*
(Continued)

*Primary Examiner* — Syed A Zaidi
(74) *Attorney, Agent, or Firm* — Miller Johnson

(57) ABSTRACT

A method of updating and distributing information associated with an individual includes storing an application program, controlling modules to execute instructions of the application program, and generating, via the application program, one or more profiles. Each profile contains personal or professional information of an individual. The method includes identifying at least one of the profiles to transmit to a recipient, obtaining an update to the profiles, transmitting the update, and transmitting a profile template to a mobile device. The method includes receiving the profiles generated in connection with the profile template, validating data fields of received profiles generated based on the template, storing the received profiles that are validated, receiving the update, updating the profiles according to the received update, generating an identifier of the profiles, and transmitting the identifier and data associated with the updated profiles to a computing device of the recipient.

21 Claims, 84 Drawing Sheets

Related U.S. Application Data continuation of application No. PCT/US2022/052416, filed on Dec. 9, 2022.

(60) Provisional application No. 63/324,733, filed on Mar. 29, 2022, provisional application No. 63/287,851, filed on Dec. 9, 2021.

(58) Field of Classification Search
USPC .......................................................... 726/26
See application file for complete search history.

(56) References Cited

U.S. PATENT DOCUMENTS

| | | | |
|---|---|---|---|
| 9,298,763 | B1 | 3/2016 | Zack |
| 10,333,871 | B1* | 6/2019 | Lewis ..................... H04L 51/10 |
| 2002/0006803 | A1 | 1/2002 | Mendiola |
| 2007/0100941 | A1 | 5/2007 | Lee |
| 2010/0223192 | A1* | 9/2010 | Levine ................. G06Q 50/265 |
| | | | 705/317 |
| 2013/0166515 | A1* | 6/2013 | Kung ................... G06Q 10/063 |
| | | | 707/690 |
| 2013/0217365 | A1 | 8/2013 | Ramnani |
| 2014/0006517 | A1* | 1/2014 | Hsiao ..................... G06Q 50/01 |
| | | | 709/205 |
| 2014/0095970 | A1* | 4/2014 | Saiu .................... G06Q 30/0641 |
| | | | 715/224 |
| 2018/0150650 | A1* | 5/2018 | Saunders .............. H04L 63/104 |
| 2018/0183619 | A1* | 6/2018 | Jayaram .................. H04W 4/12 |
| 2018/0309801 | A1* | 10/2018 | Rathod ............... H04M 3/5175 |
| 2019/0068748 | A1* | 2/2019 | Abdel-Maguid ....... H04L 51/52 |
| 2019/0097812 | A1* | 3/2019 | Toth ...................... H04L 9/0841 |
| 2019/0386951 | A1* | 12/2019 | Uhll ....................... G06F 3/048 |
| 2022/0108416 | A1 | 4/2022 | Oberai |
| 2022/0335503 | A1* | 10/2022 | DeVet ................ G06Q 30/0633 |

OTHER PUBLICATIONS

Written Opinion and International Search Report dated Apr. 13, 2023 for PCT/US22/52416.

Extended European Search Report regarding European Application No. 2290518.0, mailed Apr. 9, 2025.

Anonymous: "Mobile deep linking—Wikipedia", Nov. 22, 2021 (Nov. 22, 2021), pp. 1-4, XP093264114, Retrieved from the Internet: URL:https://en.wikipedia.org/w/index.php?title=Mobile_deep_linking&oldid=1056565141.

\* cited by examiner

FIG. 13B

Create an Account

Email gmotz@website.com

Email Verified ✓

New Password

Confirm New Password

First Name

Last Name

Phone Number  Optional

CANCEL    CREATE

Create an Account

Email gmotz@website.com

Email Verified ✓

New Password

●●●●●●●●●

Confirm New Password

●●●●●●●●●

First Name

George

Last Name

Motz

Phone Number  Optional 555-404-1186

CANCEL    CREATE

INVITATIONS

| | Incoming | Outgoing |

| Name | Sent ⌄ | Expires |
|---|---|---|
| Jennifer Motschenbacher<br>Invite: QR code | License: Account 03 | 07/06/21<br>1:15:37 pm | 08/06/21<br>1:15:37 pm |
| Unnamed Recipient<br>Invite: Email | License: Account 03 | 07/06/21<br>1:15:37 pm | 08/06/21<br>1:15:37 pm |
| Katherine Gudmundsdottir<br>Invite: Text | License: Account 03 | 07/06/21<br>1:15:37 pm | 08/06/21<br>1:15:37 pm |
| Matthew Grohaussente...<br>Invite: Text | License: Account 03 | 07/06/21<br>1:15:37 pm | 08/06/21<br>1:15:37 pm |
| Jennifer Motschenbacher<br>Invite: Text| License: Account 03 | 07/06/21<br>1:15:37 pm | 08/06/21<br>1:15:37 pm |
| Unnamed Recipient<br>Invite: QR code | License: Account 03 | 07/06/21<br>1:15:37 pm | 08/06/21<br>1:15:37 pm |
| Katherine Gudmundsdottir<br>Invite: Email | License: Account 03 | 07/06/21<br>1:15:37 pm | 08/06/21<br>1:15:37 pm |
| Matthew Grohaussente...<br>Invite: QR code | License: Account 03 | 07/06/21<br>1:15:37 pm | 08/06/21<br>1:15:37 pm |
| Jennifer Motschenbacher<br>Invite: QR code | License: Account 03 | 07/06/21<br>1:15:37 pm | 08/06/21<br>1:15:37 pm |

INVITATIONS

Incoming | Outgoing

| Name | Sent ⌄ | Expires | |
|---|---|---|---|
| Jennifer Motschenbacher<br>Invite: QR code \| License: Account 03 | 07/06/21<br>1:15:37 pm | 08/06/21<br>1:15:37 pm | |
| Recipient<br>License: Account 03 | 07/06/21<br>1:15:37 pm | 08/06/21<br>1:15:37 pm | RESCIND |
| Katherine Gudmundsdottir<br>Invite: Text \| License: Account 03 | 07/06/21<br>1:15:37 pm | 08/06/21<br>1:15:37 pm | |
| Matthew Grohaussente...<br>Invite: Text \| License: Account 03 | 07/06/21<br>1:15:37 pm | 08/06/21<br>1:15:37 pm | |
| Jennifer Motschenbacher<br>Invite: Text\| License: Account 03 | 07/06/21<br>1:15:37 pm | 08/06/21<br>1:15:37 pm | |
| Unnamed Recipient<br>Invite: QR code \| License: Account 03 | 07/06/21<br>1:15:37 pm | 08/06/21<br>1:15:37 pm | |
| Katherine Gudmundsdottir<br>Invite: Email \| License: Account 03 | 07/06/21<br>1:15:37 pm | 08/06/21<br>1:15:37 pm | |
| Matthew Grohaussente...<br>Invite: QR code \| License: Account 03 | 07/06/21<br>1:15:37 pm | 08/06/21<br>1:15:37 pm | |
| Jennifer Motschenbacher<br>Invite: QR code \| License: Account 03 | 07/06/21<br>1:15:37 pm | 08/06/21<br>1:15:37 pm | |

TERMS & PRIVACY

1. General Information

1.1 Lyncsync
Lorem ipsum dolor sit amet, consectetur adipiscing elit. Etiam eu nisi dolor. Quisque congue turpis ac dolor dictum, in consequat libero condimentum. Nullam non ligula dolor. Nullam quis ipsum ac lorem ullamcorper semper. Nunc nec erat tellus. Suspendisse labortis sisl id ex tincidunt imperdiet. Aliquam commodo nisl ut augure mollis vestibulum. Nulla facilisi.

1.2 Dolor Sit Amet
Lorem ipsum dolor sit amet, consectetur adipiscing elit. Etiam eu nisi dolor. Quisque congue turpis ac dolor dictum, in consequat libero condimentum. Nullam non ligula dolor. Nullam quis ipsum ac lorem ullamcorper semper. Nunc nec erat tellus. Suspendisse labortis sisl id ex tincidunt imperdiet. Aliquam commodo nisl ut augure mollis vestibulum. Nulla facilisi.

2. Lorem Ipsum

2.1 Lyncsync
Lorem ipsum dolor sit amet, consectetur adipiscing elit. Etiam eu nisi dolor. Quisque

SYSTEMS AND METHODS FOR UPDATING AND DISTRIBUTING INFORMATION ASSOCIATED WITH AN INDIVIDUAL

CROSS-REFERENCE TO RELATED APPLICATIONS

This application is a continuation of U.S. application Ser. No. 18/067,867 filed Dec. 19, 2022, which is a continuation of PCT App. No. PCT/US22/52416 filed Dec. 9, 2022, which claims the benefit of U.S. Provisional Application No. 63/324,733 filed Mar. 29, 2022 and U.S. Provisional Application No. 63/287,851 filed Dec. 9, 2021. The entire disclosures of the above applications are incorporated by reference.

FIELD

The present disclosure generally relates to a system and method for updating and distributing information associated with an individual, and more particularly relates to automating the creation, maintenance, and accuracy of personal and professional information among individuals and entities (e.g., companies, associations, organizations, clubs, interest groups, etc.).

BACKGROUND

Generally, as individuals change addresses, update employment statuses and associations, replace phone numbers, establish social media profiles, and any number of other personal and professional changes to their contact information, those changes and updates may not be readily known by or made available to other individuals within their network of friends and associates. As a result, reliably maintaining connections among individuals is often difficult due to inaccurate or outdated contact information kept among the individuals.

Exchanging one's contact information is currently cumbersome and fraught with many errors. Individuals exchange business cards, attach their contact information to various forms of electronic communication, and verbally inform someone of their contact information, among other methods, all of which merely provide a one-time exchange of information. The reliability of the contact information exchanged may be subject to its complete and accurate entry by the recipient into a database that must also be maintained by the recipient. Misspellings, transposed numbers, selectively entered information, loss of relevant fields, or general lack of information by having failed to enter it into a contact database are all errors that are constantly encountered. Currently, ongoing updates made to one's contact information are not readily known by the initial recipient of that individual's contact information.

Accordingly, there is a need for enabling an individual to maintain his or her various contact attributes in one or more personal, professional, or custom profiles within a mobile and/or web-based application.

SUMMARY

The present disclosure generally relates to a system and method of a network of persons and entities for broadcasting data within closed user-subscriber connections.

According to some aspects of the present disclosure, a system is disclosed for updating and distributing information associated with an individual, comprising a mobile device and a computing server system. The mobile device comprises a non-transitory computer-readable storage medium configured to store an application program and a processor coupled to the non-transitory computer-readable storage medium and configured, by instructions of the application program, to generate one or more profiles via the application program, each profile containing personal or professional information of an individual, identify at least one of the one or more profiles to transmit to one or more recipients, obtain at least one update to the one or more profiles, and transmit the at least one update to the one or more recipients. The computing server system is configured to transmit at least one profile template to the mobile device, receive the one or more profiles generated in connection with the at least one profile template, validate data fields of the received one or more profiles generated based on the at least one profile template, store the received one or more profiles that are validated, receive the at least one update and update the one or more profiles accordingly, generate an identifier of the one or more profiles, and transmit the identifier and data associated with updated one or more profiles to a computing device of the one or more recipients.

In some embodiments, a device includes a non-transitory computer-readable storage medium configured to store an application program, and a processor coupled to the non-transitory computer-readable storage medium and configured, by instructions of the application program, to generate one or more profiles via the application program, each profile containing personal or professional information of an individual, identify at least one of the one or more profiles to transmit to one or more recipients, obtain at least one update to the one or more profiles, and transmit the at least one update to the one or more recipients.

In some embodiments, a non-transitory computer-readable storage medium stores instructions that, when executed by a processor of a device, cause the device to generate one or more profiles via an application program, each profile containing personal or professional information of an individual, identify at least one of the one or more profiles to transmit to one or more recipients, obtain at least one update to the one or more profiles, and transmit the at least one update to the one or more recipients.

In some embodiments, computer-implemented method includes generating, by a processor of a device, one or more profiles via an application program, each profile containing personal or professional information of an individual; identifying, by the processor, at least one of the one or more profiles to transmit to one or more recipients; obtaining, by the processor, at least one update to the one or more profiles; and transmitting, by the processor, the at least one update to the one or more recipients.

In some embodiments, a computing server includes a non-transitory computer-readable storage medium configured to store a set of instructions, and a processor coupled to the non-transitory computer-readable storage medium and configured, by the instructions, to transmit at least one profile template to a mobile device, receive one or more profiles generated in connection with the at least one profile template, validate data fields of the received one or more profiles generated based on the at least one profile template, store the received one or more profiles that are validated, receive at least one update and update the one or more profiles accordingly, generate an identifier of the one or more profiles, and transmit the identifier and data associated with updated one or more profiles to a computing device of one or more recipients.

In some embodiments, a non-transitory computer-readable storage medium stores instructions that, when executed by a processor of a device, cause the device to transmit at least one profile template to a mobile device, receive one or more profiles generated in connection with the at least one profile template, validate data fields of the received one or more profiles generated based on the at least one profile template, store the received one or more profiles that are validated, receive at least one update and update the one or more profiles accordingly, generate an identifier of the one or more profiles, and transmit the identifier and data associated with updated one or more profiles to a computing device of one or more recipients.

In some embodiments, a method includes transmitting, by a processor of a device, at least one profile template to a mobile device; receiving, by the processor, one or more profiles generated in connection with the at least one profile template; validating, by the processor, data fields of the received one or more profiles generated based on the at least one profile template; storing, by the processor, the received one or more profiles that are validated; receiving, by the processor, at least one update and update the one or more profiles accordingly; generating, by the processor, an identifier of the one or more profiles; and transmitting, by the processor, the identifier and data associated with updated one or more profiles to a computing device of one or more recipients.

In some embodiments, an application program includes a mobile or web-based application. In some embodiments, the processor of the mobile device is further configured to validate the data fields of received one or more profiles generated based at least upon a defined length of each data field, a defined threshold size of a file, a media type and related file header information. In some embodiments, the information saved on the computing device of the one or more recipients includes data associated with native applications of the computing device, wherein the computing server system is further configured to identify and update the data associated with the native applications based on the identifier and the at least one update. In some embodiments, the computing server system is further configured to determine whether the one or more recipients has the application program downloaded on the computing device, and, in response to detecting that the one or more recipients is an existing user of the system, transmit one or more signals to a mail service system and a push service system to communicate with the computing device of the one or more recipients. In some embodiments, the computing server system is further configured to transmit an invitation identifier and hash to the mobile device in response to detecting that the one or more recipients is identified for receiving the one or more profiles, wherein the processor of the mobile device is further configured to generate and transmit a machine-readable code or label and a unique uniform resource identifier (URI) to the computing device based on the invitation identifier and hash. In some embodiments, the computing device of the one or more recipients is configured to obtain the one or more profiles based on the machine-readable code or label and the URI. In some embodiments, the computing server system is further configured to determine that the one or more recipients is not an existing user of the system, and transmit signals to a mail service system to communicate with the computing device of the one or more recipients. In some embodiments, the computing server system is further configured to transmit an invitation identifier, hash, invitation URI to the computing device of the one or more recipients via the mail service system, wherein the invitation URI is configured to prompt the one or more recipients to download the application program on the computing device. In some embodiments, the processor of the mobile device is further configured to identify a first one of the one or more profiles to transmit to a first group of recipients and a second one of the one or more profiles to transmit to a second group of recipients.

According to some aspects of the present disclosure, a method of updating and distributing information associated with an individual is disclosed. The method comprises storing an application program, controlling a plurality of modules to execute instructions of the application program, generating, via the application program, one or more profiles, each profile containing personal or professional information of an individual, identifying at least one of the one or more profiles to transmit to one or more recipients, obtaining at least one update to the one or more profiles, transmitting the at least one update, transmitting at least one profile template to a mobile device, receiving the one or more profiles generated in connection with the at least one profile template, validating data fields of received one or more profiles generated based on the at least one profile template, storing the received one or more profiles that are validated, receiving the at least one update, updating the one or more profiles saved in the database according to the received at least one update, generating and identifier of the one or more profiles, and transmitting the identifier and data associated with the updated one or more profiles to a computing device of the one or more recipients.

In some embodiments, an application program includes a mobile or web-based application. In some embodiments, the processor of the mobile device is further configured to validate the data fields of received one or more profiles generated based at least upon a defined length of each data field, a defined threshold size of a file, a media type and related file header information. In some embodiments, the information saved on the computing device of the one or more recipients includes data associated with native applications of the computing device, wherein the computing server system is further configured to identify and update the data associated with the native applications based on the identifier and the at least one update. In some embodiments, the computing server system is further configured to: determine whether the one or more recipients has the application program downloaded on the computing device, and in response to detecting that the one or more recipients is an existing user of the system, transmit signals to a mail service system and a push service system to communicate with the computing device of the one or more recipients. In some embodiments, the computing server system is further configured to generate and transmit an invitation identifier and hash to the mobile device in response to detecting that the one or more recipients is identified for receiving the one or more profiles, wherein the processor of the mobile device is further configured to generate and transmit a machine-readable code or label and a unique uniform resource identifier (URI) to the computing device based on the invitation identifier and hash. In some embodiments, the computing device of the one or more recipients is configured to obtain the one or more profiles based on the machine-readable code or label the URI. In some embodiments, the computing server system is further configured to determine that the one or more recipients is not an existing user of the system, and transmit signals to a mail service system to communicate with the computing device of the one or more recipients. In some embodiments, the computing server system is further configured to generate and transmit an invitation identifier, hash, invitation URI to the computing device of the one or more recipients via the mail service system, wherein the invitation URI is configured to prompt the one or more recipients to download the application program on the computing device. In some embodiments, the processor of the mobile device is further configured to identify a first one of the one or more profiles to transmit to a first group of recipients and a second one of the one or more profiles to transmit to a second group of recipients.

In embodiments, a device includes a non-transitory computer-readable storage medium configured to store an application program; and a processor coupled to the non-transitory computer-readable storage medium and configured, by instructions of the application program, to: generate one or more profiles via the application program, each profile containing personal or professional information of an individual, identify at least one of the one or more profiles to transmit to one or more recipients, obtain at least one update to the one or more profiles, and transmit the at least one update to the one or more recipients.

In embodiments, a non-transitory computer-readable storage medium storing instructions that, when executed by a processor of a device, cause the device to: generate one or more profiles via an application program, each profile containing personal or professional information of an individual, identify at least one of the one or more profiles to transmit to one or more recipients, obtain at least one update to the one or more profiles, and transmit the at least one update to the one or more recipients.

In embodiments, a computer-implemented method includes generating, by a processor of a device, one or more profiles via an application program, each profile containing personal or professional information of an individual; identifying, by the processor, at least one of the one or more profiles to transmit to one or more recipients; obtaining, by the processor, at least one update to the one or more profiles; and transmitting, by the processor, the at least one update to the one or more recipients.

In embodiments, a computing server includes a non-transitory computer-readable storage medium configured to store a set of instructions; and a processor coupled to the non-transitory computer-readable storage medium and configured, by the instructions, to: transmit at least one profile template to a mobile device, receive one or more profiles generated in connection with the at least one profile template, validate data fields of the received one or more profiles generated based on the at least one profile template, store the received one or more profiles that are validated, receive at least one update and update the one or more profiles accordingly, generate an identifier of the one or more profiles, and transmit the identifier and data associated with updated one or more profiles to a computing device of one or more recipients.

In embodiments, a non-transitory computer-readable storage medium storing instructions that, when executed by a processor of a device, cause the device to: transmit at least one profile template to a mobile device, receive one or more profiles generated in connection with the at least one profile template, validate data fields of the received one or more profiles generated based on the at least one profile template, store the received one or more profiles that are validated, receive at least one update and update the one or more profiles accordingly, generate an identifier of the one or more profiles, and transmit the identifier and data associated with updated one or more profiles to a computing device of one or more recipients.

In embodiments, a method including transmitting, by a processor of a device, at least one profile template to a mobile device; receiving, by the processor, one or more profiles generated in connection with the at least one profile template; validating, by the processor, data fields of the received one or more profiles generated based on the at least one profile template; storing, by the processor, the received one or more profiles that are validated; receiving, by the processor, at least one update and update the one or more profiles accordingly; generating, by the processor, an identifier of the one or more profiles; and transmitting, by the processor, the identifier and data associated with updated one or more profiles to a computing device of one or more recipients.

In embodiments, a system for updating and distributing information associated with an individual including a mobile device, comprising: a non-transitory computer-readable storage medium configured to store an application program; and a processor coupled to the non-transitory computer-readable storage medium and configured, by instructions of the application program, to: generate a personal user profile containing professional information of the individual, generate a professional user profile containing professional information of the individual, transmit the professional user profile to one or more recipients, obtain at least one update to the account, update the professional user profile based on the at least one update, transmit the at least one update to the one or more recipients, identify a plurality of recipient profiles of recipients having a professional relationship with the individual, and group the plurality of recipient profiles with one another; and a computing server system configured to: transmit at least one profile template to the mobile device, receive the personal user profile and professional user profile generated in connection with the at least one profile template, validate data fields of the received personal user profile and the received professional user profile generated based on the at least one profile template, store the received personal user profile and the received professional user profile that are validated, receive the at least one update and update the stored professional user profile accordingly, generate an identifier of the personal user profile and an identifier of the professional user profile, receive the grouped plurality of recipient profiles, receive a request to not share information with a recipient profile of the grouped plurality of recipient profiles, and transmit the identifier and data associated with the updated professional user profile to a computing device of the one or more recipients other than the recipient associated with the request to not share information.

In embodiments, the application program includes a mobile or web-based application. In embodiments, the processor of the mobile device is further configured to validate the data fields of received one or more profiles generated based at least upon a defined length of each data field, a defined threshold size of a file, a media type and related file header information. In embodiments, the information saved on the computing device of the one or more recipients includes data associated with native applications of the computing device, wherein the computing server system is further configured to identify and update the data associated with the native applications based on the identifier and the at least one update. In embodiments, the computing server system is further configured to, determine whether the one or more recipients has the application program downloaded on the computing device, and in response to detecting that the one or more recipients is an existing user of the system, transmit one or more signals to a mail service system and a push service system to communicate with the computing device of the one or more recipients.

In embodiments, the computing server system is further configured to transmit an invitation identifier and hash to the mobile device in response to detecting that the one or more recipients is identified for receiving the one or more profiles, wherein the processor of the mobile device is further configured to generate and transmit a machine-readable code or label and a unique uniform resource identifier (URI) to the computing device based on the invitation identifier and hash. In embodiments, the computing device of the one or more recipients is configured to obtain the one or more profiles based on the machine-readable code or label and the URI.

In embodiments, the computing server system is further configured to determine that the one or more recipients is not an existing user of the system, and transmit signals to a mail service system to communicate with the computing device of the one or more recipients.

In embodiments, the computing server system is further configured to transmit an invitation identifier, hash, invitation URI to the computing device of the one or more recipients via the mail service system, wherein the invitation URI is configured to prompt the one or more recipients to download the application program on the computing device.

In embodiments, the processor of the mobile device is further configured to identify a first one of the one or more profiles to transmit to a first group of recipients and a second one of the one or more profiles to transmit to a second group of recipients.

In embodiments, a system for updating and distributing information associated with an individual, including a mobile device, comprising: a non-transitory computer-readable storage medium configured to store an application program; and a processor coupled to the non-transitory computer-readable storage medium and configured, by instructions of the application program, to: generate a personal user profile containing professional information of the individual, generate a professional user profile containing professional information of the individual, transmit the professional user profile to one or more recipients, obtain at least one update to the account, update the professional user profile based on the at least one update, transmit the at least one update to the one or more recipients, identify a plurality of recipient profiles of recipients having a professional relationship with the individual, and group the plurality of recipient profiles with one another; and a computing server system configured to: transmit at least one profile template to the mobile device, receive the personal user profile and professional user profile generated in connection with the at least one profile template, validate data fields of the received personal user profile and the received professional user profile generated based on the at least one profile template, store the received personal user profile and the received professional user profile that are validated, receive the at least one update and update the stored professional user profile accordingly, generate an identifier of the personal user profile and an identifier of the professional user profile, receive the grouped plurality of recipient profiles, receive a request to not share information with a recipient profile of the grouped plurality of recipient profiles, and transmit the identifier and data associated with the updated professional user profile to a computing device of the one or more recipients other than the recipient associated with the request to not share information.

In embodiments, the application program includes a mobile or web-based application. In embodiments, the processor of the mobile device is further configured to validate the data fields of received one or more profiles generated based at least upon a defined length of each data field, a defined threshold size of a file, a media type and related file header information. In embodiments, the information saved on the computing device of the one or more recipients includes data associated with native applications of the computing device, wherein the computing server system is further configured to identify and update the data associated with the native applications based on the identifier and the at least one update. In embodiments, the computing server system is further configured to determine whether the one or more recipients has the application program downloaded on the computing device, and in response to detecting that the one or more recipients is an existing user of the system, transmit one or more signals to a mail service system and a push service system to communicate with the computing device of the one or more recipients.

In embodiments, the computing server system is further configured to transmit an invitation identifier and hash to the mobile device in response to detecting that the one or more recipients is identified for receiving the one or more profiles, wherein the processor of the mobile device is further configured to generate and transmit a machine-readable code or label and a unique uniform resource identifier (URI) to the computing device based on the invitation identifier and hash. In embodiments, the computing device of the one or more recipients is configured to obtain the one or more profiles based on the machine-readable code or label and the URI.

In embodiments, the computing server system is further configured to determine that the one or more recipients is not an existing user of the system, and transmit signals to a mail service system to communicate with the computing device of the one or more recipients. In embodiments, the computing server system is further configured to transmit an invitation identifier, hash, and invitation URI to the computing device of the one or more recipients via the mail service system, wherein the invitation URI is configured to prompt the one or more recipients to download the application program on the computing device.

In embodiments, processor of the mobile device is further configured to identify a first one of the one or more profiles to transmit to a first group of recipients and a second one of the one or more profiles to transmit to a second group of recipients.

In embodiments, a system for updating and distributing information associated with an individual, comprising: a mobile device, comprising: a non-transitory computer-readable storage medium configured to store an application program, wherein the application program includes a mobile or web-based application; and a processor coupled to the non-transitory computer-readable storage medium and configured, by instructions of the application program, to: generate one or more profiles via the application program, each profile containing personal or professional information of an individual, identify at least one of the one or more profiles to transmit to one or more recipients, obtain at least one update to the one or more profiles, transmit the at least one update to the one or more recipients, generate and transmit a machine-readable code or label and a unique uniform resource identifier (URI) to the computing device based on the invitation identifier and hash, wherein the computing device of the one or more recipients is configured to obtain the one or more profiles based on the machine-readable code or label and the URI, and identify a first one of the one or more profiles to transmit to a first group of recipients and a second one of the one or more profiles to transmit to a second group of recipients; and a computing server system configured to: transmit at least one profile template to the mobile device, receive the one or more profiles generated in connection with the at least one profile template, validate data fields of the received one or more profiles generated based on the at least one profile template, wherein validating the data fields is based at least upon a defined length of each data field, a defined threshold size of a file, a media type and related file header information, store the received one or more profiles that are validated, receive the at least one update and update the one or more profiles accordingly, generate an identifier of the one or more profiles, transmit the identifier and data associated with updated one or more profiles to a computing device of the one or more recipients, identify and update data included in information saved on the computing device of the one or more recipients, wherein the data is associated with native applications based on the identifier and the at least one update, determine whether the one or more recipients has the application program downloaded on the computing device, in response to detecting that the one or more recipients is an existing user of the system, transmit one or more signals to a mail service system and a push service system to communicate with the computing device of the one or more recipients, transmit the first invitation identifier and hash to the mobile device in response to detecting that the one or more recipients is identified for receiving the one or more profiles, determine that the one or more recipients is not an existing user of the system, transmit signals to a mail service system to communicate with the computing device of the one or more recipients, and transmit a second invitation identifier, hash, and invitation URI to the computing device of the one or more recipients via the mail service system, wherein the invitation URI is configured to prompt the one or more recipients to download the application program on the computing device.

In embodiments, a mobile device includes a non-transitory computer-readable storage medium configured to store an application program, wherein the application program includes a mobile or web-based application; and a processor coupled to the non-transitory computer-readable storage medium and configured, by instructions of the application program, to: generate one or more profiles via the application program, each profile containing personal or professional information of an individual, identify at least one of the one or more profiles to transmit to one or more recipients, obtain at least one update to the one or more profiles, transmit the at least one update to the one or more recipients, generate and transmit a machine-readable code or label and a unique uniform resource identifier (URI) to the computing device based on the invitation identifier and hash, wherein the computing device of the one or more recipients is configured to obtain the one or more profiles based on the machine-readable code or label and the URI, and identify a first one of the one or more profiles to transmit to a first group of recipients and a second one of the one or more profiles to transmit to a second group of recipients.

In embodiments, a computing server system includes a non-transitory computer-readable storage medium configured to store an application program; and a processor coupled to the non-transitory computer-readable storage medium and configured, by instructions of the application program, to: transmit at least one profile template to a mobile device, receive one or more profiles generated in connection with the at least one profile template, validate data fields of the received one or more profiles generated based on the at least one profile template, wherein validating the data fields is based at least upon a defined length of each data field, a defined threshold size of a file, a media type and related file header information, store the received one or more profiles that are validated, receive the at least one update and update the one or more profiles saved on a database accordingly, generate an identifier of the one or more profiles, transmit the identifier and data associated with updated one or more profiles to a computing device of the one or more recipients, identify and update data included in information saved on the computing device of the one or more recipients, wherein the data is associated with native applications based on the identifier and the at least one update, determine whether the one or more recipients has the application program downloaded on the computing device, in response to detecting that the one or more recipients is an existing user of the system, transmit one or more signals to a mail service system and a push service system to communicate with the computing device of the one or more recipients, transmit the first invitation identifier and hash to the mobile device in response to detecting that the one or more recipients is identified for receiving the one or more profiles, determine that the one or more recipients is not an existing user of the system, transmit signals to a mail service system to communicate with the computing device of the one or more recipients, and transmit a second invitation identifier, hash, and invitation URI to the computing device of the one or more recipients via the mail service system, wherein the invitation URI is configured to prompt the one or more recipients to download the application program on the computing device.

In embodiments, a method includes storing, by a mobile device, an application program, wherein the application program includes a mobile or web-based application; and generating one or more profiles via the application program, each profile containing personal or professional information of an individual; identifying at least one of the one or more profiles to transmit to one or more recipients; obtaining at least one update to the one or more profiles; transmitting the at least one update to the one or more recipients; generating and transmitting a machine-readable code or label and a unique uniform resource identifier (URI) to the computing device based on the invitation identifier and hash, wherein the computing device of the one or more recipients is configured to obtain the one or more profiles based on the machine-readable code or label and the URI; identifying a first one of the one or more profiles to transmit to a first group of recipients and a second one of the one or more profiles to transmit to a second group of recipients; transmitting, by a computing server system, at least one profile template to the mobile device; receiving the one or more profiles generated in connection with the at least one profile template; validating data fields of the received one or more profiles generated based on the at least one profile template, wherein validating the data fields is based at least upon a defined length of each data field, a defined threshold size of a file, a media type and related file header information; storing the received one or more profiles that are validated; receiving the at least one update and update the one or more profiles accordingly; generating an identifier of the one or more profiles; transmitting the identifier and data associated with updated one or more profiles to a computing device of the one or more recipients; identifying and updating data included in information saved on the computing device of the one or more recipients, wherein the data is associated with native applications based on the identifier and the at least one update, determining whether the one or more recipients has the application program downloaded on the computing device; in response to detecting that the one or more recipients is an existing user of the system, transmitting one or more signals to a mail service system and a push service system to communicate with the computing device of the one or more recipients; transmitting the first invitation identifier and hash to the mobile device in response to detecting that the one or more recipients is identified for receiving the one or more profiles; determining that the one or more recipients is not an existing user of the system; transmitting signals to a mail service system to communicate with the computing device of the one or more recipients; and transmitting a second invitation identifier, hash, and invitation URI to the computing device of the one or more recipients via the mail service system, wherein the invitation URI is configured to prompt the one or more recipients to download the application program on the computing device.

In embodiments, a method includes storing, by a mobile device, an application program, wherein the application program includes a mobile or web-based application; and generating one or more profiles via the application program, each profile containing personal or professional information of an individual; identifying at least one of the one or more profiles to transmit to one or more recipients; obtaining at least one update to the one or more profiles; transmitting the at least one update to the one or more recipients; generating and transmitting a machine-readable code or label and a unique uniform resource identifier (URI) to the computing device based on the invitation identifier and hash, wherein the computing device of the one or more recipients is configured to obtain the one or more profiles based on the machine-readable code or label and the URI; and identifying a first one of the one or more profiles to transmit to a first group of recipients and a second one of the one or more profiles to transmit to a second group of recipients.

In embodiments, a method includes transmitting, by a computing server system, at least one profile template to a mobile device; receiving one or more profiles generated in connection with the at least one profile template; validating data fields of the received one or more profiles generated based on the at least one profile template, wherein validating the data fields is based at least upon a defined length of each data field, a defined threshold size of a file, a media type and related file header information; storing the received one or more profiles that are validated; receiving at least one update and updating the one or more profiles saved on a database accordingly; generating an identifier of the one or more profiles; transmitting the identifier and data associated with updated one or more profiles to a computing device of one or more recipients; identifying and updating data included in information saved on a computing device of the one or more recipients, wherein the data is associated with native applications based on the identifier and the at least one update, determining whether the one or more recipients has an application program downloaded on the computing device; in response to detecting that the one or more recipients is an existing user of the system, transmitting one or more signals to a mail service system and a push service system to communicate with the computing device of the one or more recipients; transmitting the first invitation identifier and hash to the mobile device in response to detecting that the one or more recipients is identified for receiving the one or more profiles; determining that the one or more recipients is not an existing user of the system; transmitting signals to a mail service system to communicate with the computing device of the one or more recipients; and transmitting a second invitation identifier, hash, and invitation URI to the computing device of the one or more recipients via the mail service system, wherein the invitation URI is configured to prompt the one or more recipients to download the application program on the computing device.

In embodiments, a system for updating and distributing information associated with an individual includes a mobile device, comprising: a non-transitory computer-readable storage medium configured to store an application program, wherein the application program includes a mobile or web-based application; and a processor coupled to the non-transitory computer-readable storage medium and configured, by instructions of the application program, to: generate a personal user profile containing professional information of the individual, generate a professional user profile containing professional information of the individual, transmit the professional user profile to one or more recipients, obtain at least one update to the account, update the professional user profile based on the at least one update, transmit the at least one update to the one or more recipients, identify a plurality of recipient profiles of recipients having a professional relationship with the individual, group the plurality of recipient profiles with one another, generate and transmit a machine-readable code or label and a unique uniform resource identifier (URI) based on a first invitation identifier and hash, and identify a first one of the one or more profiles to transmit to a first group of recipients and a second one of the one or more profiles to transmit to a second group of recipients; and a computing server system configured to: transmit at least one profile template to the mobile device, receive the personal user profile and professional user profile generated in connection with the at least one profile template, validate data fields of the received personal user profile and the received professional user profile generated based on the at least one profile template, wherein validating the data fields is based at least upon a defined length of each data field, a defined threshold size of a file, a media type and related file header information, store the received personal user profile and the received professional user profile that are validated, receive the at least one update and update the stored professional user profile accordingly, generate an identifier of the personal user profile and an identifier of the professional user profile, receive the grouped plurality of recipient profiles, receive a request to not share information with a recipient profile of the grouped plurality of recipient profiles, transmit the identifier and data associated with the updated professional user profile to a computing device of the one or more recipients other than the recipient associated with the request to not share information, identify and update data included in information saved information on the computing device of the one or more recipients, wherein the data is associated with native applications of the computing device, determine whether the one or more recipients has the application program downloaded on the computing device, in response to detecting that the one or more recipients is an existing user of the system, transmit one or more signals to a mail service system and a push service system to communicate with the computing device of the one or more recipients, transmit the first invitation identifier and hash to the mobile device in response to detecting that the one or more recipients is identified for receiving the one or more profiles, determine that the one or more recipients is not an existing user of the system, transmit signals to a mail service system to communicate with the computing device of the one or more recipients, and transmit a second invitation identifier, hash, and invitation URI to the computing device of the one or more recipients via the mail service system, wherein the invitation URI is configured to prompt the one or more recipients to download the application program on the computing device.

In embodiments, a method includes storing, by a mobile device, an application program, wherein the application program includes a mobile or web-based application; generating a personal user profile containing professional information of the individual; generating a professional user profile containing professional information of the individual; transmitting the professional user profile to one or more recipients; obtaining at least one update to the account; updating the professional user profile based on the at least one update; transmitting the at least one update to the one or more recipients; identifying a plurality of recipient profiles of recipients having a professional relationship with the individual; grouping the plurality of recipient profiles with one another; generating and transmitting a machine-readable code or label and a unique uniform resource identifier (URI) based on a first invitation identifier and hash; identifying a first one of the one or more profiles to transmit to a first group of recipients and a second one of the one or more profiles to transmit to a second group of recipients; transmitting, by a computing server system, at least one profile template to the mobile device; receiving the personal user profile and professional user profile generated in connection with the at least one profile template; validating data fields of the received personal user profile and the received professional user profile generated based on the at least one profile template, wherein validating the data fields is based at least upon a defined length of each data field, a defined threshold size of a file, a media type and related file header information; storing the received personal user profile and the received professional user profile that are validated; receiving the at least one update and update the stored professional user profile accordingly; generating an identifier of the personal user profile and an identifier of the professional user profile; receiving the grouped plurality of recipient profiles; receiving a request to not share information with a recipient profile of the grouped plurality of recipient profiles; transmitting the identifier and data associated with the updated professional user profile to a computing device of the one or more recipients other than the recipient associated with the request to not share information; identifying and updating data included in information saved information on the computing device of the one or more recipients, wherein the data is associated with native applications of the computing device; determining whether the one or more recipients has the application program downloaded on the computing device; in response to detecting that the one or more recipients is an existing user of the system, transmit one or more signals to a mail service system and a push service system to communicate with the computing device of the one or more recipients; transmitting the first invitation identifier and hash to the mobile device in response to detecting that the one or more recipients is identified for receiving the one or more profiles; determining that the one or more recipients is not an existing user of the system; transmitting signals to a mail service system to communicate with the computing device of the one or more recipients; and transmitting a second invitation identifier, hash, and invitation URI to the computing device of the one or more recipients via the mail service system, wherein the invitation URI is configured to prompt the one or more recipients to download the application program on the computing device.

The above-simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

Figure 13B:
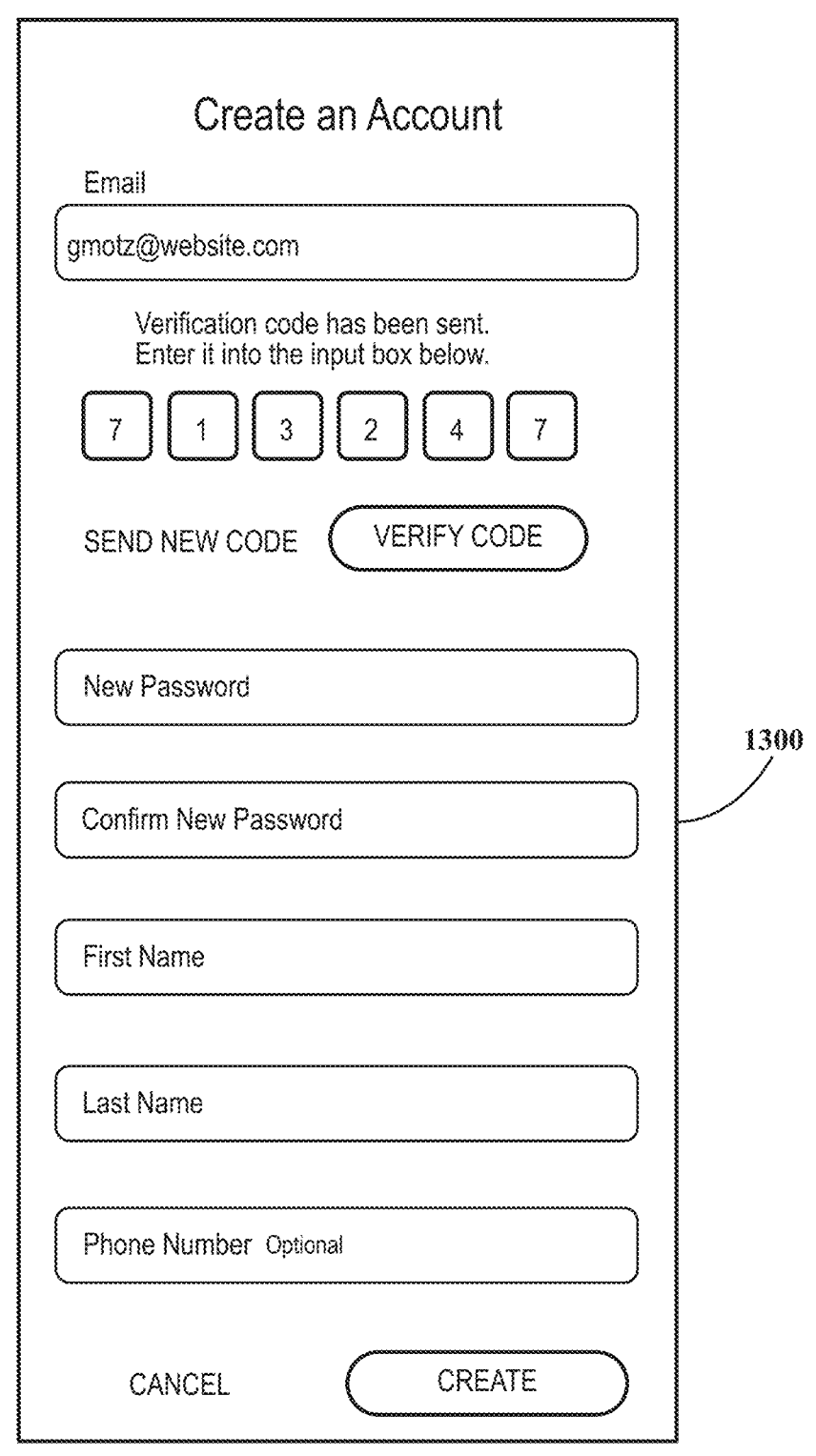

FIGS. 13A, 13B, 13C, 13D, 13E, and 13F illustrate an exemplary account creation screen of the user interface of the mobile application, according to aspects of the present disclosure.

FIGS. 26A-26I illustrate exemplary embodiments of the user interface whereby the user may manage incoming and outgoing invitations, and group connections, according to aspects of the present disclosure.

FIG. 36 illustrates exemplary embodiments of a terms and privacy menu of the user interface, according to aspects of the present disclosure.

DETAILED DESCRIPTION

Figure 1A:
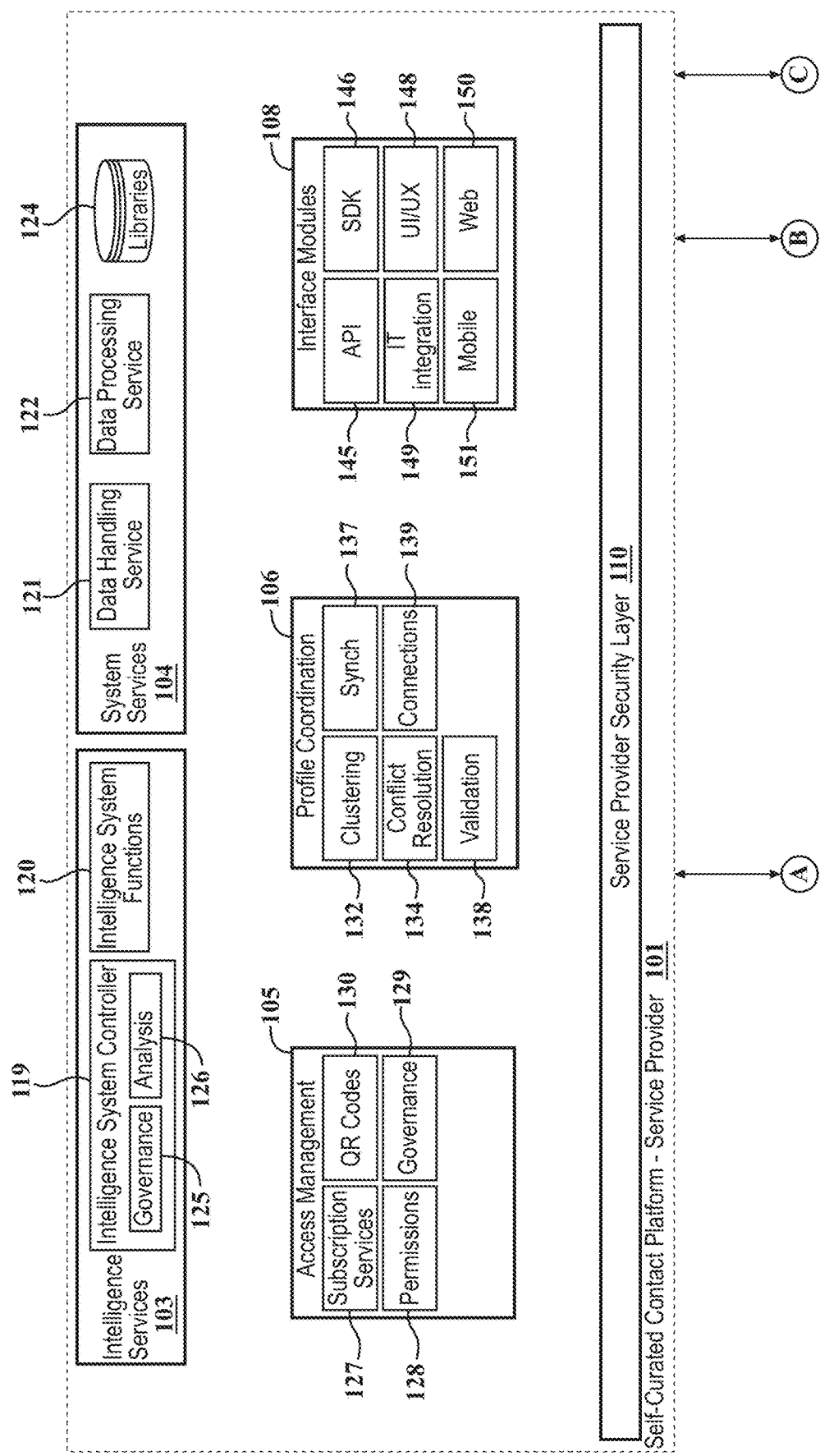
FIGS. 1A and 1B are schematic diagrams of a platform for a self-curated single source of truth about the contact or profile of an individual according to aspects of the present disclosure.

Various aspects of the present disclosure will be described with reference to the drawings, wherein like reference numerals are used to refer to like elements throughout. In the following description, for purposes of explanation, numerous specific details are set forth in order to promote a thorough understanding of one or more aspects of the present application. It may be evident in some or all instances, however, that any aspects described below can be practiced without adopting the specific design details described below.

In the exemplary embodiment, the method and system provide for automating the creation, maintenance, and accuracy of electronic contact information among individuals and companies. The accuracy of individuals' contact information may be maintained by the individuals themselves, considering they are ultimately the ones making any changes to their contact information. By enabling others to subscribe to an individual's contact information, the present disclosure creates the ability for all subscribers of an individual's contact information to automatically receive and synchronize all changes made in contact information by that individual. In accordance with aspects of the present disclosure, electronic access to a user's contact information by an individual or group of individuals may be implemented and managed through a mobile and web-based application that allows those individuals to subscribe to customized contact profiles. For example, the user who wants to distribute their contact information is responsible for the accuracy of such contact information, authorizes and initiates access and publication of that information with other individuals or associations through the application, and maintains/manages his or her own contact attributes for use in managing third party subscriber access to customized data sets. While a method and system for exchanging and broadcasting contact information is described in the exemplary embodiment, the method and system may also be used with other customized user data information.

In one aspect, the present disclosure may allow a user to manage which other users of the application are allowed to subscribe to at least one of his or her, e.g., contact profile(s). A request to subscribe to another user's contact profile or an invitation for another user to subscribe to one's own profile may be processed by the owner of the contact profile. By enabling this control over the distribution of one's contact profile, the user may be provided with the ongoing means to maintain his or her social and professional networks while ensuring the privacy of his or her contact information.

Figure 1B:
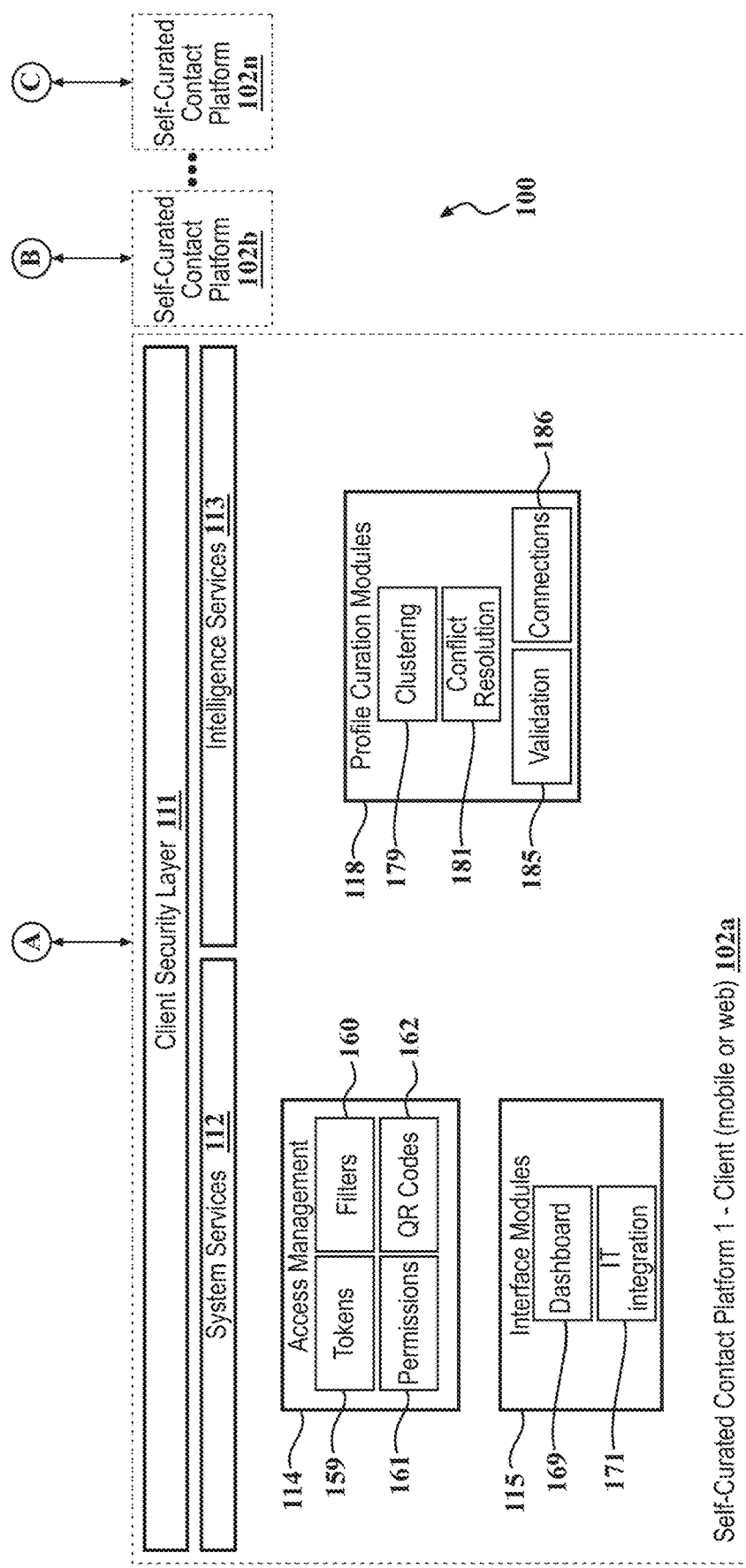

Referring to FIGS. 1A and 1B, in accordance with aspects of the present disclosure, a self-curated contact and identity platform 100. FIG. 1A is a schematic diagram of a service provider 101 (e.g., a server) that communicates with a client, such as the client 102 of FIG. 1B. FIG. 1B is a schematic diagram of a client 102 (e.g., a web browser or a mobile device) that communicates with a service provider, such as the service provider 101 of FIG. 1A. The self-curated contact and identity platform 100 may be configured to receive and detect updated personal and/or professional information associated with an individual, determine updates to be made to corresponding databases storing the personal and professional information associated with the individual, and provide appropriate automatic updates to one or more selected computing devices of the platform 100. The platform 100 is configured to perform and facilitate self-curated contact and identity management, which improves the quality of contact and identity data by having the most involved individual govern its curation. The platform is further configured to perform and facilitate link-driven contact and identity synchronization, which ensures that the curated contact and identity data remains fresh and consistent throughout the entire network of an individual's contacts. These enabling capabilities converge to enable a range of contact and identity intelligence platform capabilities and services, including machine learning, automation, and analytics, which support a range of enhanced product/service offerings and business use cases. The platform 100 collects a large amount of data from subscribers and provides tools and services for profile curation, user analytics, and identity synchronization. Subscribers may use the platform to curate their own profiles and control their own information. Processing modules and machine learning systems may perform operations such as clustering, conflict resolution, validation, prediction, and more. The platform may communicate with external systems via a cloud interface to gather information from external sources, such as professional networks and targeted content providers.

In embodiments, the platform 100 includes the service provider platform 101 in communication with one or more client platforms 102a, 102b . . . 102n. The service provider platform 100 and each of the one or more client platforms 102a, 102b . . . 102n may include one or more services and modules configured to perform data operations and communicate with one another and one or more of the client platforms 102a, 102b . . . 102n to perform and facilitate self-curated contact and identity management.

Referring to FIG. 1A, in embodiments, the service provider platform 101 may include one or more of intelligence services 103, service provider system services 104, service provider access management modules 105, profile coordination modules 106, commerce coordination modules 107, interface modules 108, and a service provider security layer 110.

In embodiments, the intelligence services 103 may include an intelligence system controller 119 and a plurality of intelligence system functions 120. The intelligence system controller 119 may include and control a plurality of modules, such as a governance 125 module and an analysis module 126. The governance module 125 is configured to perform and facilitate a plurality of functions related to governance of one or more intelligent systems (e.g., AI-enabled processes, machine-learned algorithms, intelligent agents, etc.). The analysis module 126 is configured to perform and facilitate analysis-related intelligence system functions 120 in conjunction with the intelligent systems. Examples of the intelligence system functions 120 that may be performed by the service provider platform 100 and facilitated by one or both the governance module 125 and the analysis module 126 include making AI-enabled predictions related to one or more contacts and relationships therebetween and performing contact synchronization and deduplication functions via machine-learned algorithms.

In embodiments, the system services 104 may include a data handling service 121, a data processing service 122, a blockchain service 123, and one or more libraries 124. The data handling service 121 is configured to handle data communications between the service provider platform 101 and the client platforms 102a, 102b . . . 102n, as well as between the service provider platform 101 and other external services, such as third-party cloud services and databases. The data processing service 121 is configured to process data received from and to be transmitted to the client platforms 102a, 102b . . . 102n, as well other external services, such as third-party cloud services and databases. The libraries 124 may include one or more data repositories for storing information.

In embodiments, the service provider access management modules 105 may include subscription services 127, a permissions module 128, a governance module 129, a QR codes module 130, and a policy module 131. The subscription services 127 are configured to manage subscriptions of users of the platform 100. The permissions module 128 is configured to manage permissions for data sent to, received by, and shared amongst users of the platform 100. The governance module 129 is configured to manage governance policies for data sent to, received by, and shared amongst users of the platform 100. The QR codes module 130 is configured to create and manage QR codes for use in functions of the platform 100, such as facilitating case of sharing contact information amongst users of the platform 100.

In embodiments, the profile coordination modules 106 may include a clustering module 132, a conflict resolution module 134, a synchronization module 137, a validation module 138, and a connections module 139. The clustering module 132 is configured to perform clustering of user profiles. Examples of profile clustering may include clustering by location, vocation, sex, gender, age, workplace, and the like. The conflict resolution module 134 is configured to perform conflict resolution related to user profiles, such as by deduplicating profiles, flagging profiles that appear to belong to the same person but different accounts, flagging profiles that having internally conflicting information, etc. The synchronization module 137 is configured to perform services related to synchronizing information contained in profiles to which users are subscribed according to user preferences and settings. The validation module 138 is configured to perform processes related to validating information contained in user profiles, such as by vetting profile information against workplace records, government records, education records, etc. The connections module 139 is configured to perform and facilitate processes related to connections between users and connections between user profiles.

In embodiments, the interface modules 108 may include an API module 145, an SDK module 146, a UI/UX module 148, an IT integration module 149, a web module 150, and a mobile module 151. The API module 145 is configured to manage and facilitate processes related to creation and management of an API to facilitate communication with the service provider platform 101 by external computing services. The SDK module 146 is configured to facilitate creation and management of a software development kit (SDK) for developing and modifying behaviors of the platform 100 via software. The UI/UX module 148 is configured to facilitate user interface and user experience interfaces for user interaction with the platform 100. The IT integration module 149 is configured to facilitate integration of one or more services and functions of the platform 100 with information technology infrastructure and services. The web module 150 is configured to manage and facilitate processes related to web applications and web browser-based interfaces thereof for interacting with the service provider platform 100. The mobile module 151 is configured to manage and facilitate processes related to mobile applications and mobile interfaces for interacting with the service provider platform 100.

In embodiments, the service provider security layer 110 is configured to provide security functions related to data transmission and processes of the service provider platform 100. The security functions may be or be related to application security, presentation security, session security, transport security, network security, data link security, and/or physical security.

Referring to FIG. 1B, in embodiments, each of the one or more client platforms 102*a*, 102*b* . . . 102*n* may include one or more of a client security layer 111, client system services 112, client intelligence services 113, client access management modules 114, client interface modules 115, and profile curation modules 118. For case and simplicity of description, many of the components, services, and modules are described herein with respect to the client platform 102*a*. It should be appreciated that such components, services, and modules and descriptions thereof may be applicable to any or all of the one or more client platforms 102*a*, 102*b* . . . 102*n*.

In embodiments, the client security layer 111 is configured to provide security functions related to data transmission and processes of the client platform 102*a*. The security functions may be or be related to application security, presentation security, session security, transport security, network security, data link security, and/or physical security.

In embodiments, the client system services 112 may include one or more services configured to process data in conjunction with modules of the client platform 102*a* to perform various services of the 100, such as data handling and data processing. The client intelligence services 113 may include one or more intelligence services configured to perform intelligent services of the platform 100 (e.g., AI-enabled processes, machine-learned algorithms, intelligent agents, etc.).

In embodiments, the client access management modules 114 may include a tokens module 159, a filters module 160, a permissions module 161, and a QR codes module 162. The tokens module 159 is configured to manage and facilitate processes related to creation, distribution, and management of tokens related to functions of the client platform 102*a* and the platform 100, such as session tokens, user tokens, profile tokens, information tokens, and cryptographic tokens. The filters module 160 is configured to manage and facilitate processes related to creation, use, and management of filters related to functions of the client platform 102*a* and the platform 100, such as data filters and profile filters. The permissions module 161 is configured to manage and facilitate processes related to creation, use, and management of permissions related to functions of the client platform 102 and the platform 100, such as user permissions, session permissions, data permissions, etc. The QR codes module 162 is configured to manage and facilitate processes related to creation, use, and management of QR codes for functions and services of the client platform 102*a* and the platform 100, such as QR codes for facilitating connections between users of the platform 100.

In embodiments, the client interface modules 115 include a dashboard module 169 and an IT integration module 171. The dashboard module 169 is configured to create and manage a user dashboard for facilitating user interaction with the platform 100 via mobile applications, web applications, and the like. The IT integration module 171 is configured to create, manage, and facilitate processes related to integration of the client platform 102*a* and services and functions thereof with information technology infrastructure of users, enterprises, etc.

In embodiments, the profile curation modules 118 may include a clustering module 179, a conflict resolution module 181, a validation module 185, and a connections module 186. The clustering module 179 is configured to perform and facilitate clustering of user profiles and data contained within user profiles. The conflict resolution module 181 is configured to perform and facilitate resolution of conflicting data within user profiles and data contained within user profiles. The validation module 185 is configured to perform and facilitate validation of user profiles and data contained within user profiles. The connections module 186 is configured to manage and facilitate connections between users and between user profiles.

Figure 2:
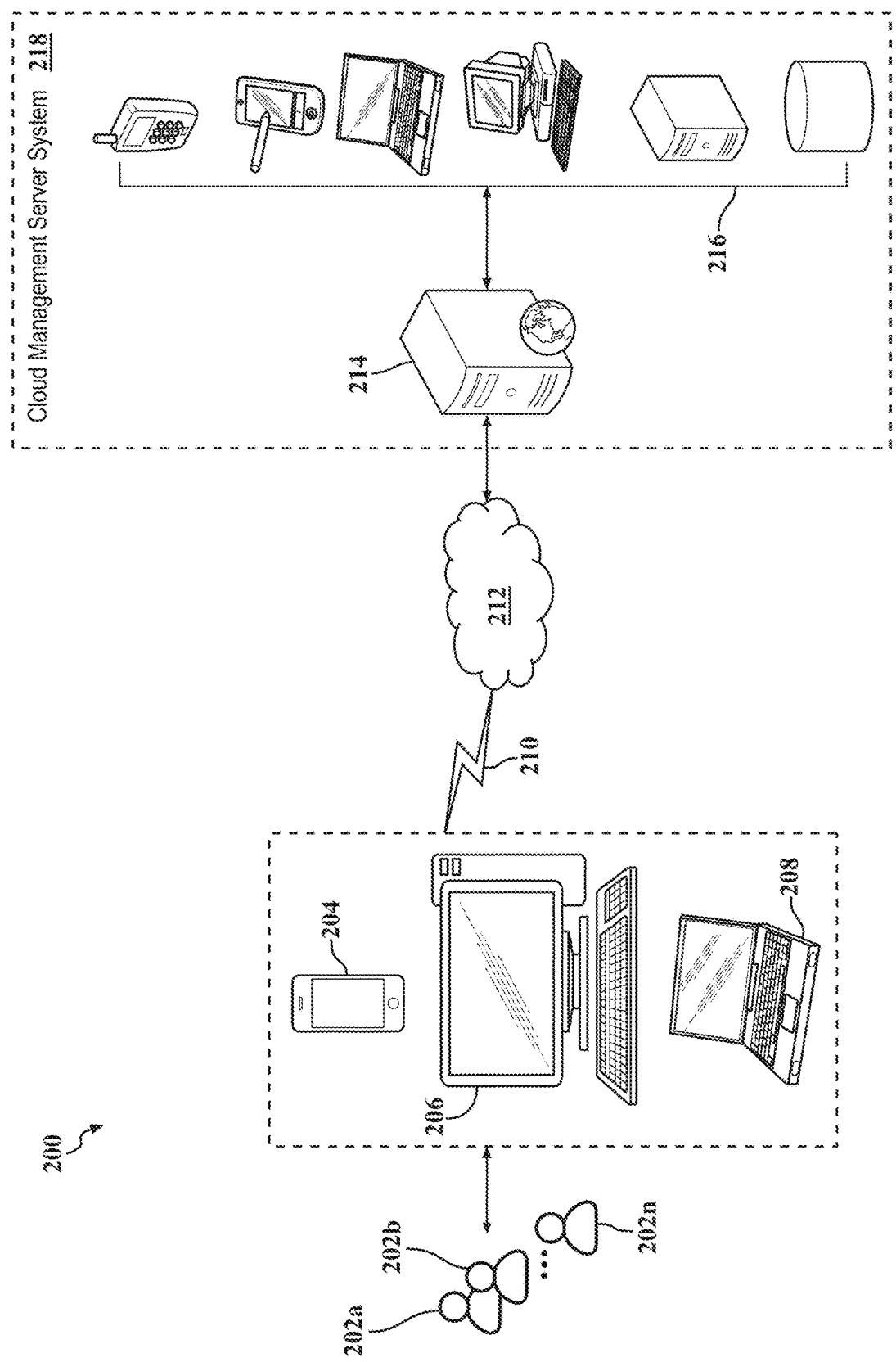
FIG. 2 illustrates a device ecosystem for updating and distributing information associated with an individual, according to aspects of the present disclosure.

FIG. 2 illustrates an exemplary ecosystem of the platform 100. For example, a user (e.g., user 202*a*, 202*b* . . . 202*n*) may update his or her contact personal and/or professional information via at least one mobile or web-based applications (e.g., native iOS or Android apps) installed on the computing devices 204, 206 and 208, respectively. Here, an application may refer to a computer program or software application designed to run on a computing device. Each individual may create one or more customized profiles containing his or her personal and/or professional contact information where each profile contains information chosen for a particular group of recipients. In one embodiment, users may create at least one profile from a template provided by the platform 100 or create their own custom profiles with a number of user defined data fields. A user (e.g., user 202*a*, 202*b* . . . 202*n*) of the platform 100 may fill out profiles with contact attributes (e.g., name, phone number, email, etc.). In some implementations, these attributes may be reused across multiple profiles of a specific user. Each user may select and share at least one selected profile with other users. For example, when sharing profiles with other users, a user may select which of his or her profiles to be shared among a selected contact group. In one embodiment, sharing of profiles may always occur in a closed loop. That is, if user 202*a* is connected with user 202*b*, user 202*a* must have permission to at least one profile from user 202*b* and vice versa.

In accordance with aspects of the present application, each user (e.g., user 202*a*, 202*b* . . . 202*n*) of the platform 100 may invite other users to connect with him or her. For example, each user may initiate a search with an application downloaded on his or her computing device to connect with other users by sending an in-app notification and/or a generated code (e.g., a quick response (QR) code, any suitable machine-readable optical label including 2D or 3D barcodes, or picture or data that may be readable by a digital computing device of a recipient user).

In another embodiment, via the mobile or web-based applications installed on the computing devices 204, 206 and 208, users (e.g., user 202*a*, 202*b* . . . 202*n*) may invite individuals outside of these applications via emails, texts, and/or generated code (e.g., a QR code, any suitable machine-readable optical label including 2D or 3D barcodes, or picture or data that may be readable by a digital computing device of a recipient).

Further, users of computing devices 204, 206 and 208 may synchronize their contacts or connections to their computing devices. In one embodiment, each user may organize which contacts to synchronize to a corresponding computing device and may organize contacts into one or more groups to be synchronized. On the other hand, in response to detecting that a synchronized contact updates his or her personal or professional information, the platform 100 may be configured to determine how to update corresponding databases storing the personal and professional information, and provide appropriate automatic updates to selected computing devices. The term "database," as used herein, may refer to a database (e.g., relational database management system (RDBMS) or structured query language (SQL) database), or may refer to any other data structure, such as, for example, a comma separated values (CSV), tab-separated values (TSV), JavaScript Object Notation (JSON), extensible markup language (XML), TEXT (TXT) file, flat file, spreadsheet file, and/or any other widely used or proprietary format. In some embodiments, one or more of the databases or data sources may be implemented using one of relational databases, flat file databases, entity-relationship databases, object-oriented databases, hierarchical databases, network databases, NoSQL databases, and/or record-based databases.

In accordance with aspects of the present disclosure, platform 200 may comprise a computing server system or device 214 configured to provide, via one or more of the system services 104, e.g., web service that exposes all of the operations used by applications installed on the computing devices 204, 206 and 208 via suitable communication protocol 210 and communication network 212. For example, computing server system 214 may use application programming interface (API), such as an API 145 of the interface module 108, to control and manage information exchanges among disparate data sources. Here, API may generally refer to a set of rules that define how applications or computing devices may connect to and communicate with one another. In one embodiment, via point-and-click interfaces, computing server system 214 may use REpresentational State Transfer (REST) API to expose a number of functionalities, handle authentication using e.g., OpenID Connect with Active Directory (AD) domain services, and handle all commands and queries from applications installed on the computing devices 204, 206 and 208. In one embodiment, AD domain services of the platform 100 may be configured to authenticate all client devices/applications and issue identifiers and access tokens that may be used to make API calls to a server deployed in the platform 100.

For example, computing server system 214 may be configured to provide, via a UI/UX module 148 of the interface module 108, a uniform interface among various connected computing devices and components of the platform 100, such that all requests for the same resource look the same (e.g., multiple users 202a, 202b . . . 202n requesting subscription to a specific user's contact profile), no matter where each specific request is originated. Individual resources may be identified in requests, for example using a uniform resource identifier (URI). Here, a resource may generally refer to any information communicated in the platform 100 including but not limited to an object with a type (e.g., an image file), associated data, relationships to other resources, a set of methods that operate on the resource, etc. In one embodiment, each resource in the platform 100 may be assigned only one logical URI (i.e., a unique identifiable URI) which provides a way to fetch related or additional data relating to the resource. Resources may be grouped into collections and each collection may be homogeneous so that it contains only one type of resource and is unordered. Resources may also exist outside any collection (e.g., singleton resources). Singleton resources may represent a virtual resource for direct interaction of an existing resource instance, e.g., a user's one and only contact profile. Computing server system 214 may be configured to define and manage nested singleton resources when there is a one and only one relationship between a parent resource and its child resource, e.g., a user's preferences of a contact profile. Collections may exist globally, at the top level of an API, or be contained inside a single resource (i.e., a subcollection). Computing server system 214 may be configured to implement a resource model to describe available resources types, their behavior, and their relationships. URIs may map to a single resource, a collection resource (group of resource members of the same type), or a composite resource (group of different resources). A user may perform actions on resources using representations, e.g., to retrieve, create, update, and delete. A representation may be a snapshot in time of the state of a given resource where the state is in a format described by message metadata. The format may include binary or textual key-value pairs. The metadata of a representation may facilitate decision making about the bytes without parsing them. That is, a representation may include information that reflects a past, current, or desired state of a given resource, in a format that may be readily communicated via a protocol. Multiple types of representations may be used for a single request.

Within the platform 100, all resources are conceptually separate from the representations that are returned to each client application or computing device. For example, computing server system 214 may send data from its database as HTML, XML or JSON, none of which are the server's internal representation, and it is the same one resource. When a user (e.g., user 202a, 202b . . . 202n) controls a representation of a resource (e.g., a contact profile), including any metadata attached, she has enough information to customize, modify or delete the resource on a server (e.g., computing server system 214). Further, each message in the platform 100 may be configured to include sufficient information to describe how to process the message. For example, which parser to invoke may be specified by an Internet media type (previously known as a MIME type). Responses also explicitly indicate their cacheability.

In one embodiment, a user (e.g., user 202a, 202b . . . 202n) of the platform 100 interacts with computer server system 214 that is configured to provide information dynamically through hypermedia (e.g., any content which holds connections for various other types of media including images, text, video clips as well as movies). For example, a user device may communicate with computer server system 214 (e.g., accepting an invite from another user) via, e.g., body contents, query-string parameters, request headers and the requested URI. The user may click on an initial API URI and use the server provided links (e.g., hyperlinks within hypertext) to access the requested resources and discover available actions dynamically. On the other hand, computer server system 214 may be configured to deliver state to the user via, e.g., body content, response codes, and response headers. The user computing device need not have prior knowledge of the service or the different steps involved in a workflow. That is, various user computing devices of the platform 100 do not have to hardcode URI structures for various resources beforehand and computer server system 214 may be configured to independently change or evolve the URI of any of its resources.

Moreover, within the platform 100, all client applications (e.g., various mobile or web-based applications installed on the computing devices 204, 206 and 208 of FIG. 2) and/or various computer server system 214 applications or any server applications deployed in cloud management server system 218 are configured to be completely independent of one another. The only information each client application may know is the URI of a requested resource and each client application may be configured to interact with computer server system 214 applications only via URIs. Similarly, various computer server system 214 applications and/or any server applications deployed in cloud management server system 218 may not modify any client application other than passing the requested data via HTTP to each client application.

In accordance with aspects of the present disclosure, each request to computer server system 214 or any server applications deployed in cloud management server system 218 may be configured to include all the information necessary for processing it. In some implementations, requiring no server-side sessions and no application states, servers of the platform 100 do not store any data or state regarding any client session on the server-side. Here, application state generally includes server-side data that servers store to identify incoming client requests, their previous interaction details, and current context information. Resource state generally includes the current state of a resource on a server at any point in time which has nothing to do with the interaction between client and server. An example may include a response from a server as an API response. In one aspect, computer server system 214 may be configured to save all data on at least one backend database or externalize state data into the caches of client devices/applications that interact with it.

In certain implementations, resources of the platform 100 may be cacheable on the client or server side. For example, responses from computer server system 214 may be configured to contain information about whether caching is allowed for the delivered resource. Here, caching may generally refer to storing copies of frequently accessed data in several places along the request-response path. From a system's perspective, caching may generally refer to storing one or more server responses in a client device/application itself, so that the client device/application need not make a server request for the same resource repeatedly. A server response may have information about how caching is to be carried out, so that a client device/application caches the response for a defined time-period or never caches the server response. When a user (e.g., user 202a, 202b . . . 202n) of the platform 100 requests a resource representation, the request may go through a cache or a series of caches (local cache, proxy cache, or reverse proxy) toward the service hosting the resource. If any of the caches along the request path has an updated copy of the requested representation, it may return that copy to fulfill the request. If none of the caches can satisfy the request, the request may be transmitted to an origin server hosting that service. In one embodiment, by using HTTP headers, the origin server may be configured to indicate whether a response can be cached and, if so, by which computing device or application, and for how long. For example, computer server system 214 may use a reverse proxy server (not shown) deployed between client devices/applications and itself for caching responses. The proxy server may obtain a request, examine it for cache headers, and send it to computer server system 214. Subsequently, the proxy server may examine the response from computer server system 214 and, if it is cacheable, cache it with the URI as the key along with some headers in certain cases and the response as the value. GET requests are cacheable by default until a special condition arises, because for the same URI repeated invocation does not change the response. POST requests are not cacheable by default but may be made cacheable if either an "Expires" header or a "Cache-Control" header with a directive to explicitly allow caching, is added to the response. Responses to PUT and DELETE requests may not be cacheable.

In accordance with aspects of the present disclosure, a number of example HTTP response headers may be used to control caching behavior. For example, an "Expires" HTTP header may be configured to specify an expiry time for a cached representation. Beyond that time, a cached representation may be considered stale and be re-validated with an origin server. The header value of a "Cache-Control" may comprise one or more comma-separated directives. These directives determine whether a response is cacheable, and if so, by which device/application, and for how long, e.g., max-age or s-maxage directives. Cacheable responses (whether to a GET or to a POST request) may be configured to include a validator-either an "ETag" or a "Last-Modified" header. An "ETag" value is an opaque string token that a server associates with a resource to uniquely identify the state of the resource over its lifetime. When the resource changes, the "ETag" changes accordingly. Whereas a response's Date header indicates when the response was generated, a "Last-Modified" header may be configured to indicate when the associated resource last changed. The "Last-Modified" value cannot be less than the Date value.

As shown in FIGS. 1-4, the calls and responses within the platform 100 may go through different layers. That is, various client and server applications of the platform 100 may not connect directly to one another. There may be a number of different intermediaries in the underlying communication network of the platform 100, such as the service provider security layer 110 and the client security layer 111. For example, as will be described fully below in FIG. 3, cloud management server system 302 of the platform 100 may use multiple intermediary modules or servers may improve system availability by enabling load-balancing and by providing shared caches.

In accordance with other aspects of the present disclosure, computer server system 214 and other servers deployed in cloud management server system 218 may be configured to usually send static resources. However, in certain cases, responses may be configured to include executable codes such as JavaScript, Java applets, a flash application and these codes may be only run on-demand.

Depending upon specific implementation, computer server system 214 may also be configured to deliver structured content to applications (e.g., Help Topics and FAQs). In a preferred embodiment, computer server system 214 may use a SQL database as the primary data store to manage profiles, profile subscriptions, profile update notification messages, user account information, user preferences, invitations, subscriptions, and enterprises/organizations. In one embodiment, computer server system 214 may use a binary large object (BLOB) storage for file storage including user profile photos and use service bus to publish profile update notification events and receive subscription events (modifications, renewals, failures).

In one embodiment, the computing devices 204, 206, 208 and other devices of the platform 100 may be configured to communicate with the computing server system 214 via a communication network 212 using suitable network connections and communication protocols 210. A communication network (e.g., communication network 212) may refer to a geographically distributed collection of computing devices or data points interconnected by communication links and segments for transporting signals and data therebetween. A protocol (e.g., communication protocols 210) may refer to a set of rules defining how computing devices and networks may interact with each other, such as frame relay, internet protocol (IP), transmission control protocol (TCP), user datagram protocol (UDP), hypertext transfer protocol (HTTP). Many types of communication networks are available, ranging from local area networks (LANs), wide area networks (WANs), cellular networks, to overlay networks and software-defined networks (SDNs), a packet data network (e.g., the Internet), mobile telephone networks (e.g., cellular networks, such as 4G or 5G), Plain Old Telephone (POTS) networks, and wireless data networks (e.g., Institute of Electrical and Electronics Engineers (IEEE) 802.11 family of standards known as Wi-Fi wireless networking technology, WiGig wireless networking technology, IEEE 802.16 family of standards known as WiMax wireless networking technology), IEEE 802.15.4 family of standards, a Long Term Evolution (LTE) family of standards, a Universal Mobile Telecommunications System (UMTS) family of standards, peer-to-peer (P2P) networks, virtual private networks (VPN), Bluetooth, Near Field Communication (NFC), or any other suitable network. Devices 204, 206 and 208 may be configured to communicate in a peer to peer manner to replace, duplicate, supplement or extend the functionalities of the communication network 212.

For example, communication network 212 may be a LAN configured to connect each of computing devices 204, 206, 208 and other devices deployed within a nursing home over dedicated private communications links. Communication network 212 may be a WAN configured to connect computing devices deployed within the nursing home and other geographically dispersed computing devices and networks over long-distance communications links, such as common carrier telephone lines, optical light paths, synchronous optical networks (SONET), or synchronous digital hierarchy (SDH) links. The Internet may be used to connect disparate devices and networks throughout the world, providing global communication among nodes (a node of an Internet has an IP address) on various networks. These nodes may communicate over the communication network 212 by exchanging discrete frames or packets of data according to communication protocols 210, such as TCP/IP. Communication network 212 may be further interconnected by an intermediate network node, such as a router and/or gateway device, to extend the effective size of each network.

In another aspect, the platform 100 may employ a cloud-based communication network 118 for providing computing services using shared resources. Cloud computing may generally include Internet-based computing in which computing resources are dynamically provisioned and allocated to each connected computing device or other devices on-demand, from a collection of resources available via the network or the cloud. Cloud computing resources may include any type of resource, such as computing, storage, and networking. For instance, resources may include service devices (firewalls, deep packet inspectors, traffic monitors, load balancers, etc.), compute/processing devices (servers, CPUs, GPUs, random access memory, caches, etc.), and storage devices (e.g., network attached storages, storage area network devices, hard disk drives, solid-state devices, etc.). In addition, such resources may be used to support virtual networks, virtual machines, databases, applications, etc.

Cloud computing resources accessible via any suitable communication network may include a private cloud, a public cloud, and/or a hybrid cloud. For example, a private cloud may be a cloud infrastructure operated by an enterprise for use by the enterprise, while a public cloud may refer to a cloud infrastructure that provides services and resources over a network for public use. In a hybrid cloud computing environment that uses a mix of on-premises, private cloud and third-party, public cloud services with orchestration between the two platforms, data and applications may move between private and public clouds for greater flexibility and more deployment options.

In one embodiment, backend computing server systems 216 of FIG. 2 may be cloud-based and may comprise at least one of personal computers, servers, server farms, laptops, tablets, mobile devices, smart phones, smart watches, fitness tracker devices, cellular devices, gaming devices, media players, network enabled printers, routers, wireless access points, network appliances, storage systems, gateway devices, smart home devices, virtual or augmented reality devices, or any other suitable devices that are deployed in the same or different communication networks of computing devices 204, 206 and 208. As will be described fully below, backend computing server systems 216 may be configured to provide functionalities for any connected devices, such as sharing data, provisioning resources among multiple client devices, or performing computations for each connected client device.

Figure 3:
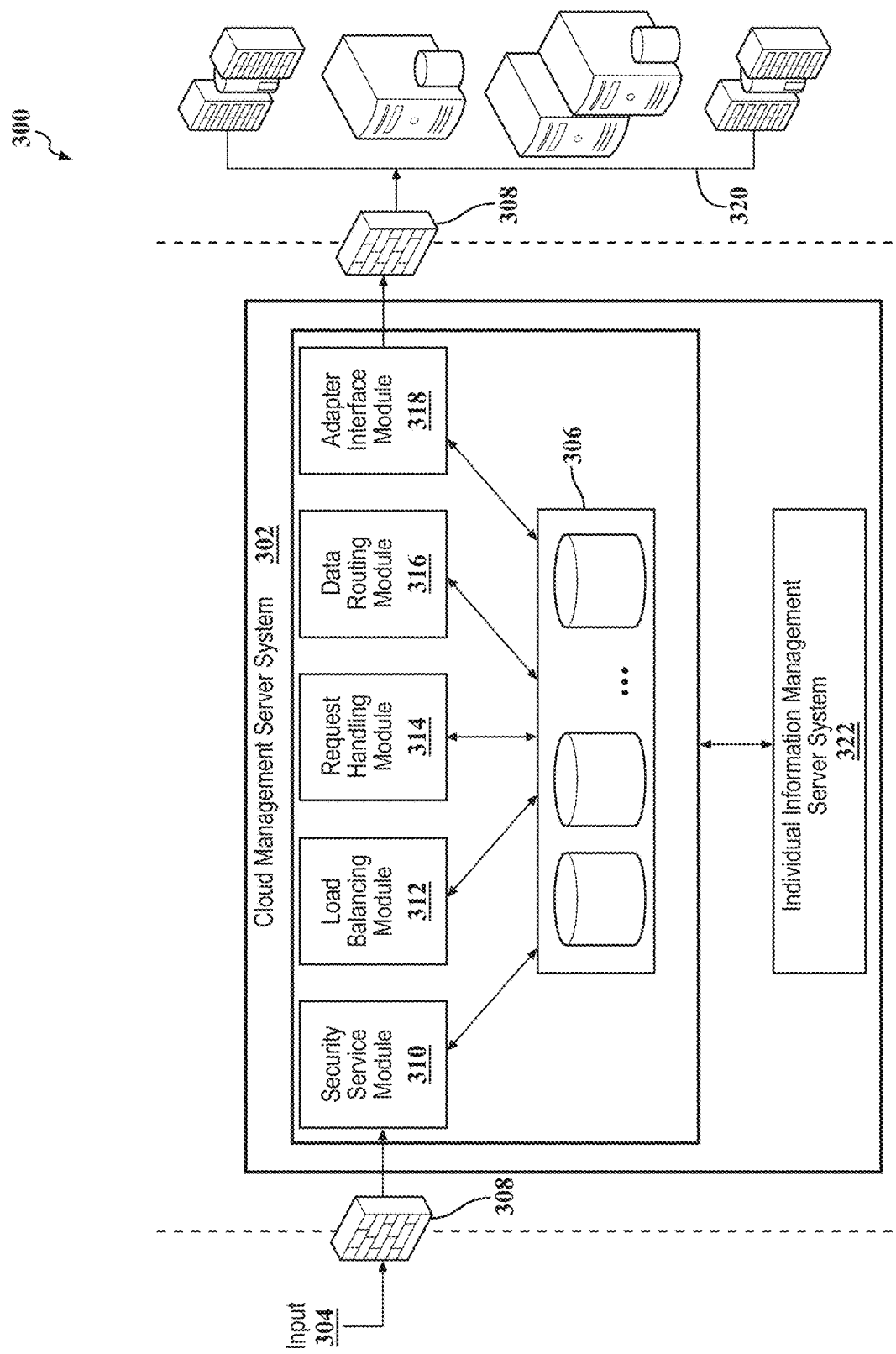
FIG. 3 illustrates an example cloud-based system architecture, according to aspects of the present disclosure.

FIG. 3 shows an example architecture 300 of the platform 100 of FIGS. 1A and 1B using a Cloud management computing server system 302 for exchanging information among different entities, according to aspects of the present disclosure. On a high level, the cloud management computing server system 302 facilitates on-demand delivery of compute power, database storage, software applications, and other IT resources through a cloud services platform via the Internet. The cloud management server system 302 may include multiple cloud servers concurrently running on a hypervisor to control the capacity of underlying operating systems and allocate processor cycles, memory space, network bandwidth and so on. Input 304 (e.g., data and messages) to the cloud management server system 302 may be obtained from the computing devices 204, 206, 208, 214, 216 or other data sources or computing devices connected therewith. In one embodiment, the input 304 may include cloud service invocation messages, result messages, request messages, or any messages communicated among different cloud computing devices. For example, a message may include a message type (e.g., a type value from a set of shared type constants), a unique identifier (e.g., an identifier used to correlate this message with one or more other messages), priority information to support for priority based message queues, timeout, sensitivity indicator to support message data isolation, message source (e.g., a uniform resource identifier (URI) of a sender), a message destination (e.g., a URI that uniquely identifies the destination), a request context (e.g., request information from a dispatcher), and/or a message payload. The payload may have different attributes depending upon the type of message that is being sent, such as parameter data and result data.

In embodiments, the cloud management server system 302 may be configured to operate as a secure intermediary computing environment for real time or near real time data collection, storage, and analysis in connection with the use of the computing devices 204, 206, 208, 214, 216. For example, the cloud management server system 302 may implement techniques to facilitate communications among various mobile computing devices and cloud computing entities (cloud datacenters, cloud web servers, cloud application servers, cloud database servers, cloud storage devices) despite their incompatibilities in communication, such as differences between formats or communication protocols. In certain embodiments, the cloud management server system 302 may be configured to translate communication protocols among different computing devices.

In embodiments, the cloud management server system 302 may be implemented using hardware, software, firmware, or combinations thereof. For example, the cloud management server system 302 may include one or more computing devices, such as a server computer, one or more memory storage data repositories 306, one or more processors, and operate with different kinds of operating systems. Each memory storage device may implement one or more databases (e.g., a document database, a relational database, or other types of database), one or more file stores, one or more file systems, or combinations thereof, and may include instructions stored thereon which, when executed by the processor(s), cause the processor(s) to implement one or more operations disclosed herein.

The data repositories 306 may be accessible by various modules 310-318. For example, one of the data repository 306 may store all the metadata (e.g., run-time and design-time data, each having their own requirements on availability and performance) associated with the server system 302. A tenant or subscriber (e.g., the computing devices 204, 206, 208, 214, 216) of the cloud management server system 302 may have any number of applications installed thereon. Each application may be versioned and have at least one versioned resource application programming interface (API), and corresponding versioned service. The data repository may store one or more callable interfaces, which may be invoked by device 204, 206, 208, 214, 216. The callable interface may be implemented to translate between one format, protocol, or architectural style for communication and another format, protocol, or architectural style for communication. Further, another of the data repositories 306 may be used to store information about processing occurring in the cloud management server system 302, such as messages communicated via the cloud management server system 302 and log information. Additional data repositories 306 may be configured to store logging and analytics data captured during processing in the cloud management server system 302. Depending on the demand of computing devices seeking to communicate with backend cloud resources 320, the cloud management server system 302 may be configured to handle surges and temporary periods of higher than normal traffic between each mobile computing device and other cloud computing devices. For example, the cloud management server system 302 may include elements that support scalability such that components may be added or replaced to satisfy demand in communication.

The input 304 (e.g., a request for cloud service) may be communicated between device 202a, 202b . . . 202n and the cloud management server system 302 via one or more callable interfaces, e.g., APIs. The cloud management server system 302 may be protected by one or more firewalls 308 to provide a secure environment to process requests from various computing devices. For example, the firewalls 308 may permit communication of messages between the cloud management server system 302 and each device 204, 206, and/or 208. Such messages (e.g., SPDY messages, hypertext transfer protocol (HTTP) messages or representational state transfer (REST) messages) may conform to a communication protocol (e.g., SPDY, HTTP, or REST). The input 304 that is received through the firewall 308 may be processed first by security service module 310 which is configured to manage security authentication for a user associated with a service request by at least restricting access to only those who have the required credentials to certain personal and/or professional data. In one embodiment, security authentication may be determined for a request, a session, a user, a device, other criteria related to the user, or combinations thereof. Security authentication may be performed for each request that is received or based on a previous verification of a request. Security authentication may be determined for a user or a device, such that requests to different of the backend cloud resources 320 may be authenticated based on a single verification of security.

Upon determining security authentication, the cloud management server system 302 may use the load balancing module 312 to detect to which of the backend cloud resources 320 the received request is directed, and use a request handling module 314 to transmit each service request to an appropriate of the backend cloud resources 320. A request may be routed to an appropriate resource of the backend cloud resources 320 upon dispatch, or to another module of the cloud management server system 302. The request handling module 314 may resolve a request to determine its destination based on a location (e.g., a URI of the request). The request handling module 314 may parse a request's header to extract one or more of the following information: tenant identifier, service identifier, application name, application version, request resource, operation and parameters, etc. The request handling module 314 may use the parsed information to perform a lookup in the data repositories 306 and retrieve corresponding application metadata. The request handling module 314 may determine the target service based on the requested resource and the mappings in the stored metadata. Via formatting the request and any other necessary information, the request handling module 314 may place the input message on data routing module 316 for further processing, or on a queue and await the corresponding response. The request handling module 214 may process responses received from the data routing module 316 and return a response to, e.g., at least one of the device 204, 206, 208, 214, and 216.

The data routing module 316 may manage delivery of messages to destinations registered with itself. The data routing module 316 may operate as a central system for managing communications in the backend cloud resources 320, such that additional centralized services (additional authorization, debugging, etc.) may be plugged in, as necessary. Data captured by the data routing module 316 may be stored in the data repositories 306.

The data routing module 316 may route messages to one or more destinations 320 directly, or with the aid of an adapter interface module 318 by translating or converting a message to a protocol supported by a receiving cloud device of the backend cloud resources 320. The adapter interface module 318 may establish separate communication connections with each of the backend cloud resources 320.

In accordance with aspects of the present disclosure, the cloud management server system 302 may implement an individual information management server system 322 for obtaining real time data from the computing devices 204, 206, 208, 214, 216, and/or other data sources, such as stored historical data, conducting data capture, storage, analysis, search, sharing, transferring, querying, and updating of the obtained data using proprietary algorithms, and providing feedback to a user in a real time, near real time, daily, monthly, or at a user requested interval. In one embodiment, individual information management server system 322 may manage a web application which is a public facing website for handling authentication using e.g., OpenID Connect with AD domain services, providing data for marketing pages, and providing interfaces for all enterprise and system management. For example, an enterprise management interface may be provided to add/remove internal or external users from an enterprise subscription, and assign roles to internal users. Each subscription may be assigned a defined number of seats. Users with permission to invite other users may be given a certain number of seats they can invite others to use. Such enterprise management interface may be configured to transfer control of the platform 100 from one administrative user to another and display shared contact information for internal or external users. Moreover, a system management interface may be provided to allow administrators of the platform 100 to assist users with common tasks including but not limited to changing emails associated with user accounts if users are unable to use the self-service option in the application, changing password if users are unable to reset password themselves, and displaying subscription information for each user. System management interface may also be configured to manage enterprise subscriptions via options including creating, modifying, deleting certain subscription information, and inviting administrators to enterprise subscriptions.

As discussed above, in one embodiment, users of the platform 100 must share at least one profile between one another. If they do not, the connection between them is removed individual information management server system 322. Those users would no longer see each other's profiles. Business logic may be generally maintained by developers. If a user accepts an invitation to an enterprise seat, a connection between the sender of the invite and recipient is automatically created. That connection may be shared with the enterprise that owns the seat and may be transferred from the sender to another member of the enterprise. Transferring of connections may be managed by an enterprise administrator using a web client of individual information management server system 322.

In accordance with aspects of the present disclosure, individual information management server system 322 may be configured to have an enterprise account model (not shown). Such enterprise account may allow an organization to purchase a defined number of seats and these seats may be allocated to internal employees or external contacts. For example, internal employees may be invited to join the enterprise account. Invitations may be sent via emails by an administrator of the organization. When internal employees create their accounts, they may be required to use a template pre-defined by the organization. Once user accounts are created, users are connected to the enterprise and the template they were required to use may become visible to administrators of the enterprise.

In another aspect, administrators of the enterprise may invite external contacts to the enterprise. Invitations may be sent via an email, a QR code, or a shared URI link. The external users may accept the invitations by sharing one of their profiles with the administrator who invited them. Once connected to the enterprise, the profile they shared initially with the administrator may not become visible to other administrators of the enterprise. The connection with an external contact may be transferred from one administrator to another. The new administrator's profile may be shared with the external contact. The external contact's information may remain shared with the enterprise and viewable by other administrators. If the external contact severs the connection with the enterprise administrator, the connection with the enterprise is disconnected too. As a result, the external contact's profile is no longer viewable by administrators of the enterprise. Generally, a user may belong to multiple enterprises.

Figure 4:
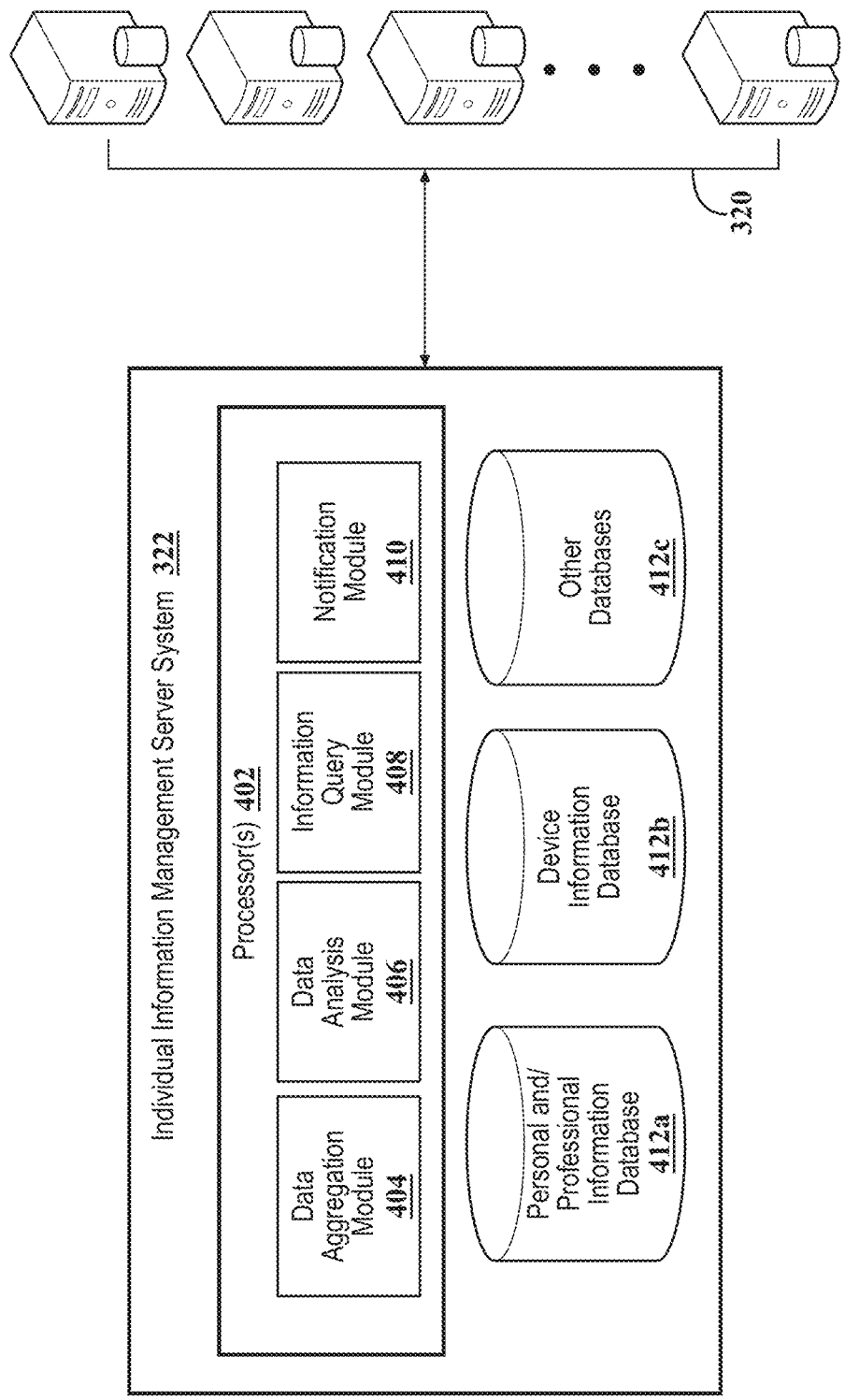
FIG. 4 illustrates an example individual information management server system, according to aspects of the present disclosure.

Referring to FIG. 4, the individual information management server system 322 may include one or more processors 402 communicatively coupled to a plurality of information databases 412a, 412b, 412c. The server system 322 may also be configured to access the plurality of servers and cloud-implemented processing, memory, and data resources 320 connected with the underlying cloud management server system 302 shown in FIG. 3. Thus, as information dynamically changes, the individual information management server system 322 may be configured to scale with additional processing resources, server resources, data storage resources, and data management resources.

The databases 412a, 412b, 412c may include database(s), database management system(s), server(s) to facilitate management, provision, transfer, and analysis of various individual personal and professional information. For example, personal and/or professional information database 412a may retain any confidential or publicly available personal and professional information of a user (e.g., 202a, 202b ... 202n of FIG. 2) of at least one mobile or web-based applications installed on the computing devices 204, 206 and 208 collected from various data sources by a data aggregation module 404.

In accordance with aspects of the present disclosure, a device information database 312b may be configured to obtain and store real-time data from the computing devices 204, 206 and 208 having at least one mobile or web-based applications, determine relativeness of data received from these computing devices and from other sources, and exchange information with other modules or computing devices via appropriate interfaces.

To process data received from at least one computing devices 204, 206 and 208, the processor(s) 402 may control and execute a number of modules including the data aggregation module 404, data analysis module 406, information query module 408, and a notification module 410.

More specifically, the data aggregation module 404 may be configured to utilize one or more communication interfaces to access one or more of the databases 412a, 412b, 412c, and/or the other data source(s) 320 through appropriate network connections, determine a degree of reliability, consistency, comprehensiveness, thoroughness, and accuracy of obtained information corresponding to a specific user, and aggregate the obtained information using appropriate data structures for further data storage or processing. For example, data aggregation may include organizing, categorizing, qualifying, and comparing different sets of information; detecting, identifying, and handling errors and discrepancies. Thus, the data aggregation module 404 may be configured to store the aggregated user information in one or more of the databases 412a, 412b, 412c.

Moreover, the data aggregation module 404 may acquire and store authentication information in the other database 412c. For example, a user, who may be a subscriber to an individual's profile, may use an interface of a computing device to seek access to this individual's contact information with a set of credentials. The authentication information, which may be of any suitable form and content, may be retrieved and used to check the credentials provided. Pursuant to authentication, the user may be granted access to at least a portion of the stored information in databases 412a, 412b, 412c corresponding to the identified individual.

In one aspect, the data aggregation module 404 may be linked to a remote server 320 that provides updates on information changes in databases 412a, 412b, 412c corresponding to the identified individual, periodically crawl for updates and changes, or may otherwise receive notice of information changes from other data sources. Thereafter, the data aggregation module 404 may process the changes to identify the content and scope of the changes, and potential ramifications. For example, the data aggregation module 404 may correlate the changes with stored individual's information. For example, using knowledge representation and reasoning, the information stored in databases 412a, 412b, 412c may be semantically linked and formally structured by the data aggregation module 404, such that the data analysis module 406 may be configured to analyze new information additions in databases 412a, 412b, 412c and changes in rules from experts and automatic learning, perform information changes, and propagate the changes to relevant modules. After each change implementation, the data analysis module 406 may log and maintain these changes for later audit purposes including change recovery and for understanding the evolution history of the rules.

Data analysis module 406 may assess received information relating to a defined rule set and assign a weight to the information. For example, missing information may have a lower score than non-missing information. Information may be weighted according to its data source. Based on the assigned weight, one or more follow-up questions prompting for further information or clarifying information may be generated by an information query module 408.

The information query module 408 may also be configured to handle feedback received from e.g., subscribers of at least one mobile or web-based applications installed on the computing devices 204, 206 and 208, in order to search, retrieve, modify, or facilitate transfer of particular information among different modules and information repositories.

In one aspect of the present disclosure, at least one of the modules 404, 406 and 408 may be configured to handle subscription events generated by App stores that are not sent from a user's device and place them in a queue to be handled by another service, receive subscription events from the queue, validate them and call back into the API to persist any changes (e.g., extending a subscription, downgrading a subscription).

The notification module 410 may be configured to generate and deliver various messages based on user preferences through one or more channels, detect user responses, and take further actions based on the responses. Some alert channels may include known communication resources, either one-way or two-way. Examples include emails, SMS, and push notifications. In accordance with aspects of the present disclosure, the notification module 410 may be configured to receive notification events from queue, determine the best channel to send notification to a user (push notification, SMS, email, etc.), batch profile notifications per recipient to reduce number of sent notifications, and deliver notifications through external commercial services.

Figure 5:
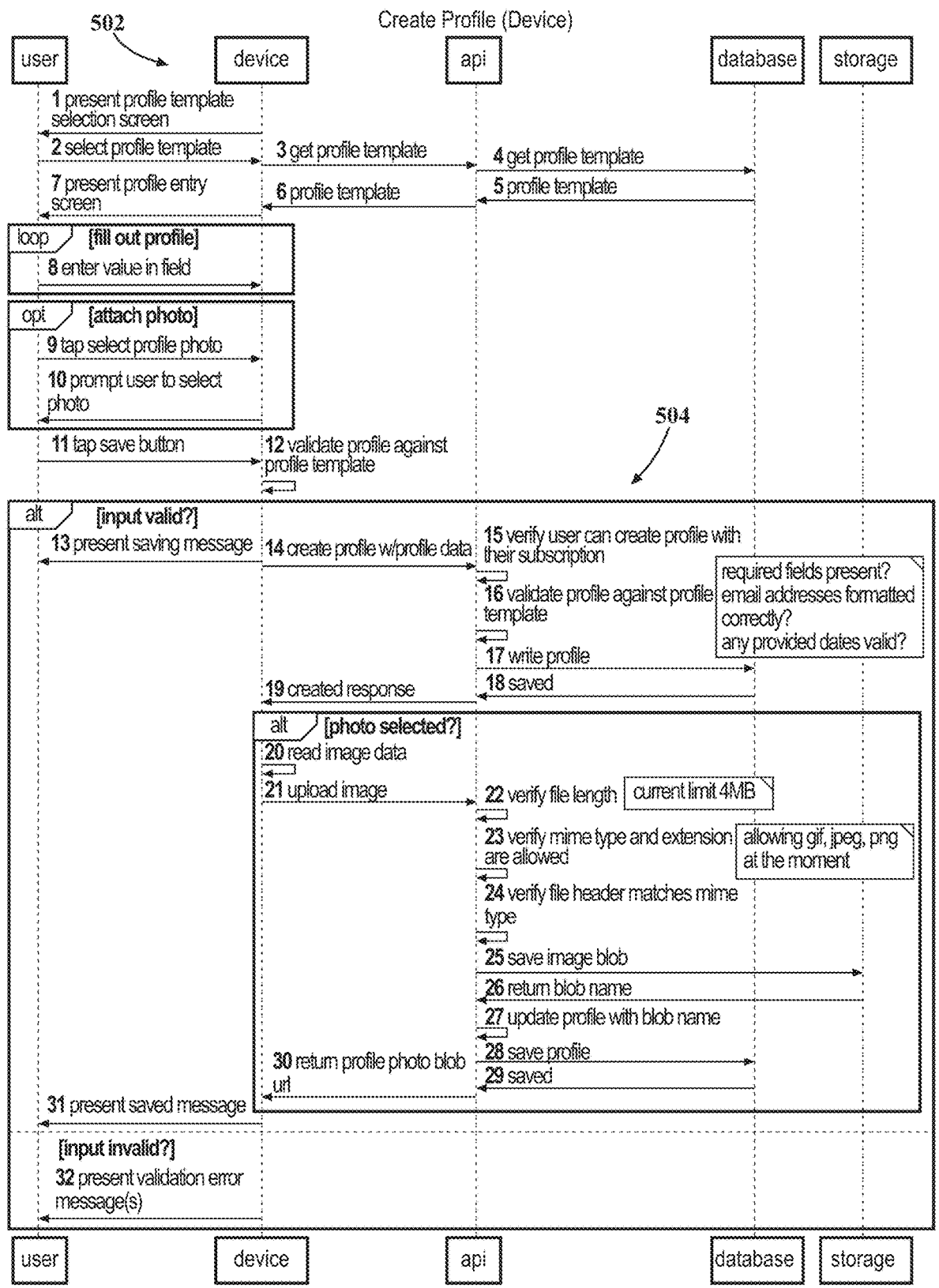
FIG. 5 is a system diagram illustrating how to create a contact profile using the platform of FIGS. 1A and 1B, according to aspects of the present disclosure.

Referring now to FIG. 5, in accordance with aspects of the present disclosure, a user (e.g., 202a, 202b . . . 202n of FIG. 2) may create a contact profile via at least one mobile or web-based applications installed on the computing devices 204, 206 and 208. At 502, initially, the user may open a client application downloaded on his or her computing device and be presented with a profile template selection screen generated via one or more of the service provider interface modules 108 and client interface modules 115. In response to detecting that the user selects a specific profile template, the computing device may, via one or more of the profile curation modules 118, be configured to retrieve the selected profile template from computing device 214 and corresponding database. An example template may specify that a profile field is required. A template may specify that a profile field's value matches a pattern (e.g., email ends with "@somedomain.com"). The client application may present a profile entry screen to the user, such that the user may follow the profile format and fill out each required profile field. In one embodiment, the user may be prompted to upload a phone or picture. At 504, in response to detecting that the user is saving all the inputs, the saved profile may be transmitted to computing server system 214 and the fields of the profile may be validated against the template. In some implementations, additional validations may be performed by computing server system 214 when a field's value does not exceed a defined maximum length. The labels and values of multi-value fields (e.g., email addresses, phone numbers, social profiles, websites) may be validated and only specific labels may be allowed (e.g., for phone numbers, only "work" or "home" as labels). Further, validation takes place to ensure email and URI addresses are correctly formatted. Other values of the saved profile may be checked for maximum length. Computing device 214 may be configured to transmit to and save the profile in a corresponding database subsequent to profile validation and generate a response to the computing device of the user. The user may set an image at the account level (e.g., upload a photo via the client application), and computing server system 214 may be configured to verify the file length against a threshold value (e.g., up to 4 MB), media type and file header information. In one embodiment, preferred multipurpose Internet mail extension (MIME) type of the image data may include GIF, JPEG, PNG and computing server system 214 may be configured to verify the content type header of the image data which is used to indicate the media type of the resource matches the detected MIME type. Subsequently, computing server system 214 may generate a BLOB of the verified image data and save it on the corresponding database which in turn generates a BLOB name. Computing server system 214 may be configured to update the profile with the BLOB name, save the profile on the corresponding database, and return profile photo BLOB URI to the computing device of the user. At the end of this profile creation process, the user may be presented with a message on the client application indicating that a profile has been successfully created and saved or an error message prompting the user to re-enter certain information.

Figure 6:
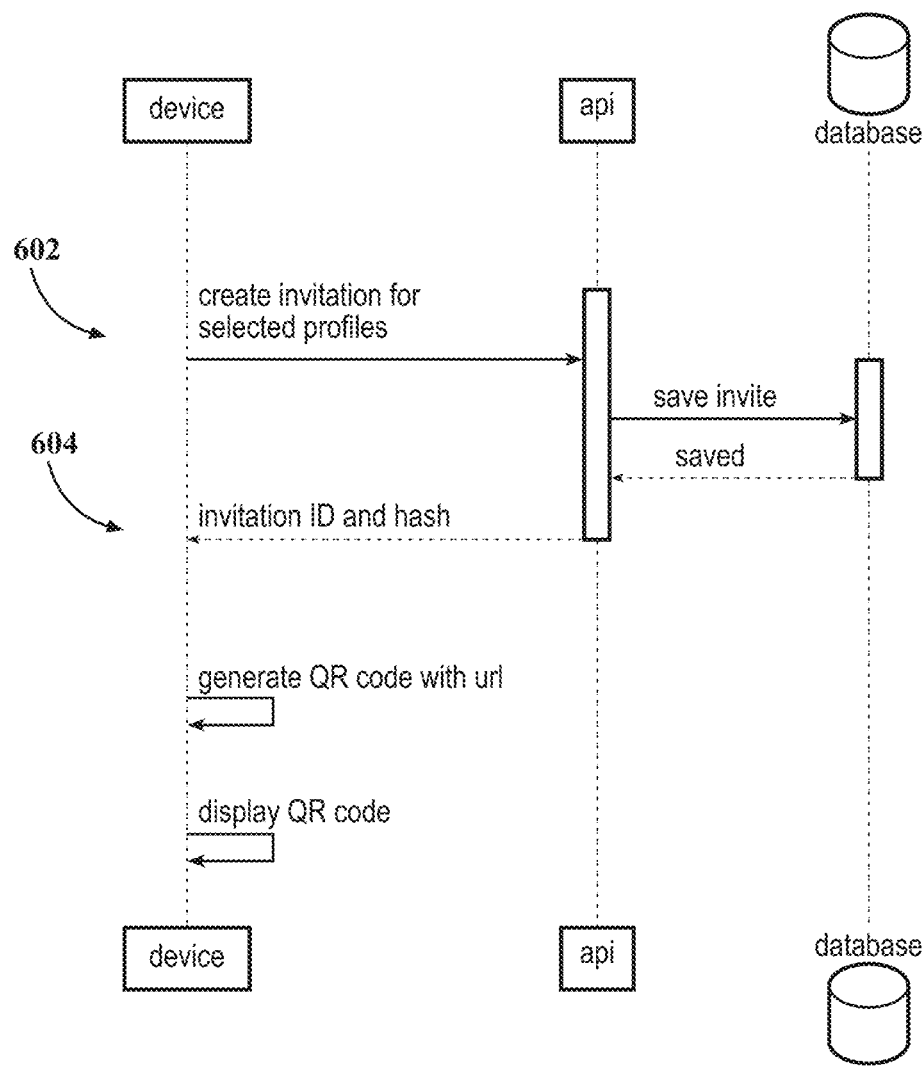
FIG. 6 is a system diagram illustrating how to create an invite with a machine-readable code or label using the platform of FIGS. 1A and 1B, according to aspects of the present disclosure.

Referring to FIG. 6, in accordance with aspects of the present disclosure, a user (e.g., 202a, 202b . . . 202n of FIG. 2) may create a QR code invite to other users via at least one mobile or web-based applications installed on the computing devices 204, 206 and 208. For example, at 602, the client application may, via the client access management module 114, prompt the user to select at least one saved profile for creating an invitation and generate and transmit data representing the user selection to computing server system 214. At 604, upon saving the data on a corresponding database, computing server system 214 may be configured to, via the service provider access management module 105, generate an invitation identifier and hash and send both to the computing device of the user which in turn generates a QR code with URI. Subsequently, the QR code may be displayed on the client application, such that the user may send it to other users for sharing his or her selected profile. In certain embodiments, a QR code invite may be created for one time use. It should be appreciated that other types of codes may be applicable depending on specific implementation of the platform 100 (e.g., machine-readable optical label including 2D or 3D barcodes, picture or data that may be readable by a digital computing device of a recipient user).

Figure 7:
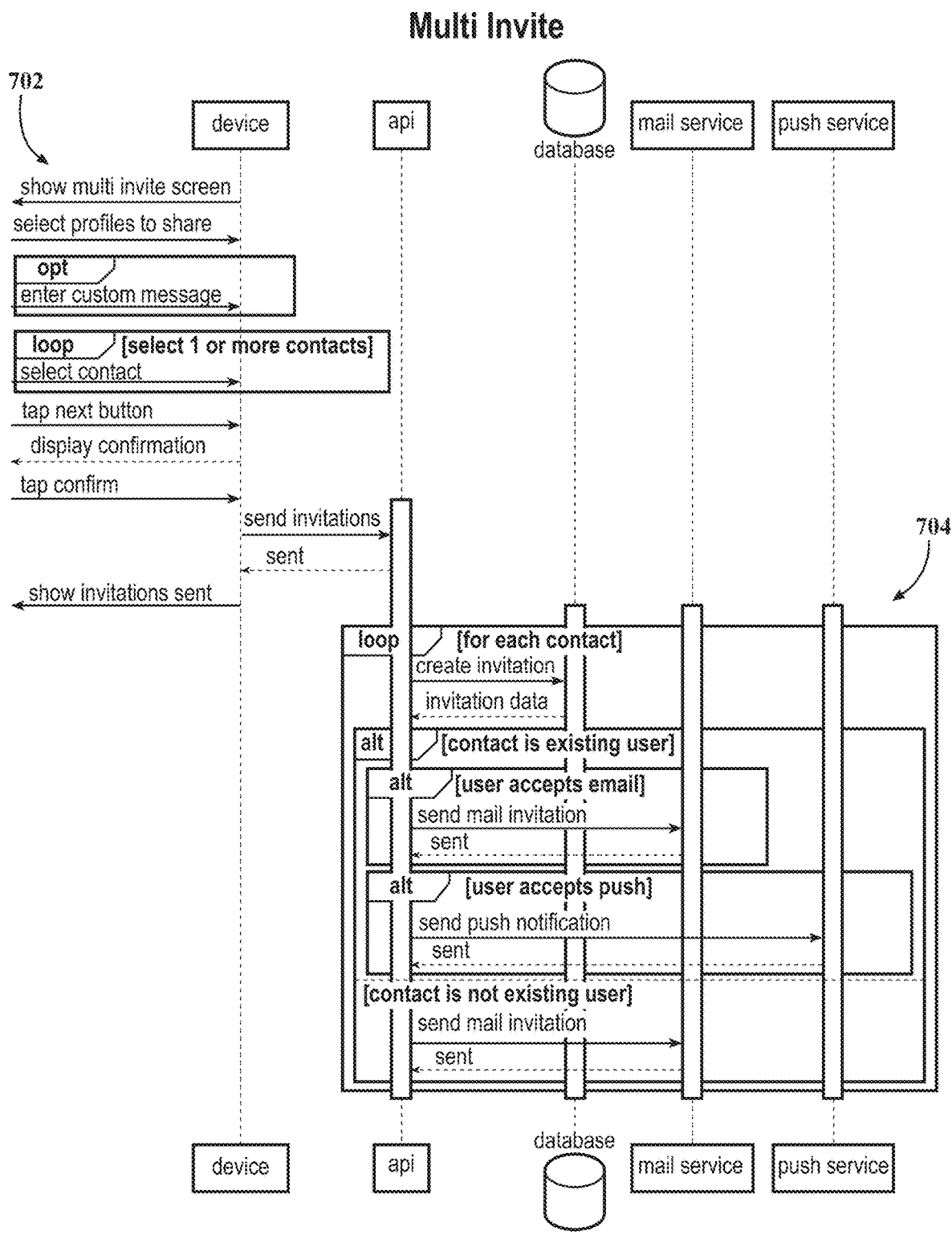
FIG. 7 is a system diagram illustrating how to create a multi-invite using the platform of FIGS. 1A and 1B, according to aspects of the present disclosure.

Referring to FIG. 7, in accordance with aspects of the present disclosure, a user (e.g., 202a, 202b . . . 202n of FIG. 2) may create an invite to multiple recipients via at least one mobile or web-based applications installed on the computing devices 204, 206 and 208. For example, at 702, the user may open a client application downloaded on his or her computing device and be presented with a multi-invite screen. The user may be prompted to enter a custom or personal message which may subject to a character limit validation by computing server system 214. In response to detecting that the user selects one or more profiles to share, the computing device may be configured to provide the user with a list of contacts that may already be stored in the computing device and/or client application. In one embodiment, the list may be configured to show contacts not already connected with in the platform 100. At 704, once the user confirms the contacts of the multi-invite, the computing device may be configured to transmit the invitations to computing server system 214 which in turn creates and saves invitation data for each identified contact on a corresponding database. In response to detecting that a selected contact is an existing user of the platform 100, computing server system 214 may be configured to transmit the invitation to a mail service system and a push service system (e.g., part of computing server system 214 or backend computing server systems 216 of FIG. 2). As a result, such existing user may be configured to receive the invitation and push notification.

In one embodiment, the push service system may be configured to provide services or mechanisms for application developers to send information from various application servers deployed in Cloud management server system 218 of FIG. 2 to the users and application programs on the devices of the platform 100. Examples push mechanisms may include but are not limited to Android Cloud to Device Messaging (C2DM), Apple Push Notification Service (APNS), SMS Push, Lookout Cloudpush, BlackBerry Push Service, long poll (e.g., a persistent connection from client to server which allows the server to notify the client when needed), and etc. Push information may include a lightweight message (e.g., 1024 characters or less) that may instruct a client application program to connect to a specific application server to receive further information, instructions, commands, or updates (e.g., updated information of user's contact profile).

In addition, push service system may be configured to push information or requests to different types of client computing devices from a single server. In some implementations, computing server system 214 and push service system of the present disclosure may be configured to provide a flexible signaling depending on detected device's functionalities thereby supporting a variety of devices, provide fault tolerant delivery for a computing server system, provide a single point for analytics of various push backend mechanisms to compare their performance, and allow for loose coupling between the application server and notification mechanisms, thereby making the client application program more maintainable.

In some embodiments, some push mechanisms may be device-specific. For example, the Android C2DM API, provided by Google, may allow content or application providers to push messages to Android client devices, but not to iPhone devices. Conversely, APNS, the Apple Push Notification Service provided by Apple, may allow push messages to be sent to iPhone client devices, but not to Android devices.

Still referring to FIG. 7, in response to detecting that one or more identified contacts are not existing users of the platform 100, computing server system 214 may be configured to transmit the invitation to the mail service system which in turn generates and transmits an invite to each of these non-users of the platform 100.

In accordance with aspects of the present disclosure, a user may update a pending invitation by sending out another invitation with a different profile. The recipient may not receive additional notifications but when she clicks to accept an incoming invitation, it may be configured to be updated to include the additional profile. Each invite URI generated may be one-time use.

Figure 8:
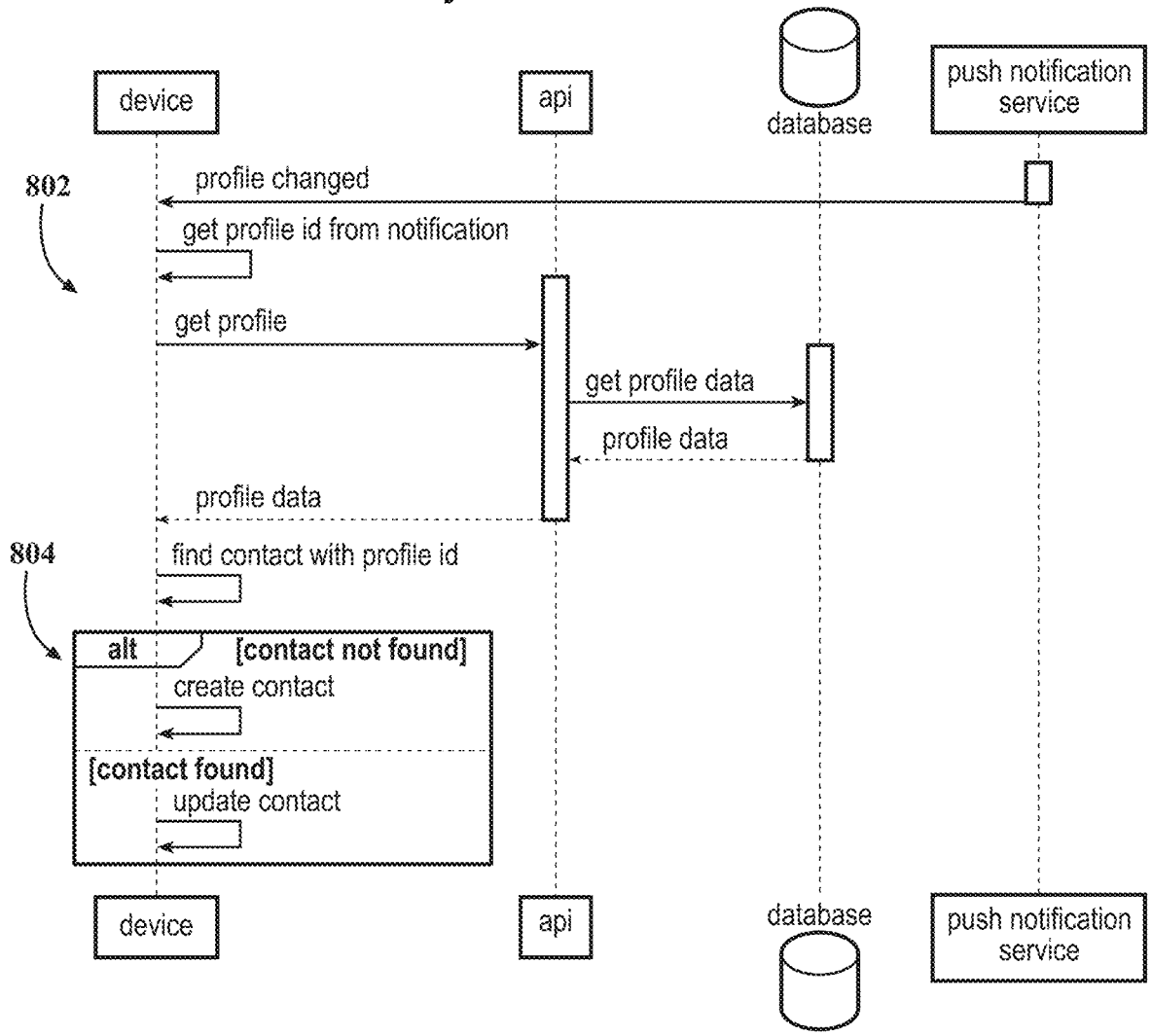
FIG. 8 is a system diagram illustrating how to perform user contact profile synchronization using push notification using the platform of FIGS. 1A and 1B, according to aspects of the present disclosure.

Referring to FIG. 8, in accordance with aspects of the present disclosure, a user (e.g., 202a, 202b . . . 202n of FIG. 2) may receive a profile synchronization push notification via at least one mobile or web-based applications installed on the computing devices 204, 206 and 208. At 802, in response to detecting an update to a contact profile of a user, a push notification including at least an identifier of the profile may be generated and transmitted from push notification service of the present disclosure. In one embodiment, all changes to a contact profile may be pushed out to all of the contact's connections in the client application, such that the recipient user's computing device may be configured to obtain the updated contact profile (e.g., identified by the received profile identifier) from computing server system 214 and a corresponding database. At 804, if the synchronization function has been enabled on a specific user device, the client application may, in communication with the service provider platform 101 and one or more of the profile coordination modules 106, synchronize all changes down to the user device's native contact application. In one embodiment, upon receiving the profile updates, the recipient user's computing device may search stored contacts based at least upon the profile identifier and update the profile accordingly. If the contact has not been found in the recipient user's computing device, the user may be prompted to create a new contact with the updated profile.

Figure 9:
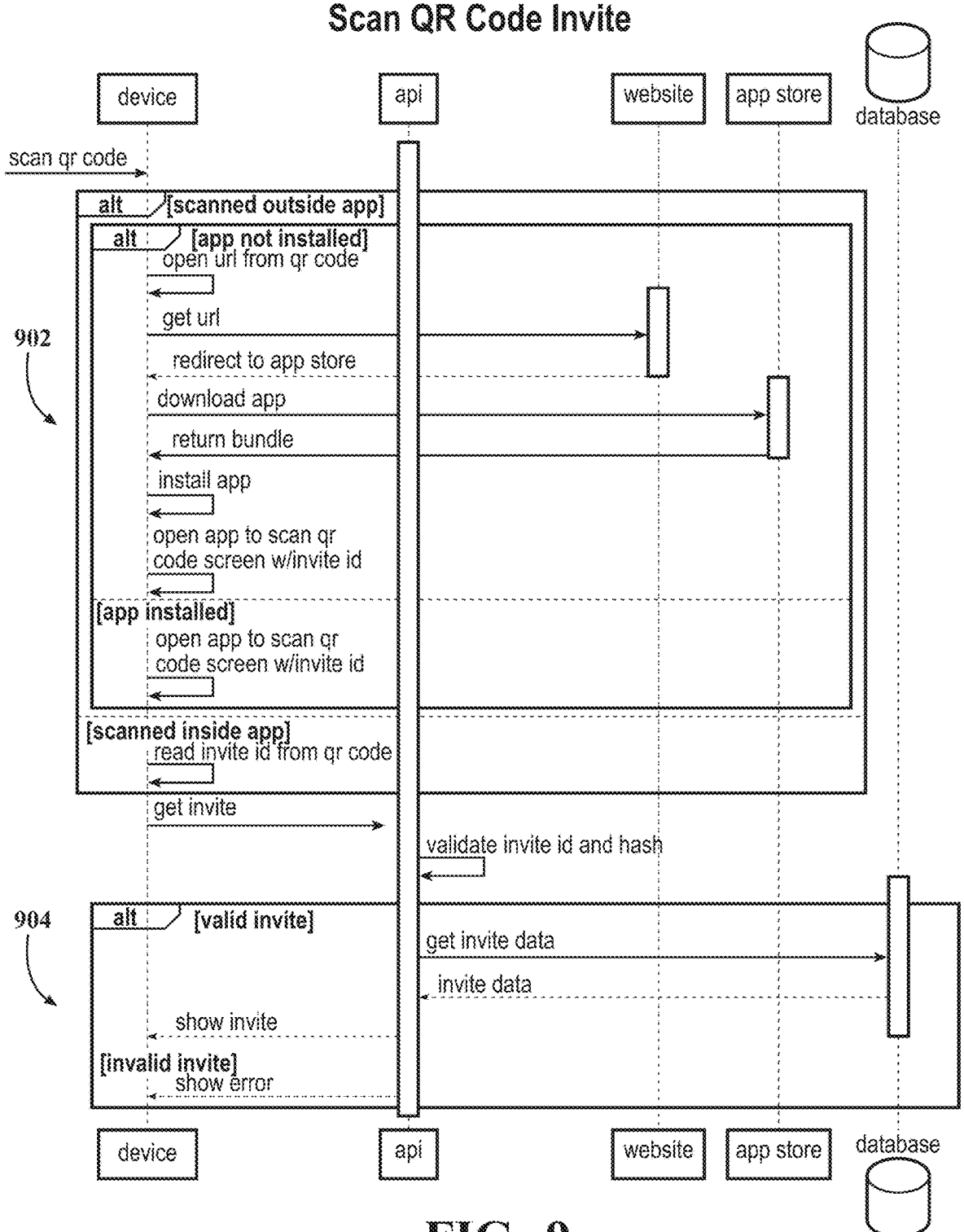
FIG. 9 is a system diagram illustrating how to scan a machine-readable code or label associated with an invite using the platform of FIGS. 1A and 1B, according to aspects of the present disclosure.

As discussed above with respect to FIG. 6, a user of the platform 100 may create and send an invite with a machine-readable code or label to other users via at least one mobile or web-based applications installed on the computing devices 204, 206 and 208. As shown in FIG. 9, a recipient user of such invite may scan the associated machine-readable code or label (e.g., a QR code). In one embodiment, at 902, if the recipient user scans the code outside the client application (e.g., client application is not installed on the recipient user's device), a URI from the code may be used to redirect the recipient user to a website and app store, such that the user may download the client application on his or her device. For example, if the user uses a camera of her mobile device to scan the code, the code may either prompt the user to open the application to handle the invitation or the user is redirected to download the application. If the user downloads the application using the redirect link, the application may pass information to the app store to keep track of the original invitation. Once the client application is properly installed, the user may open the application to scan the code and obtain the invitation identifier.

In another embodiment, a recipient user may scan the code associated with an incoming invite via a previously installed client application to obtain the invitation identifier. At 904, upon being scanned, the code may be validated by computing server system 214 based at least on the invitation identifier and hash. The invitation may be triggered once the code is confirmed and accepted, and data associated with the invitation may be retrieved from a corresponding database by computing server system 214 and displayed on the user's device. In case that the code is not validated by computing server system 214, at least one error message may be generated by computing server system 214 and displayed to the user.

Figure 10:
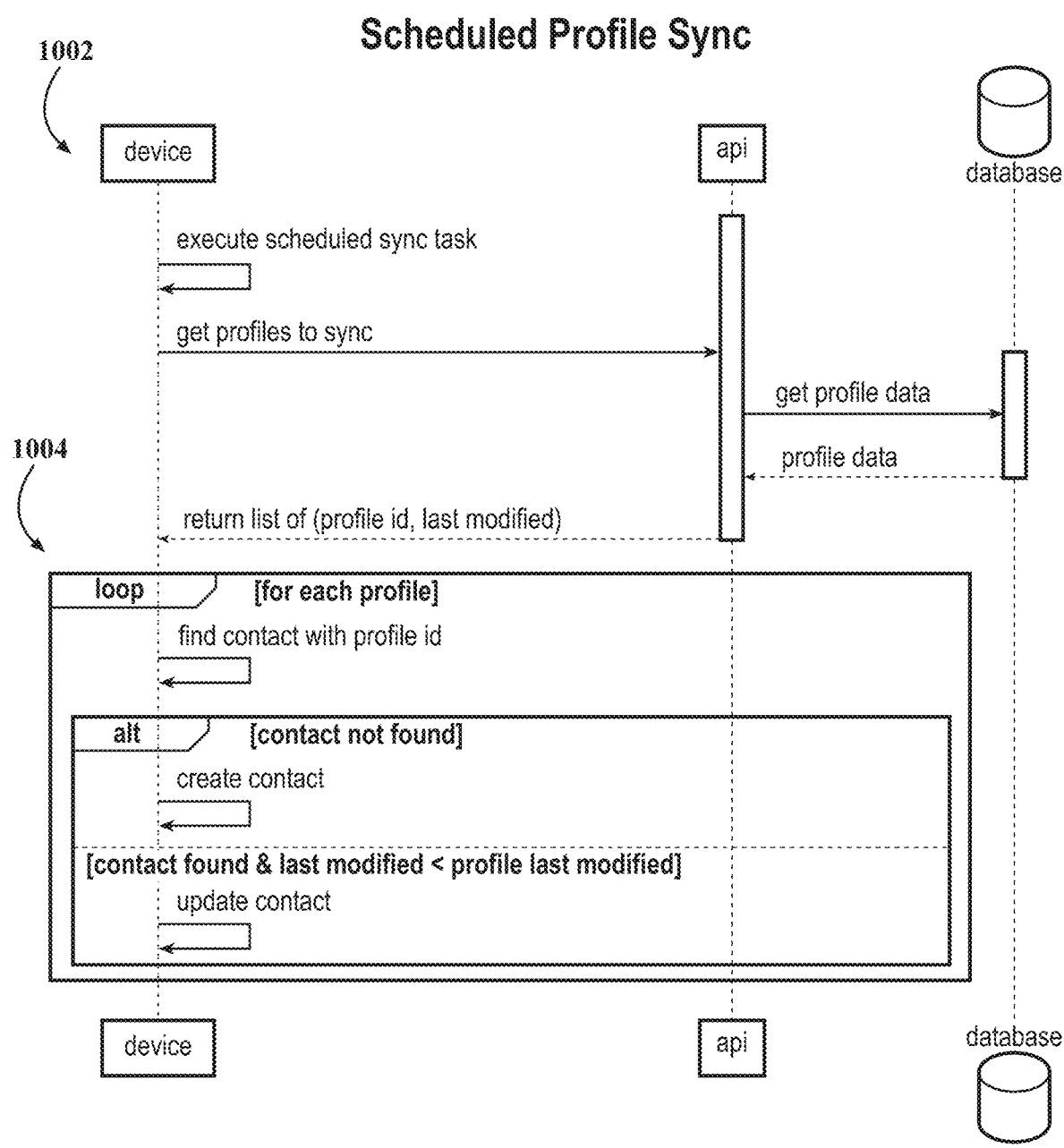
FIG. 10 is a system diagram illustrating how to perform scheduled profile synchronization using the platform of FIGS. 1A and 1B, according to aspects of the present disclosure.

Referring to FIG. 10, in accordance with aspects of the present disclosure, the platform 100 may be configured to perform scheduled profile synchronization on connected computing devices 204, 206 and 208 in response to detecting, e.g., updates to saved user's contact profile(s) or periodically. At 1002, during each synchronization operation, a user's device may be configured to obtain at least one profile identifier and data indicating changes since the most recent synchronization from computing server system 214 and a corresponding database. At 1004, if updates have been made to a specific contact profile, computing server system 214 may be configured to synchronize the profile information down to the user's device. For example, a contact profile may be located on the user's device based on the profile identifier and changes may be made to the contact profile. In one embodiment, computing server system 214 and a corresponding database may be configured to maintain a mapping between instances of objects stored in each user's device and instances of the same objects stored in the database, such that changes of contact profiles between two consecutive synchronizations may be tracked and recorded.

Figure 11:
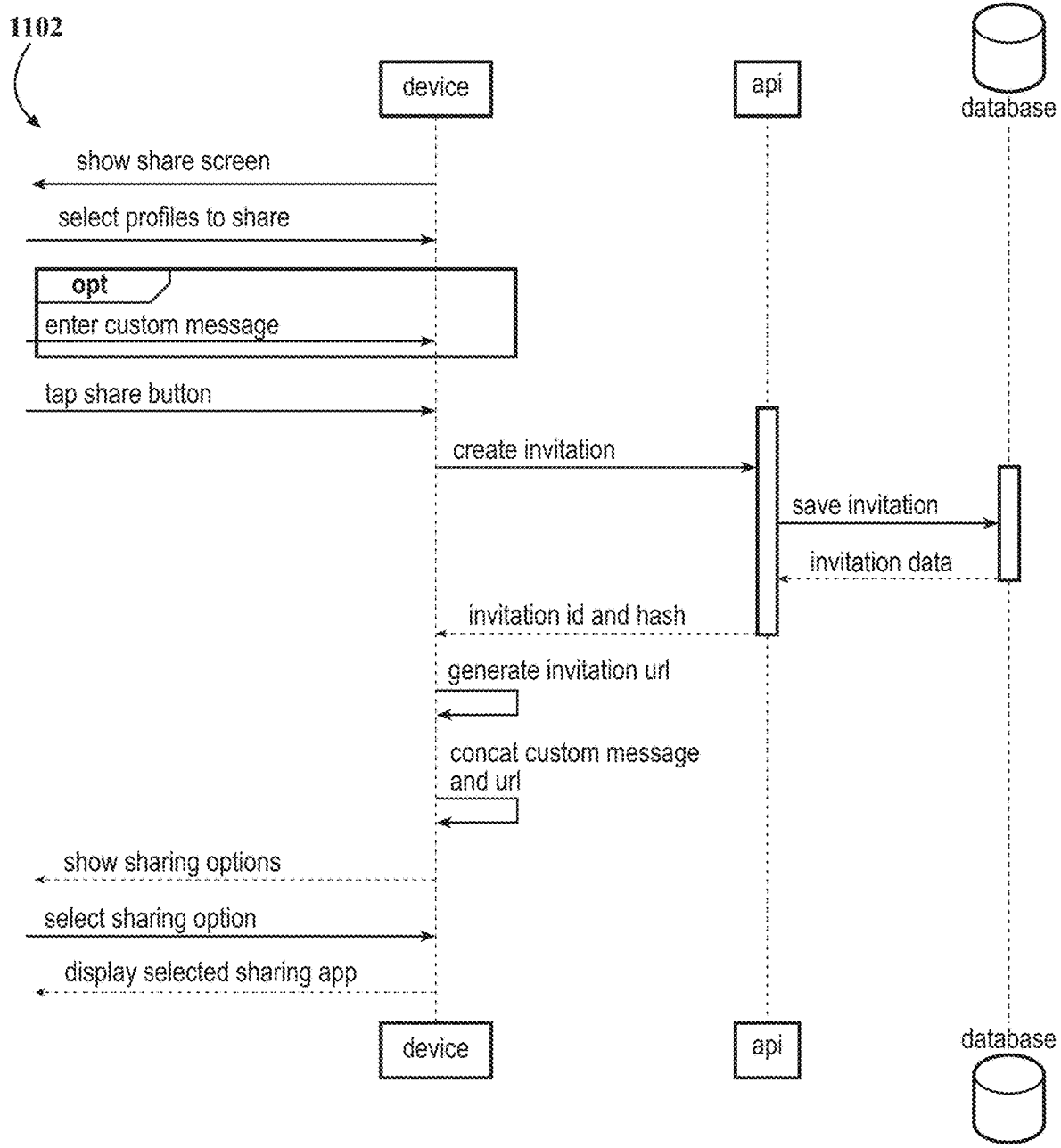
FIG. 11 is a system diagram illustrating how to create a single invite using the platform of FIGS. 1A and 1B, according to aspects of the present disclosure.

Referring to FIG. 11, in accordance with aspects of the present disclosure, a user (e.g., 202a, 202b . . . 202n of FIG. 2) may create an invite to a specific recipient (single invite) via at least one mobile or web-based applications installed on the computing devices 204, 206 and 208. For example, at 1102, the user may open a client application downloaded on his or her computing device and be presented with options to select one or more profiles saved in the platform 100 to share with a recipient user. The user may also be prompted to enter a custom or personal message to the recipient which may subject to a character limit validation by computing server system 214. Once the user confirms the recipient, a single invite may be generated and transmitted to computing server system 214 which in turn creates and saves invitation data on a corresponding database. Subsequently, computing server system 214 may be configured to generate and transmit an invitation identifier, hash, invitation URI, and optionally contact custom message and URI, to the user's device. These URIs may be created for one time use. In one embodiment, one or more sharing options may be displayed to the user before the invite is finalized and sent to the recipient. The link(s) may either prompt the recipient to open the corresponding client application to handle the invitation (existing user of the platform 100) or redirect the recipient to download the corresponding client application (non-user of the platform 100). If the recipient downloads the application using the redirect link, the application may pass information to the app store to keep track of the original invitation.

In accordance with other aspects of the present disclosure, the platform 100 disclosed herein may be configured to achieve application crossover. That is, in addition to supporting the linked connectivity between two users within the client application and direct push of information, the platform 100 may be configured to push outside of the application across application barriers into various connected computing devices' native operating systems' contacts applications, and other third-party applications, such as customer relations management (CRM) tools.

Moreover, the platform 100 disclosed herein may be configured to establish a direct line connection with a 2-way push across that connection line. In contrast to currently available platforms (e.g., social media platforms) that connect parties/users and rely upon a published feed and the ability to subscribe to such feed, information changes, or updates, the platform 100 of the present disclosure provides a direct linkage between connected parties and users. Further, the platform 100 also provides the unique ability to manage within a network those connections, such as the breaking of a connection, unlike the traditional unfollow/unsubscribe of traditional platforms.

In certain implementations, the platform 100 of the present disclosure may be configured to reverse an account creation process historically seen. That is, unlike the conventional practice which generally requires a user create an account under a greater account umbrella to be within that system, the platform 100 of the present disclosure engineers a reverse account creation where an entity creates an account feed to each connected individual.

With respect to database connections, the platform 100 of the present disclosure supports and maintains the capability of housing and connecting all devices and accounts deployed in the underlying communication network, and thus the entire network of connectivity of all users in a comprehensive connectivity web.

In accordance with important aspects of the present disclosure, the platform 100 may be configured to achieve the backend tailoring and ability to create/manage/distribute multiple unique sub-profiles with potentially varying attributes into a consolidated user account, and the ability to push sub-profiles out throughout the application and then across the application barrier to the native contacts applications of connected user computing devices.

In addition, the platform 100 of the present disclosure may be configured to, from a data perspective but while also being all live-feed connections, roll up all downstream, individual live connections to the overarching umbrella enterprise. Rather than consolidation of downstream data, it is the consolidation of ever-changing, fluid information through live, two-way connectivity in the platform 100 of the present disclosure.

In embodiments, the platform 100 may be configured to, via at least one mobile and/or web-based application installed on one or more of the computing devices 204, 206, 208, provide relevant insights and become the go-to "companion app" to a native contact application.

In embodiments, the platform 100 may be configured to provide a contact dashboard configured to sort groups of contacts by metrics such as last touchpoint. A touchpoint may be any suitable interaction between two users, individuals, contacts, and/or profiles, such as individual contact interaction detail page, most recent call, text, email, and/or any other suitable interaction.

In embodiments, the platform 100 may be configured to provide reporting and insights for contacts, which may include contacts managed by the platform 100 and contacts not managed by the platform 100, such as contacts stored on a native contact application of the user device or one or more of the computing devices 204, 206, 208. The platform may be configured to show a verified indicator for contacts that have been confirmed within a given time period, such as a number of weeks.

In embodiments, the platform 100 may be configured to create one or more contact touchpoint frequency schedules to remind/prompt users to create touchpoints with contacts. The touchpoint frequency schedules may remind and/or prompt users to create touchpoints within one or more frequencies defined by the touchpoint frequency schedule, such as a recurring number of days, weeks, etc. The touchpoint frequency schedule may be customizable by the user and/or one or more functions, such as AI-enabled functions, of the platform and may be customized and set for one or more individual contacts, profiles, types of contacts or profiles, groups, and the like.

In embodiments, the platform 100 may be configured to define, manage, and perform a scoring algorithm and related scoring framework to define a contact score indicative of a predicted accuracy of data for each contact. The scoring algorithm may define the contact score based on the scoring framework. The scoring framework may include one or more metrics used to calculate the contact score, the one or more metrics may be related to or based on contact validation described herein.

In embodiments, the platform 100 may be configured to display to the user via one or more of the computing devices 204, 206, 208 one or more user interface components related to the contact score for an individual contact. The user interface components may include an accuracy probability metric depicted by a simple scale or range, a prompt for a user to manually change the contact score, a metric of contact grouping and/or filtering, a prompt for enhanced deduplication and archiving of "stale" contacts, a reverse flow interface allowing a user can see what contacts need updated information and data, an ability to notify users that connected profiles, users, contacts, etc. may have outdated information for you (e.g., via email, text, multiple channels), and/or branded email services facilitated by the platform 100.

In embodiments, the platform 100 may enable users to enable leased connections that expire after a period of time. Thereby, the users may continue to provide updated contact info to leased connections or may opt to let the leased connections expire, thereby automatically ceasing updating of contact information received from and/or transmitted to the leased connections that have expired.

In embodiments, the platform 100 may be configured to facilitate integrations with email marketing providers, such as via export of PURLs.

FIGS. 12A-36 illustrate an exemplary embodiment of a user interface of at least one mobile and/or web-based application installed on one or more of the computing devices 204, 206, 208. The user interface is configured to allow a user (e.g., 202a, 202b . . . 202n) to initiate, request, and/or facilitate performance of one or more operations of the platform 100. The user may download the application (e.g., from an application storefront or website), may run the downloaded application, and/or may access the application via a URL.

Figure 12A:
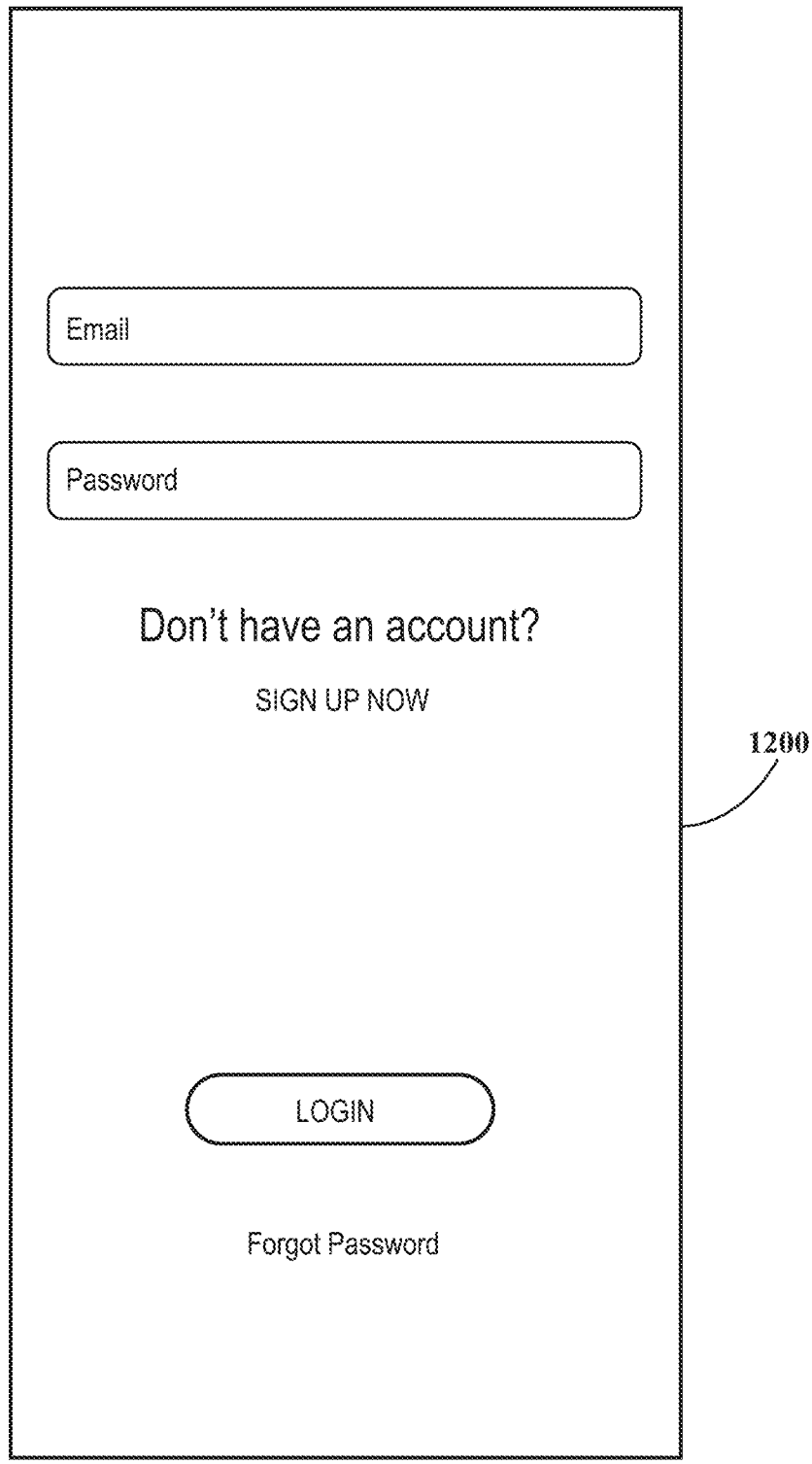
FIGS. 12A and 12B illustrate an exemplary login screen of a user interface of a mobile application, according to aspects of the present disclosure.
Figure 12B:
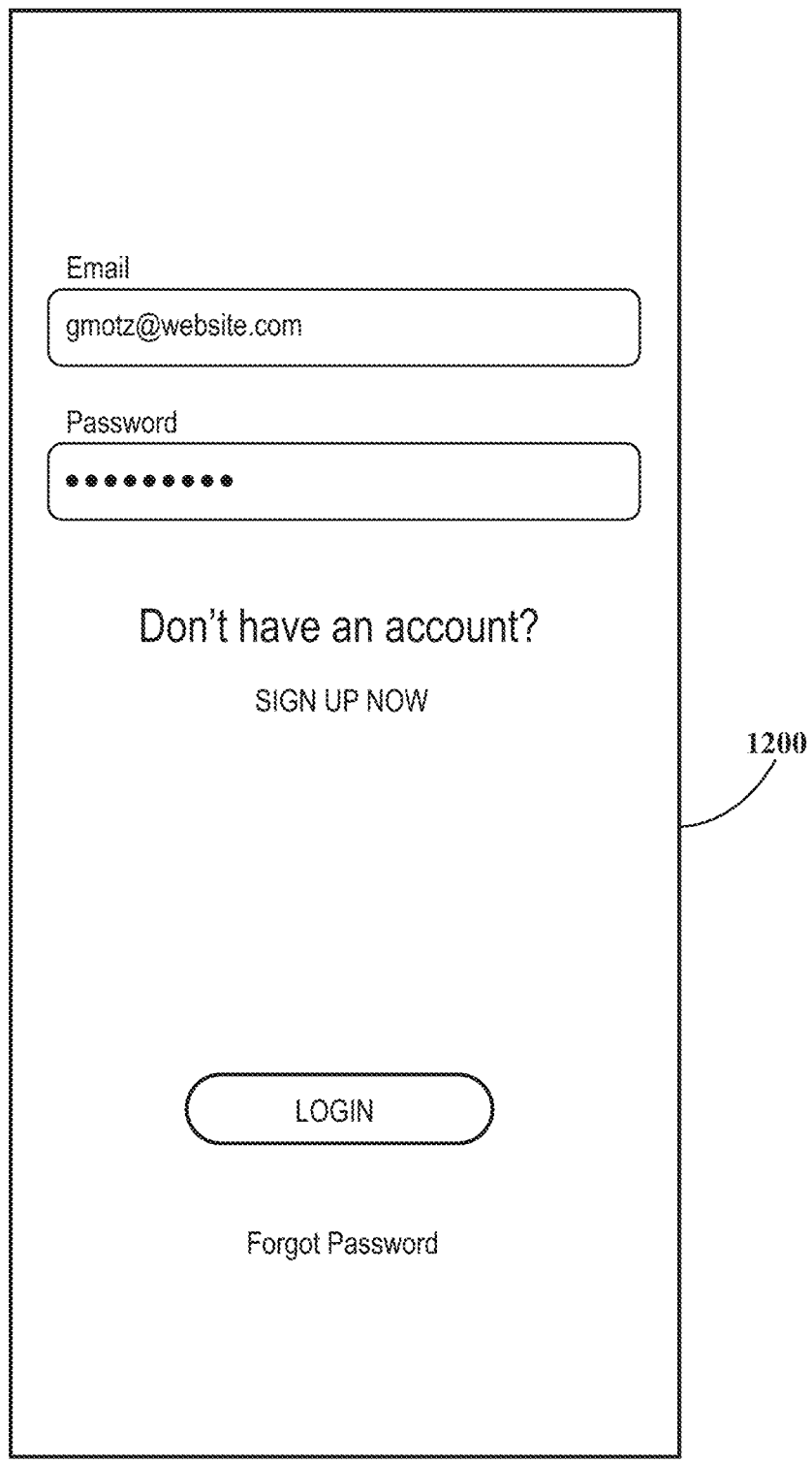
Figure 13A:
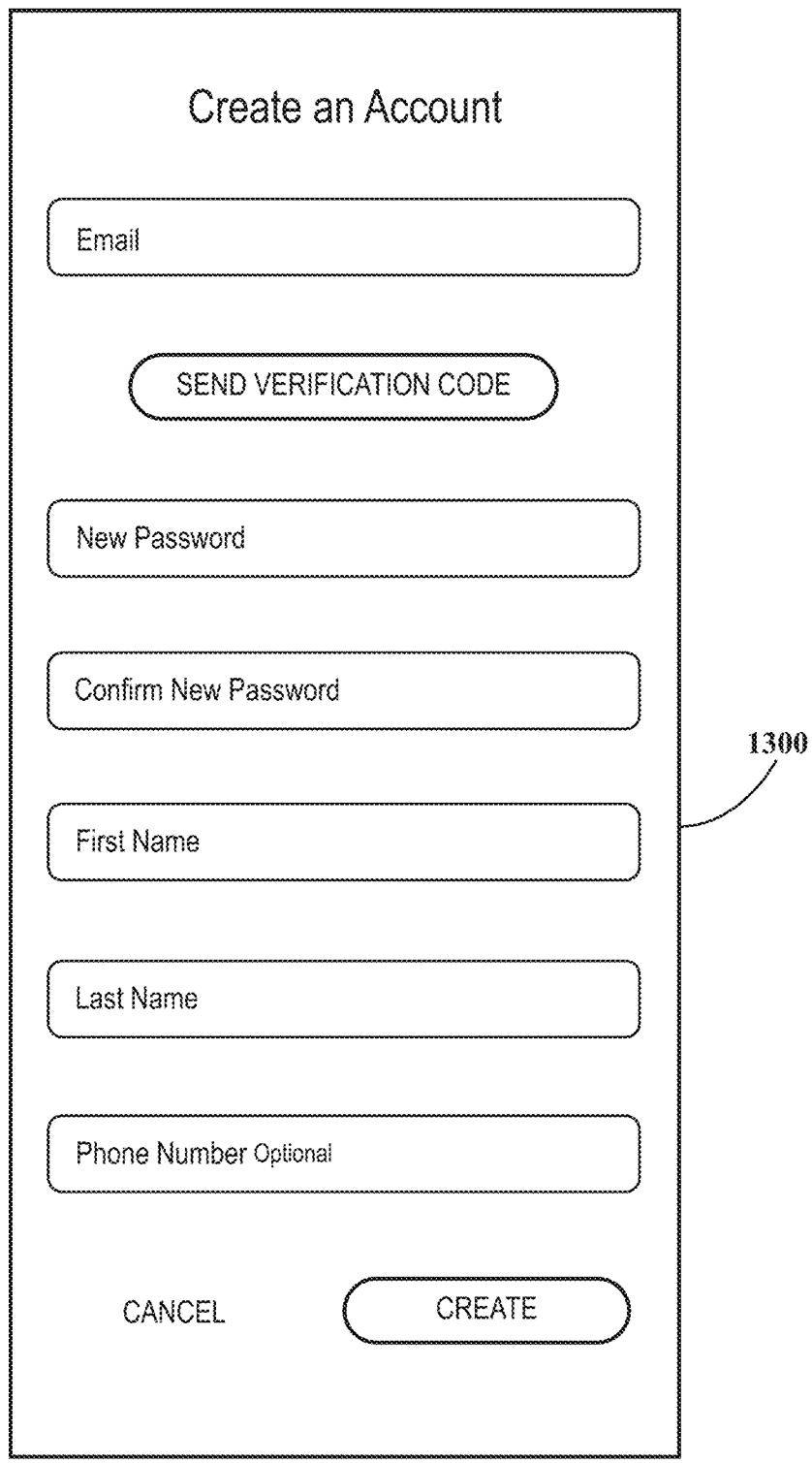
Figure 13E:
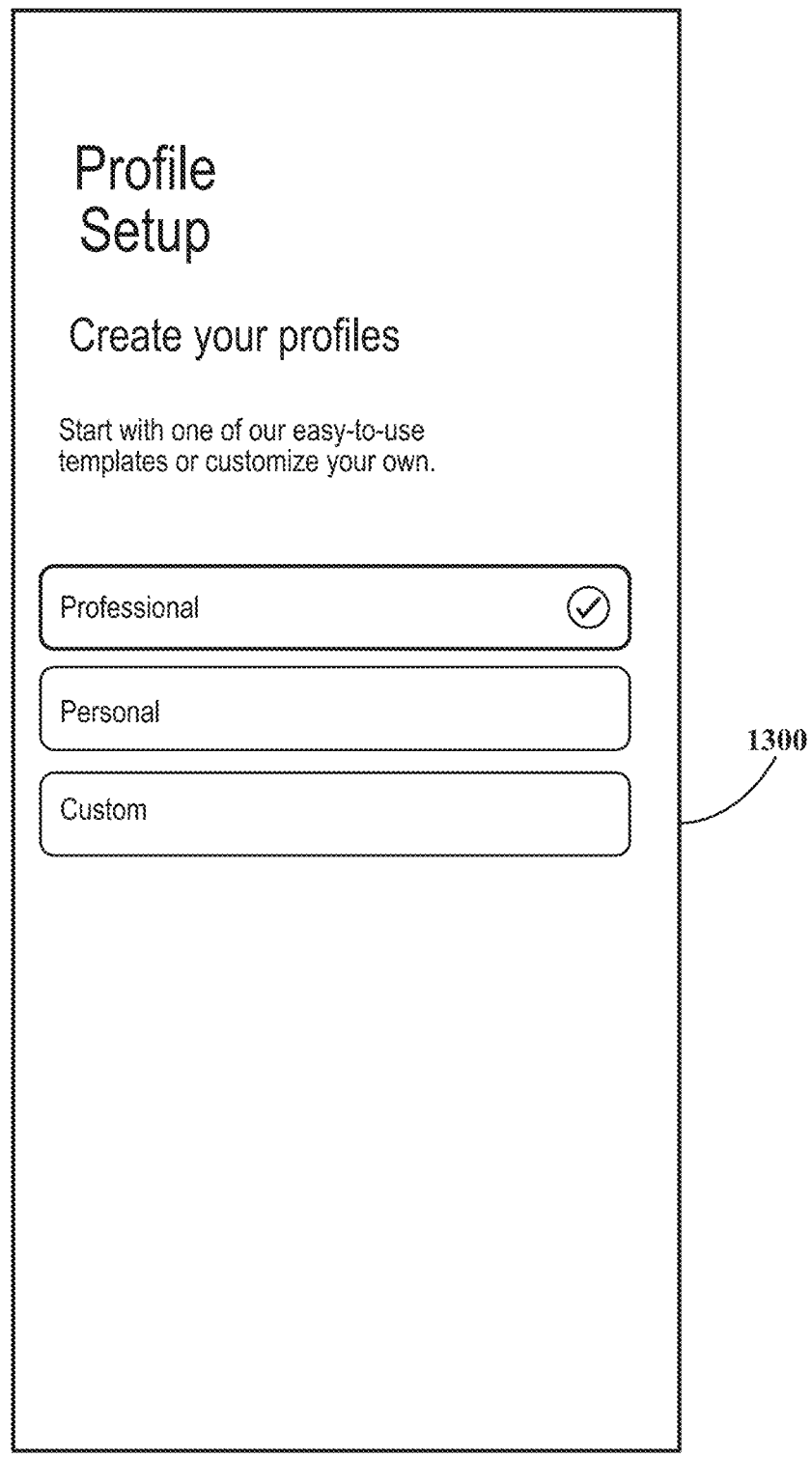
Figure 13F:
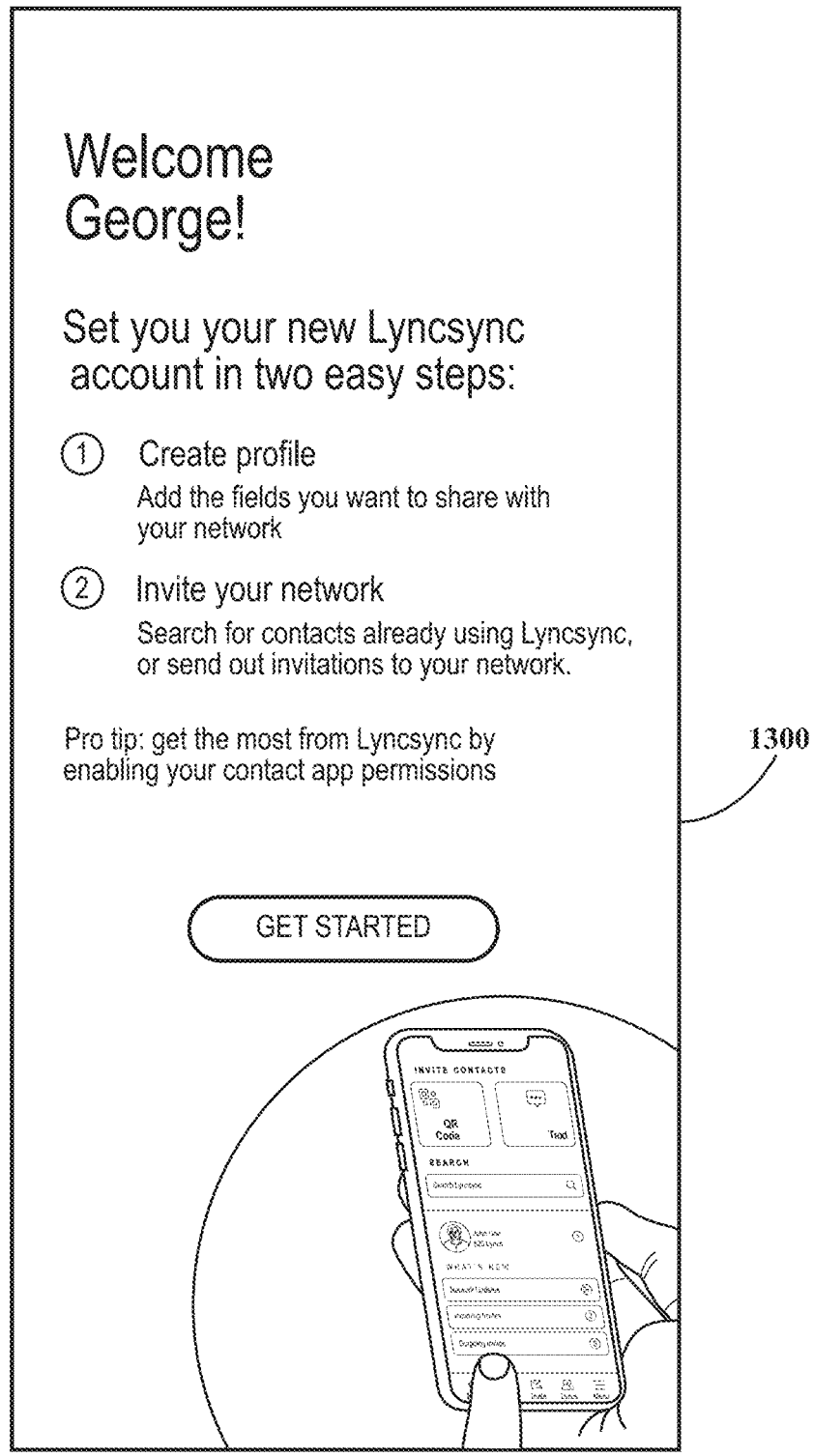

FIGS. 12A and 12B illustrate an exemplary login screen 1200 of the application. Upon running and/or accessing the application, the user may be prompted to create a user account and/or log in to an existing user account associated with the user.

FIGS. 13A-13F illustrate an exemplary account creation screen 1300 of the application. The user may create an account by entering information into the app such as email address, password, first name, last name, and/or phone number. During account creation, the platform 100 may transmit a verification code to the email address submitted to the application by the user to verify access to the email address by the user via multifactor authentication. The platform 100 is configured to verify that the verification code submitted into the application by the user matches the verification code transmitted to the email address provided by the user.

In embodiments, the user interface may prompt the user to create a user profile associated with the user account. The profile may be created according to a template, such as a professional profile, a personal profile and/or custom profile. Each of the professional, personal, and/or custom profiles may be customizable. For example, the user may elect to create a professional profile and enter information related to the profession of the user into the profile (e.g., work email address, work phone number, work address). In embodiments, such as where a user has a role within an enterprise, the template may be pre-populated with relevant contact information for the role, such as the job title of the user, company address, assigned company email, and the like. In embodiments where the profile is associated with a specific role, role-specific elements may optionally be fixed/locked (made not customizable) by the enterprise, while other elements may be left customizable by the user. The user may additionally or alternatively elect to create a personal profile and enter personal information into the profile (e.g., personal email address, personal phone number, home address). The user may change the name of the user profile, such as "Work Profile," or any name that the user desires. The platform 100 is configured to import the information such as first name, last name, email address, and/or phone number, into the profile for association with the user account. The profile may include visual elements, such as a photograph selected by the user, an animation, an emoji, an avatar, or other visual elements. In embodiments, different visual elements may be selected for a work contact profile versus a personal contact profile.

Figure 14A:
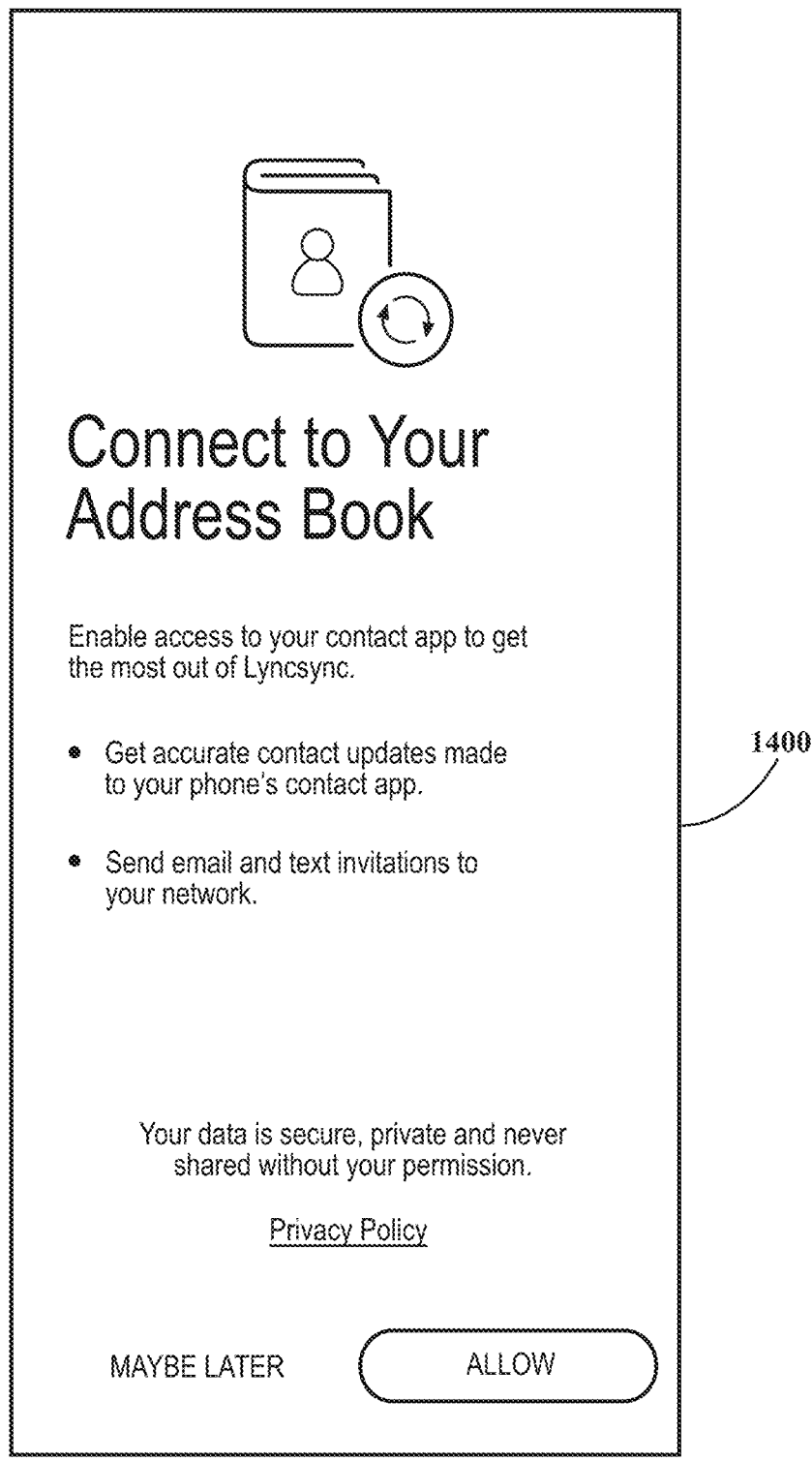
FIGS. 14A, 14B, and 14C illustrate an exemplary address book permissions screen of the user interface of the mobile application, according to aspects of the present disclosure.
Figure 14B:
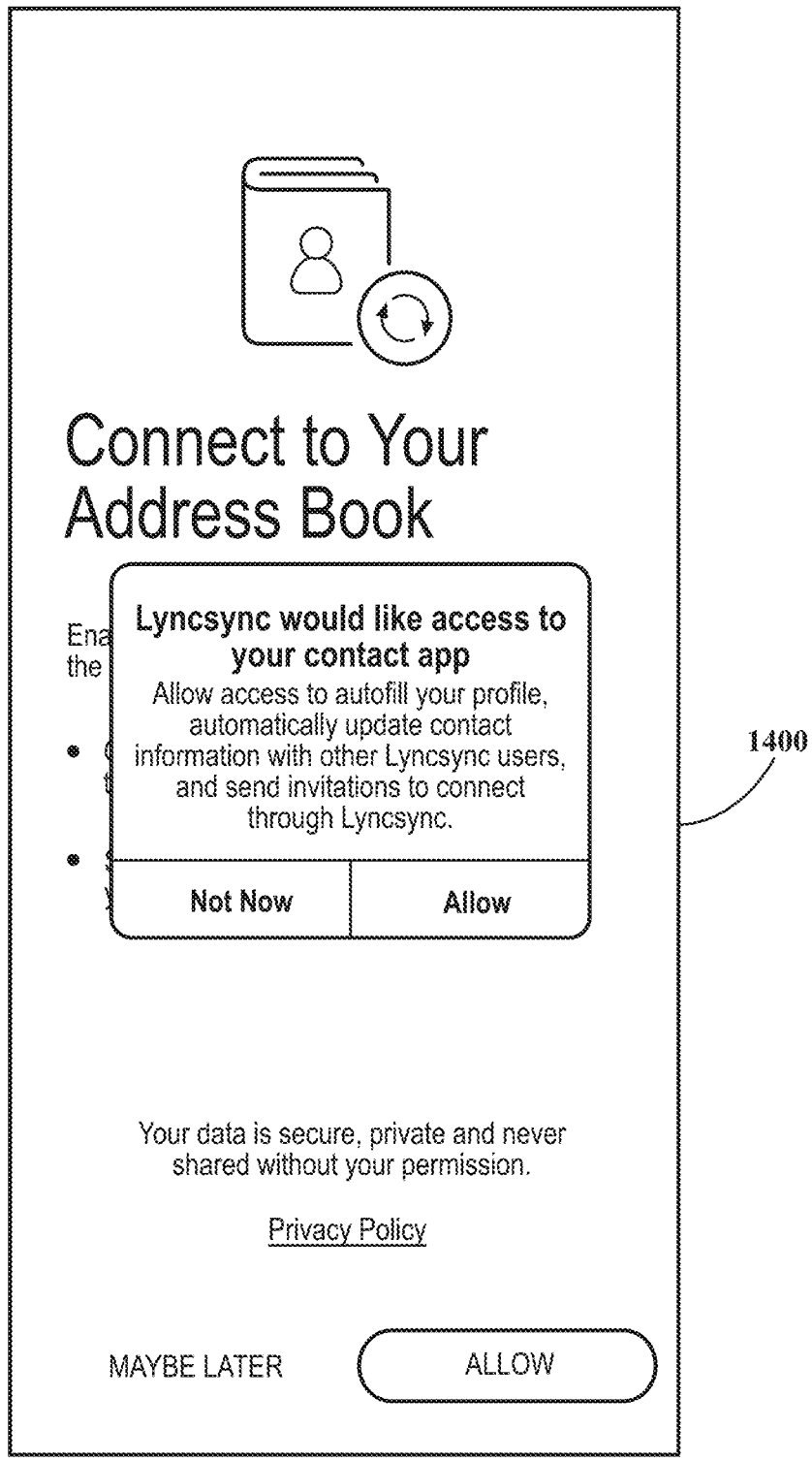
Figure 14C:

Referring to FIGS. 14A, 14B and 14C, the user interface may, via a contact import screen 1400, prompt the user to allow the platform 100 to import existing contact information, e.g., from contacts stored on and/or associated with the mobile device of the user. Upon importing the contact information, the platform 100 may transmit invitations to contacts within the contact information, the invitations being configured to allow recipients thereof to become users of the platform 100. Upon receiving an invitation, an invited contact may be prompted to create a profile and connect with the user via the mobile application and/or web-based application. Rather than having each recipient user's system import all contact cards and have that information on its system, the system establishes a link by which the recipient set up an account that will pull contact information from the sender. The sender continues to own and control the curation of the contact information.

Figure 15:
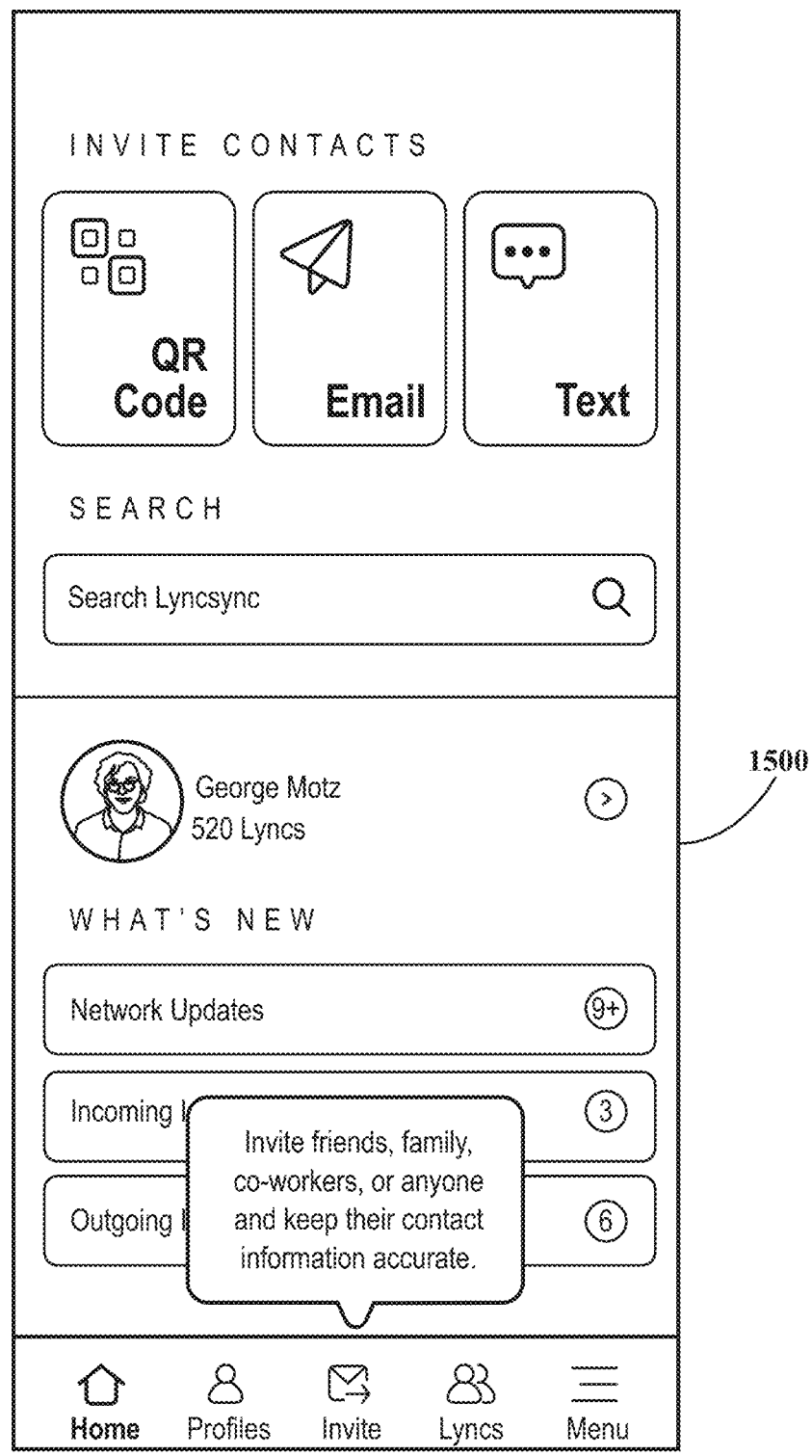
FIG. 15 illustrates exemplary embodiments of a home screen of the user interface of the mobile application, according to aspects of the present disclosure.

FIG. 15 illustrates an exemplary embodiment of a home screen 1500 of the user interface of the mobile application. The home screen may include one or more initial dialog boxes and/or graphical bubbles to help familiarize the user with the user interface. For example, a dialog box may prompt the user to invite friends, family, coworkers, associates, etc. of the user to create user profiles and engage with the platform 100.

In embodiments, the home screen may include information indicative of network updates, incoming invitations, and/or outgoing invitations related to the user profile. For example, when a user profile of another user with which the user is connected is updated, the home screen may display information indicative of the update.

Figure 16:
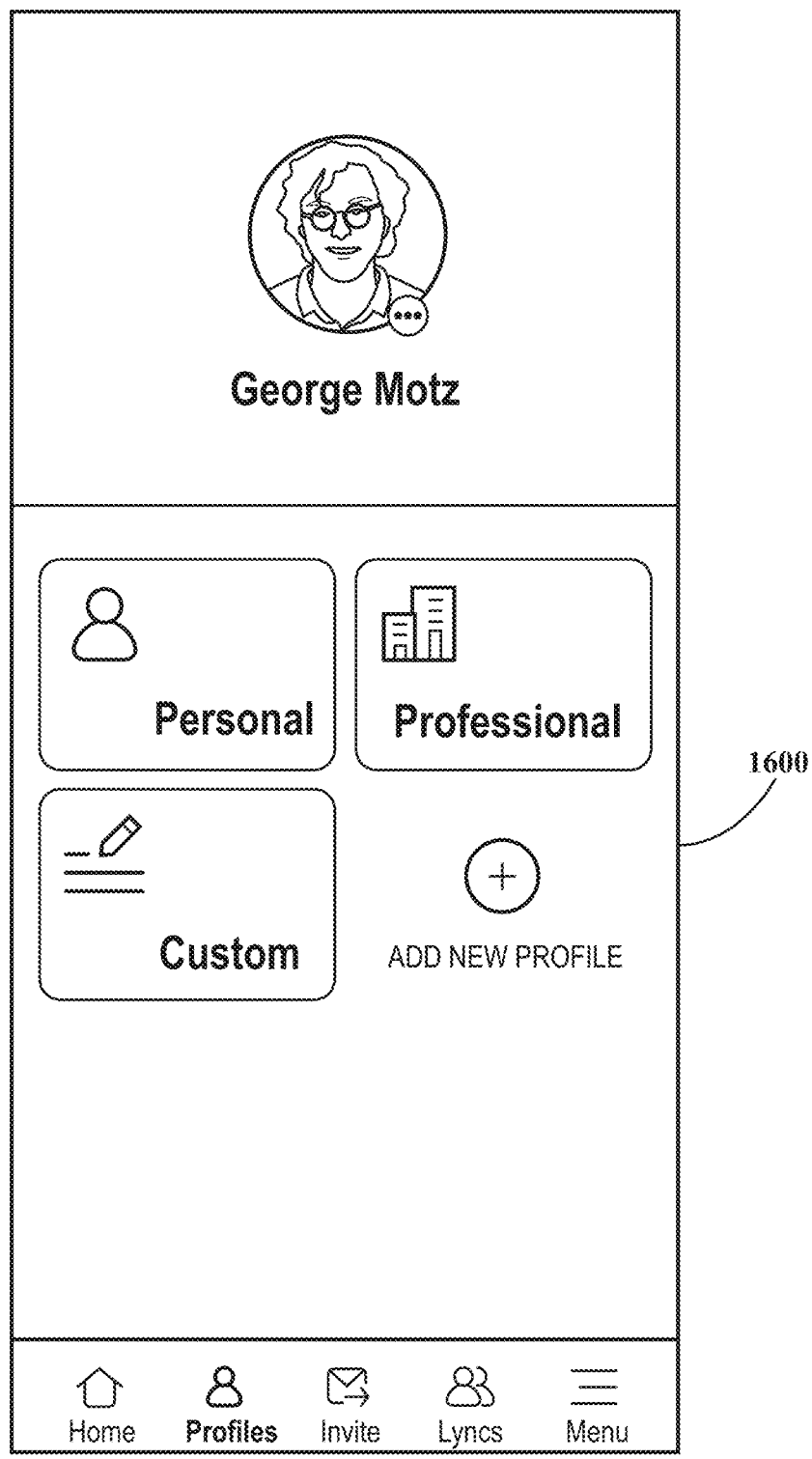
FIG. 16 illustrates exemplary embodiments of a profile screen of the user interface of the mobile application, according to aspects of the present disclosure.

FIG. 16 illustrates an exemplary embodiment of a profile screen 1600 of the user interface of the mobile application. The profile screen may allow the user to view and/or change information associated with each of the one or more user profiles (e.g., personal profile, professional profile, custom profile) associated with the user account of the user.

Figure 17:
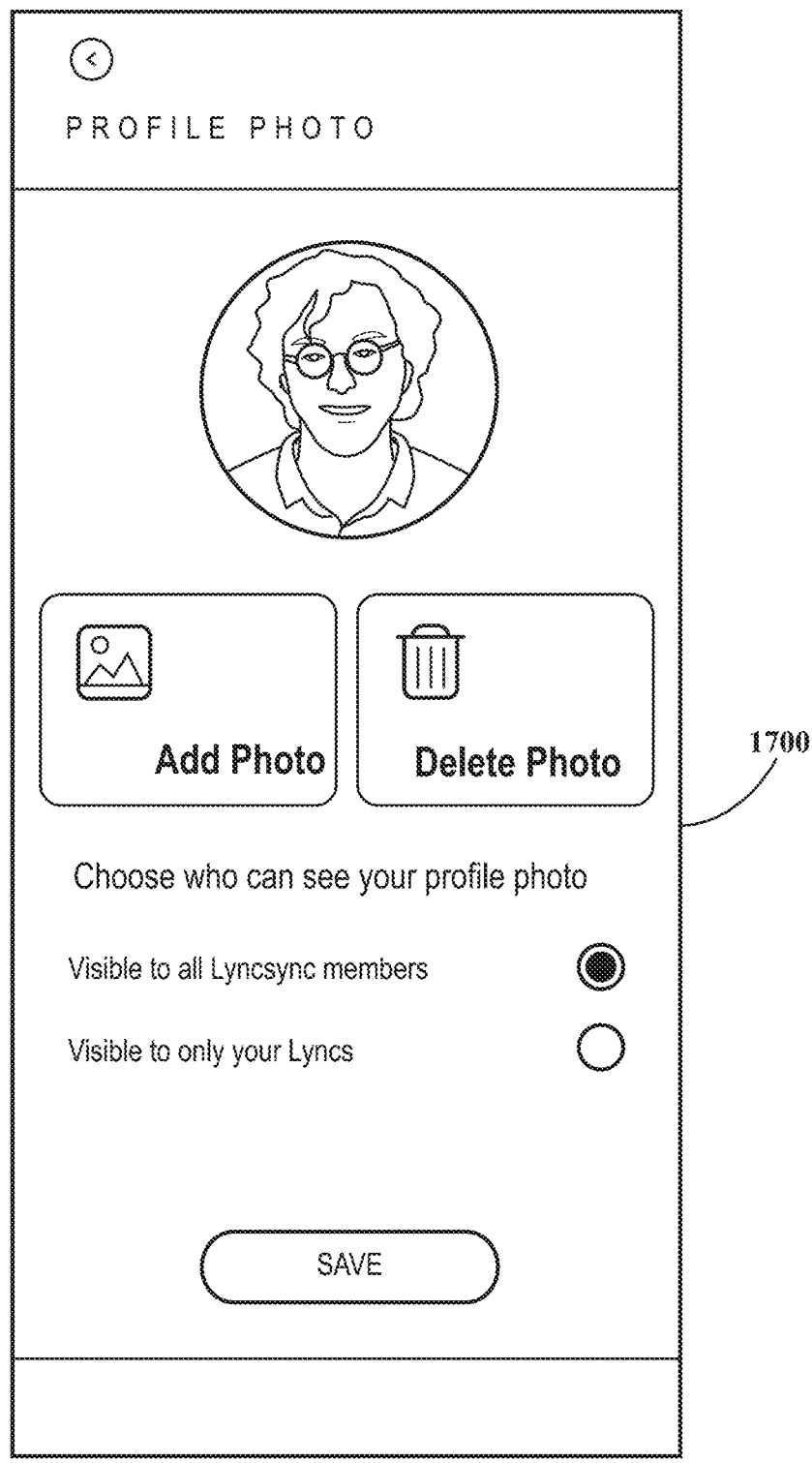
FIG. 17 illustrates exemplary embodiments of a profile photo screen of the user interface of the mobile application, according to aspects of the present disclosure.

Referring to FIG. 17, in embodiments, the user interface may, via photo upload screen 1700, allow the user to upload a photo to be used as a profile photo associated with one or more user profiles of the user. The user may select one or more privacy options for the profile photo, such as by restricting visibility of the profile to other users with which the user profile is connected or allowing the profile photo to be viewed by any other users.

Figure 18A:
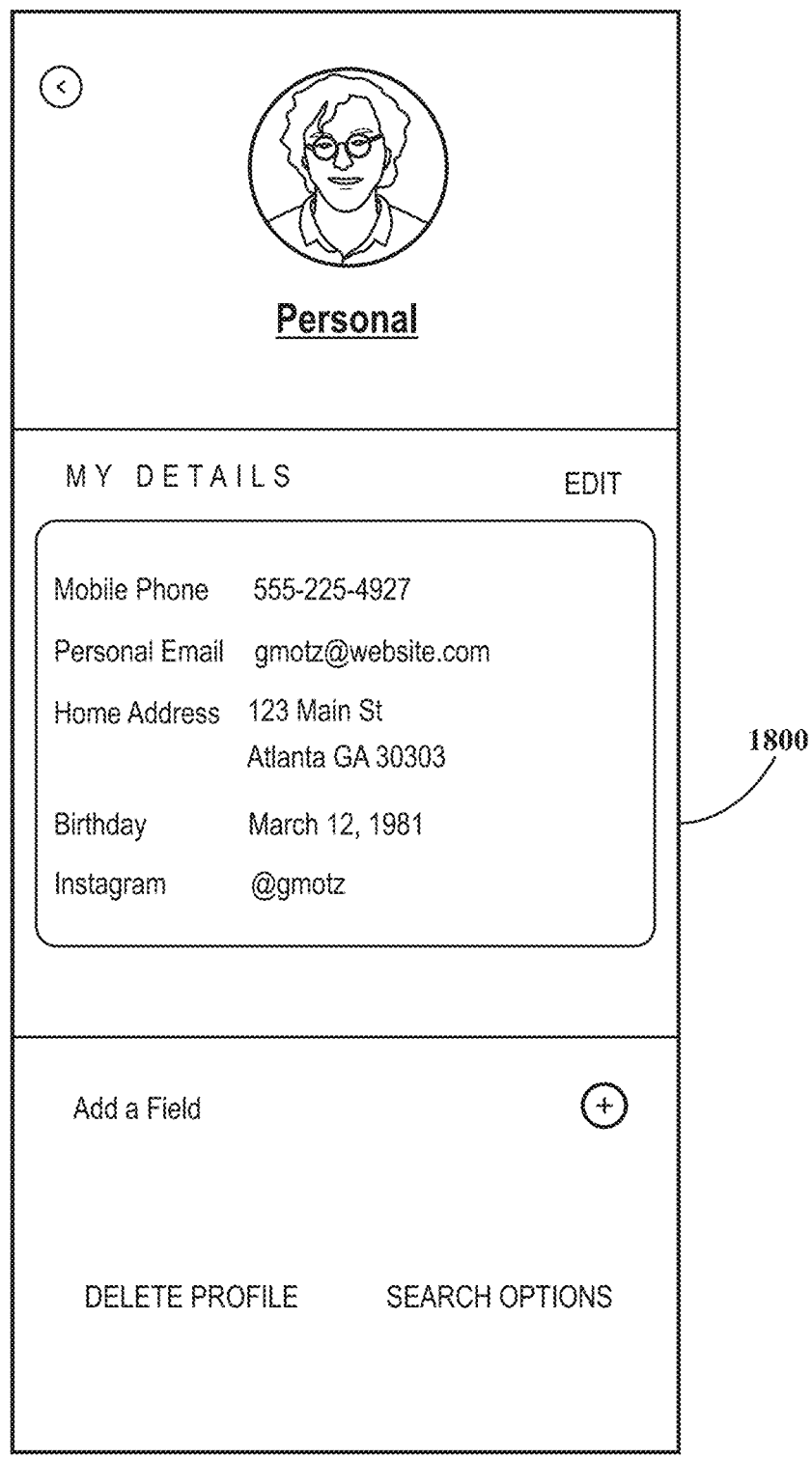
FIGS. 18A, 18B, and 18C illustrate exemplary embodiments of the user interface whereby the user may view, enter, and/or edit a plurality of fields of contact information associated with the user profile of the user within the mobile application and/or the web application, according to aspects of the present disclosure.
Figure 18B:
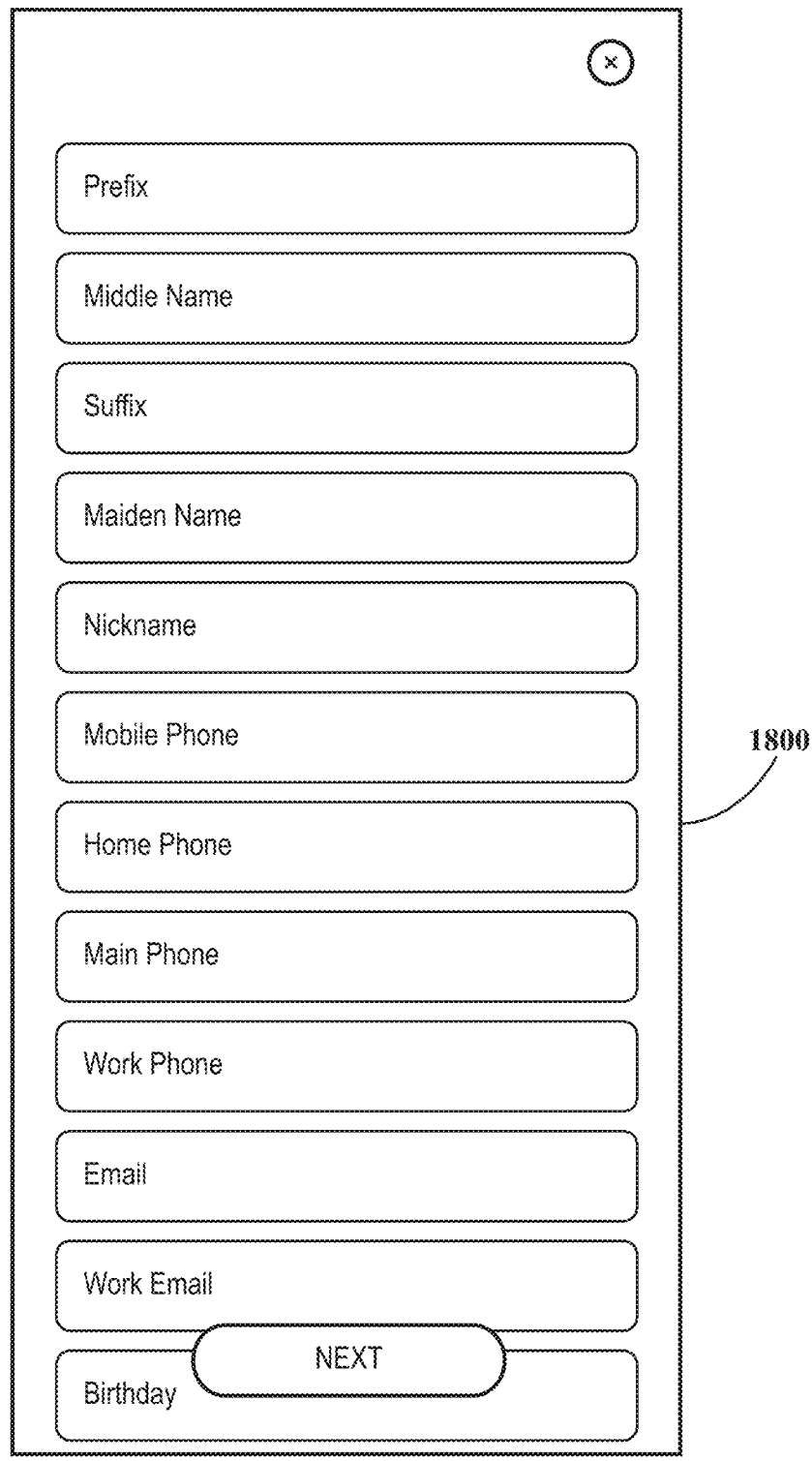
Figure 18C:
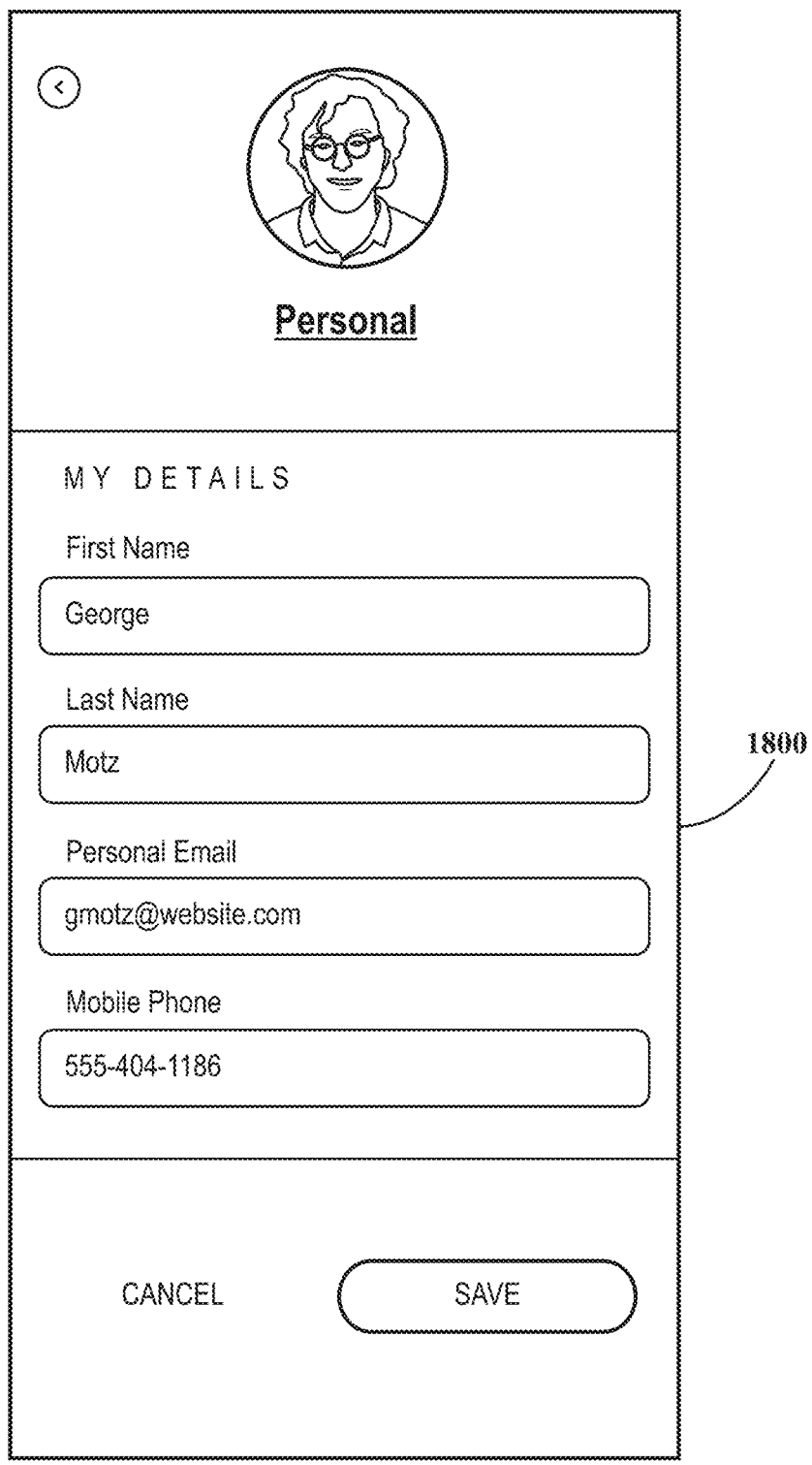

FIGS. 18A, 18B, and 18C illustrate an exemplary embodiment of the user interface displaying a contact viewing and editing screen 1800, whereby the user may view, enter, and/or edit a plurality of fields of contact information associated with the user profile of the user within the mobile application and/or the web application. The contact information may include one or more of prefix, middle name, suffix, maiden name, nickname, mobile phone number, home phone number, main phone number, work phone number, email address, work email address, birthday, website URL, social media handle, affinity group, education information, and the like. It should be appreciated that the user may associate instances of contact information with one or more of the user profiles of the user account. For example, the user may associate an Instagram handle with a personal profile and not a professional profile of the user, may associate a LinkedIn URL with a professional profile of the user, and/or may associate a Twitter handle with both a personal profile and a professional profile of the user.

Figure 19A:
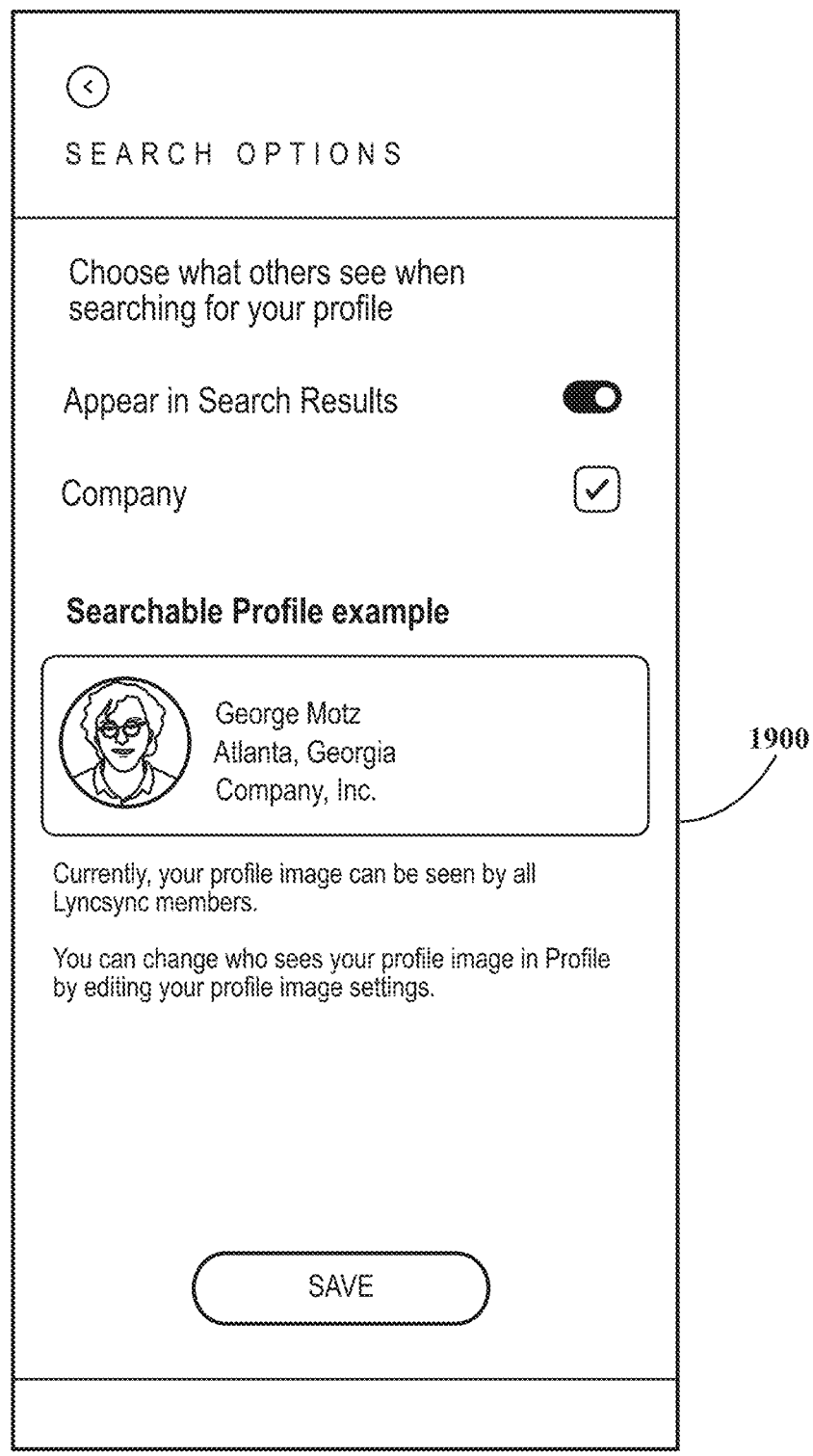
FIGS. 19A and 19B illustrate embodiments of a search disclosure screen of the user interface of the mobile application, according to aspects of the present disclosure.
Figure 19B:
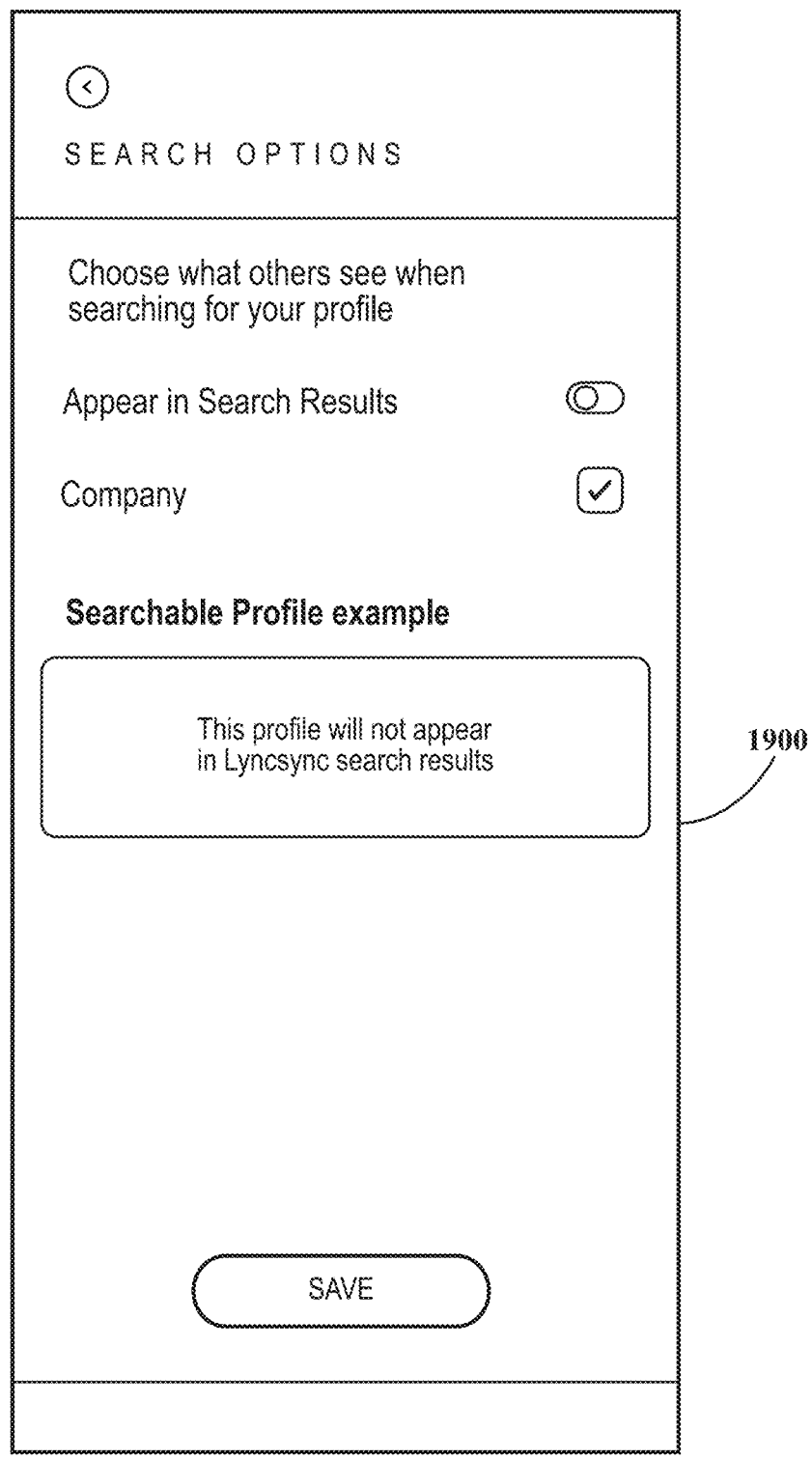

Referring to FIGS. 19A and 19B, in embodiments, the user may elect to, via a contact association screen 1900, have one or more instances of contact information associated with the user appear in search results for other users of the mobile application and/or web application. For example, the user may elect to not allow one or more instances of contact information appear in search results, or may restrict some instances of contact information, such as company information, from appearing in search results.

In embodiments, contact information of other user profiles with which the user account is associated may be imported into native contact applications (e.g., Android contacts and/or iOS contacts) of one or more user devices of the user. The platform 100 may be configured to create new contacts and/or merge the imported contact information into existing contacts within the native contact applications. The platform 100 may, in some embodiments, perform deduplication, correction, and/or rectification of contact information within the native contact applications.

In embodiments, the user may view contact information associated with user profiles of other users within the mobile application and/or the web-based application. The user may interact with the contact information associated with the user profiles of other users to make phone calls, send emails, visit web pages, visit social media profiles, and the like. For example, the user may select a phone number within a user profile of another user, and, upon selection, the mobile application may facilitate the mobile device to prompt the user to make a phone call to the selected phone number.

Figure 20:
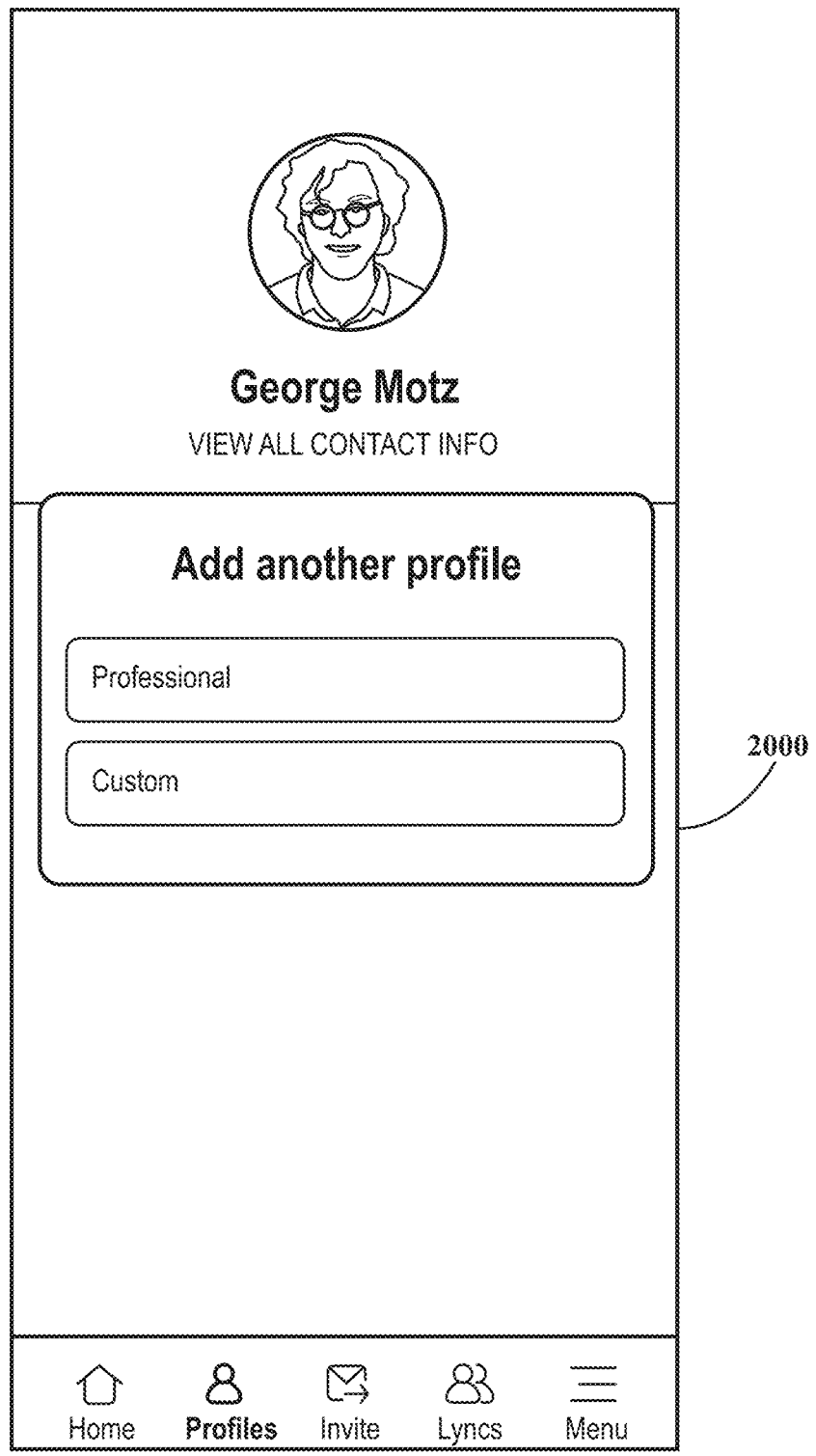
FIG. 20 illustrates exemplary embodiments of the user interface whereby the user may add one or more additional user profiles to the user account of the user, according to aspects of the present disclosure.

FIG. 20 illustrates an exemplary embodiment of the user interface having a profile addition screen 2000 whereby the user may add one or more additional user profiles to the user account of the user.

Figure 21:
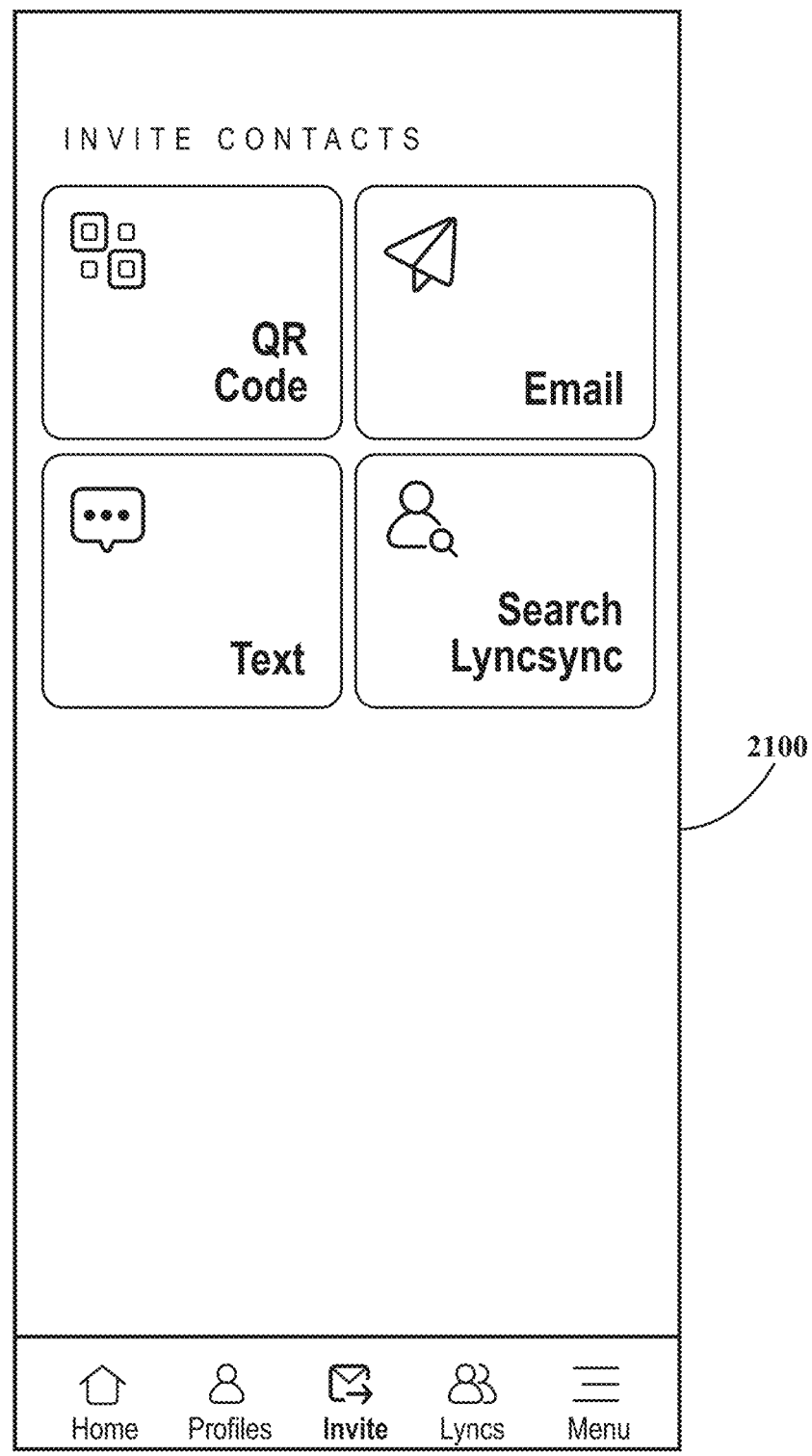
FIG. 21 illustrates exemplary embodiments of the user interface whereby the user may connect the user account and/or one or more user profiles of the user with one or more user profiles of other users, according to aspects of the present disclosure.
Figure 22A:
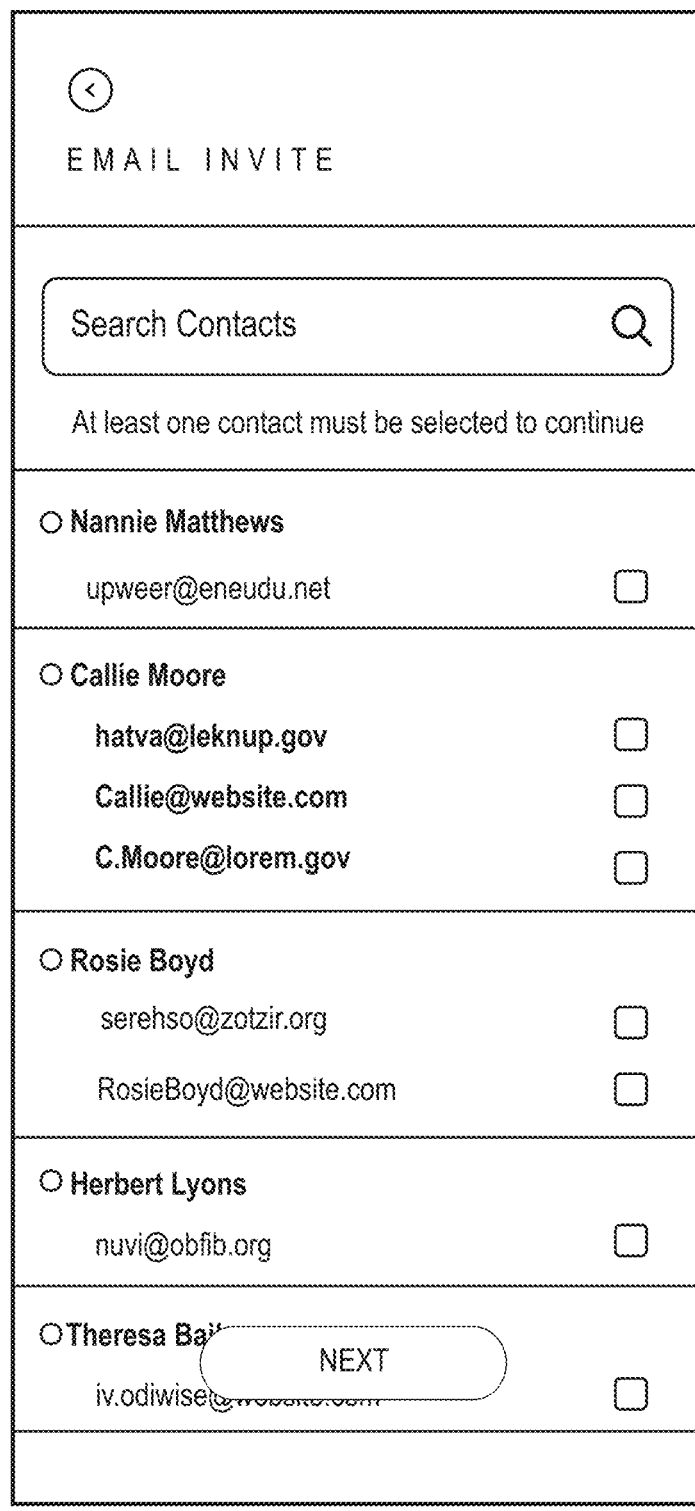
FIGS. 22A-22D illustrate exemplary embodiments of the user interface whereby the user may connect with one or more other users via email, according to aspects of the present disclosure.
Figure 22B:
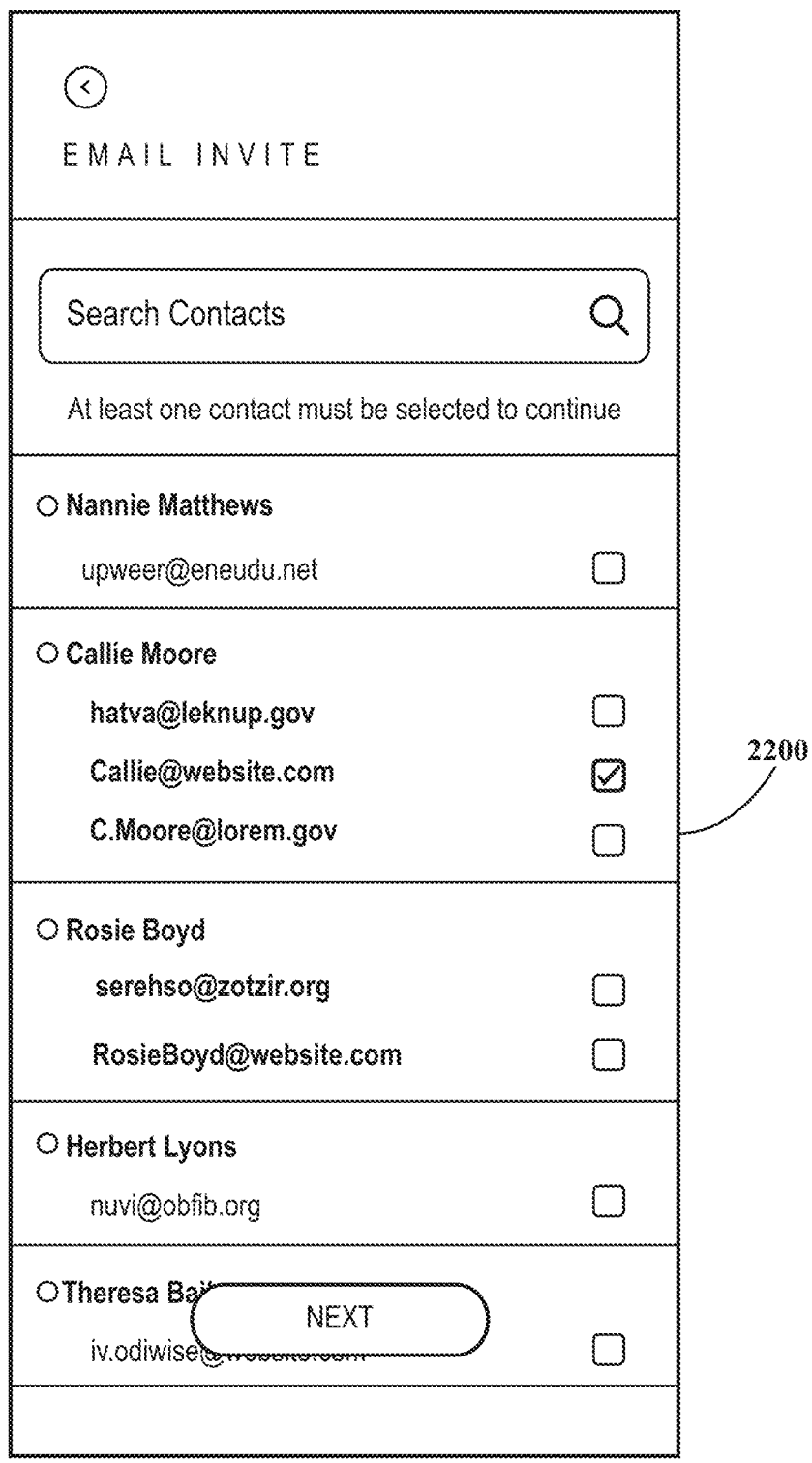
Figure 22C:
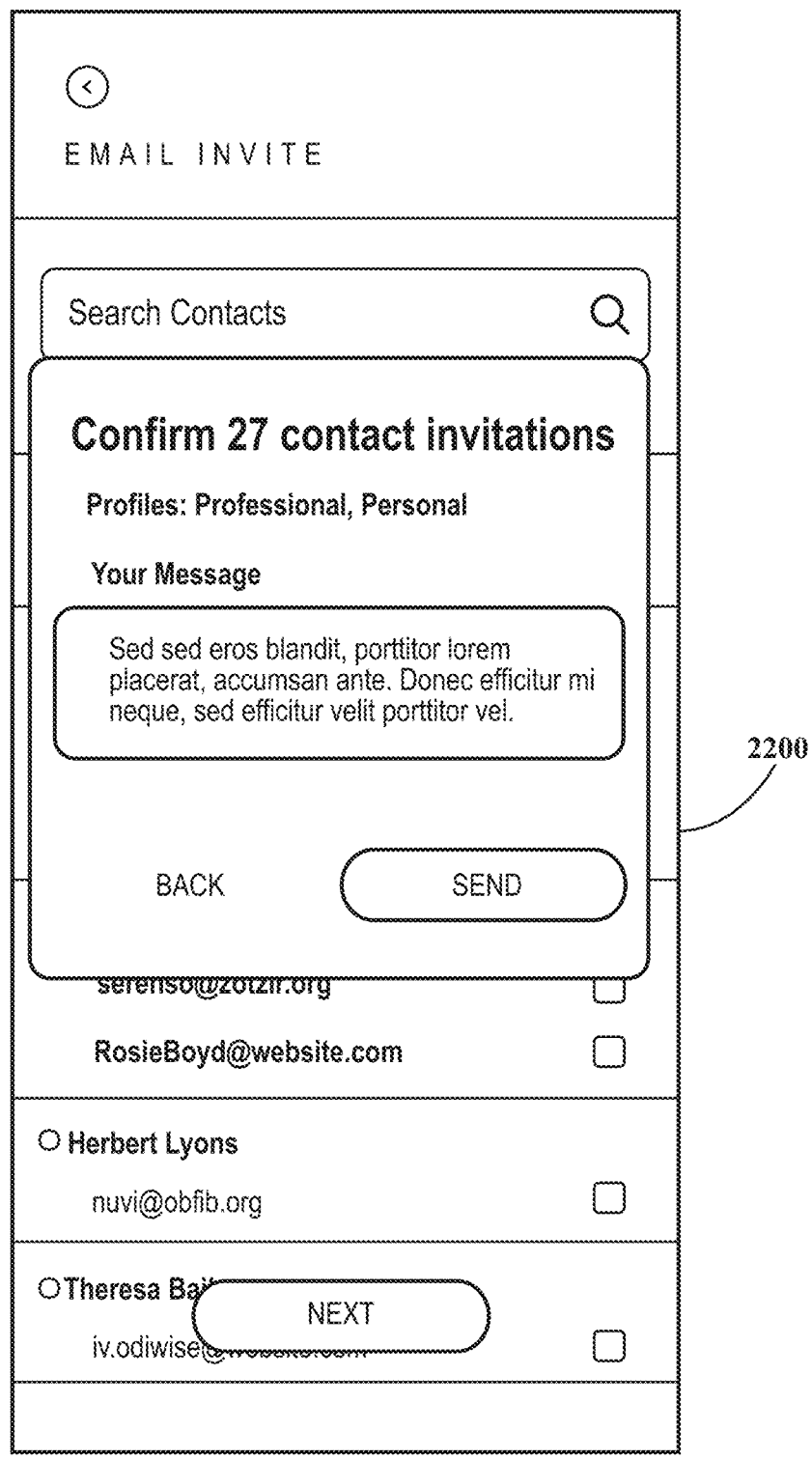
Figure 22D:
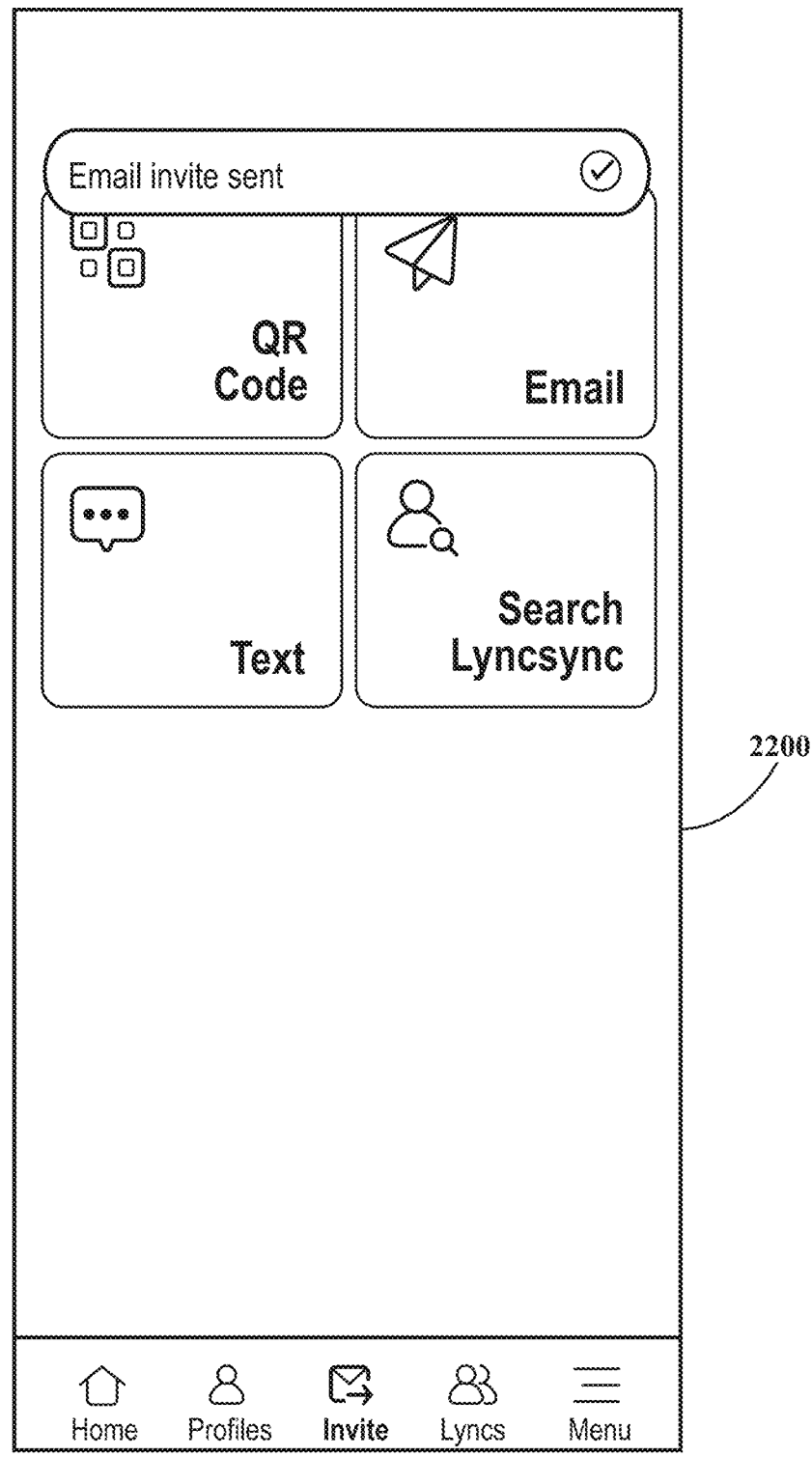
Figure 23A:
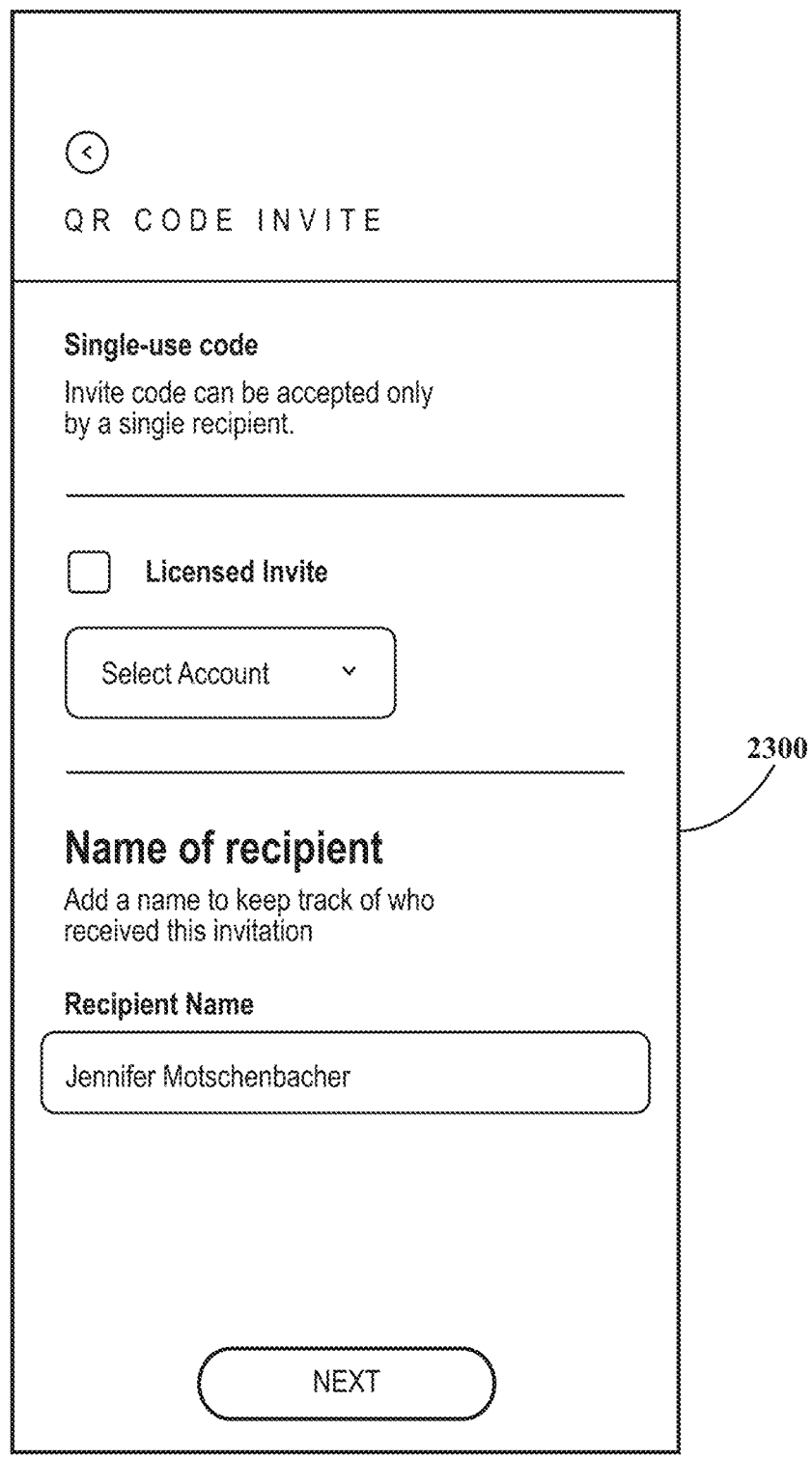
FIGS. 23A-23D illustrate exemplary embodiments of the user interface whereby the user may connect with one or more other users via QR code, according to aspects of the present disclosure.
Figure 23B:
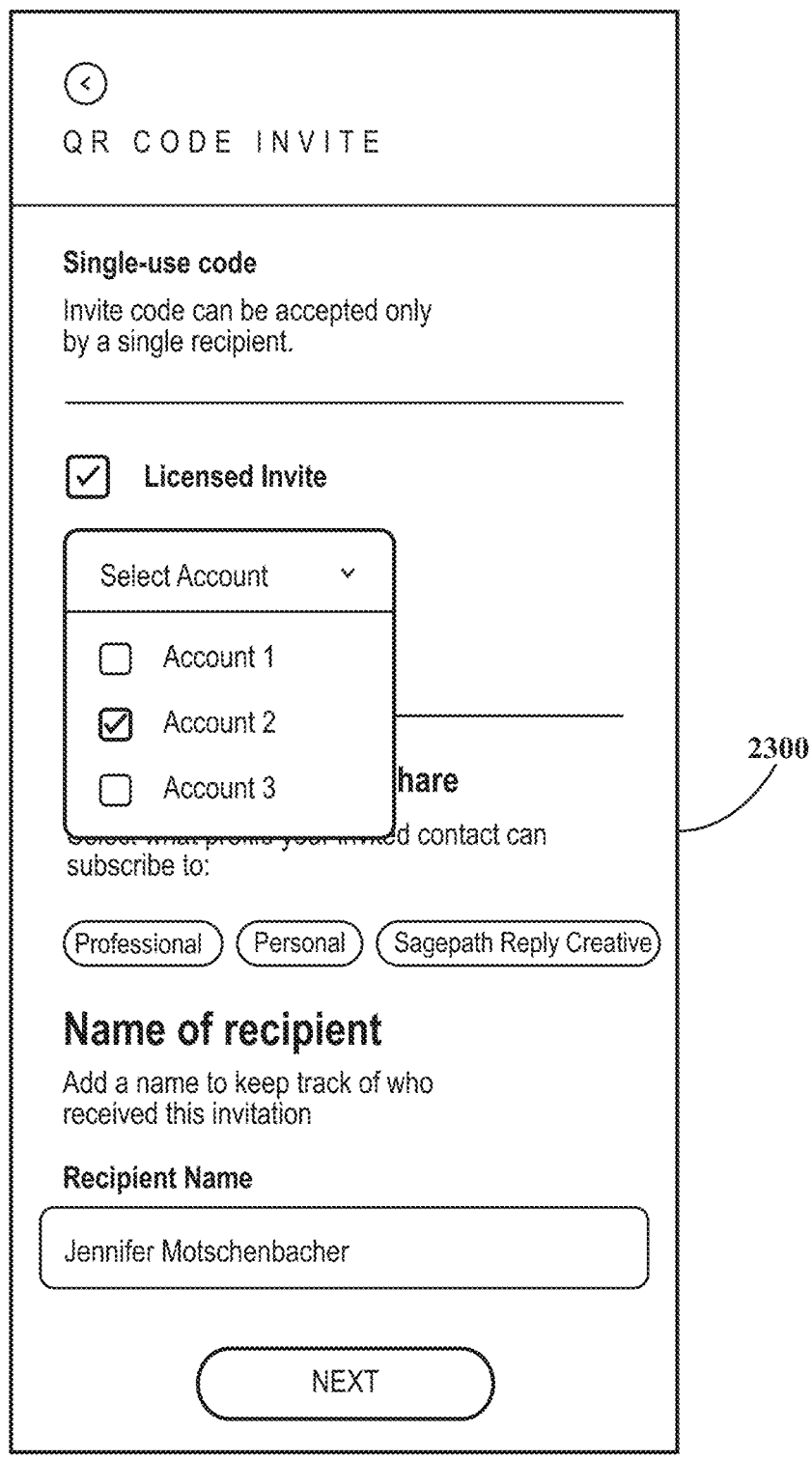
Figure 23C:
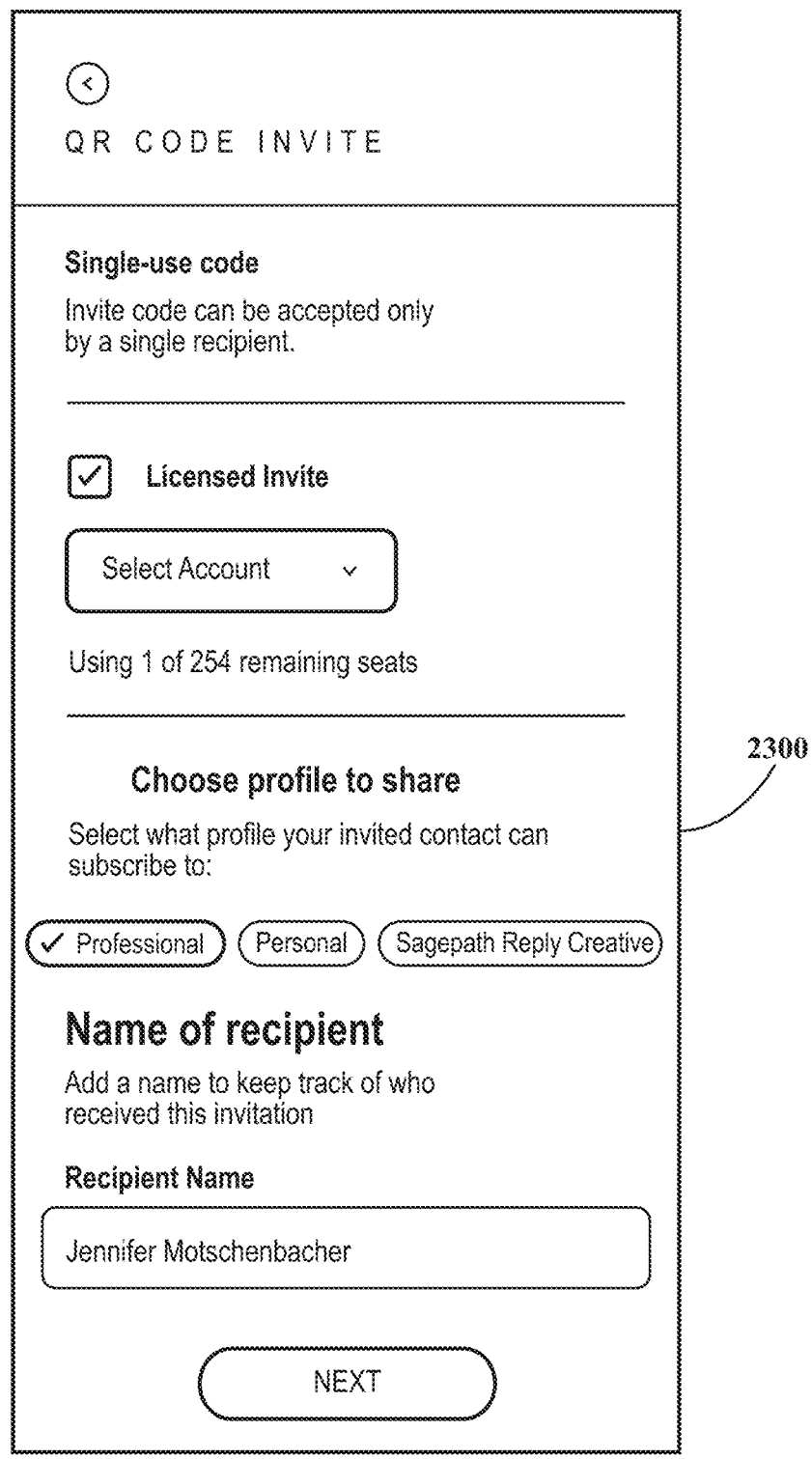
Figure 23D:
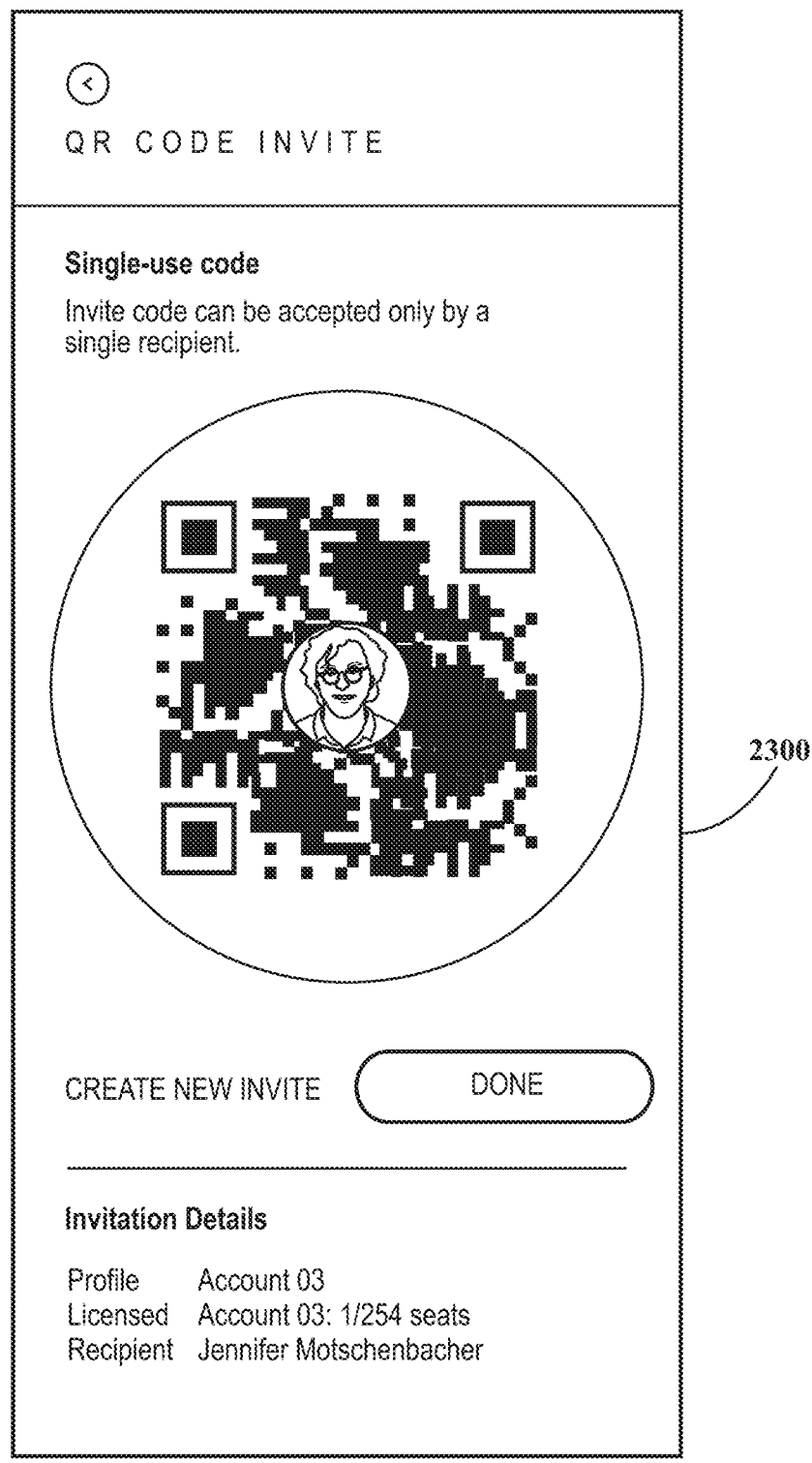
Figure 24A:
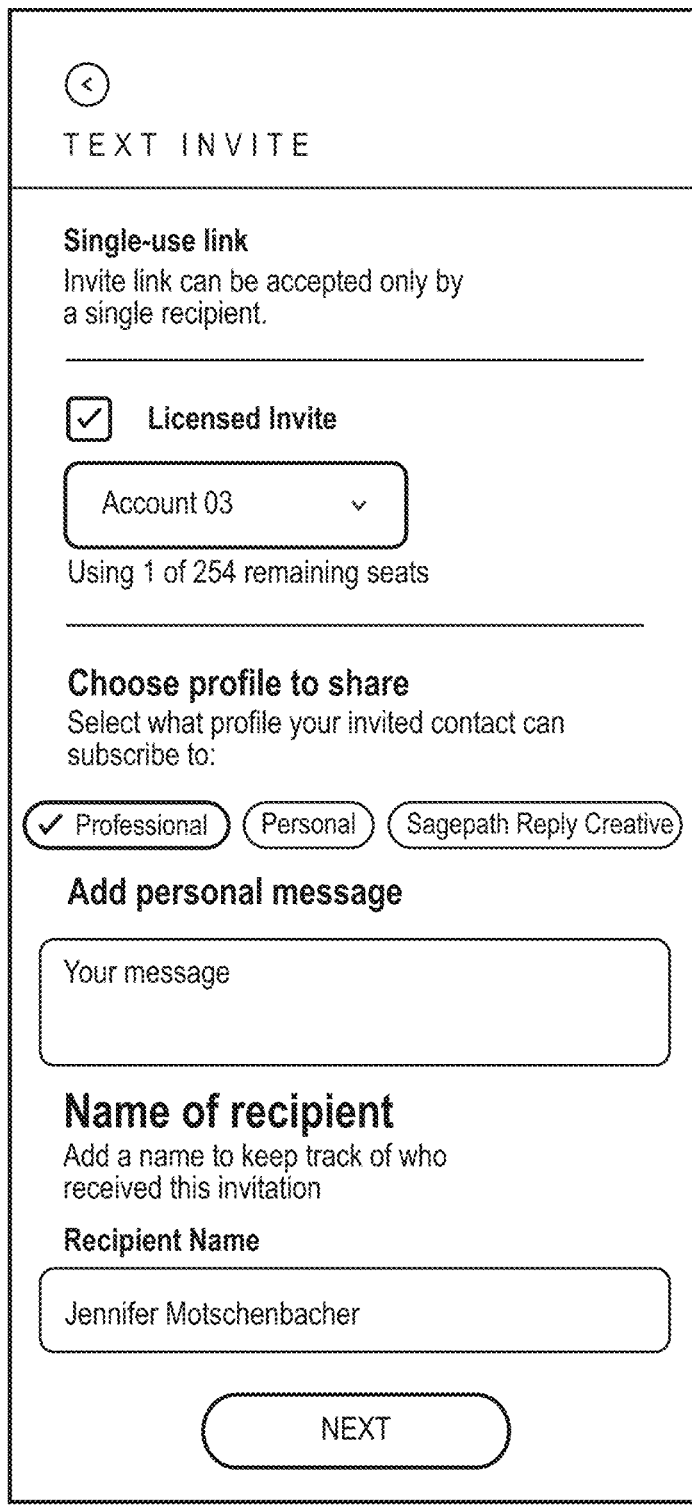
FIGS. 24A-24D illustrate exemplary embodiments of the user interface whereby the user may connect with one or more users via text message, according to aspects of the present disclosure.
Figure 24B:
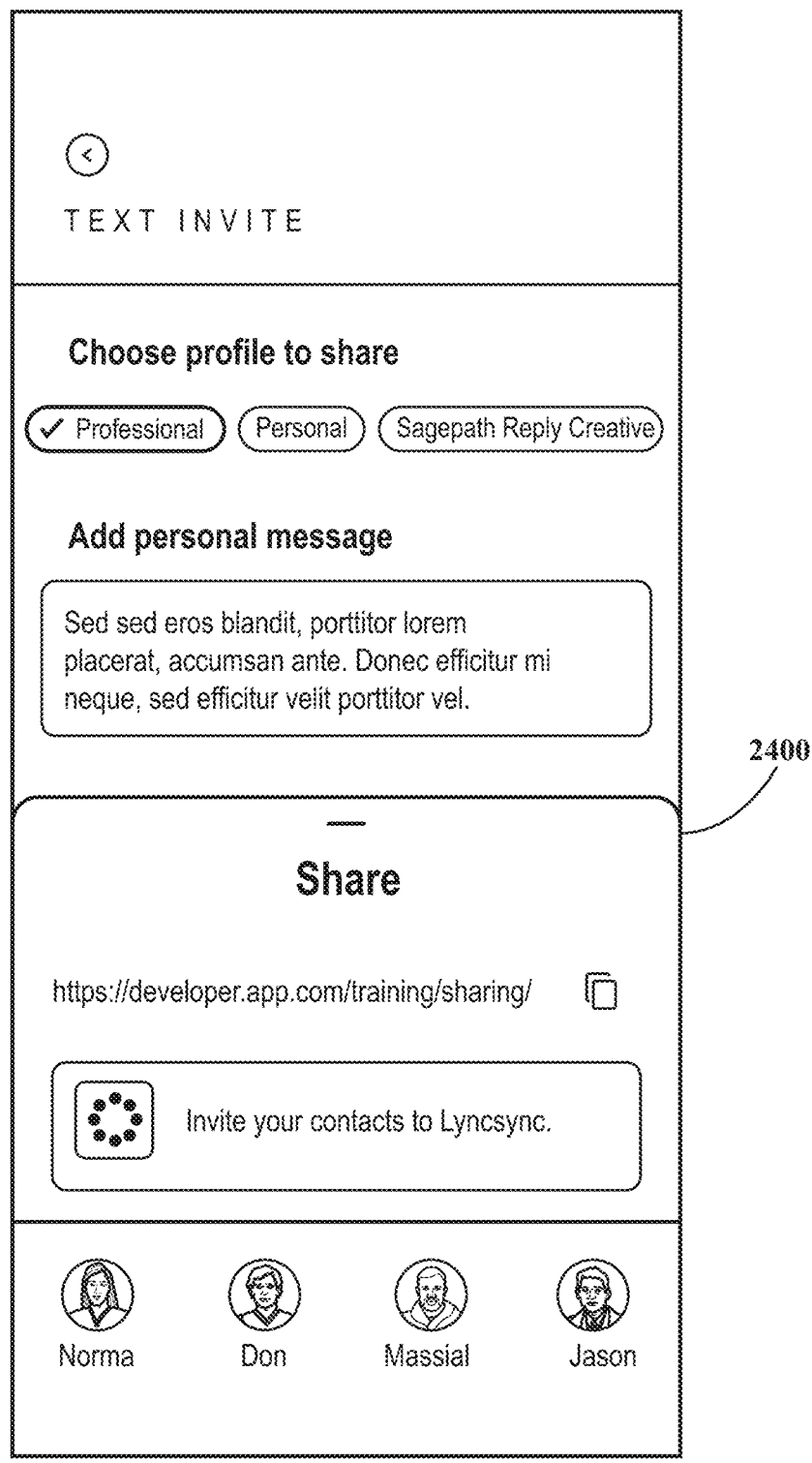
Figure 24C:
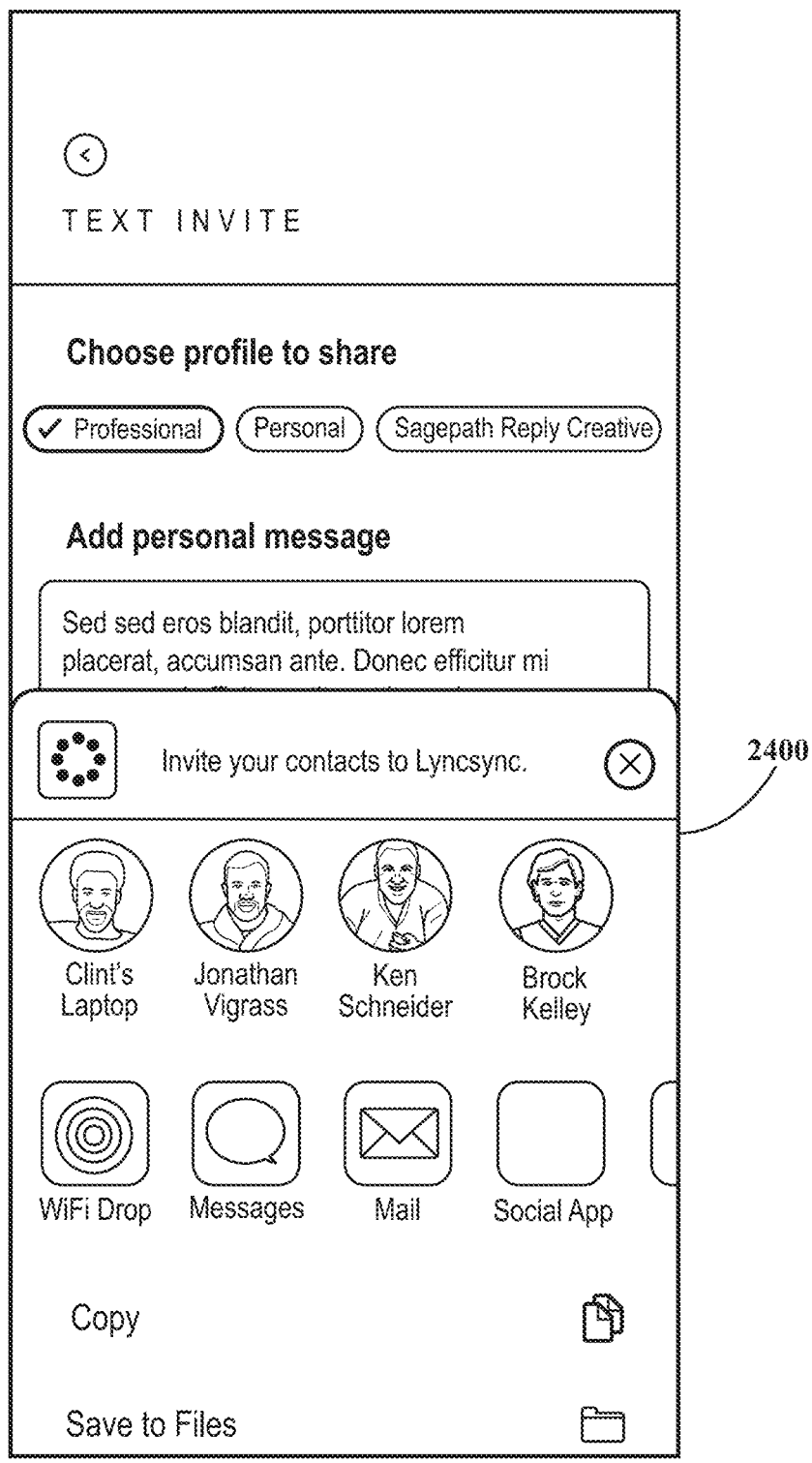
Figure 24D:
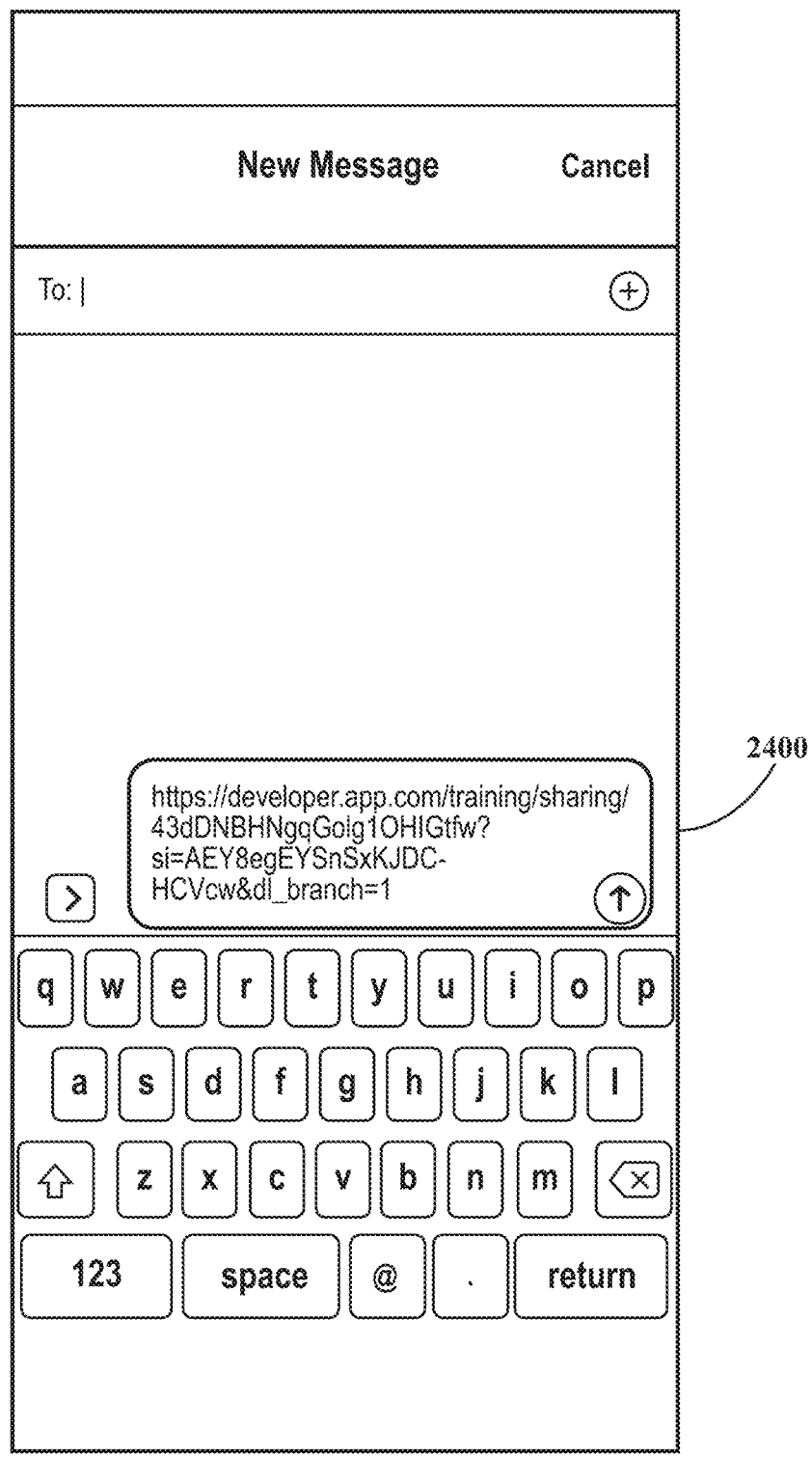
Figure 25A:
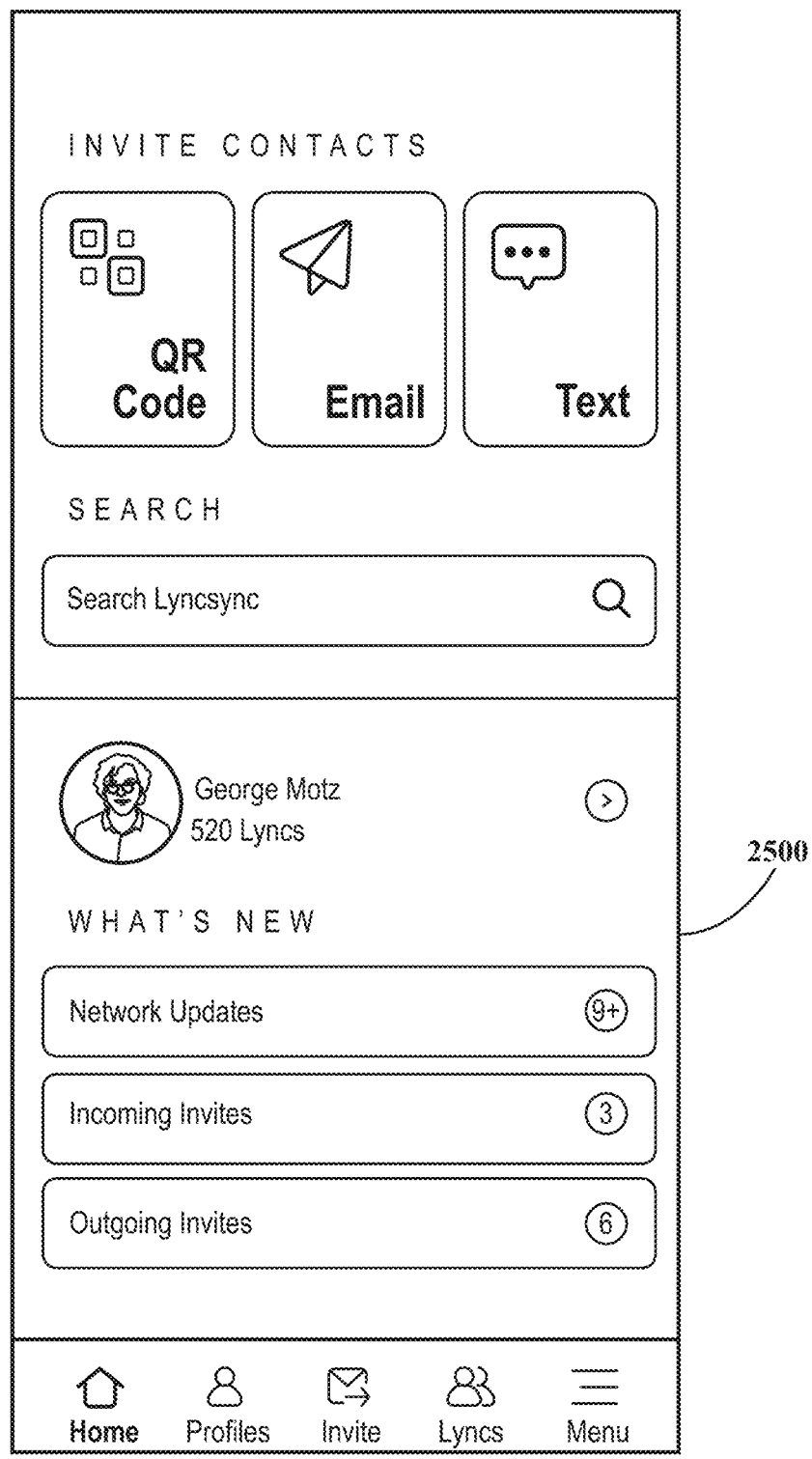
FIGS. 25A-25H illustrate exemplary embodiments of the user interface whereby the user may connect with one or more users by searching for the one or more other users, according to aspects of the present disclosure.
Figure 25B:
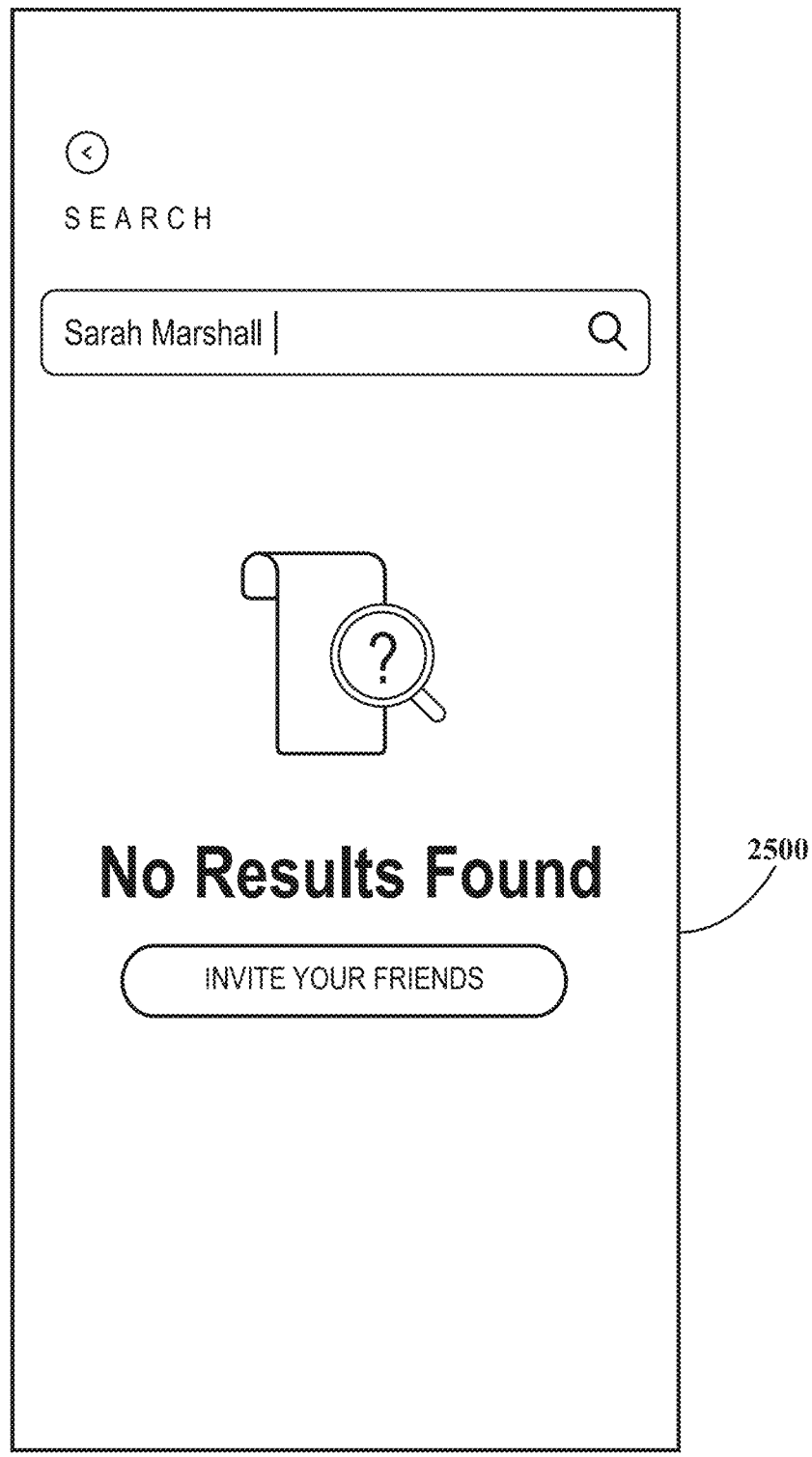
Figure 25C:
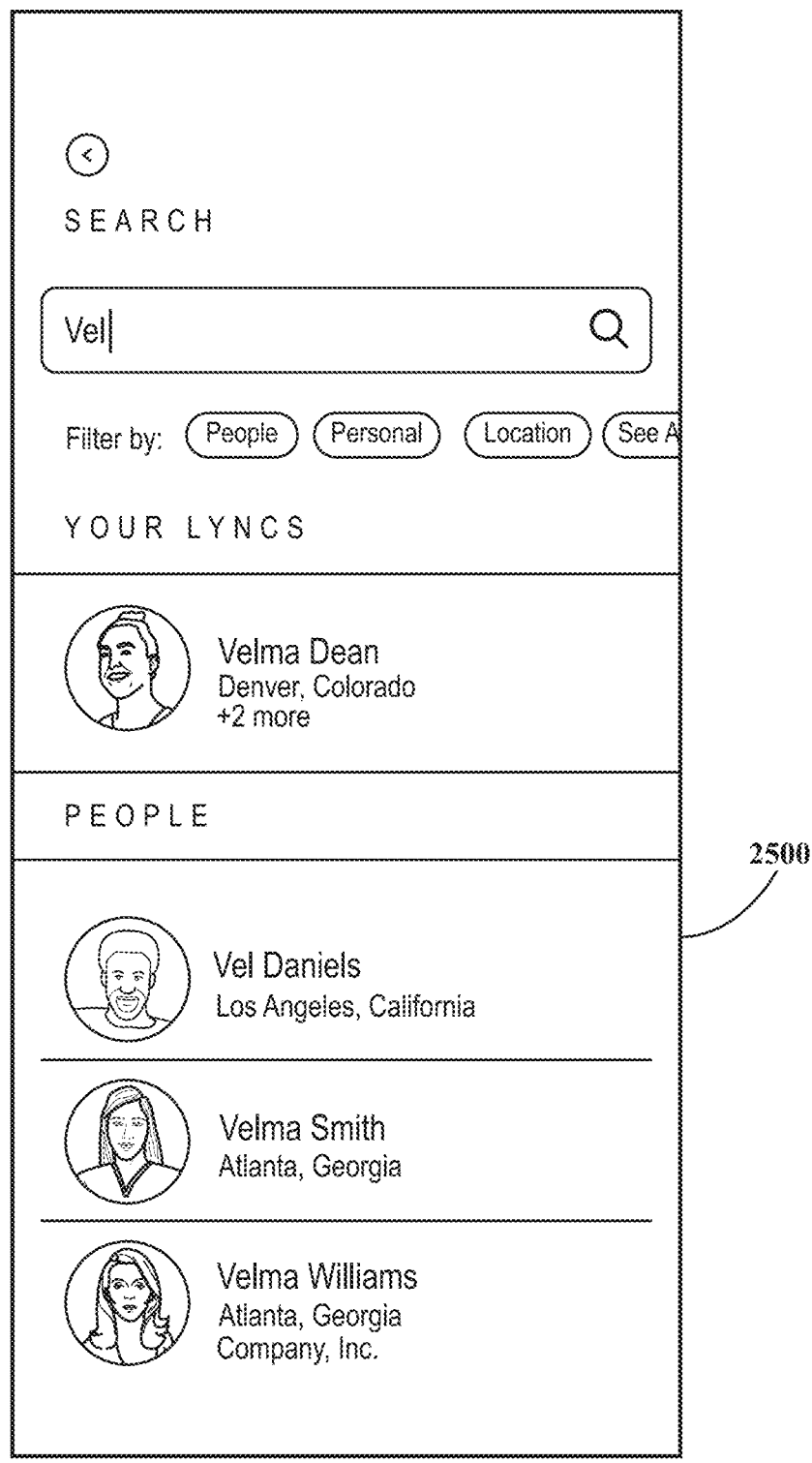
Figure 25D:
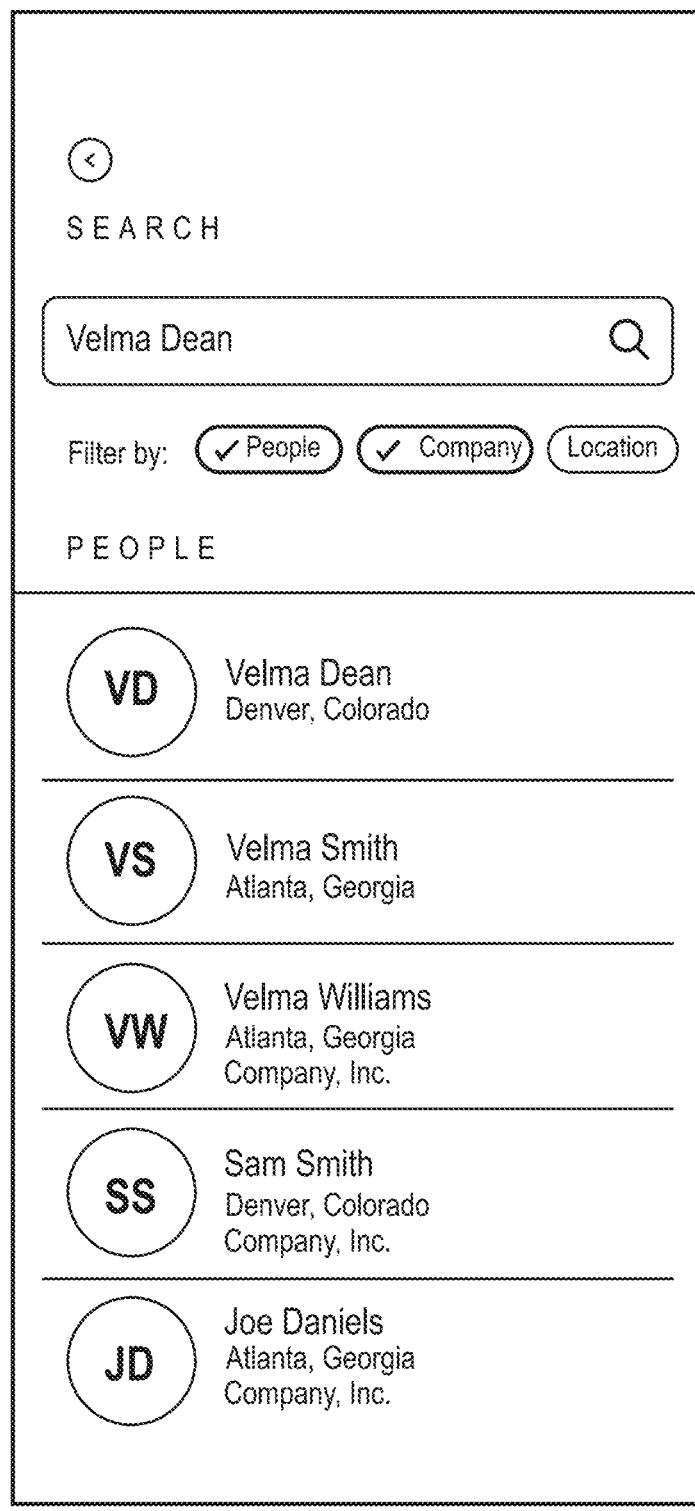
Figure 25E:
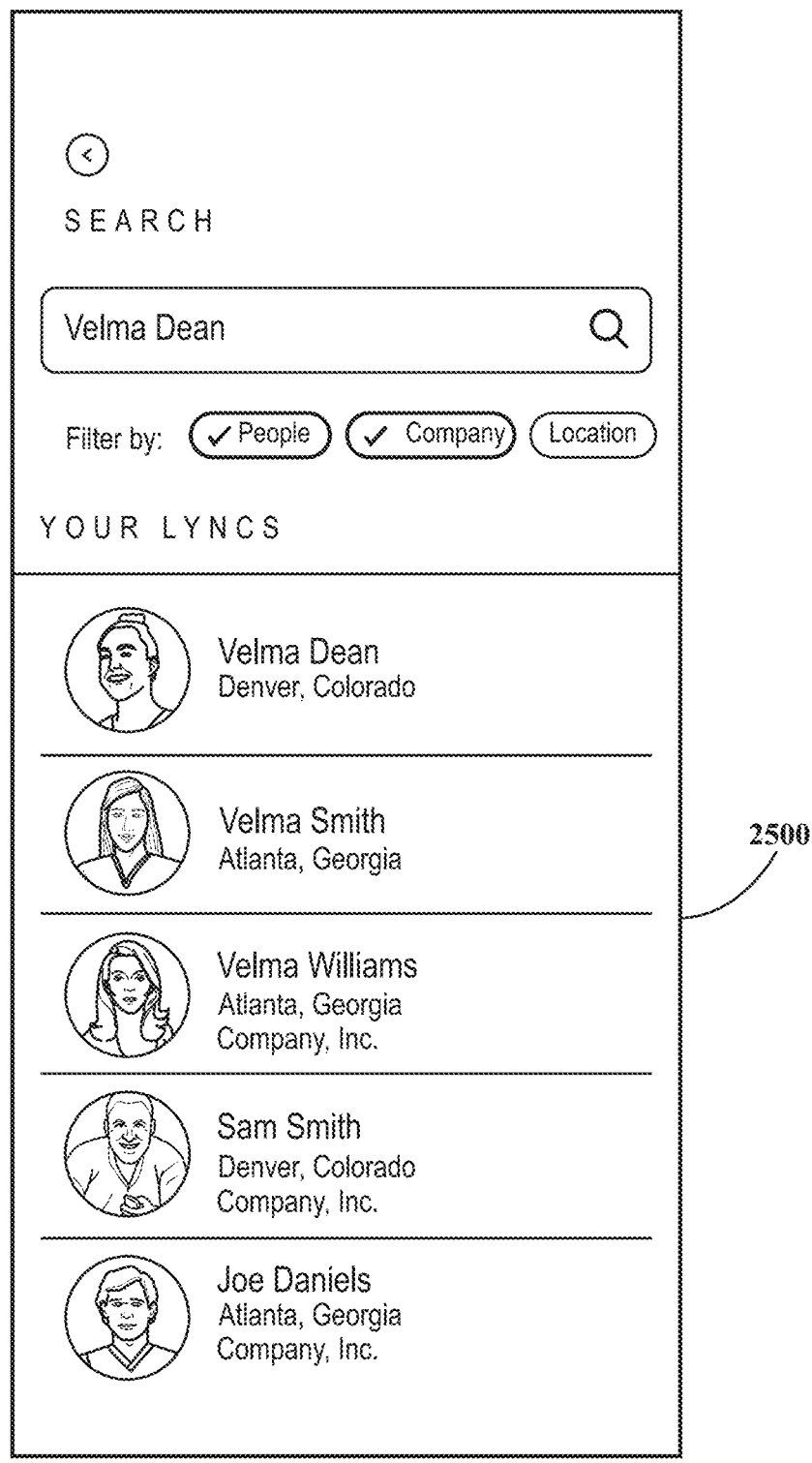
Figure 25F:
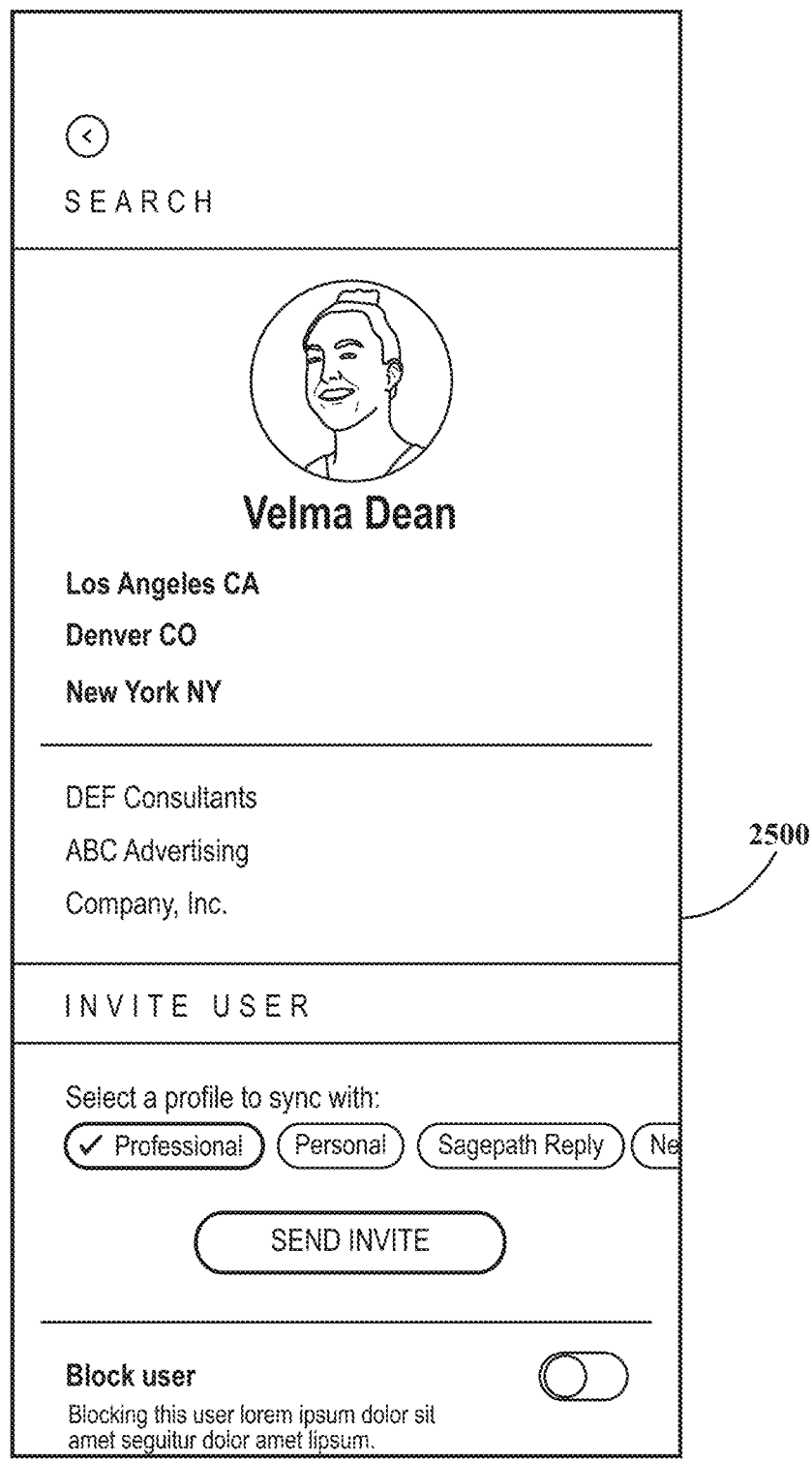
Figure 25G:
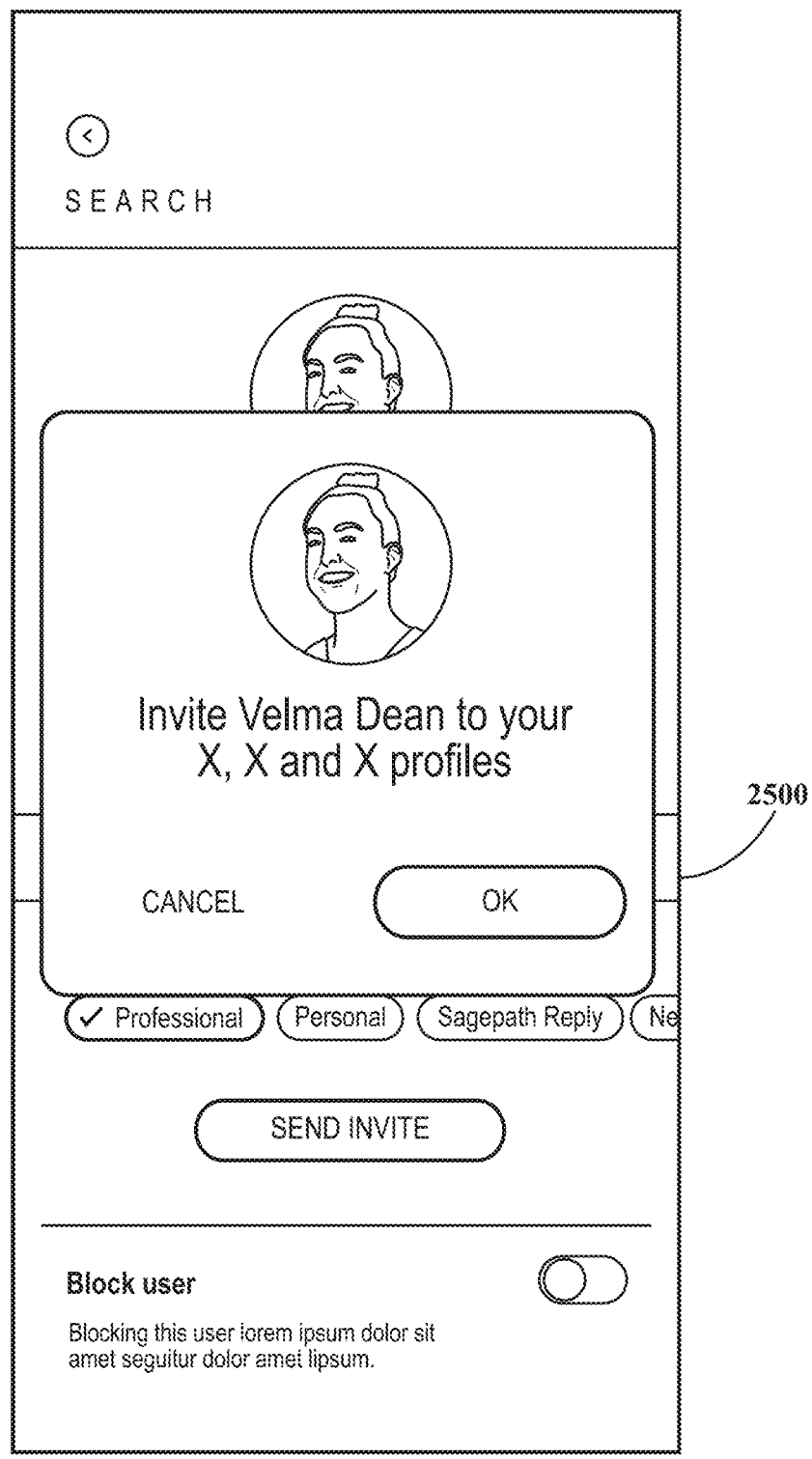
Figure 25H:
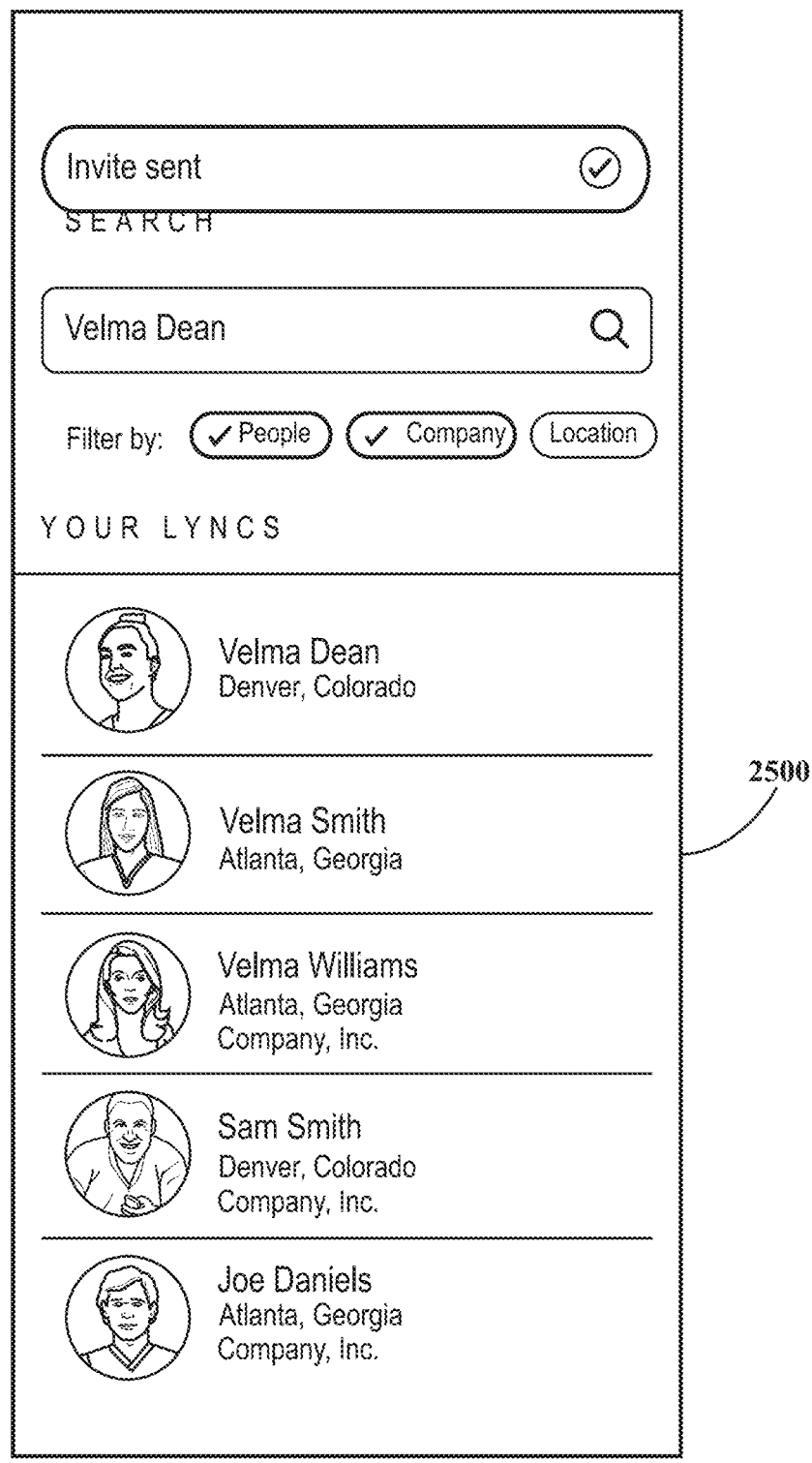
Figure 26A:
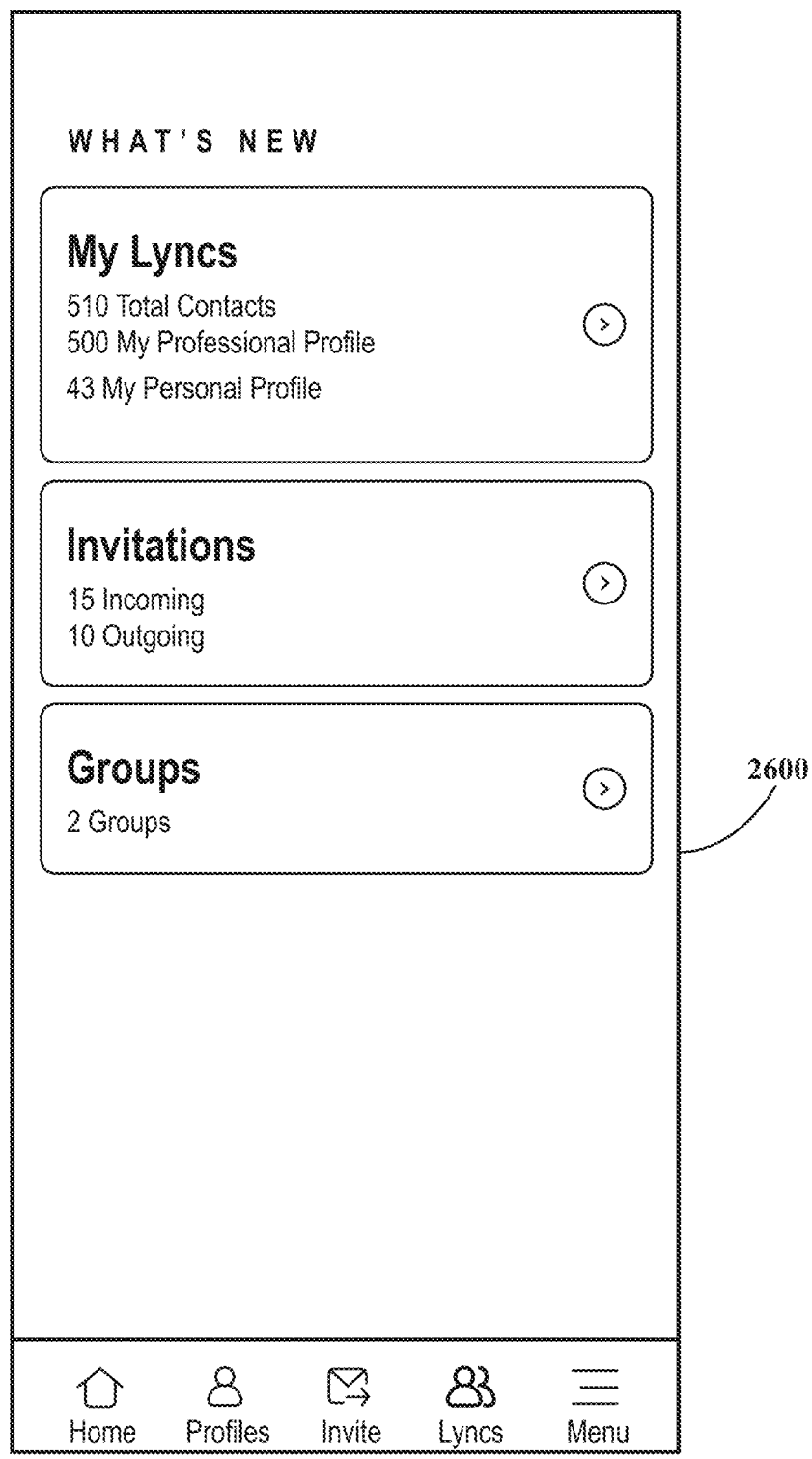
Figure 26B:
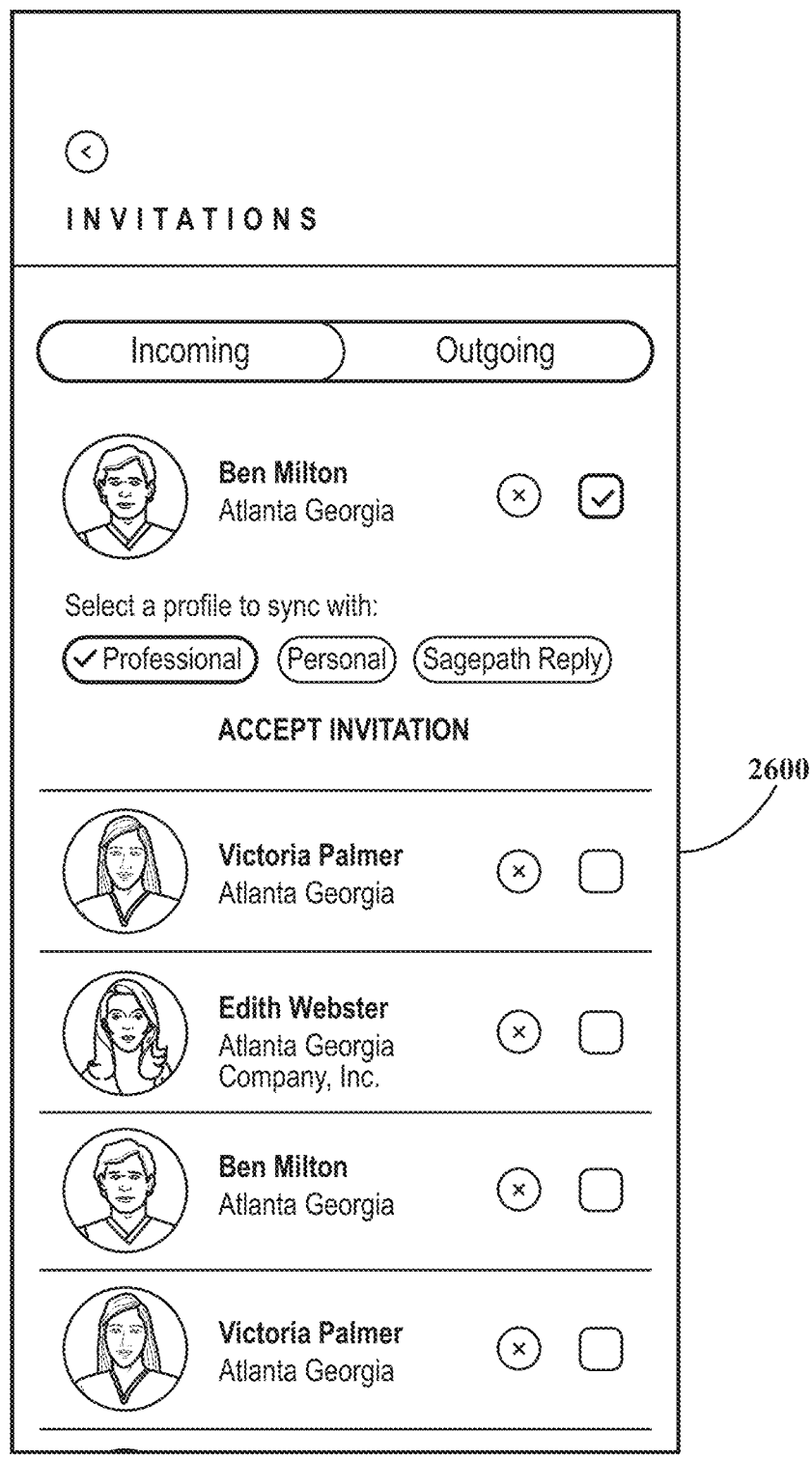
Figure 26C:
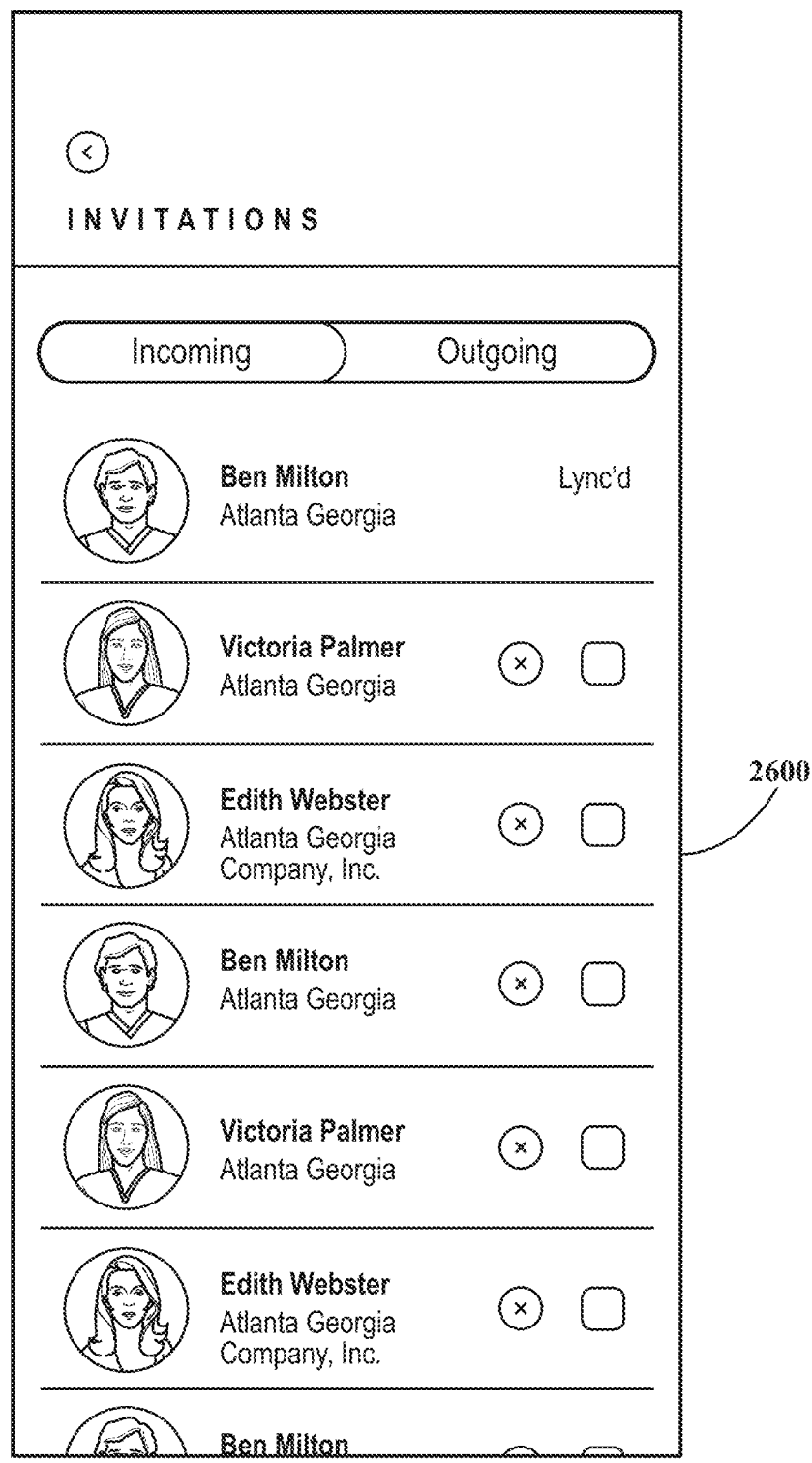
Figure 26D:
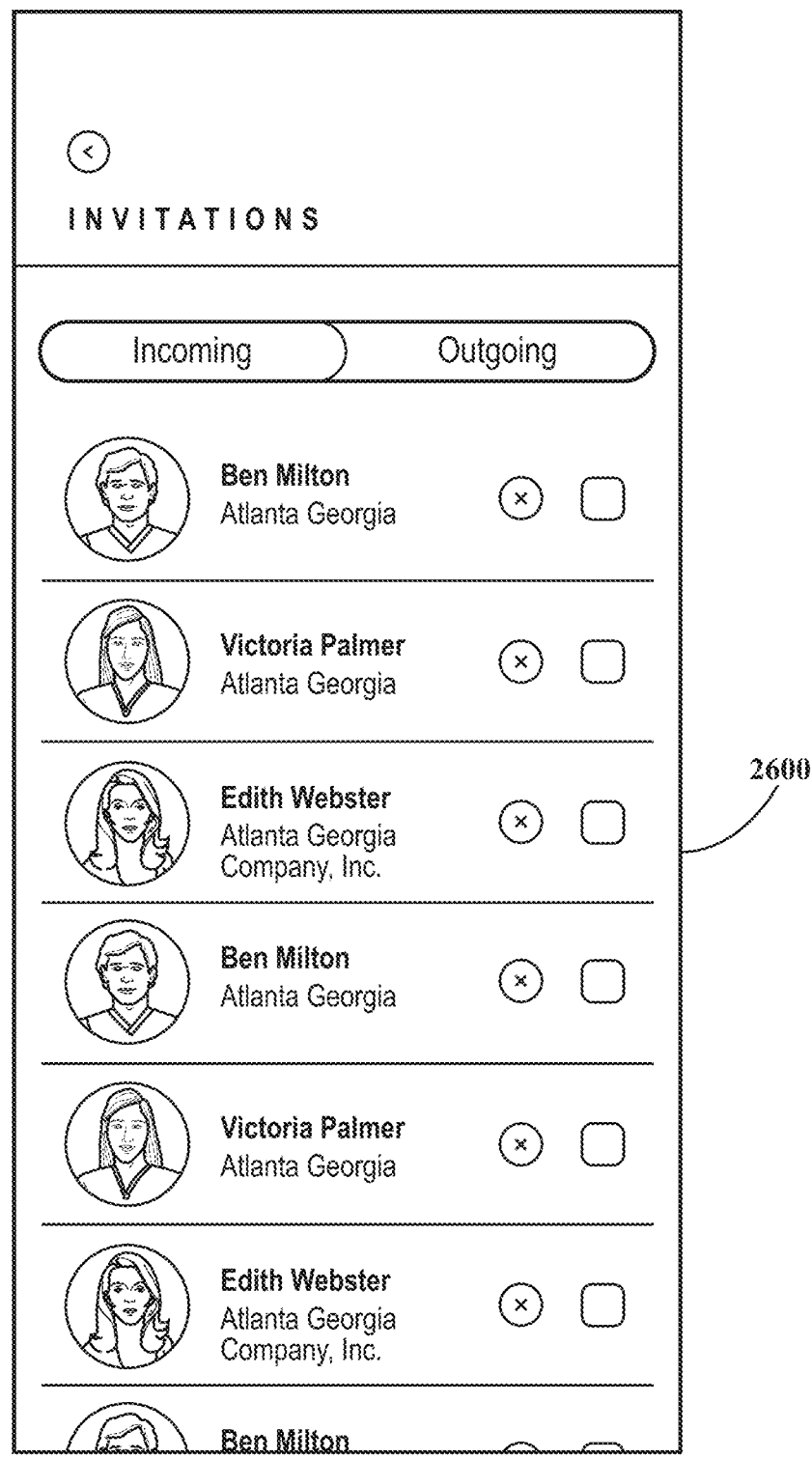
Figure 26E:
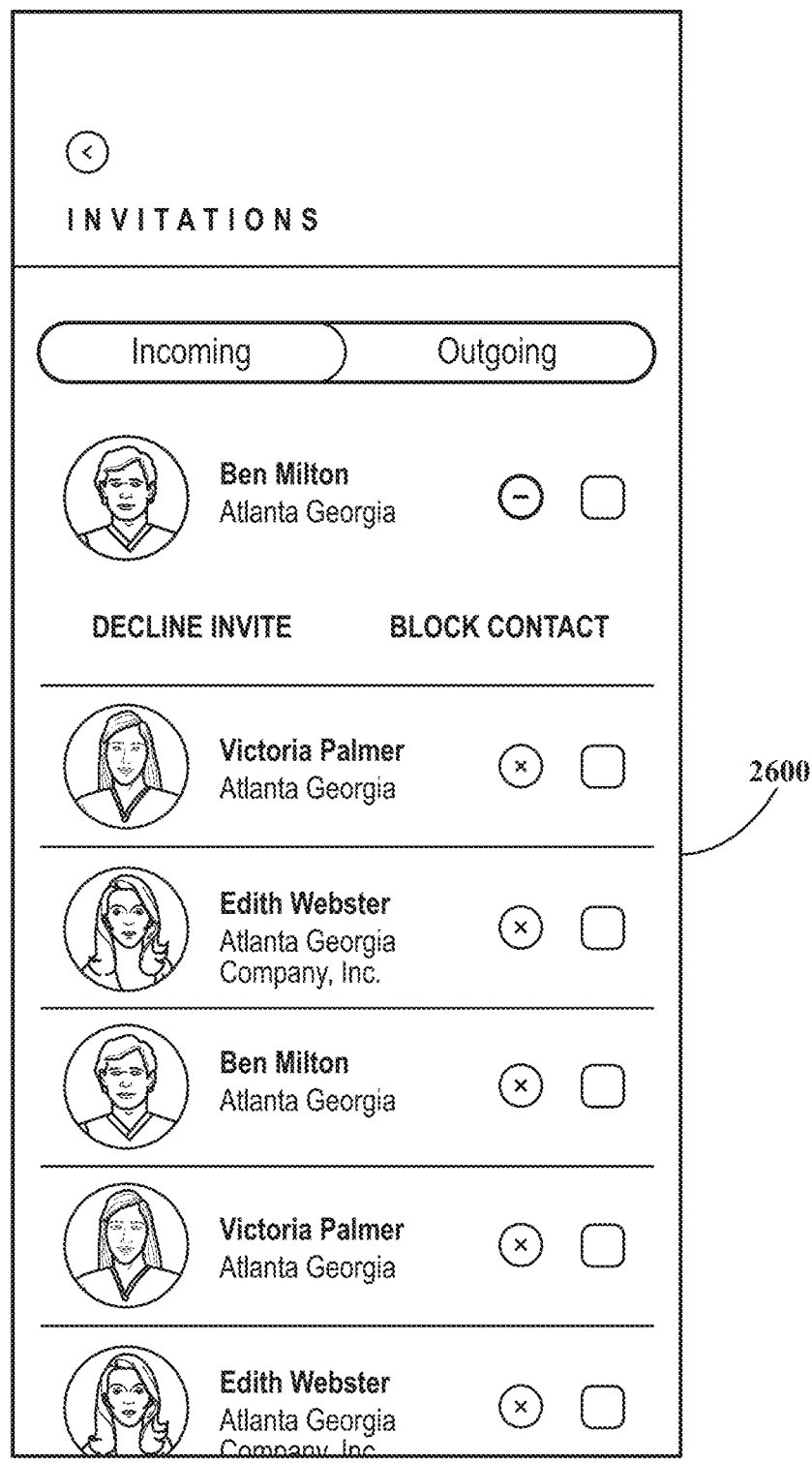
Figure 26F:
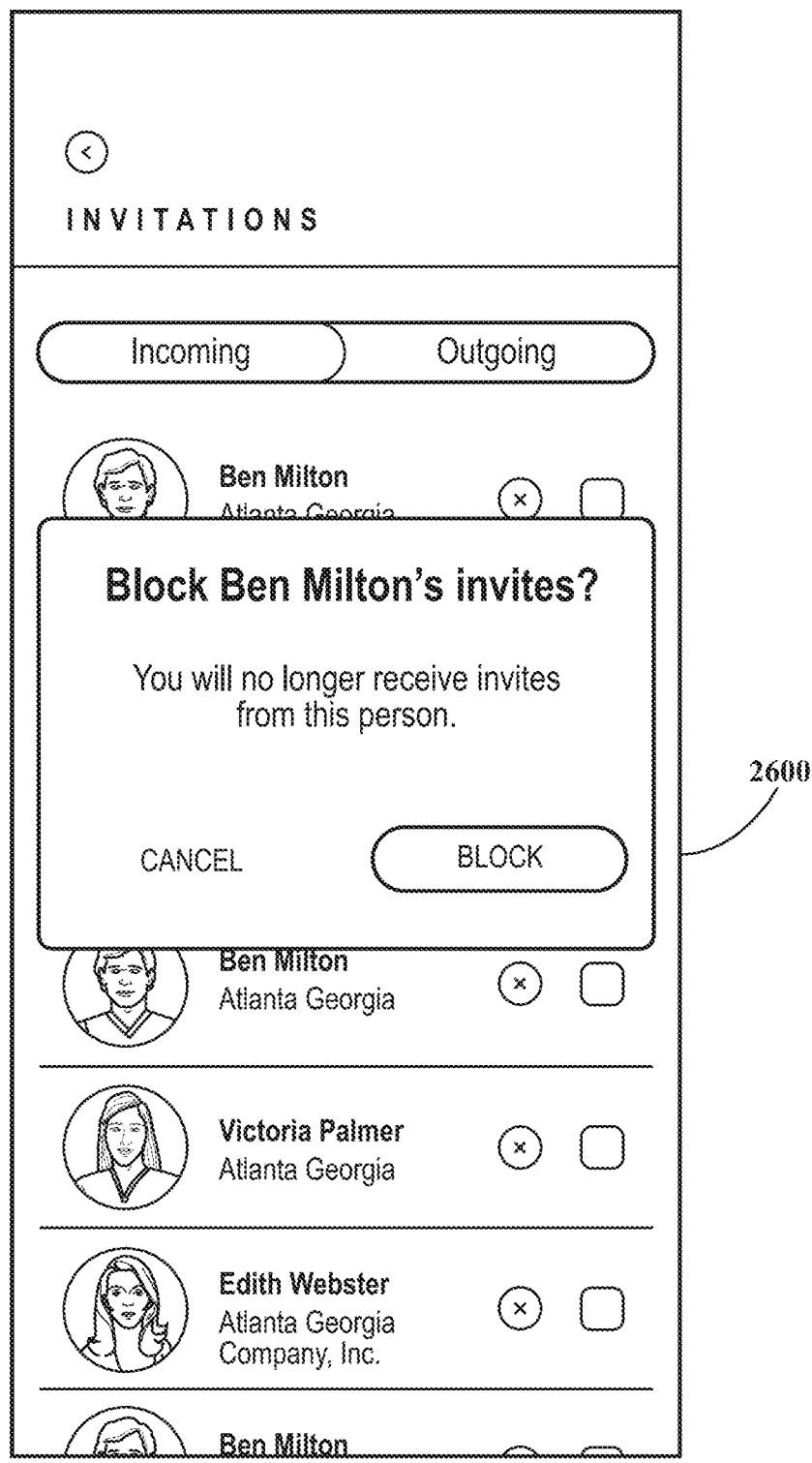
Figure 26I:
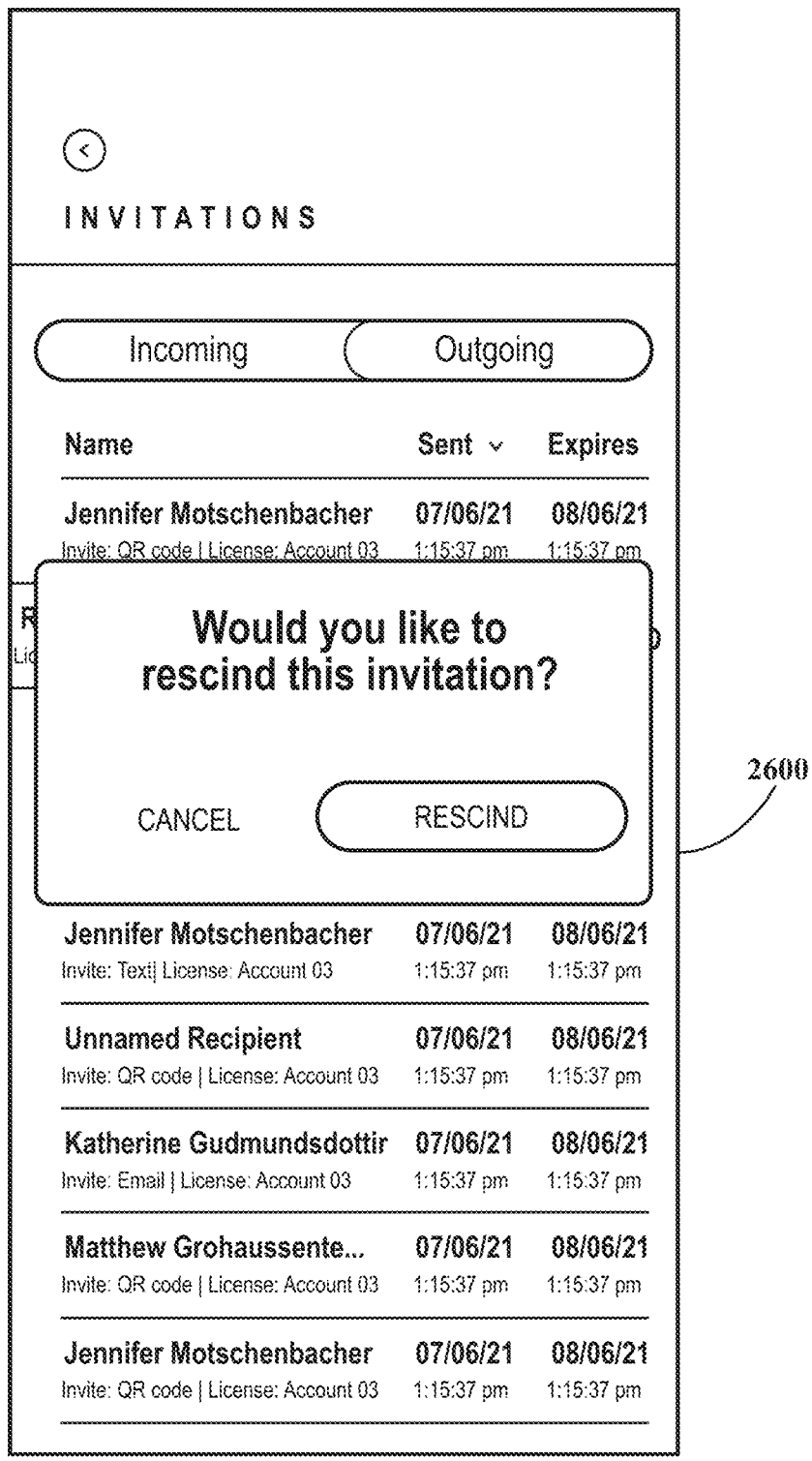

FIG. 21 illustrates an exemplary embodiment of the user interface having an existing user account connection screen 2100 whereby the user may connect the user account and/or one or more user profiles of the user with one or more user profiles of other users. The user may connect with other users via, for example, QR code, email, text, search, and the like.

FIGS. 22A-22D illustrate an exemplary embodiment of the user interface having an email user connection screen 2200 whereby the user may connect with one or more other users via email. The user may enter and/or select one or more email addresses of other users of the mobile application and/or the web-based application. The user may additionally select one or more user profiles of the user to which the user would like the other users to connect. Upon selection, the other users may receive invitations to connect with the user. Upon accepting an invitation to connect, contact information associated with the one or more selected user profiles of the user is shared with the other user, and contact information of one or more user profiles of the other user is shared with the user.

FIGS. 23A-23D illustrate an exemplary embodiment of the user interface having a QR code user connection screen 2300 whereby the user may connect with one or more other users via QR code. The user may select one or more user profiles to be shared via QR code. Upon selection, the platform 100 is configured to generate a single-use QR code. Another user may scan the single-use QR code to receive an invitation to connect to the one or more user profiles selected by the user. Upon accepting an invitation to connect, contact information associated with the one or more selected user profiles of the user is shared with the other user, and contact information of one or more user profiles of the other user is shared with the user. In embodiments, the QR code invitation may be associated with a licensed invitation of an enterprise account. Connections made via licensed invitations may be added to an enterprise connection list and shared among some or all users of the enterprise account.

FIGS. 24A-24D illustrate an exemplary embodiment of the user interface having a text message user connection screen 2400 whereby the user may connect with one or more users via text message. The user may select one or more profiles to be shared via text message. Upon selection, the platform 100 is configured to generate a URL that may be transmitted via text message to another user, such as via a native text message application of the mobile application. The recipient of the text message may engage with the URL to receive an invitation to connect to the one or more user profiles selected by the user. Upon accepting an invitation to connect, contact information associated with the one or more selected user profiles of the user is shared with the other user, and contact information of one or more user profiles of the other user is shared with the user. In embodiments, the text message invitation may be associated with a licensed invitation of an enterprise account. Connections made via licensed invitations may be added to an enterprise connection list and shared among some or all users of the enterprise account.

FIGS. 25A-25H illustrate an exemplary embodiment of the user interface having a search user connection screen 2500 whereby the user may connect with one or more users by searching for the one or more other users. The user may input one or more instances of contact information or partial instances of contact information into a search bar within the user interface. The user interface is configured to present to the user a list of user profiles having information that matches or partially matches the input contact information. The user may then select one or more user profiles, view contact information associated with the one or more user profiles, and/or send an invitation to connect. Upon accepting an invitation to connect, contact information associated with the one or more selected user profiles of the user is shared with the other user, and contact information of one or more user profiles of the other user is shared with the user.

In embodiments, the user may block one or more user profiles from sending invitations to connect to the user.

FIGS. 26A-26I illustrate an exemplary embodiment of the user interface having an invitation management screen 2600 whereby the user may manage incoming and outgoing invitations, and group connections. The user may view invitations to connect that have been sent to other users, and/or may view invitations to connect that have been received from other users. The user may elect to rescind one or more invitations to connect that have not yet been accepted, may decline in invitations to connect received from other users, and/or may elect to block one or more users from sending further invitations to connect.

In embodiments, the user may group one or more user profiles into groups. The user may create one or more groups of user profiles, name the one or more groups of user profiles, and add one or more user profiles to the one or more groups of user profiles. The user may select one or more instances of contact information associated with the user profile to share or to not share with the user profiles contained within the one or more groups of user profiles. In response to receiving an indication from the user that instances of contact information associated with the user profile are to not be shared with the user profiles contained within the one or more groups of user profiles, the platform 100 may be configured to remove the indicated user profiles contained within the one or more groups of user profiles from the related group and/or to cease pushing updates of the contact information to the indicated user profiles contained within the one or more groups of user profiles.

Figure 27:
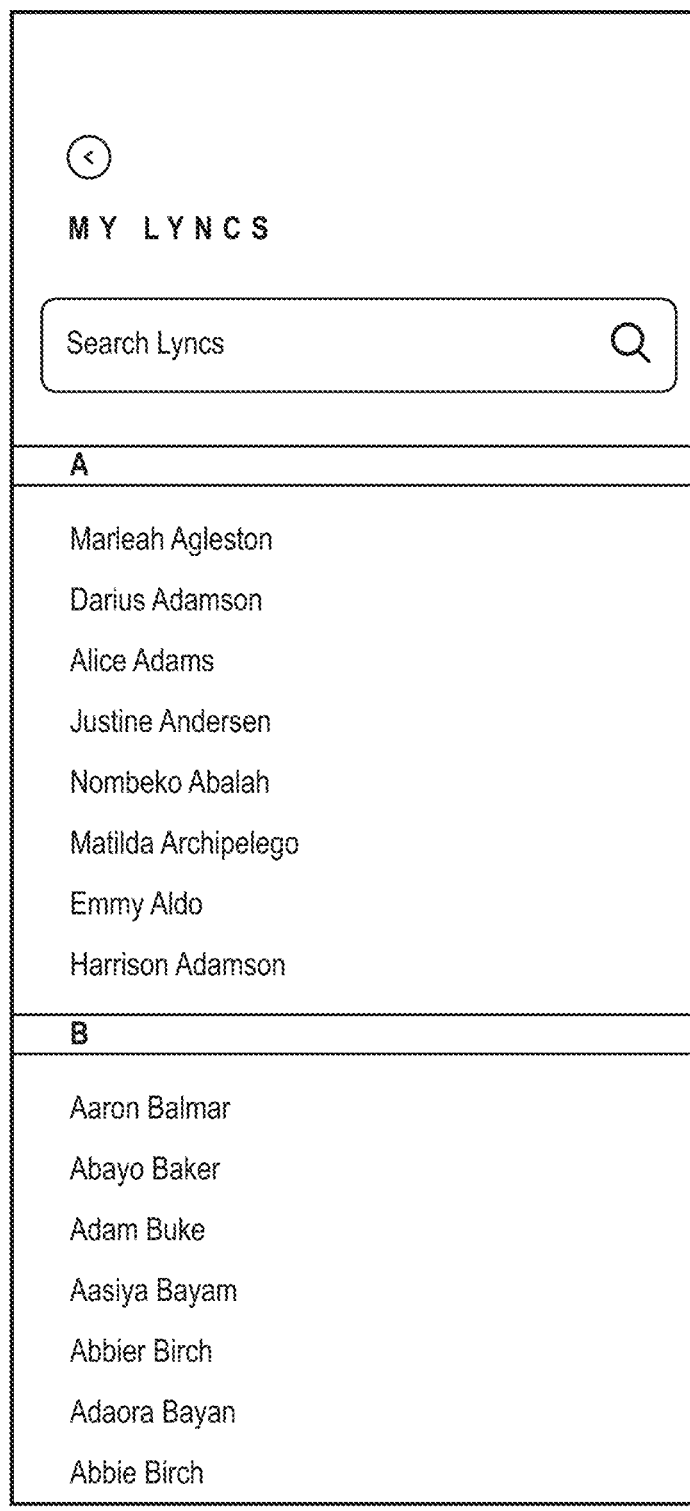
FIG. 27 illustrates exemplary embodiments of the user interface whereby the user may view a list of user profiles with which the user is connected, according to aspects of the present disclosure.
Figure 28A:
FIGS. 28A-28E illustrate exemplary embodiments of the user interface displaying a user profile with which the user is connected, according to aspects of the present disclosure.
Figure 28B:
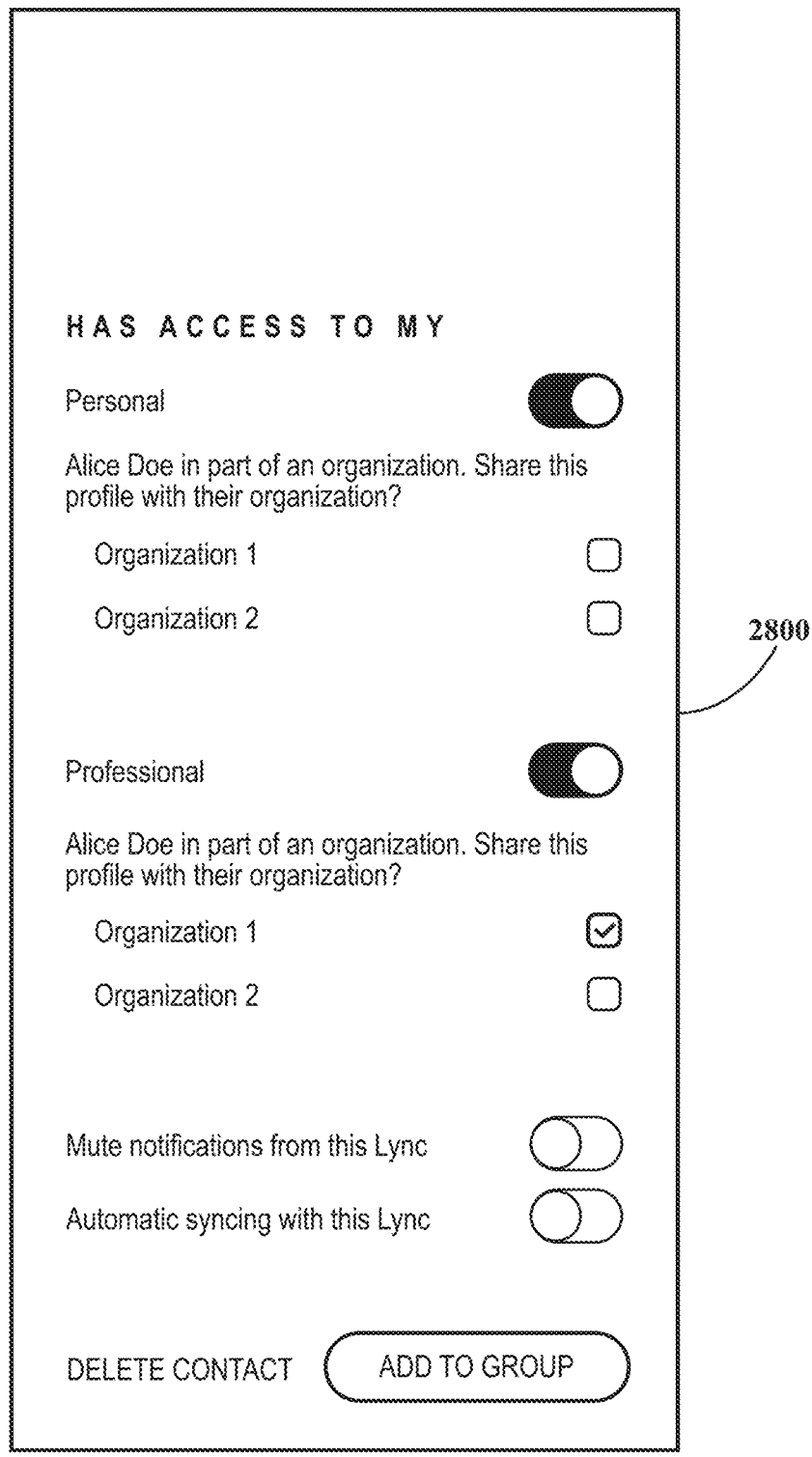
Figure 28C:
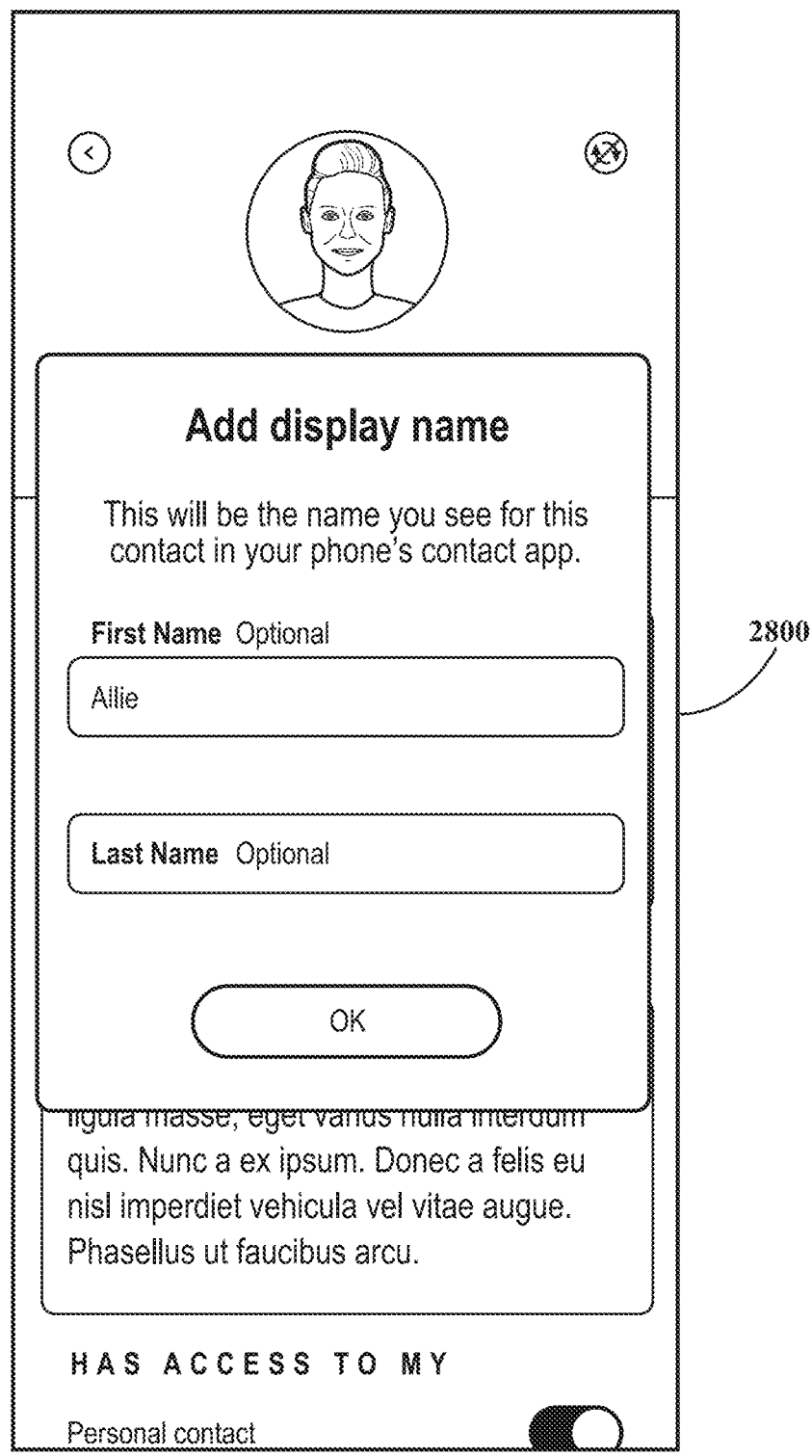
Figure 28D:
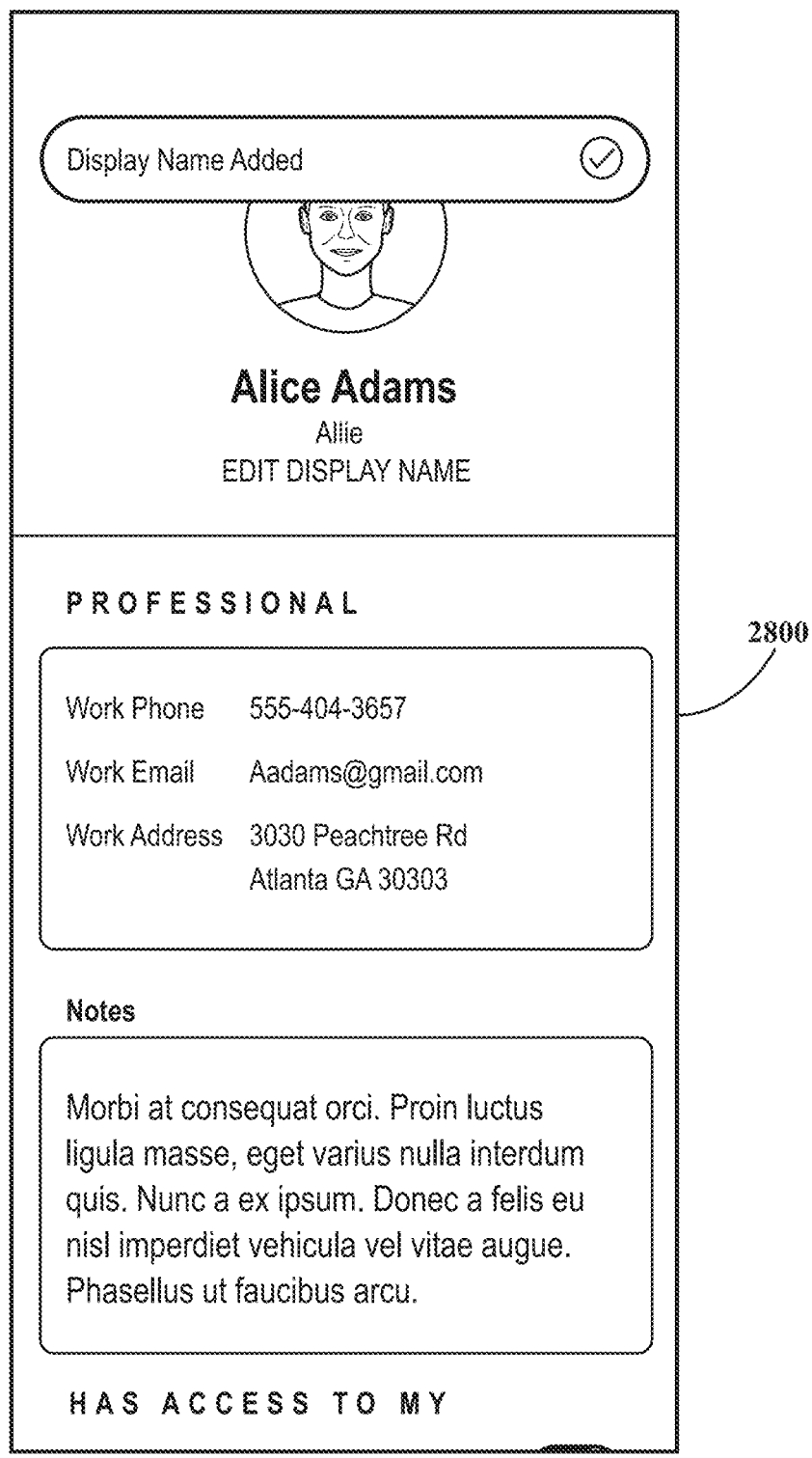
Figure 28E:
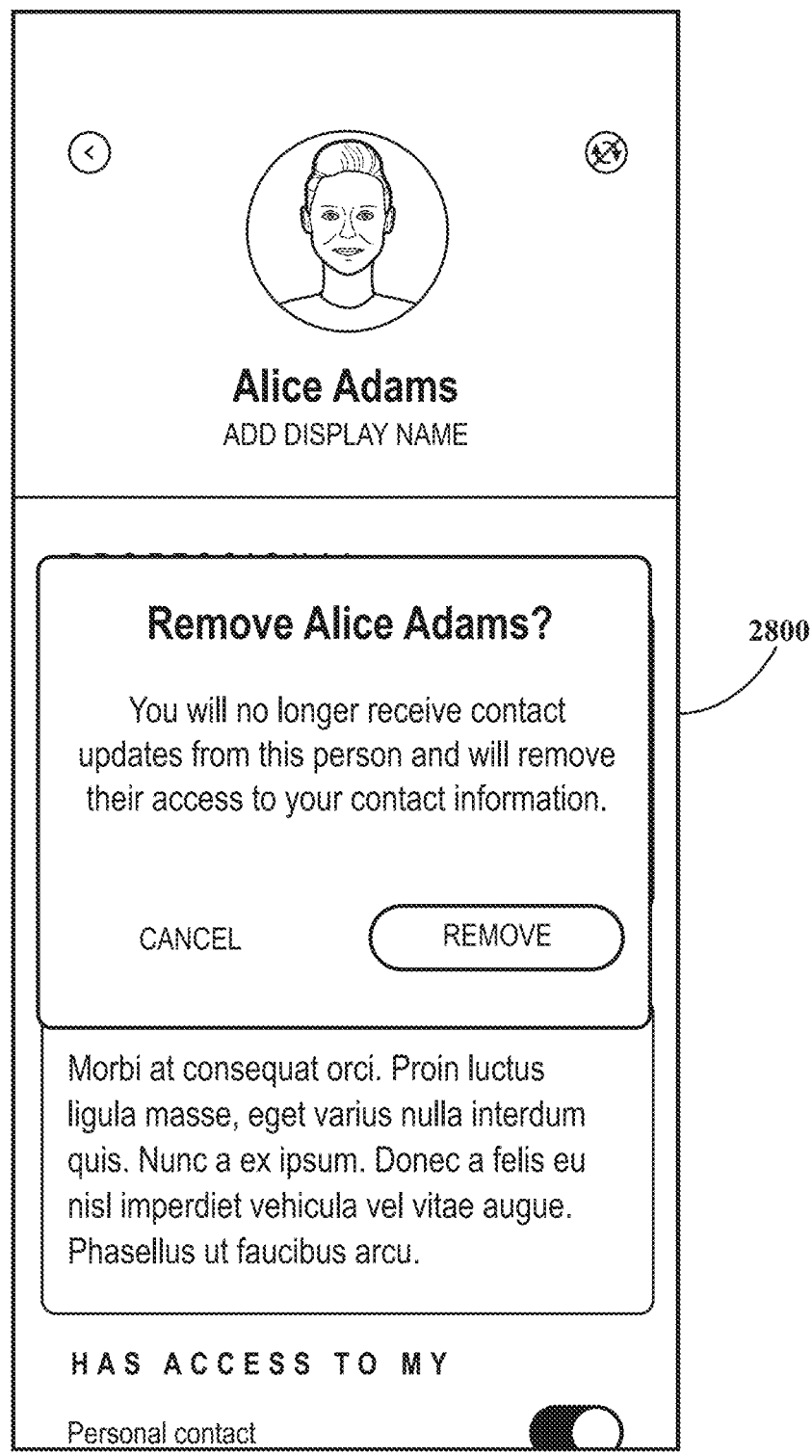
Figure 29A:
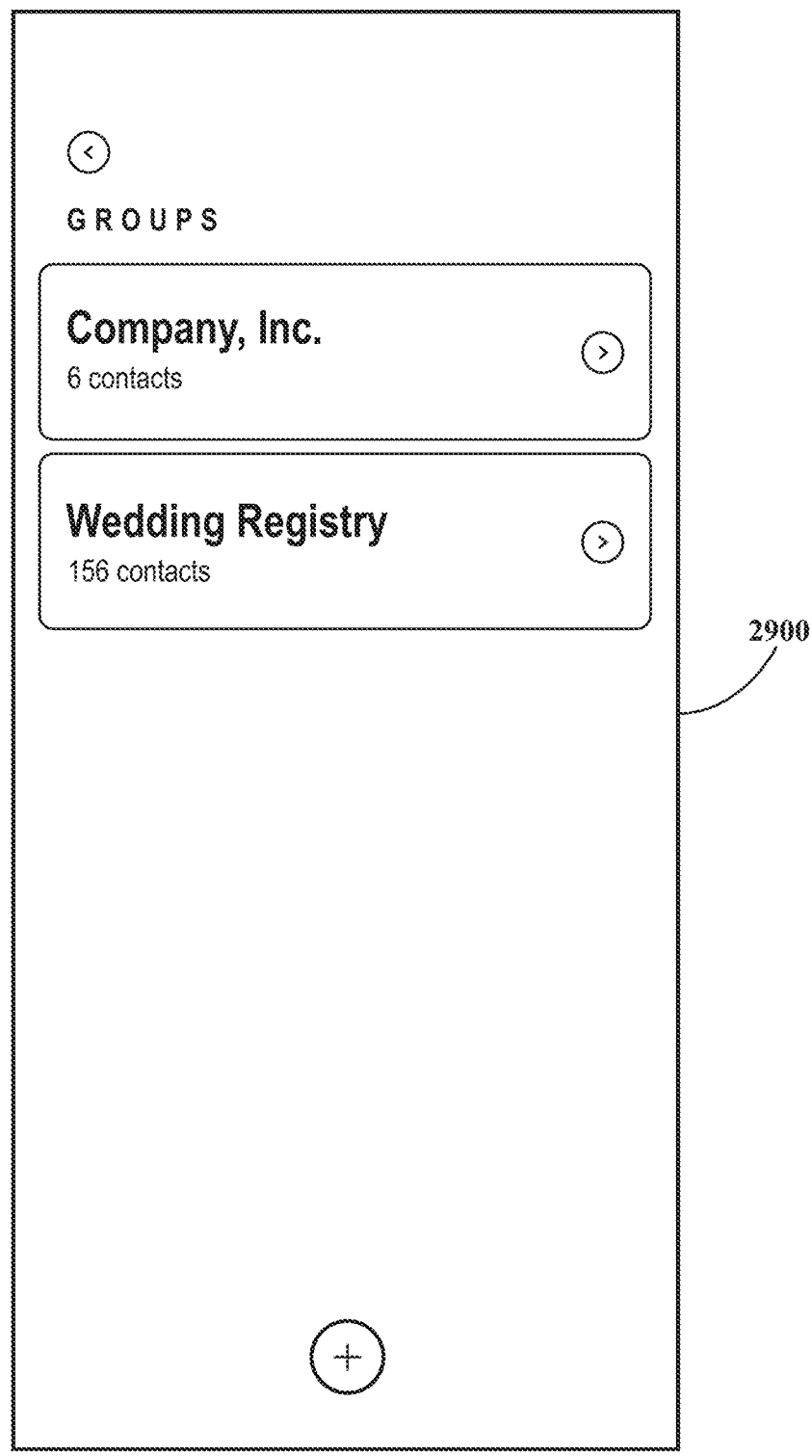
FIGS. 29A-29G illustrate exemplary embodiments of the user interface whereby the user may manage groups of user profiles, according to aspects of the present disclosure.
Figure 29B:
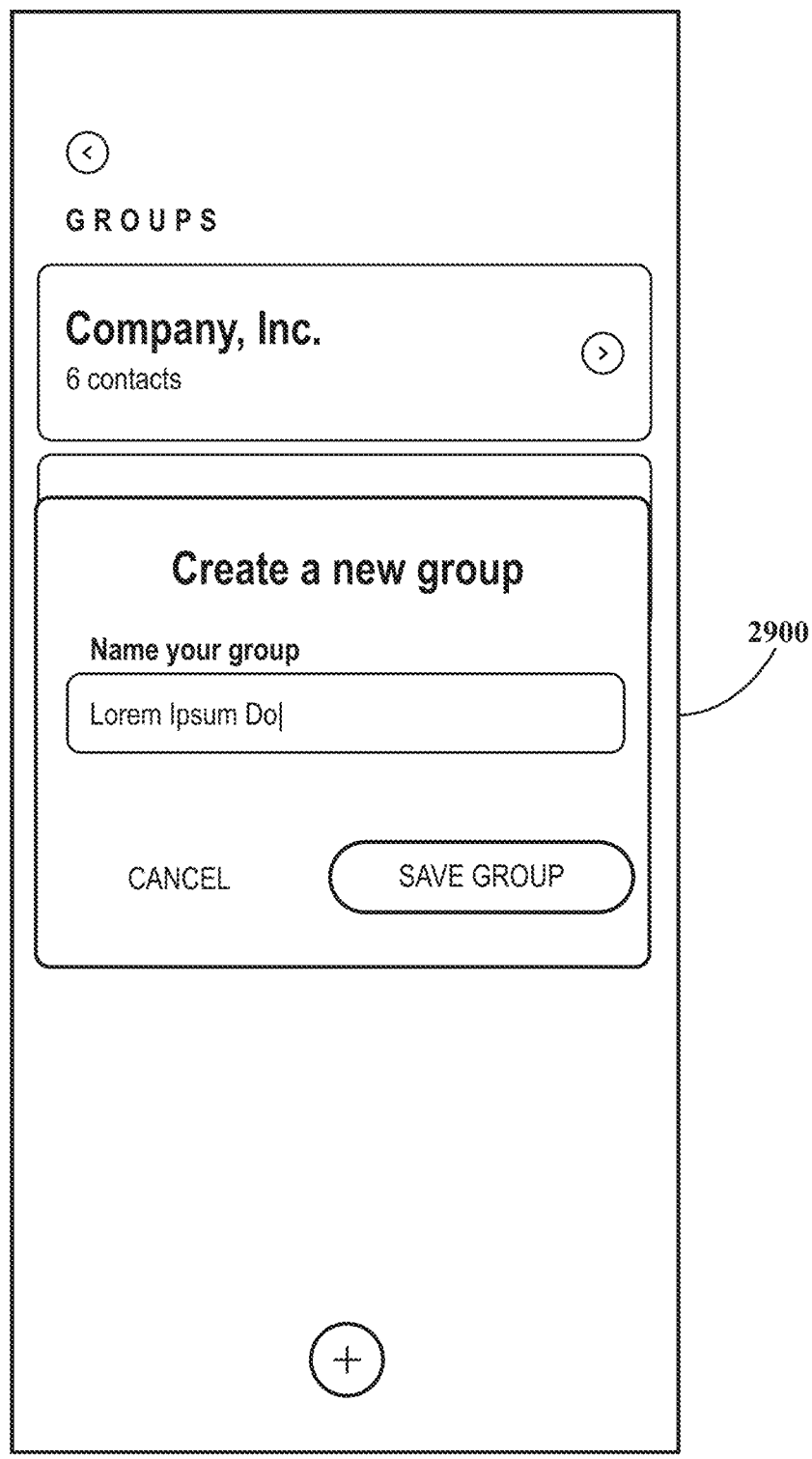
Figure 29C:
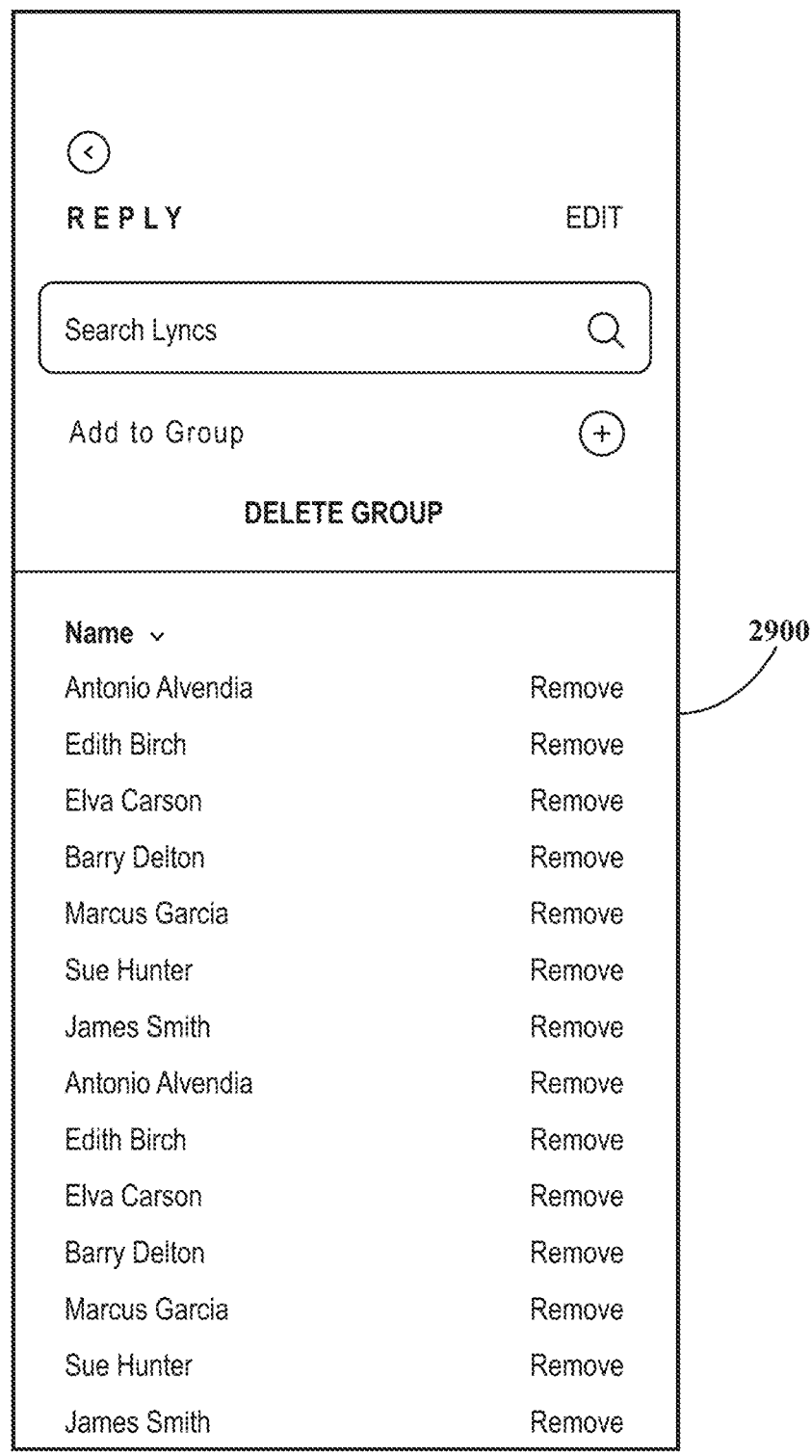
Figure 29D:
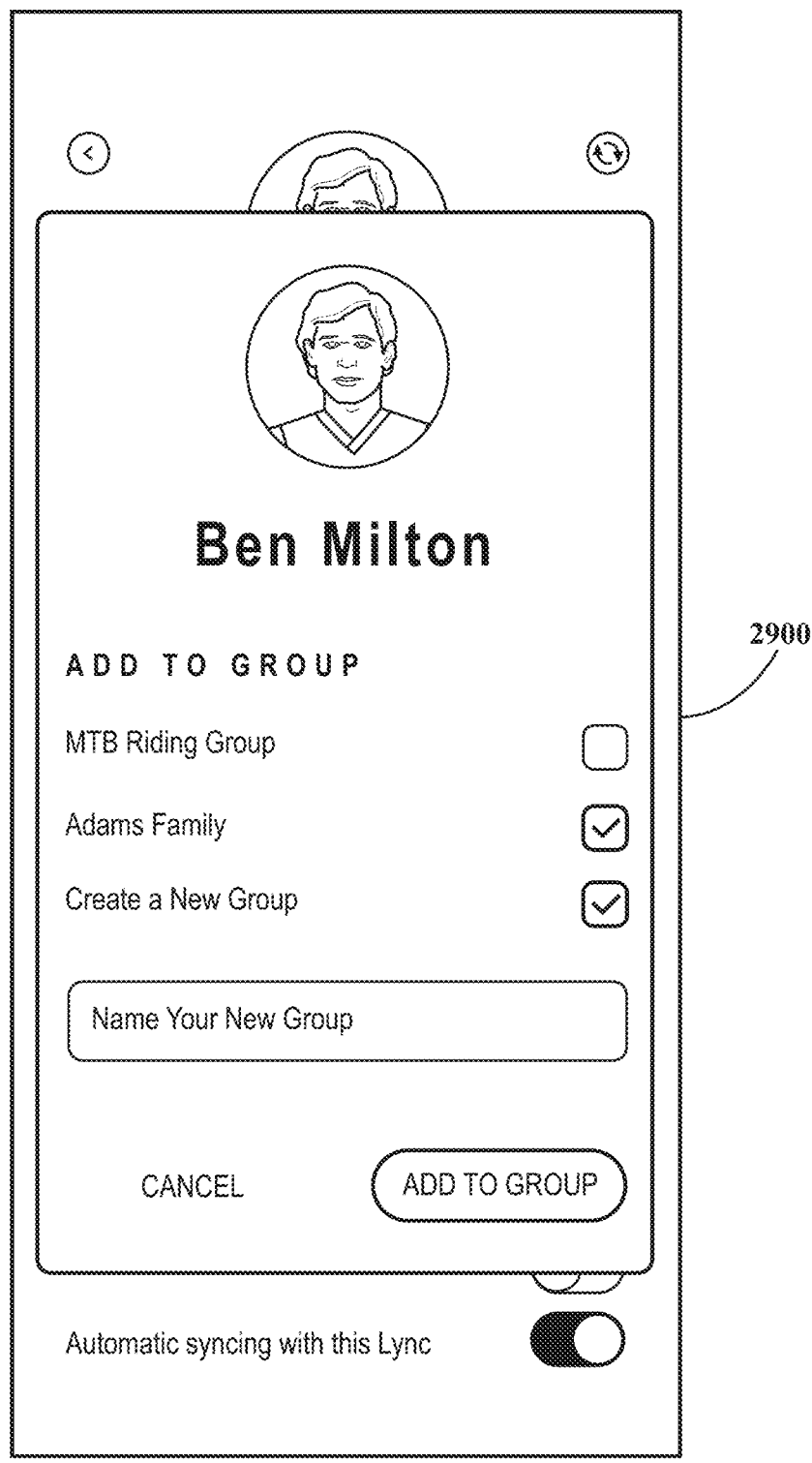
Figure 29E:
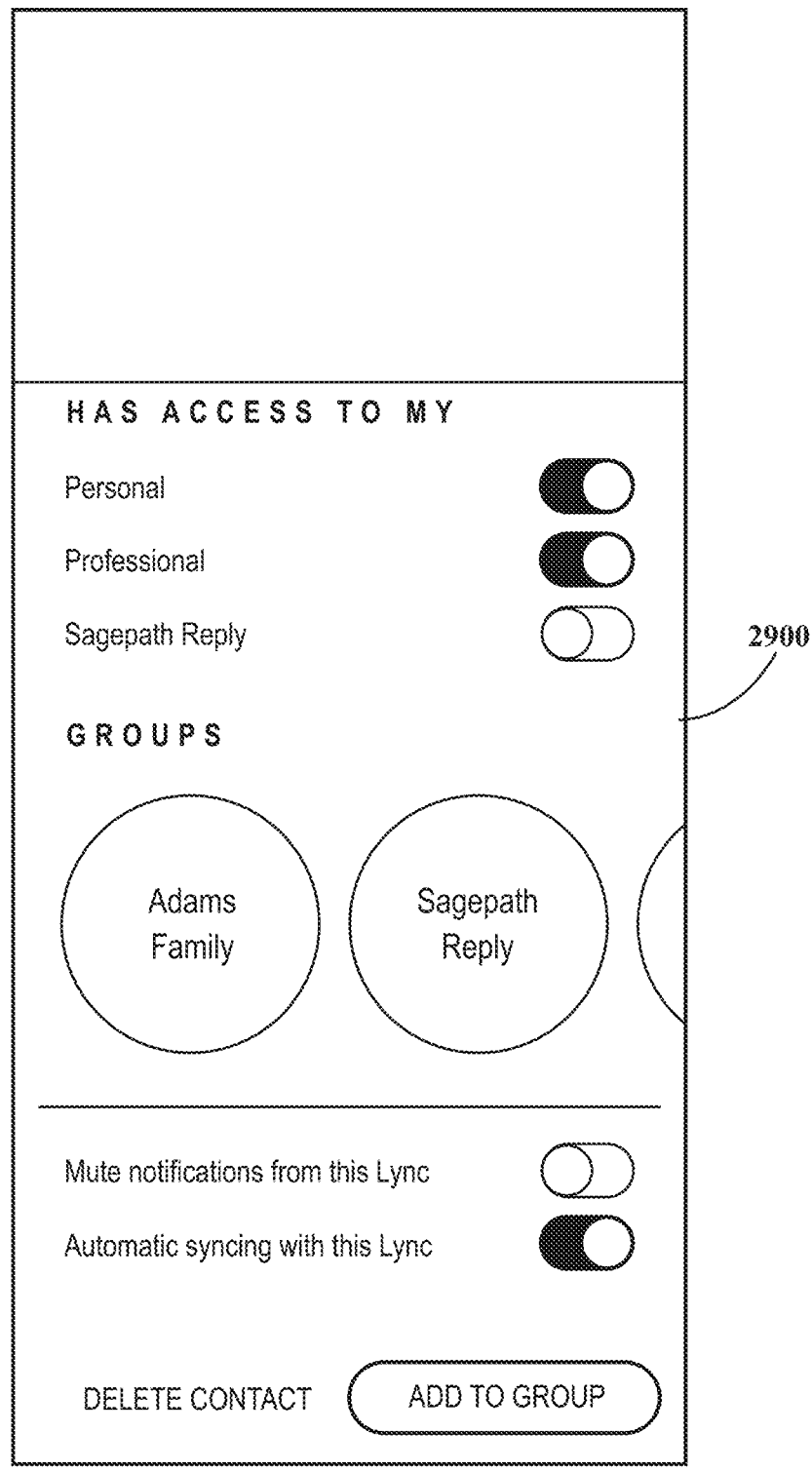
Figure 29F:
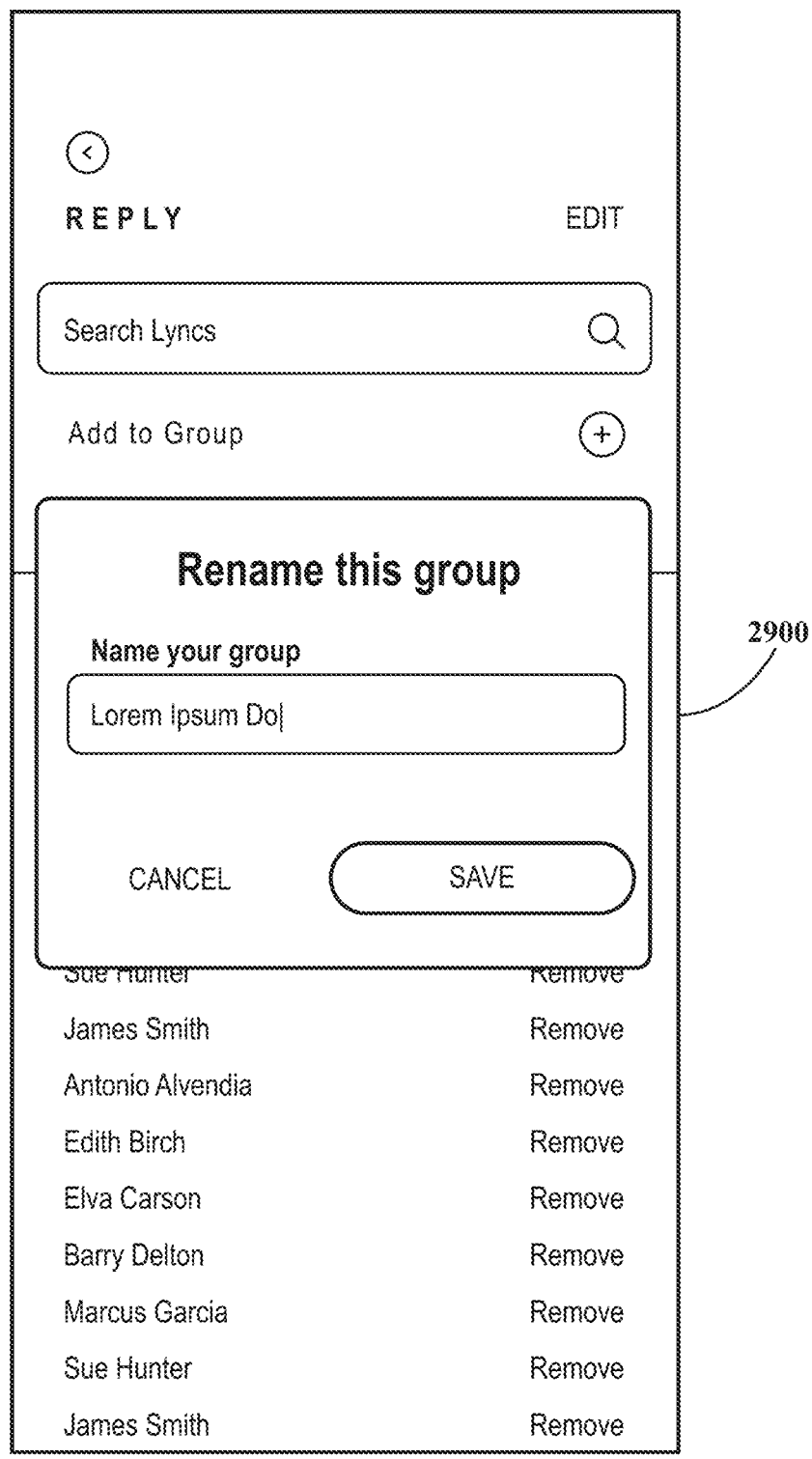
Figure 29G:
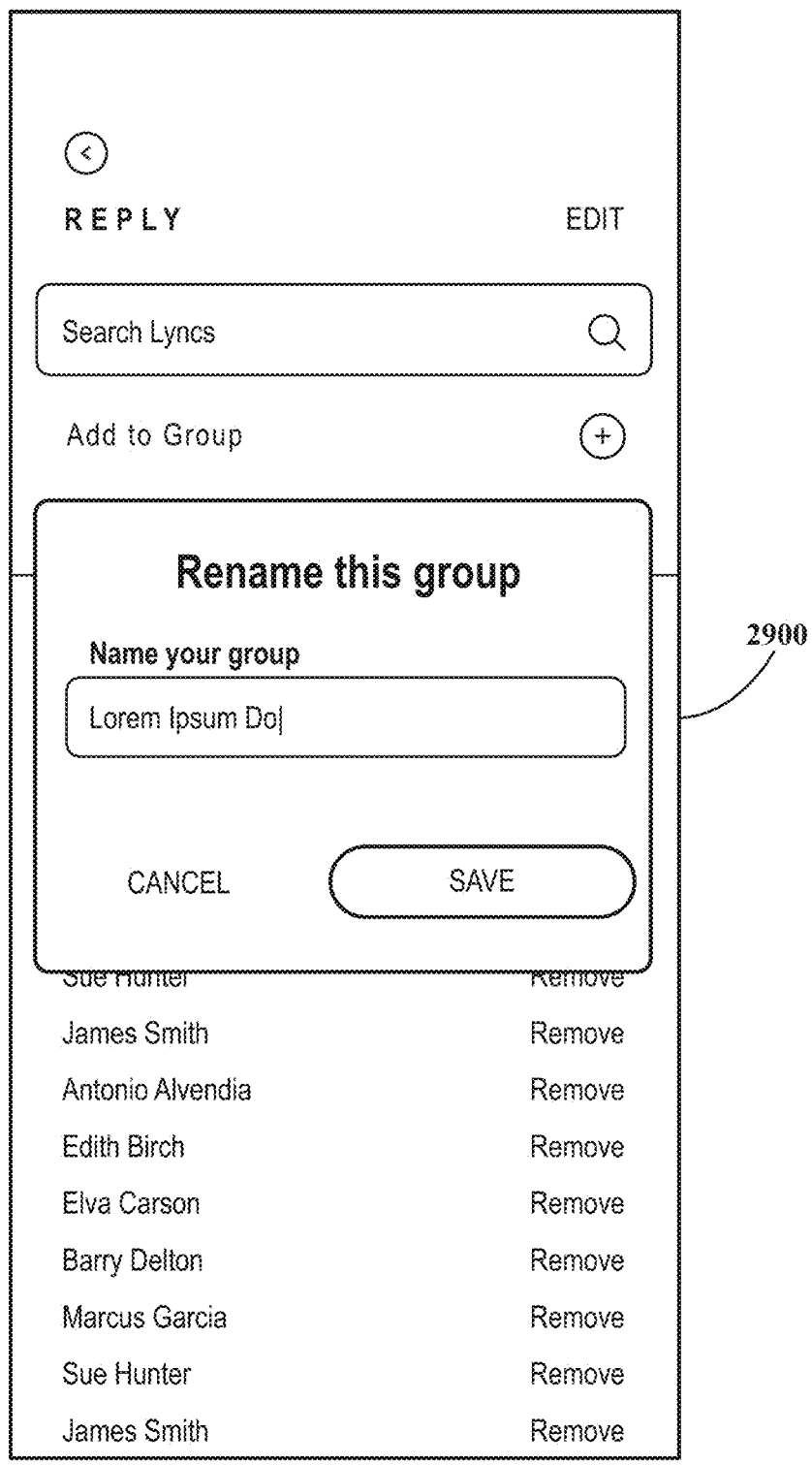

FIG. 27 illustrates an exemplary embodiment of the user interface having a connected profile list screen 2700 whereby the user may view a list of user profiles with which the user is connected. The user may scroll to view user profiles listed within the user interface and may select one or of the user profiles listed to view the user profile selected.

FIGS. 28A-28E illustrate an exemplary embodiment of the user interface having a connected user profile display screen 2800 displaying a user profile with which the user is connected. In embodiments, the display of the user profile includes contact information associated with the user profile that is viewable by the user. In embodiments, the display of the user profile includes a notes interface for creating, displaying, and/or editing notes by the user. The user may create and/or edit notes for display in the notes interface. The notes displayed in the notes interface are viewable by only the user and, as such, are not viewable by the other user with whom the displayed user profile is associated. In embodiments, the display of the user profile includes options for the user to change access of the displayed user profile to contact information of the user profile of the user, toggle receipt of notifications related to the displayed user profile, toggle automatic synchronization of updated contact information related to the displayed user profile, disconnect from the displayed user profile, and/or add the displayed user profile to a group of user profiles. In embodiments, the user may add a display name to the displayed user profile. The user interface is configured to present the entered display name to the user rather than the full name of the user.

FIGS. 29A-29G illustrate an exemplary embodiment of the user interface having a group management screen 2900 whereby the user may manage groups of user profiles. The user may, via the user interface, create one or more groups of user profiles, name and/or rename one or more groups of user profiles, add one or more user profiles to the one or more groups of user profiles, and/or remove one or more user profiles from the one or more groups of user profiles.

Figure 30:
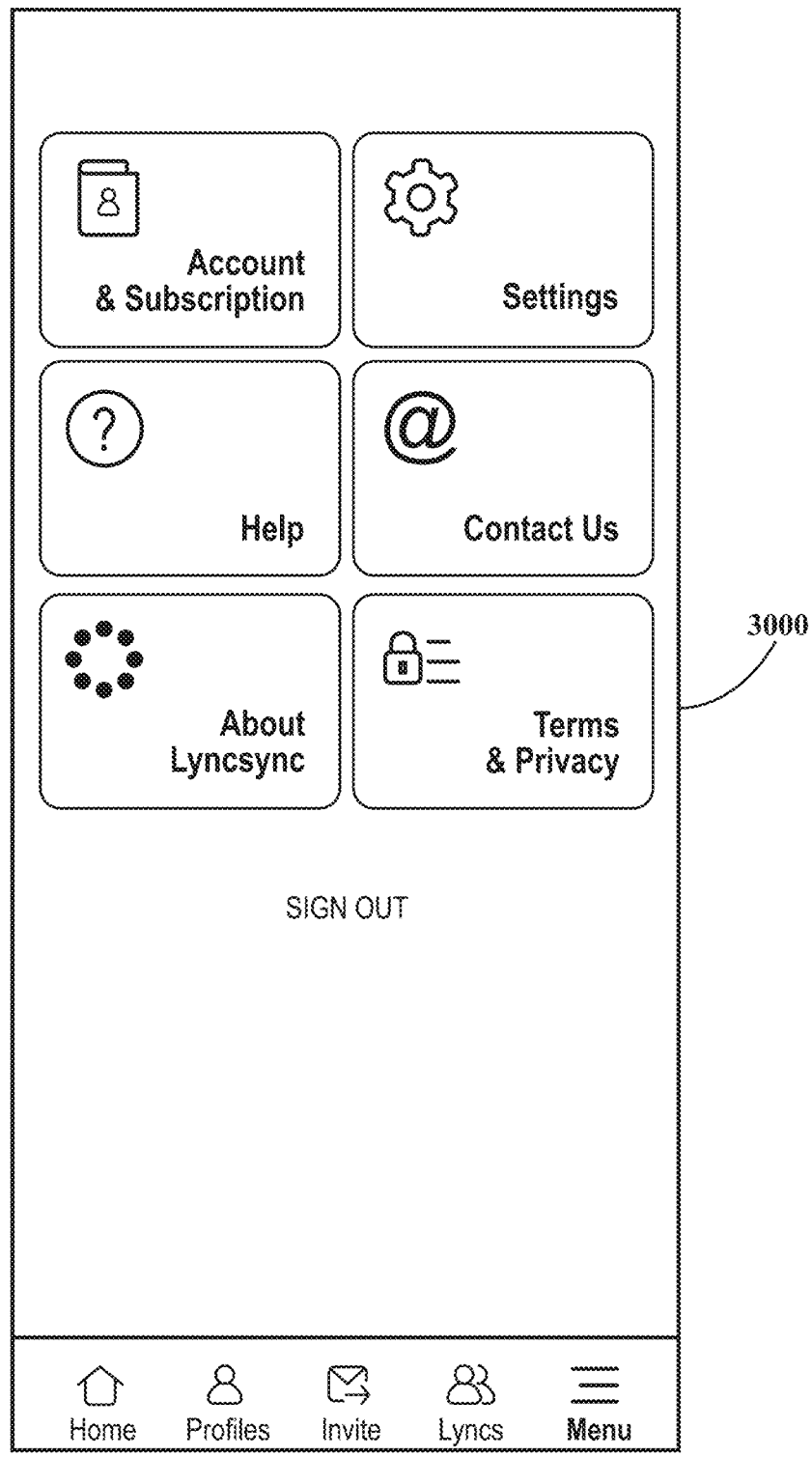
FIG. 30 illustrates exemplary embodiments of a menu tab of the user interface, according to aspects of the present disclosure.

FIG. 30 illustrates an exemplary embodiment of a menu tab screen 3000 of the user interface. The menu tab allows the user to access one or more menus, such as one or more of account, subscription, settings, help, contact us, about, and terms and privacy.

Figure 31:
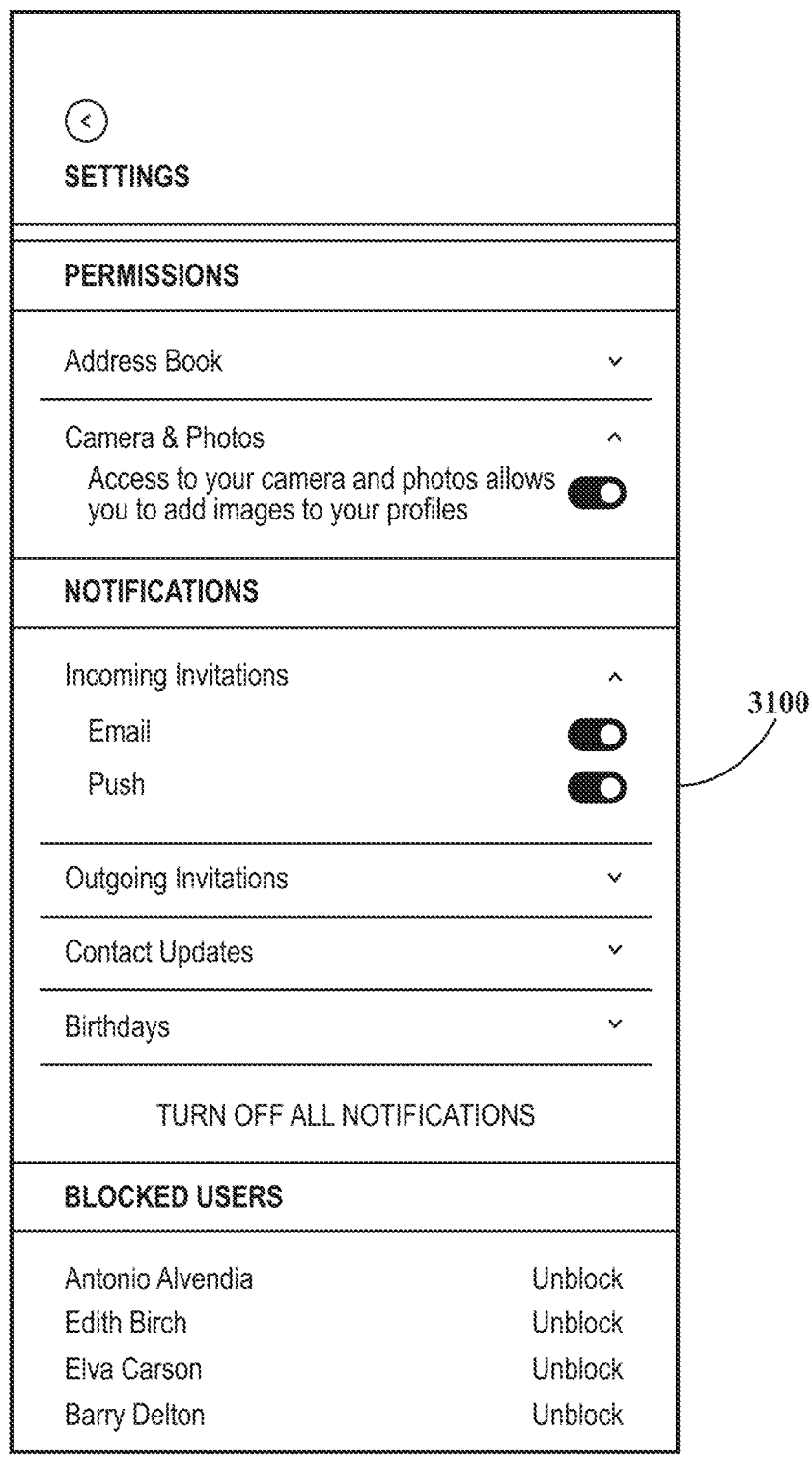
FIG. 31 illustrates exemplary embodiments of a settings menu of the user interface, according to aspects of the present disclosure.

FIG. 31 illustrates an exemplary embodiment of the settings menu screen 3100 of the user interface. The settings menu may include options that allow the user to control permissions, notifications, blocked users, etc.

Figure 32A:
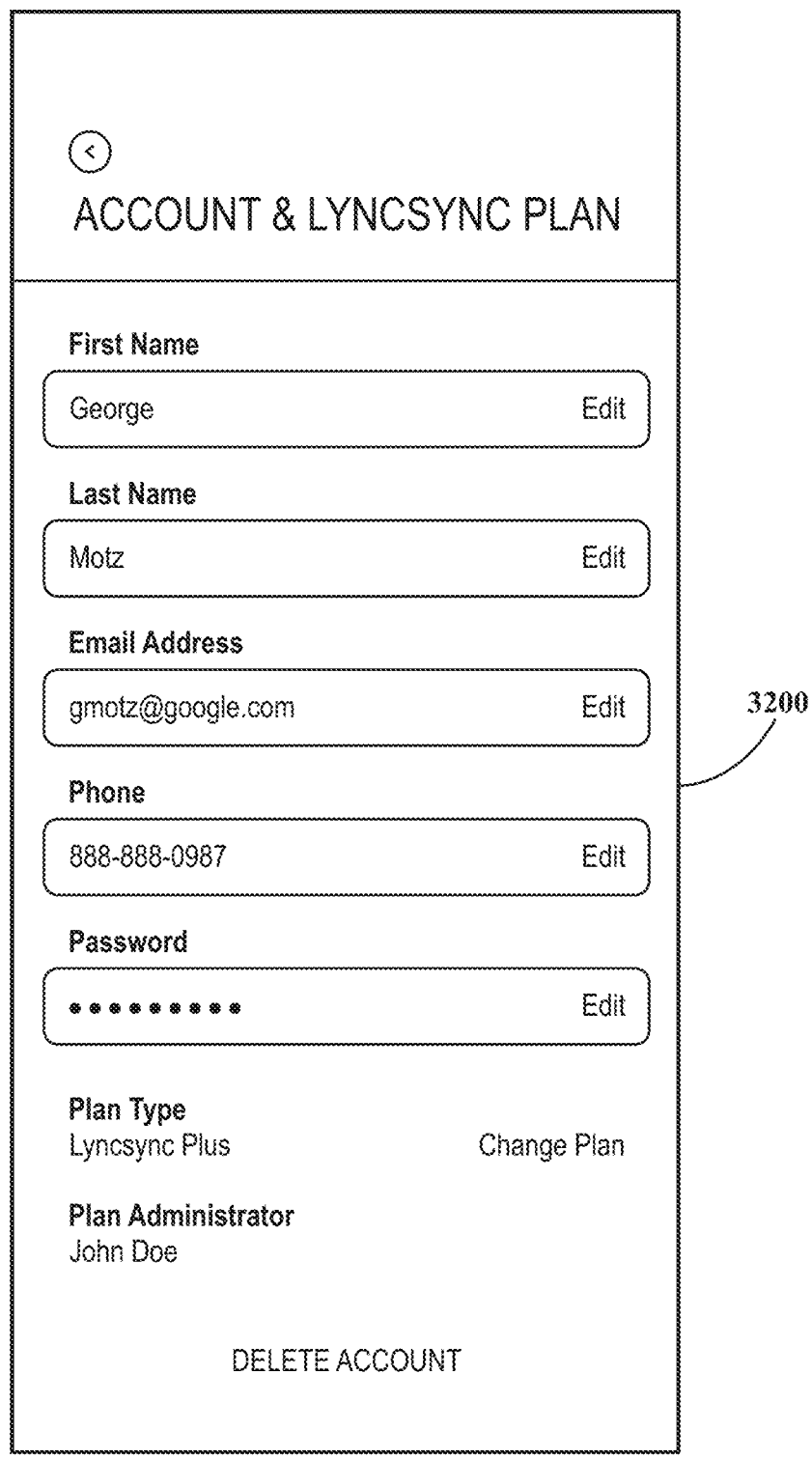
FIGS. 32A and 32B illustrate exemplary embodiments of an account menu of the user interface, according to aspects of the present disclosure.
Figure 32B:
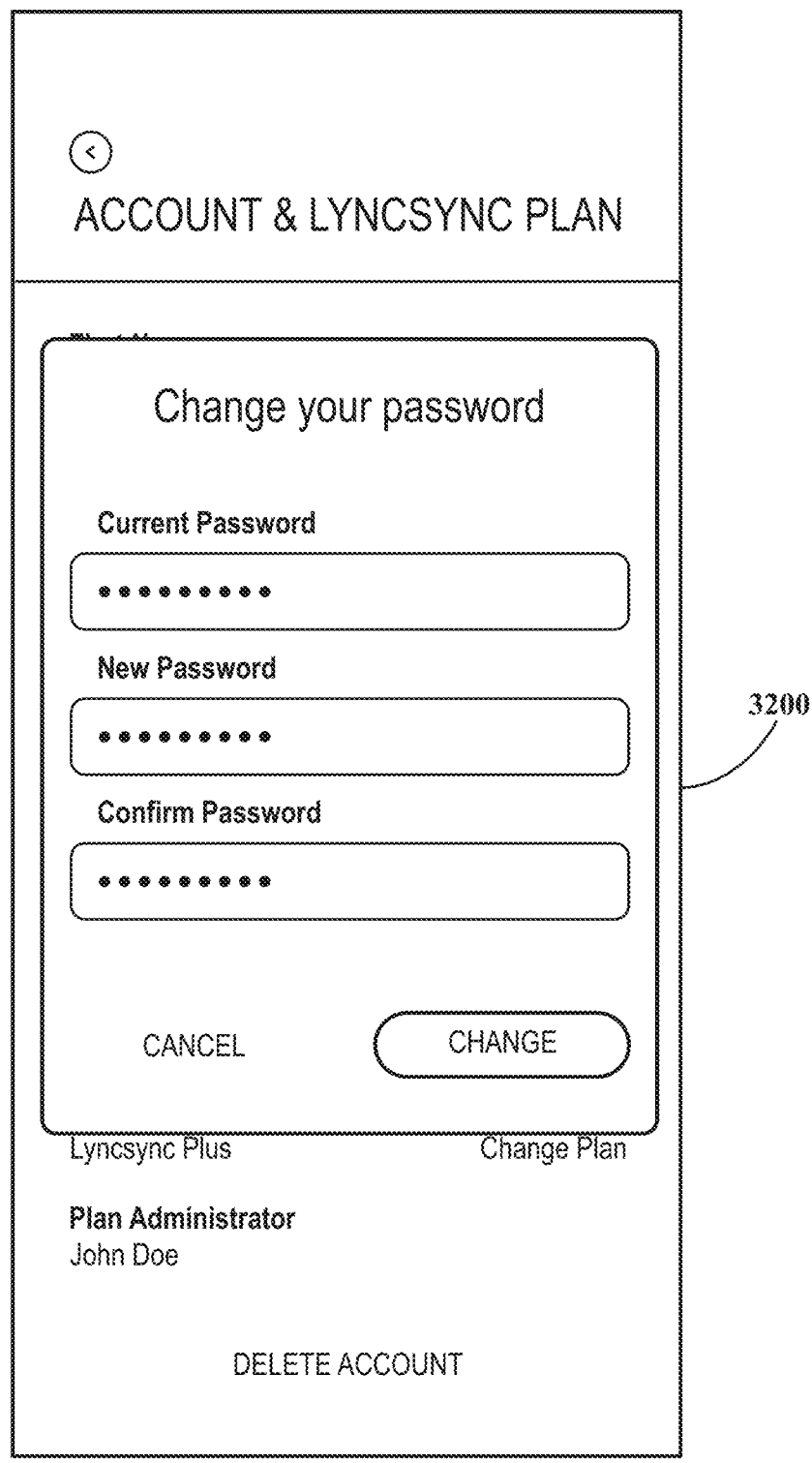

FIGS. 32A and 32B illustrate an exemplary embodiment of the account menu screen 3200 of the user interface. The account menu may include options that allow the user to change contact information associated with the user account, change a password associated with the user account, change subscription and/or payment plan options, delete the user account, and the like.

Figure 33A:
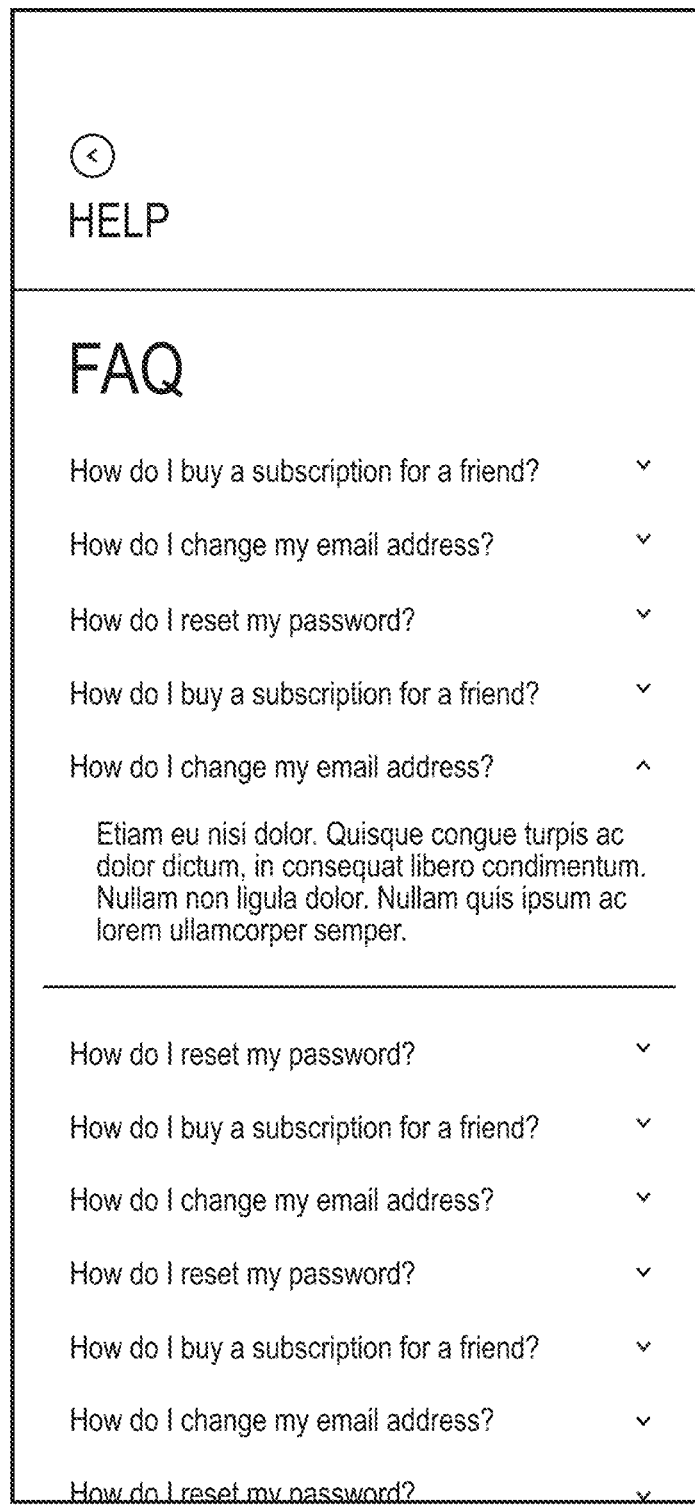
FIGS. 33A and 33B illustrate exemplary embodiments of a help menu of the user interface, according to aspects of the present disclosure.
Figure 33B:
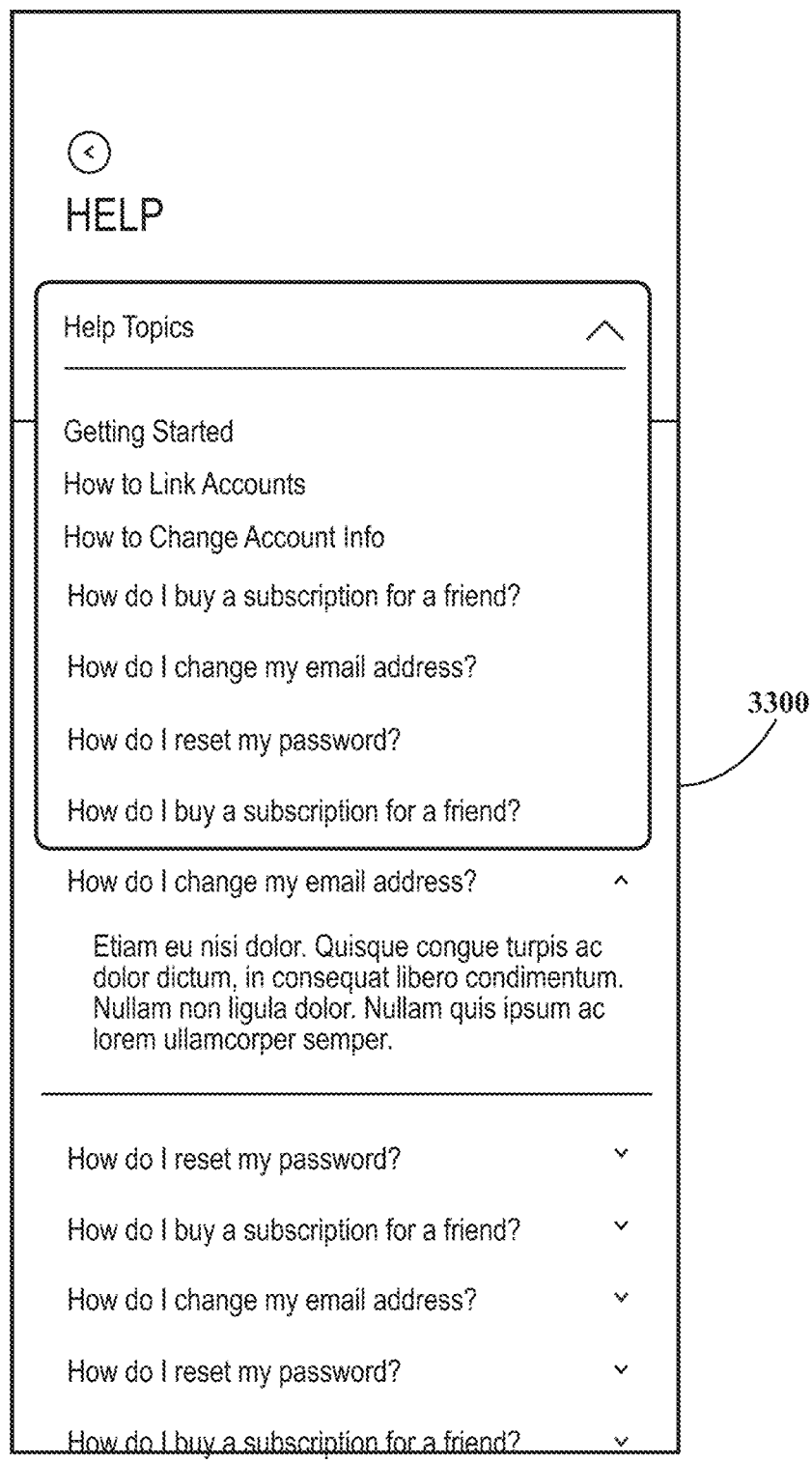

FIGS. 33A and 33B illustrate an exemplary embodiment of the help menu screen 3300 of the user interface. The help menu may include, for example, frequently asked questions and answers related thereto, and one or more help topics with information related to usage of the mobile application and/or the web-based application by the user.

Figure 34:
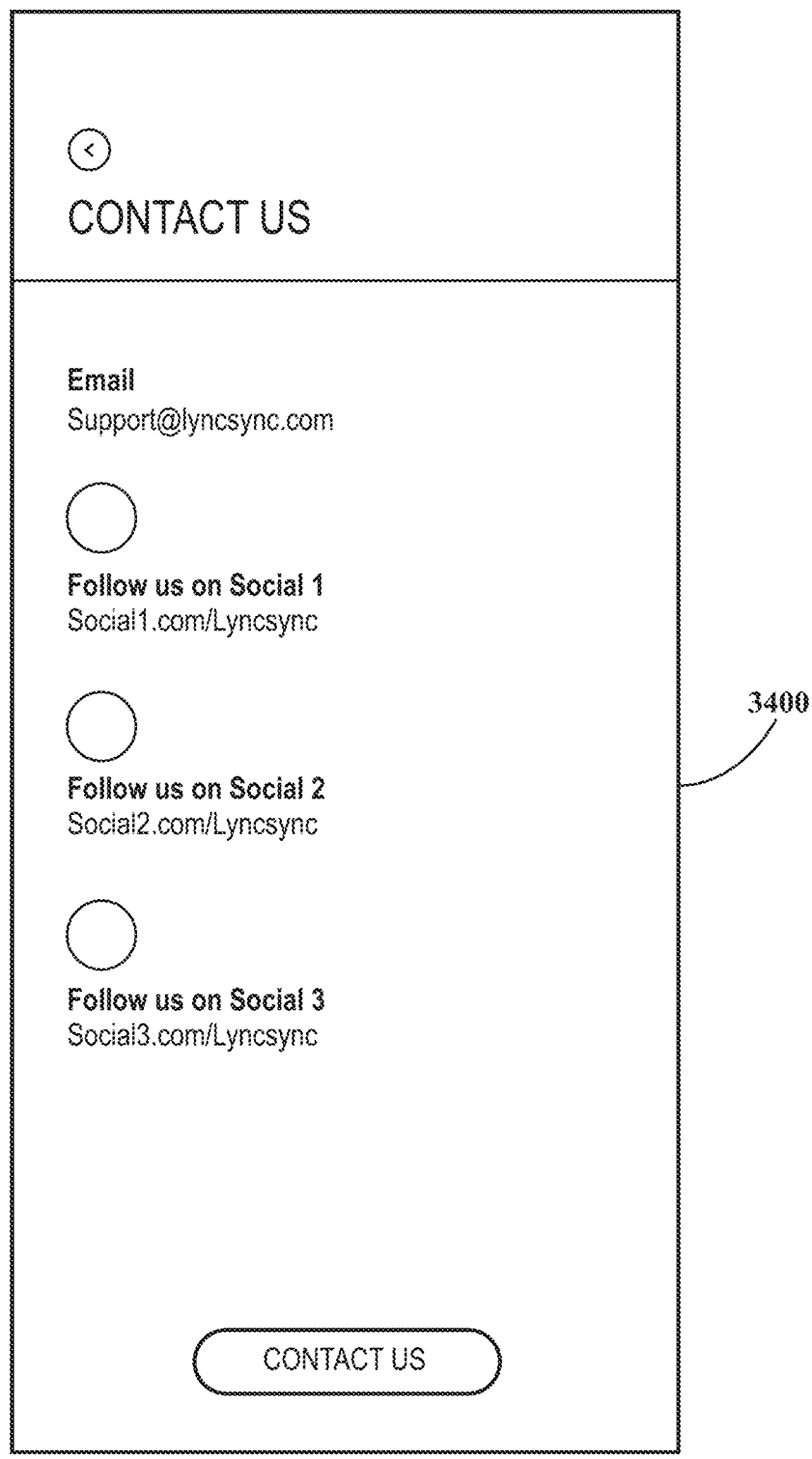
FIG. 34 illustrates exemplary embodiments of a contact us menu of the user interface, according to aspects of the present disclosure.

FIG. 34 illustrates an exemplary embodiment of the contact us menu screen 3400 of the user interface. The "contact us" menu of the user interface may include information that allows the user to contact and view information related to one or more creators, publishers, and/or managers of the mobile application and/or the web-based application.

Figure 35:
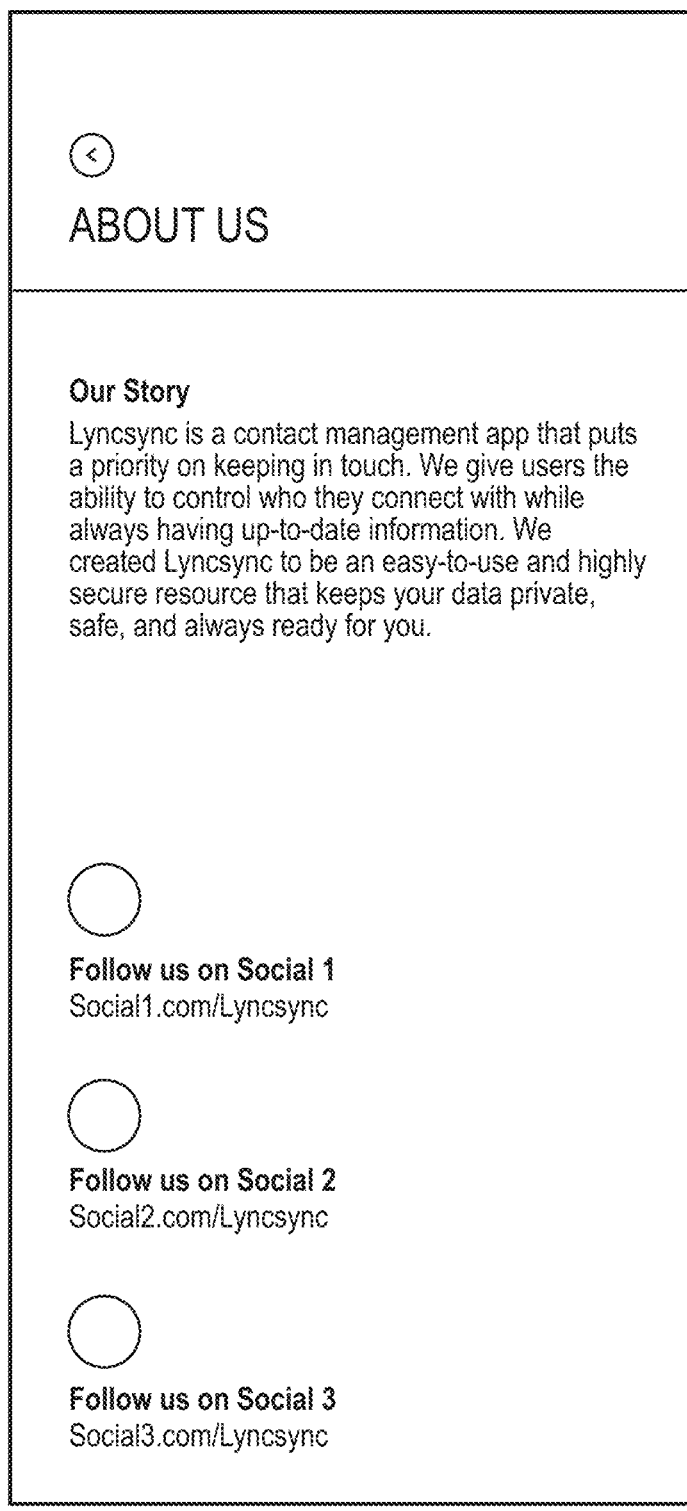
FIG. 35 illustrates exemplary embodiments of an about us menu of the user interface, according to aspects of the present disclosure.

FIG. 35 illustrates an exemplary embodiment of the "about us" menu screen 3500 of the user interface. The "about us" menu may include information about the one or more creators, publishers, and/or managers of the mobile application and/or the web-based application.

FIG. 36 illustrates an exemplary embodiment of the terms & privacy menu screen 3600 of the user interface. The terms & privacy menu may include information related to usage, legal rights, terms of use, privacy policies, and the like associated with the mobile application and/or web-based application.

Additional Embodiments—Analytics System

In embodiments, provided herein is a platform for self-curated single source of truth about the contact or profile of an individual having an analytics system configured for performing an analytic operation to produce an analytic measure. In embodiments, provided herein is a platform for self-curated single source of truth about the contact or profile of an individual having an analytics system configured for performing an analytic operation to produce an analytic measure and having an AI system. In embodiments, provided herein is a platform for self-curated single source of truth about the contact or profile of an individual having an analytics system configured for performing an analytic operation to produce an analytic measure and having a system configured to perform automated attribute augmentation from social network data. In embodiments, provided herein is a platform for self-curated single source of truth about the contact or profile of an individual having an analytics system configured for performing an analytic operation to produce an analytic measure and having a system for performing automated curation of contact and/or profile information. In embodiments, provided herein is a platform for self-curated single source of truth about the contact or profile of an individual having an analytics system configured for performing an analytic operation to produce an analytic measure and having an automation system. In embodiments, provided herein is a platform for self-curated single source of truth about the contact or profile of an individual having an analytics system configured for performing an analytic operation to produce an analytic measure and having a system for performing consensus techniques and algorithms. In embodiments, provided herein is a platform for self-curated single source of truth about the contact or profile of an individual having an analytics system configured for performing an analytic operation to produce an analytic measure and having a system configured to facilitate manual contact attribute conflict resolution. In embodiments, provided herein is a platform for self-curated single source of truth about the contact or profile of an individual having an analytics system configured for performing an analytic operation to produce an analytic measure and having a system for performing curation of data and analytics and profiles on people. In embodiments, provided herein is a platform for self-curated single source of truth about the contact or profile of an individual having an analytics system configured for performing an analytic operation to produce an analytic measure and having a deduplication system. In embodiments, provided herein is a platform for self-curated single source of truth about the contact or profile of an individual having an analytics system configured for performing an analytic operation to produce an analytic measure and having a knowledge base system. In embodiments, provided herein is a platform for self-curated single source of truth about the contact or profile of an individual having an analytics system configured for performing an analytic operation to produce an analytic measure and having a machine learning/artificial intelligence system configured for classification. In embodiments, provided herein is a platform for self-curated single source of truth about the contact or profile of an individual having an analytics system configured for performing an analytic operation to produce an analytic measure and having a machine learning/artificial intelligence system configured for configuration and/or control. In embodiments, provided herein is a platform for self-curated single source of truth about the contact or profile of an individual having an analytics system configured for performing an analytic operation to produce an analytic measure and having a machine learning/artificial intelligence system configured to provide decision support. In embodiments, provided herein is a platform for self-curated single source of truth about the contact or profile of an individual having an analytics system configured for performing an analytic operation to produce an analytic measure and having a machine learning/artificial intelligence system configured for detection. In embodiments, provided herein is a platform for self-curated single source of truth about the contact or profile of an individual having an analytics system configured for performing an analytic operation to produce an analytic measure and having a machine learning/artificial intelligence system configured to perform an optimization. In embodiments, provided herein is a platform for self-curated single source of truth about the contact or profile of an individual having an analytics system configured for performing an analytic operation to produce an analytic measure and having a machine learning/artificial intelligence system configured to generate a prediction. In embodiments, provided herein is a platform for self-curated single source of truth about the contact or profile of an individual having an analytics system configured for performing an analytic operation to produce an analytic measure and having a matching system. In embodiments, provided herein is a platform for self-curated single source of truth about the contact or profile of an individual having an analytics system configured for performing an analytic operation to produce an analytic measure and having a system for resolving differences. In embodiments, provided herein is a platform for self-curated single source of truth about the contact or profile of an individual having an analytics system configured for performing an analytic operation to produce an analytic measure and having a system for managing jurisdiction-based privacy domains. In embodiments, provided herein is a platform for self-curated single source of truth about the contact or profile of an individual having an analytics system configured for performing an analytic operation to produce an analytic measure and having a similarity and/or clustering system. In embodiments, provided herein is a platform for self-curated single source of truth about the contact or profile of an individual having an analytics system configured for performing an analytic operation to produce an analytic measure and having a plurality of models and structures for contact data. In embodiments, provided herein is a platform for self-curated single source of truth about the contact or profile of an individual having an analytics system configured for performing an analytic operation to produce an analytic measure and having an e-commerce login/checkout ID control system. In embodiments, provided herein is a platform for self-curated single source of truth about the contact or profile of an individual having an analytics system configured for performing an analytic operation to produce an analytic measure and having a host interface system. In embodiments, provided herein is a platform for self-curated single source of truth about the contact or profile of an individual having an analytics system configured for performing an analytic operation to produce an analytic measure and having an incentives system configured to provide incentives for encouraging adoption and/or expansion. In embodiments, provided herein is a platform for self-curated single source of truth about the contact or profile of an individual having an analytics system configured for performing an analytic operation to produce an analytic measure and having a license management system. In embodiments, provided herein is a platform for self-curated single source of truth about the contact or profile of an individual having an analytics system configured for performing an analytic operation to produce an analytic measure and having a calendar system configured to organize calendars and tasks of users by identity and relevant network. In embodiments, provided herein is a platform for self-curated single source of truth about the contact or profile of an individual having an analytics system configured for performing an analytic operation to produce an analytic measure and having a policy violation management system. In embodiments, provided herein is a platform for self-curated single source of truth about the contact or profile of an individual having an analytics system configured for performing an analytic operation to produce an analytic measure and having a system for facilitating granular self-curation of identity via multiple identities and profiles. In embodiments, provided herein is a platform for self-curated single source of truth about the contact or profile of an individual having an analytics system configured for performing an analytic operation to produce an analytic measure and having a location factors system. In embodiments, provided herein is a platform for self-curated single source of truth about the contact or profile of an individual having an analytics system configured for performing an analytic operation to produce an analytic measure and having a system for performing outbound versus inbound contact management. In embodiments, provided herein is a platform for self-curated single source of truth about the contact or profile of an individual having an analytics system configured for performing an analytic operation to produce an analytic measure and having a QR code system. In embodiments, provided herein is a platform for self-curated single source of truth about the contact or profile of an individual having an analytics system configured for performing an analytic operation to produce an analytic measure and having a system configured to facilitate owner-controlled utilization of self-curated contact information including permission setting by use case. In embodiments, provided herein is a platform for self-curated single source of truth about the contact or profile of an individual having an analytics system configured for performing an analytic operation to produce an analytic measure and having a system for performing wallets and crypto/blockchain infrastructure. In embodiments, provided herein is a platform for self-curated single source of truth about the contact or profile of an individual having an analytics system configured for performing an analytic operation to produce an analytic measure and having a system for performing persistent, self-curated contact and profile information of a user. In embodiments, provided herein is a platform for self-curated single source of truth about the contact or profile of an individual having an analytics system configured for performing an analytic operation to produce an analytic measure and having a system configured to score and grade quality of contact information. In embodiments, provided herein is a platform for self-curated single source of truth about the contact or profile of an individual having an analytics system configured for performing an analytic operation to produce an analytic measure and having a system for integrating with self-curated single source of truth about the contact or profile of an individual system. In embodiments, provided herein is a platform for self-curated single source of truth about the contact or profile of an individual having an analytics system configured for performing an analytic operation to produce an analytic measure and having a connection suggestion system configured to perform scoring of backgrounds and identifiers. In embodiments, provided herein is a platform for self-curated single source of truth about the contact or profile of an individual having an analytics system configured for performing an analytic operation to produce an analytic measure and having a search function system. In embodiments, provided herein is a platform for self-curated single source of truth about the contact or profile of an individual having an analytics system configured for performing an analytic operation to produce an analytic measure and having an identity management and digital identity ownership system. In embodiments, provided herein is a platform for self-curated single source of truth about the contact or profile of an individual having an analytics system configured for performing an analytic operation to produce an analytic measure and having a systems integration system. In embodiments, provided herein is a platform for self-curated single source of truth about the contact or profile of an individual having an analytics system configured for performing an analytic operation to produce an analytic measure and having a system for performing "token" or other more unique ways to identify me. In embodiments, provided herein is a platform for self-curated single source of truth about the contact or profile of an individual having an analytics system configured for performing an analytic operation to produce an analytic measure and having a system for performing user-controlled/sender-controlled contact or profile data object. In embodiments, provided herein is a platform for self-curated single source of truth about the contact or profile of an individual having an analytics system configured for performing an analytic operation to produce an analytic measure and having a plurality of tools for managing contacts and profiles. In embodiments, provided herein is a platform for self-curated single source of truth about the contact or profile of an individual having an analytics system configured for performing an analytic operation to produce an analytic measure and having a system configured to facilitate individual self-curation of contact information. In embodiments, provided herein is a platform for self-curated single source of truth about the contact or profile of an individual having an analytics system configured for performing an analytic operation to produce an analytic measure and having a user interface. In embodiments, provided herein is a platform for self-curated single source of truth about the contact or profile of an individual having an analytics system configured for performing an analytic operation to produce an analytic measure and having a system configured to facilitate split control of personal-level and enterprise-level contact information. In embodiments, provided herein is a platform for self-curated single source of truth about the contact or profile of an individual having an analytics system configured for performing an analytic operation to produce an analytic measure and having a system configured to facilitate user-controlled sale of contact information. In embodiments, provided herein is a platform for self-curated single source of truth about the contact or profile of an individual having an analytics system configured for performing an analytic operation to produce an analytic measure and having a system for performing validation. In embodiments, provided herein is a platform for self-curated single source of truth about the contact or profile of an individual having an analytics system configured for performing an analytic operation to produce an analytic measure and having a system for performing automated synchronization of contact information. In embodiments, provided herein is a platform for self-curated single source of truth about the contact or profile of an individual having an analytics system configured for performing an analytic operation to produce an analytic measure and having a system configured to facilitate blocking and managing of invite permissions. In embodiments, provided herein is a platform for self-curated single source of truth about the contact or profile of an individual having an analytics system configured for performing an analytic operation to produce an analytic measure and having a connection system configured to connect users via search.

Artificial Intelligence for Classification, Fraud Detection, Prediction, Optimization, Orchestration of Workflows, Etc.

In embodiments, provided herein is a platform for self-curated single source of truth about the contact or profile of an individual having an AI system. In embodiments, provided herein is a platform for self-curated single source of truth about the contact or profile of an individual having an AI system and having a system configured to perform automated attribute augmentation from social network data. In embodiments, provided herein is a platform for self-curated single source of truth about the contact or profile of an individual having an AI system and having a system for performing automated curation of contact and/or profile information. In embodiments, provided herein is a platform for self-curated single source of truth about the contact or profile of an individual having an AI system and having an automation system. In embodiments, provided herein is a platform for self-curated single source of truth about the contact or profile of an individual having an AI system and having a system for performing consensus techniques and algorithms. In embodiments, provided herein is a platform for self-curated single source of truth about the contact or profile of an individual having an AI system and having a system configured to facilitate manual contact attribute conflict resolution. In embodiments, provided herein is a platform for self-curated single source of truth about the contact or profile of an individual having an AI system and having a system for performing curation of data and analytics and profiles on people. In embodiments, provided herein is a platform for self-curated single source of truth about the contact or profile of an individual having an AI system and having a deduplication system. In embodiments, provided herein is a platform for self-curated single source of truth about the contact or profile of an individual having an AI system and having a knowledge base system. In embodiments, provided herein is a platform for self-curated single source of truth about the contact or profile of an individual having an AI system and having a machine learning/artificial intelligence system configured for classification. In embodiments, provided herein is a platform for self-curated single source of truth about the contact or profile of an individual having an AI system and having a machine learning/artificial intelligence system configured for configuration and/or control. In embodiments, provided herein is a platform for self-curated single source of truth about the contact or profile of an individual having an AI system and having a machine learning/artificial intelligence system configured to provide decision support. In embodiments, provided herein is a platform for self-curated single source of truth about the contact or profile of an individual having an AI system and having a machine learning/artificial intelligence system configured for detection. In embodiments, provided herein is a platform for self-curated single source of truth about the contact or profile of an individual having an AI system and having a machine learning/artificial intelligence system configured to perform an optimization. In embodiments, provided herein is a platform for self-curated single source of truth about the contact or profile of an individual having an AI system and having a machine learning/artificial intelligence system configured to generate a prediction. In embodiments, provided herein is a platform for self-curated single source of truth about the contact or profile of an individual having an AI system and having a matching system. In embodiments, provided herein is a platform for self-curated single source of truth about the contact or profile of an individual having an AI system and having a system for resolving differences. In embodiments, provided herein is a platform for self-curated single source of truth about the contact or profile of an individual having an AI system and having a system for managing jurisdiction-based privacy domains. In embodiments, provided herein is a platform for self-curated single source of truth about the contact or profile of an individual having an AI system and having a similarity and/or clustering system. In embodiments, provided herein is a platform for self-curated single source of truth about the contact or profile of an individual having an AI system and having a plurality of models and structures for contact data. In embodiments, provided herein is a platform for self-curated single source of truth about the contact or profile of an individual having an AI system and having an e-commerce login/checkout ID control system. In embodiments, provided herein is a platform for self-curated single source of truth about the contact or profile of an individual having an AI system and having a host interface system. In embodiments, provided herein is a platform for self-curated single source of truth about the contact or profile of an individual having an AI system and having an incentives system configured to provide incentives for encouraging adoption and/or expansion. In embodiments, provided herein is a platform for self-curated single source of truth about the contact or profile of an individual having an AI system and having a license management system. In embodiments, provided herein is a platform for self-curated single source of truth about the contact or profile of an individual having an AI system and having a calendar system configured to organize calendars and tasks of users by identity and relevant network. In embodiments, provided herein is a platform for self-curated single source of truth about the contact or profile of an individual having an AI system and having a policy violation management system. In embodiments, provided herein is a platform for self-curated single source of truth about the contact or profile of an individual having an AI system and having a system for facilitating granular self-curation of identity via multiple identities and profiles. In embodiments, provided herein is a platform for self-curated single source of truth about the contact or profile of an individual having an AI system and having a location factors system. In embodiments, provided herein is a platform for self-curated single source of truth about the contact or profile of an individual having an AI system and having a system for performing outbound versus inbound contact management. In embodiments, provided herein is a platform for self-curated single source of truth about the contact or profile of an individual having an AI system and having a QR code system. In embodiments, provided herein is a platform for self-curated single source of truth about the contact or profile of an individual having an AI system and having a system configured to facilitate owner-controlled utilization of self-curated contact information including permission setting by use case. In embodiments, provided herein is a platform for self-curated single source of truth about the contact or profile of an individual having an AI system and having a system for performing wallets and crypto/blockchain infrastructure. In embodiments, provided herein is a platform for self-curated single source of truth about the contact or profile of an individual having an AI system and having a system for performing persistent, self-curated contact and profile information of a user. In embodiments, provided herein is a platform for self-curated single source of truth about the contact or profile of an individual having an AI system and having a system configured to score and grade quality of contact information. In embodiments, provided herein is a platform for self-curated single source of truth about the contact or profile of an individual having an AI system and having a system for integrating with self-curated single source of truth about the contact or profile of an individual system. In embodiments, provided herein is a platform for self-curated single source of truth about the contact or profile of an individual having an AI system and having a connection suggestion system configured to perform scoring of backgrounds and identifiers. In embodiments, provided herein is a platform for self-curated single source of truth about the contact or profile of an individual having an AI system and having a search function system. In embodiments, provided herein is a platform for self-curated single source of truth about the contact or profile of an individual having an AI system and having an identity management and digital identity ownership system. In embodiments, provided herein is a platform for self-curated single source of truth about the contact or profile of an individual having an AI system and having a systems integration system. In embodiments, provided herein is a platform for self-curated single source of truth about the contact or profile of an individual having an AI system and having a system for performing "token" or other more unique ways to identify me. In embodiments, provided herein is a platform for self-curated single source of truth about the contact or profile of an individual having an AI system and having a system for performing user-controlled/sender-controlled contact or profile data object. In embodiments, provided herein is a platform for self-curated single source of truth about the contact or profile of an individual having an AI system and having a plurality of tools for managing contacts and profiles. In embodiments, provided herein is a platform for self-curated single source of truth about the contact or profile of an individual having an AI system and having a system configured to facilitate individual self-curation of contact information. In embodiments, provided herein is a platform for self-curated single source of truth about the contact or profile of an individual having an AI system and having a user interface. In embodiments, provided herein is a platform for self-curated single source of truth about the contact or profile of an individual having an AI system and having a system configured to facilitate split control of personal-level and enterprise-level contact information. In embodiments, provided herein is a platform for self-curated single source of truth about the contact or profile of an individual having an AI system and having a system configured to facilitate user-controlled sale of contact information. In embodiments, provided herein is a platform for self-curated single source of truth about the contact or profile of an individual having an AI system and having a system for performing validation. In embodiments, provided herein is a platform for self-curated single source of truth about the contact or profile of an individual having an AI system and having a system for performing automated synchronization of contact information. In embodiments, provided herein is a platform for self-curated single source of truth about the contact or profile of an individual having an AI system and having a system configured to facilitate blocking and managing of invite permissions. In embodiments, provided herein is a platform for self-curated single source of truth about the contact or profile of an individual having an AI system and having a connection system configured to connect users via search.

Automated Attribute Augmentation from Social Network Data

In embodiments, provided herein is a platform for self-curated single source of truth about the contact or profile of an individual having a system configured to perform automated attribute augmentation from social network data. In embodiments, provided herein is a platform for self-curated single source of truth about the contact or profile of an individual having a system configured to perform automated attribute augmentation from social network data and having a system for performing automated curation of contact and/or profile information. In embodiments, provided herein is a platform for self-curated single source of truth about the contact or profile of an individual having a system configured to perform automated attribute augmentation from social network data and having an automation system. In embodiments, provided herein is a platform for self-curated single source of truth about the contact or profile of an individual having a system configured to perform automated attribute augmentation from social network data and having a system for performing consensus techniques and algorithms. In embodiments, provided herein is a platform for self-curated single source of truth about the contact or profile of an individual having a system configured to perform automated attribute augmentation from social network data and having a system configured to facilitate manual contact attribute conflict resolution. In embodiments, provided herein is a platform for self-curated single source of truth about the contact or profile of an individual having a system configured to perform automated attribute augmentation from social network data and having a system for performing curation of data and analytics and profiles on people. In embodiments, provided herein is a platform for self-curated single source of truth about the contact or profile of an individual having a system configured to perform automated attribute augmentation from social network data and having a deduplication system. In embodiments, provided herein is a platform for self-curated single source of truth about the contact or profile of an individual having a system configured to perform automated attribute augmentation from social network data and having a knowledge base system. In embodiments, provided herein is a platform for self-curated single source of truth about the contact or profile of an individual having a system configured to perform automated attribute augmentation from social network data and having a machine learning/artificial intelligence system configured for classification. In embodiments, provided herein is a platform for self-curated single source of truth about the contact or profile of an individual having a system configured to perform automated attribute augmentation from social network data and having a machine learning/artificial intelligence system configured for configuration and/or control. In embodiments, provided herein is a platform for self-curated single source of truth about the contact or profile of an individual having a system configured to perform automated attribute augmentation from social network data and having a machine learning/artificial intelligence system configured to provide decision support. In embodiments, provided herein is a platform for self-curated single source of truth about the contact or profile of an individual having a system configured to perform automated attribute augmentation from social network data and having a machine learning/artificial intelligence system configured for detection. In embodiments, provided herein is a platform for self-curated single source of truth about the contact or profile of an individual having a system configured to perform automated attribute augmentation from social network data and having a machine learning/artificial intelligence system configured to perform an optimization. In embodiments, provided herein is a platform for self-curated single source of truth about the contact or profile of an individual having a system configured to perform automated attribute augmentation from social network data and having a machine learning/artificial intelligence system configured to generate a prediction. In embodiments, provided herein is a platform for self-curated single source of truth about the contact or profile of an individual having a system configured to perform automated attribute augmentation from social network data and having a matching system. In embodiments, provided herein is a platform for self-curated single source of truth about the contact or profile of an individual having a system configured to perform automated attribute augmentation from social network data and having a system for resolving differences. In embodiments, provided herein is a platform for self-curated single source of truth about the contact or profile of an individual having a system configured to perform automated attribute augmentation from social network data and having a system for managing jurisdiction-based privacy domains. In embodiments, provided herein is a platform for self-curated single source of truth about the contact or profile of an individual having a system configured to perform automated attribute augmentation from social network data and having a similarity and/or clustering system. In embodiments, provided herein is a platform for self-curated single source of truth about the contact or profile of an individual having a system configured to perform automated attribute augmentation from social network data and having a plurality of models and structures for contact data. In embodiments, provided herein is a platform for self-curated single source of truth about the contact or profile of an individual having a system configured to perform automated attribute augmentation from social network data and having an e-commerce login/checkout ID control system. In embodiments, provided herein is a platform for self-curated single source of truth about the contact or profile of an individual having a system configured to perform automated attribute augmentation from social network data and having a host interface system. In embodiments, provided herein is a platform for self-curated single source of truth about the contact or profile of an individual having a system configured to perform automated attribute augmentation from social network data and having an incentives system configured to provide incentives for encouraging adoption and/or expansion. In embodiments, provided herein is a platform for self-curated single source of truth about the contact or profile of an individual having a system configured to perform automated attribute augmentation from social network data and having a license management system. In embodiments, provided herein is a platform for self-curated single source of truth about the contact or profile of an individual having a system configured to perform automated attribute augmentation from social network data and having a calendar system configured to organize calendars and tasks of users by identity and relevant network. In embodiments, provided herein is a platform for self-curated single source of truth about the contact or profile of an individual having a system configured to perform automated attribute augmentation from social network data and having a policy violation management system. In embodiments, provided herein is a platform for self-curated single source of truth about the contact or profile of an individual having a system configured to perform automated attribute augmentation from social network data and having a system for facilitating granular self-curation of identity via multiple identities and profiles. In embodiments, provided herein is a platform for self-curated single source of truth about the contact or profile of an individual having a system configured to perform automated attribute augmentation from social network data and having a location factors system. In embodiments, provided herein is a platform for self-curated single source of truth about the contact or profile of an individual having a system configured to perform automated attribute augmentation from social network data and having a system for performing outbound versus inbound contact management. In embodiments, provided herein is a platform for self-curated single source of truth about the contact or profile of an individual having a system configured to perform automated attribute augmentation from social network data and having a QR code system. In embodiments, provided herein is a platform for self-curated single source of truth about the contact or profile of an individual having a system configured to perform automated attribute augmentation from social network data and having a system configured to facilitate owner-controlled utilization of self-curated contact information including permission setting by use case. In embodiments, provided herein is a platform for self-curated single source of truth about the contact or profile of an individual having a system configured to perform automated attribute augmentation from social network data and having a system for performing wallets and crypto/blockchain infrastructure. In embodiments, provided herein is a platform for self-curated single source of truth about the contact or profile of an individual having a system configured to perform automated attribute augmentation from social network data and having a system for performing persistent, self-curated contact and profile information of a user. In embodiments, provided herein is a platform for self-curated single source of truth about the contact or profile of an individual having a system configured to perform automated attribute augmentation from social network data and having a system configured to score and grade quality of contact information. In embodiments, provided herein is a platform for self-curated single source of truth about the contact or profile of an individual having a system configured to perform automated attribute augmentation from social network data and having a system for integrating with self-curated single source of truth about the contact or profile of an individual system. In embodiments, provided herein is a platform for self-curated single source of truth about the contact or profile of an individual having a system configured to perform automated attribute augmentation from social network data and having a connection suggestion system configured to perform scoring of backgrounds and identifiers. In embodiments, provided herein is a platform for self-curated single source of truth about the contact or profile of an individual having a system configured to perform automated attribute augmentation from social network data and having a search function system. In embodiments, provided herein is a platform for self-curated single source of truth about the contact or profile of an individual having a system configured to perform automated attribute augmentation from social network data and having an identity management and digital identity ownership system. In embodiments, provided herein is a platform for self-curated single source of truth about the contact or profile of an individual having a system configured to perform automated attribute augmentation from social network data and having a systems integration system. In embodiments, provided herein is a platform for self-curated single source of truth about the contact or profile of an individual having a system configured to perform automated attribute augmentation from social network data and having a system for performing "token" or other more unique ways to identify me. In embodiments, provided herein is a platform for self-curated single source of truth about the contact or profile of an individual having a system configured to perform automated attribute augmentation from social network data and having a system for performing user-controlled/sender-controlled contact or profile data object. In embodiments, provided herein is a platform for self-curated single source of truth about the contact or profile of an individual having a system configured to perform automated attribute augmentation from social network data and having a plurality of tools for managing contacts and profiles. In embodiments, provided herein is a platform for self-curated single source of truth about the contact or profile of an individual having a system configured to perform automated attribute augmentation from social network data and having a system configured to facilitate individual self-curation of contact information. In embodiments, provided herein is a platform for self-curated single source of truth about the contact or profile of an individual having a system configured to perform automated attribute augmentation from social network data and having a user interface. In embodiments, provided herein is a platform for self-curated single source of truth about the contact or profile of an individual having a system configured to perform automated attribute augmentation from social network data and having a system configured to facilitate split control of personal-level and enterprise-level contact information. In embodiments, provided herein is a platform for self-curated single source of truth about the contact or profile of an individual having a system configured to perform automated attribute augmentation from social network data and having a system configured to facilitate user-controlled sale of contact information. In embodiments, provided herein is a platform for self-curated single source of truth about the contact or profile of an individual having a system configured to perform automated attribute augmentation from social network data and having a system for performing validation. In embodiments, provided herein is a platform for self-curated single source of truth about the contact or profile of an individual having a system configured to perform automated attribute augmentation from social network data and having a system for performing automated synchronization of contact information. In embodiments, provided herein is a platform for self-curated single source of truth about the contact or profile of an individual having a system configured to perform automated attribute augmentation from social network data and having a system configured to facilitate blocking and managing of invite permissions. In embodiments, provided herein is a platform for self-curated single source of truth about the contact or profile of an individual having a system configured to perform automated attribute augmentation from social network data and having a connection system configured to connect users via search.

Automated Curation of Contact and/or Profile Information

In embodiments, provided herein is a platform for self-curated single source of truth about the contact or profile of an individual having a system for performing automated curation of contact and/or profile information. In embodiments, provided herein is a platform for self-curated single source of truth about the contact or profile of an individual having a system for performing automated curation of contact and/or profile information and having an automation system. In embodiments, provided herein is a platform for self-curated single source of truth about the contact or profile of an individual having a system for performing automated curation of contact and/or profile information and having a system for performing consensus techniques and algorithms. In embodiments, provided herein is a platform for self-curated single source of truth about the contact or profile of an individual having a system for performing automated curation of contact and/or profile information and having a system configured to facilitate manual contact attribute conflict resolution. In embodiments, provided herein is a platform for self-curated single source of truth about the contact or profile of an individual having a system for performing automated curation of contact and/or profile information and having a system for performing curation of data and analytics and profiles on people. In embodiments, provided herein is a platform for self-curated single source of truth about the contact or profile of an individual having a system for performing automated curation of contact and/or profile information and having a deduplication system. In embodiments, provided herein is a platform for self-curated single source of truth about the contact or profile of an individual having a system for performing automated curation of contact and/or profile information and having a knowledge base system. In embodiments, provided herein is a platform for self-curated single source of truth about the contact or profile of an individual having a system for performing automated curation of contact and/or profile information and having a machine learning/artificial intelligence system configured for classification. In embodiments, provided herein is a platform for self-curated single source of truth about the contact or profile of an individual having a system for performing automated curation of contact and/or profile information and having a machine learning/artificial intelligence system configured for configuration and/or control. In embodiments, provided herein is a platform for self-curated single source of truth about the contact or profile of an individual having a system for performing automated curation of contact and/or profile information and having a machine learning/artificial intelligence system configured to provide decision support. In embodiments, provided herein is a platform for self-curated single source of truth about the contact or profile of an individual having a system for performing automated curation of contact and/or profile information and having a machine learning/artificial intelligence system configured for detection. In embodiments, provided herein is a platform for self-curated single source of truth about the contact or profile of an individual having a system for performing automated curation of contact and/or profile information and having a machine learning/artificial intelligence system configured to perform an optimization. In embodiments, provided herein is a platform for self-curated single source of truth about the contact or profile of an individual having a system for performing automated curation of contact and/or profile information and having a machine learning/artificial intelligence system configured to generate a prediction. In embodiments, provided herein is a platform for self-curated single source of truth about the contact or profile of an individual having a system for performing automated curation of contact and/or profile information and having a matching system. In embodiments, provided herein is a platform for self-curated single source of truth about the contact or profile of an individual having a system for performing automated curation of contact and/or profile information and having a system for resolving differences. In embodiments, provided herein is a platform for self-curated single source of truth about the contact or profile of an individual having a system for performing automated curation of contact and/or profile information and having a system for managing jurisdiction-based privacy domains. In embodiments, provided herein is a platform for self-curated single source of truth about the contact or profile of an individual having a system for performing automated curation of contact and/or profile information and having a similarity and/or clustering system. In embodiments, provided herein is a platform for self-curated single source of truth about the contact or profile of an individual having a system for performing automated curation of contact and/or profile information and having a plurality of models and structures for contact data. In embodiments, provided herein is a platform for self-curated single source of truth about the contact or profile of an individual having a system for performing automated curation of contact and/or profile information and having an e-commerce login/checkout ID control system. In embodiments, provided herein is a platform for self-curated single source of truth about the contact or profile of an individual having a system for performing automated curation of contact and/or profile information and having a host interface system. In embodiments, provided herein is a platform for self-curated single source of truth about the contact or profile of an individual having a system for performing automated curation of contact and/or profile information and having an incentives system configured to provide incentives for encouraging adoption and/or expansion. In embodiments, provided herein is a platform for self-curated single source of truth about the contact or profile of an individual having a system for performing automated curation of contact and/or profile information and having a license management system. In embodiments, provided herein is a platform for self-curated single source of truth about the contact or profile of an individual having a system for performing automated curation of contact and/or profile information and having a calendar system configured to organize calendars and tasks of users by identity and relevant network. In embodiments, provided herein is a platform for self-curated single source of truth about the contact or profile of an individual having a system for performing automated curation of contact and/or profile information and having a policy violation management system. In embodiments, provided herein is a platform for self-curated single source of truth about the contact or profile of an individual having a system for performing automated curation of contact and/or profile information and having a system for facilitating granular self-curation of identity via multiple identities and profiles. In embodiments, provided herein is a platform for self-curated single source of truth about the contact or profile of an individual having a system for performing automated curation of contact and/or profile information and having a location factors system. In embodiments, provided herein is a platform for self-curated single source of truth about the contact or profile of an individual having a system for performing automated curation of contact and/or profile information and having a system for performing outbound versus inbound contact management. In embodiments, provided herein is a platform for self-curated single source of truth about the contact or profile of an individual having a system for performing automated curation of contact and/or profile information and having a QR code system. In embodiments, provided herein is a platform for self-curated single source of truth about the contact or profile of an individual having a system for performing automated curation of contact and/or profile information and having a system configured to facilitate owner-controlled utilization of self-curated contact information including permission setting by use case. In embodiments, provided herein is a platform for self-curated single source of truth about the contact or profile of an individual having a system for performing automated curation of contact and/or profile information and having a system for performing wallets and crypto/blockchain infrastructure. In embodiments, provided herein is a platform for self-curated single source of truth about the contact or profile of an individual having a system for performing automated curation of contact and/or profile information and having a system for performing persistent, self-curated contact and profile information of a user. In embodiments, provided herein is a platform for self-curated single source of truth about the contact or profile of an individual having a system for performing automated curation of contact and/or profile information and having a system configured to score and grade quality of contact information. In embodiments, provided herein is a platform for self-curated single source of truth about the contact or profile of an individual having a system for performing automated curation of contact and/or profile information and having a system for integrating with self-curated single source of truth about the contact or profile of an individual system. In embodiments, provided herein is a platform for self-curated single source of truth about the contact or profile of an individual having a system for performing automated curation of contact and/or profile information and having a connection suggestion system configured to perform scoring of backgrounds and identifiers. In embodiments, provided herein is a platform for self-curated single source of truth about the contact or profile of an individual having a system for performing automated curation of contact and/or profile information and having a search function system. In embodiments, provided herein is a platform for self-curated single source of truth about the contact or profile of an individual having a system for performing automated curation of contact and/or profile information and having an identity management and digital identity ownership system. In embodiments, provided herein is a platform for self-curated single source of truth about the contact or profile of an individual having a system for performing automated curation of contact and/or profile information and having a systems integration system. In embodiments, provided herein is a platform for self-curated single source of truth about the contact or profile of an individual having a system for performing automated curation of contact and/or profile information and having a system for performing "token" or other more unique ways to identify me. In embodiments, provided herein is a platform for self-curated single source of truth about the contact or profile of an individual having a system for performing automated curation of contact and/or profile information and having a system for performing user-controlled/sender-controlled contact or profile data object. In embodiments, provided herein is a platform for self-curated single source of truth about the contact or profile of an individual having a system for performing automated curation of contact and/or profile information and having a plurality of tools for managing contacts and profiles. In embodiments, provided herein is a platform for self-curated single source of truth about the contact or profile of an individual having a system for performing automated curation of contact and/or profile information and having a system configured to facilitate individual self-curation of contact information. In embodiments, provided herein is a platform for self-curated single source of truth about the contact or profile of an individual having a system for performing automated curation of contact and/or profile information and having a user interface. In embodiments, provided herein is a platform for self-curated single source of truth about the contact or profile of an individual having a system for performing automated curation of contact and/or profile information and having a system configured to facilitate split control of personal-level and enterprise-level contact information. In embodiments, provided herein is a platform for self-curated single source of truth about the contact or profile of an individual having a system for performing automated curation of contact and/or profile information and having a system configured to facilitate user-controlled sale of contact information. In embodiments, provided herein is a platform for self-curated single source of truth about the contact or profile of an individual having a system for performing automated curation of contact and/or profile information and having a system for performing validation. In embodiments, provided herein is a platform for self-curated single source of truth about the contact or profile of an individual having a system for performing automated curation of contact and/or profile information and having a system for performing automated synchronization of contact information. In embodiments, provided herein is a platform for self-curated single source of truth about the contact or profile of an individual having a system for performing automated curation of contact and/or profile information and having a system configured to facilitate blocking and managing of invite permissions. In embodiments, provided herein is a platform for self-curated single source of truth about the contact or profile of an individual having a system for performing automated curation of contact and/or profile information and having a connection system configured to connect users via search.

Automation for Data Collection, Cleansing, Deduplication, ETL, Etc.

In embodiments, provided herein is a platform for self-curated single source of truth about the contact or profile of an individual having an automation system. In embodiments, provided herein is a platform for self-curated single source of truth about the contact or profile of an individual having an automation system and having a system for performing consensus techniques and algorithms. In embodiments, provided herein is a platform for self-curated single source of truth about the contact or profile of an individual having an automation system and having a system configured to facilitate manual contact attribute conflict resolution. In embodiments, provided herein is a platform for self-curated single source of truth about the contact or profile of an individual having an automation system and having a system for performing curation of data and analytics and profiles on people. In embodiments, provided herein is a platform for self-curated single source of truth about the contact or profile of an individual having an automation system and having a deduplication system. In embodiments, provided herein is a platform for self-curated single source of truth about the contact or profile of an individual having an automation system and having a knowledge base system. In embodiments, provided herein is a platform for self-curated single source of truth about the contact or profile of an individual having an automation system and having a machine learning/artificial intelligence system configured for classification. In embodiments, provided herein is a platform for self-curated single source of truth about the contact or profile of an individual having an automation system and having a machine learning/artificial intelligence system configured for configuration and/or control. In embodiments, provided herein is a platform for self-curated single source of truth about the contact or profile of an individual having an automation system and having a machine learning/artificial intelligence system configured to provide decision support. In embodiments, provided herein is a platform for self-curated single source of truth about the contact or profile of an individual having an automation system and having a machine learning/artificial intelligence system configured for detection. In embodiments, provided herein is a platform for self-curated single source of truth about the contact or profile of an individual having an automation system and having a machine learning/artificial intelligence system configured to perform an optimization. In embodiments, provided herein is a platform for self-curated single source of truth about the contact or profile of an individual having an automation system and having a machine learning/artificial intelligence system configured to generate a prediction. In embodiments, provided herein is a platform for self-curated single source of truth about the contact or profile of an individual having an automation system and having a matching system. In embodiments, provided herein is a platform for self-curated single source of truth about the contact or profile of an individual having an automation system and having a system for resolving differences. In embodiments, provided herein is a platform for self-curated single source of truth about the contact or profile of an individual having an automation system and having a system for managing jurisdiction-based privacy domains. In embodiments, provided herein is a platform for self-curated single source of truth about the contact or profile of an individual having an automation system and having a similarity and/or clustering system. In embodiments, provided herein is a platform for self-curated single source of truth about the contact or profile of an individual having an automation system and having a plurality of models and structures for contact data. In embodiments, provided herein is a platform for self-curated single source of truth about the contact or profile of an individual having an automation system and having an e-commerce login/checkout ID control system. In embodiments, provided herein is a platform for self-curated single source of truth about the contact or profile of an individual having an automation system and having a host interface system. In embodiments, provided herein is a platform for self-curated single source of truth about the contact or profile of an individual having an automation system and having an incentives system configured to provide incentives for encouraging adoption and/or expansion. In embodiments, provided herein is a platform for self-curated single source of truth about the contact or profile of an individual having an automation system and having a license management system. In embodiments, provided herein is a platform for self-curated single source of truth about the contact or profile of an individual having an automation system and having a calendar system configured to organize calendars and tasks of users by identity and relevant network. In embodiments, provided herein is a platform for self-curated single source of truth about the contact or profile of an individual having an automation system and having a policy violation management system. In embodiments, provided herein is a platform for self-curated single source of truth about the contact or profile of an individual having an automation system and having a system for facilitating granular self-curation of identity via multiple identities and profiles. In embodiments, provided herein is a platform for self-curated single source of truth about the contact or profile of an individual having an automation system and having a location factors system. In embodiments, provided herein is a platform for self-curated single source of truth about the contact or profile of an individual having an automation system and having a system for performing outbound versus inbound contact management. In embodiments, provided herein is a platform for self-curated single source of truth about the contact or profile of an individual having an automation system and having a QR code system. In embodiments, provided herein is a platform for self-curated single source of truth about the contact or profile of an individual having an automation system and having a system configured to facilitate owner-controlled utilization of self-curated contact information including permission setting by use case. In embodiments, provided herein is a platform for self-curated single source of truth about the contact or profile of an individual having an automation system and having a system for performing wallets and crypto/blockchain infrastructure. In embodiments, provided herein is a platform for self-curated single source of truth about the contact or profile of an individual having an automation system and having a system for performing persistent, self-curated contact and profile information of a user. In embodiments, provided herein is a platform for self-curated single source of truth about the contact or profile of an individual having an automation system and having a system configured to score and grade quality of contact information. In embodiments, provided herein is a platform for self-curated single source of truth about the contact or profile of an individual having an automation system and having a system for integrating with self-curated single source of truth about the contact or profile of an individual system. In embodiments, provided herein is a platform for self-curated single source of truth about the contact or profile of an individual having an automation system and having a connection suggestion system configured to perform scoring of backgrounds and identifiers. In embodiments, provided herein is a platform for self-curated single source of truth about the contact or profile of an individual having an automation system and having a search function system. In embodiments, provided herein is a platform for self-curated single source of truth about the contact or profile of an individual having an automation system and having an identity management and digital identity ownership system. In embodiments, provided herein is a platform for self-curated single source of truth about the contact or profile of an individual having an automation system and having a systems integration system. In embodiments, provided herein is a platform for self-curated single source of truth about the contact or profile of an individual having an automation system and having a system for performing "token" or other more unique ways to identify me. In embodiments, provided herein is a platform for self-curated single source of truth about the contact or profile of an individual having an automation system and having a system for performing user-controlled/sender-controlled contact or profile data object. In embodiments, provided herein is a platform for self-curated single source of truth about the contact or profile of an individual having an automation system and having a plurality of tools for managing contacts and profiles. In embodiments, provided herein is a platform for self-curated single source of truth about the contact or profile of an individual having an automation system and having a system configured to facilitate individual self-curation of contact information. In embodiments, provided herein is a platform for self-curated single source of truth about the contact or profile of an individual having an automation system and having a user interface. In embodiments, provided herein is a platform for self-curated single source of truth about the contact or profile of an individual having an automation system and having a system configured to facilitate split control of personal-level and enterprise-level contact information. In embodiments, provided herein is a platform for self-curated single source of truth about the contact or profile of an individual having an automation system and having a system configured to facilitate user-controlled sale of contact information. In embodiments, provided herein is a platform for self-curated single source of truth about the contact or profile of an individual having an automation system and having a system for performing validation. In embodiments, provided herein is a platform for self-curated single source of truth about the contact or profile of an individual having an automation system and having a system for performing automated synchronization of contact information. In embodiments, provided herein is a platform for self-curated single source of truth about the contact or profile of an individual having an automation system and having a system configured to facilitate blocking and managing of invite permissions. In embodiments, provided herein is a platform for self-curated single source of truth about the contact or profile of an individual having an automation system and having a connection system configured to connect users via search.

Consensus Techniques and Algorithms Around "Who You Are" (e.g.: Between Merchant/Vendor)—Pull Together Everyone Who is Trying to Identify Me into "I Identify Me" Via an Identification Such as a LyncSync ID In embodiments, provided herein is a platform for self-curated single source of truth about the contact or profile of an individual having a system for performing consensus techniques and algorithms. In embodiments, provided herein is a platform for self-curated single source of truth about the contact or profile of an individual having a system for performing consensus techniques and algorithms and having a system configured to facilitate manual contact attribute conflict resolution. In embodiments, provided herein is a platform for self-curated single source of truth about the contact or profile of an individual having a system for performing consensus techniques and algorithms and having a system for performing curation of data and analytics and profiles on people. In embodiments, provided herein is a platform for self-curated single source of truth about the contact or profile of an individual having a system for performing consensus techniques and algorithms and having a deduplication system. In embodiments, provided herein is a platform for self-curated single source of truth about the contact or profile of an individual having a system for performing consensus techniques and algorithms and having a knowledge base system. In embodiments, provided herein is a platform for self-curated single source of truth about the contact or profile of an individual having a system for performing consensus techniques and algorithms and having a machine learning/artificial intelligence system configured for classification. In embodiments, provided herein is a platform for self-curated single source of truth about the contact or profile of an individual having a system for performing consensus techniques and algorithms and having a machine learning/artificial intelligence system configured for configuration and/or control. In embodiments, provided herein is a platform for self-curated single source of truth about the contact or profile of an individual having a system for performing consensus techniques and algorithms and having a machine learning/artificial intelligence system configured to provide decision support. In embodiments, provided herein is a platform for self-curated single source of truth about the contact or profile of an individual having a system for performing consensus techniques and algorithms and having a machine learning/artificial intelligence system configured for detection. In embodiments, provided herein is a platform for self-curated single source of truth about the contact or profile of an individual having a system for performing consensus techniques and algorithms and having a machine learning/artificial intelligence system configured to perform an optimization. In embodiments, provided herein is a platform for self-curated single source of truth about the contact or profile of an individual having a system for performing consensus techniques and algorithms and having a machine learning/artificial intelligence system configured to generate a prediction. In embodiments, provided herein is a platform for self-curated single source of truth about the contact or profile of an individual having a system for performing consensus techniques and algorithms and having a matching system. In embodiments, provided herein is a platform for self-curated single source of truth about the contact or profile of an individual having a system for performing consensus techniques and algorithms and having a system for resolving differences. In embodiments, provided herein is a platform for self-curated single source of truth about the contact or profile of an individual having a system for performing consensus techniques and algorithms and having a system for managing jurisdiction-based privacy domains. In embodiments, provided herein is a platform for self-curated single source of truth about the contact or profile of an individual having a system for performing consensus techniques and algorithms and having a similarity and/or clustering system. In embodiments, provided herein is a platform for self-curated single source of truth about the contact or profile of an individual having a system for performing consensus techniques and algorithms and having a plurality of models and structures for contact data. In embodiments, provided herein is a platform for self-curated single source of truth about the contact or profile of an individual having a system for performing consensus techniques and algorithms and having an e-commerce login/checkout ID control system. In embodiments, provided herein is a platform for self-curated single source of truth about the contact or profile of an individual having a system for performing consensus techniques and algorithms and having a host interface system. In embodiments, provided herein is a platform for self-curated single source of truth about the contact or profile of an individual having a system for performing consensus techniques and algorithms and having an incentives system configured to provide incentives for encouraging adoption and/or expansion. In embodiments, provided herein is a platform for self-curated single source of truth about the contact or profile of an individual having a system for performing consensus techniques and algorithms and having a license management system. In embodiments, provided herein is a platform for self-curated single source of truth about the contact or profile of an individual having a system for performing consensus techniques and algorithms and having a calendar system configured to organize calendars and tasks of users by identity and relevant network. In embodiments, provided herein is a platform for self-curated single source of truth about the contact or profile of an individual having a system for performing consensus techniques and algorithms and having a policy violation management system. In embodiments, provided herein is a platform for self-curated single source of truth about the contact or profile of an individual having a system for performing consensus techniques and algorithms and having a system for facilitating granular self-curation of identity via multiple identities and profiles. In embodiments, provided herein is a platform for self-curated single source of truth about the contact or profile of an individual having a system for performing consensus techniques and algorithms and having a location factors system. In embodiments, provided herein is a platform for self-curated single source of truth about the contact or profile of an individual having a system for performing consensus techniques and algorithms and having a system for performing outbound versus inbound contact management. In embodiments, provided herein is a platform for self-curated single source of truth about the contact or profile of an individual having a system for performing consensus techniques and algorithms and having a QR code system. In embodiments, provided herein is a platform for self-curated single source of truth about the contact or profile of an individual having a system for performing consensus techniques and algorithms and having a system configured to facilitate owner-controlled utilization of self-curated contact information including permission setting by use case. In embodiments, provided herein is a platform for self-curated single source of truth about the contact or profile of an individual having a system for performing consensus techniques and algorithms and having a system for performing wallets and crypto/blockchain infrastructure. In embodiments, provided herein is a platform for self-curated single source of truth about the contact or profile of an individual having a system for performing consensus techniques and algorithms and having a system for performing persistent, self-curated contact and profile information of a user. In embodiments, provided herein is a platform for self-curated single source of truth about the contact or profile of an individual having a system for performing consensus techniques and algorithms and having a system configured to score and grade quality of contact information. In embodiments, provided herein is a platform for self-curated single source of truth about the contact or profile of an individual having a system for performing consensus techniques and algorithms and having a system for integrating with self-curated single source of truth about the contact or profile of an individual system. In embodiments, provided herein is a platform for self-curated single source of truth about the contact or profile of an individual having a system for performing consensus techniques and algorithms and having a connection suggestion system configured to perform scoring of backgrounds and identifiers. In embodiments, provided herein is a platform for self-curated single source of truth about the contact or profile of an individual having a system for performing consensus techniques and algorithms and having a search function system. In embodiments, provided herein is a platform for self-curated single source of truth about the contact or profile of an individual having a system for performing consensus techniques and algorithms and having an identity management and digital identity ownership system. In embodiments, provided herein is a platform for self-curated single source of truth about the contact or profile of an individual having a system for performing consensus techniques and algorithms and having a systems integration system. In embodiments, provided herein is a platform for self-curated single source of truth about the contact or profile of an individual having a system for performing consensus techniques and algorithms and having a system for performing "token" or other more unique ways to identify me. In embodiments, provided herein is a platform for self-curated single source of truth about the contact or profile of an individual having a system for performing consensus techniques and algorithms and having a system for performing user-controlled/sender-controlled contact or profile data object. In embodiments, provided herein is a platform for self-curated single source of truth about the contact or profile of an individual having a system for performing consensus techniques and algorithms and having a plurality of tools for managing contacts and profiles. In embodiments, provided herein is a platform for self-curated single source of truth about the contact or profile of an individual having a system for performing consensus techniques and algorithms and having a system configured to facilitate individual self-curation of contact information. In embodiments, provided herein is a platform for self-curated single source of truth about the contact or profile of an individual having a system for performing consensus techniques and algorithms and having a user interface. In embodiments, provided herein is a platform for self-curated single source of truth about the contact or profile of an individual having a system for performing consensus techniques and algorithms and having a system configured to facilitate split control of personal-level and enterprise-level contact information. In embodiments, provided herein is a platform for self-curated single source of truth about the contact or profile of an individual having a system for performing consensus techniques and algorithms and having a system configured to facilitate user-controlled sale of contact information. In embodiments, provided herein is a platform for self-curated single source of truth about the contact or profile of an individual having a system for performing consensus techniques and algorithms and having a system for performing validation. In embodiments, provided herein is a platform for self-curated single source of truth about the contact or profile of an individual having a system for performing consensus techniques and algorithms and having a system for performing automated synchronization of contact information. In embodiments, provided herein is a platform for self-curated single source of truth about the contact or profile of an individual having a system for performing consensus techniques and algorithms and having a system configured to facilitate blocking and managing of invite permissions. In embodiments, provided herein is a platform for self-curated single source of truth about the contact or profile of an individual having a system for performing consensus techniques and algorithms and having a connection system configured to connect users via search.

Manual Contact Attribute Conflict Resolution

In embodiments, provided herein is a platform for self-curated single source of truth about the contact or profile of an individual having a system configured to facilitate manual contact attribute conflict resolution. In embodiments, provided herein is a platform for self-curated single source of truth about the contact or profile of an individual having a system configured to facilitate manual contact attribute conflict resolution and having a system for performing curation of data and analytics and profiles on people. In embodiments, provided herein is a platform for self-curated single source of truth about the contact or profile of an individual having a system configured to facilitate manual contact attribute conflict resolution and having a deduplication system. In embodiments, provided herein is a platform for self-curated single source of truth about the contact or profile of an individual having a system configured to facilitate manual contact attribute conflict resolution and having a knowledge base system. In embodiments, provided herein is a platform for self-curated single source of truth about the contact or profile of an individual having a system configured to facilitate manual contact attribute conflict resolution and having a machine learning/artificial intelligence system configured for classification. In embodiments, provided herein is a platform for self-curated single source of truth about the contact or profile of an individual having a system configured to facilitate manual contact attribute conflict resolution and having a machine learning/artificial intelligence system configured for configuration and/or control. In embodiments, provided herein is a platform for self-curated single source of truth about the contact or profile of an individual having a system configured to facilitate manual contact attribute conflict resolution and having a machine learning/artificial intelligence system configured to provide decision support. In embodiments, provided herein is a platform for self-curated single source of truth about the contact or profile of an individual having a system configured to facilitate manual contact attribute conflict resolution and having a machine learning/artificial intelligence system configured for detection. In embodiments, provided herein is a platform for self-curated single source of truth about the contact or profile of an individual having a system configured to facilitate manual contact attribute conflict resolution and having a machine learning/artificial intelligence system configured to perform an optimization. In embodiments, provided herein is a platform for self-curated single source of truth about the contact or profile of an individual having a system configured to facilitate manual contact attribute conflict resolution and having a machine learning/artificial intelligence system configured to generate a prediction. In embodiments, provided herein is a platform for self-curated single source of truth about the contact or profile of an individual having a system configured to facilitate manual contact attribute conflict resolution and having a matching system. In embodiments, provided herein is a platform for self-curated single source of truth about the contact or profile of an individual having a system configured to facilitate manual contact attribute conflict resolution and having a system for resolving differences. In embodiments, provided herein is a platform for self-curated single source of truth about the contact or profile of an individual having a system configured to facilitate manual contact attribute conflict resolution and having a system for managing jurisdiction-based privacy domains. In embodiments, provided herein is a platform for self-curated single source of truth about the contact or profile of an individual having a system configured to facilitate manual contact attribute conflict resolution and having a similarity and/or clustering system. In embodiments, provided herein is a platform for self-curated single source of truth about the contact or profile of an individual having a system configured to facilitate manual contact attribute conflict resolution and having a plurality of models and structures for contact data. In embodiments, provided herein is a platform for self-curated single source of truth about the contact or profile of an individual having a system configured to facilitate manual contact attribute conflict resolution and having an e-commerce login/checkout ID control system. In embodiments, provided herein is a platform for self-curated single source of truth about the contact or profile of an individual having a system configured to facilitate manual contact attribute conflict resolution and having a host interface system. In embodiments, provided herein is a platform for self-curated single source of truth about the contact or profile of an individual having a system configured to facilitate manual contact attribute conflict resolution and having an incentives system configured to provide incentives for encouraging adoption and/or expansion. In embodiments, provided herein is a platform for self-curated single source of truth about the contact or profile of an individual having a system configured to facilitate manual contact attribute conflict resolution and having a license management system. In embodiments, provided herein is a platform for self-curated single source of truth about the contact or profile of an individual having a system configured to facilitate manual contact attribute conflict resolution and having a calendar system configured to organize calendars and tasks of users by identity and relevant network. In embodiments, provided herein is a platform for self-curated single source of truth about the contact or profile of an individual having a system configured to facilitate manual contact attribute conflict resolution and having a policy violation management system. In embodiments, provided herein is a platform for self-curated single source of truth about the contact or profile of an individual having a system configured to facilitate manual contact attribute conflict resolution and having a system for facilitating granular self-curation of identity via multiple identities and profiles. In embodiments, provided herein is a platform for self-curated single source of truth about the contact or profile of an individual having a system configured to facilitate manual contact attribute conflict resolution and having a location factors system. In embodiments, provided herein is a platform for self-curated single source of truth about the contact or profile of an individual having a system configured to facilitate manual contact attribute conflict resolution and having a system for performing outbound versus inbound contact management. In embodiments, provided herein is a platform for self-curated single source of truth about the contact or profile of an individual having a system configured to facilitate manual contact attribute conflict resolution and having a QR code system. In embodiments, provided herein is a platform for self-curated single source of truth about the contact or profile of an individual having a system configured to facilitate manual contact attribute conflict resolution and having a system configured to facilitate owner-controlled utilization of self-curated contact information including permission setting by use case. In embodiments, provided herein is a platform for self-curated single source of truth about the contact or profile of an individual having a system configured to facilitate manual contact attribute conflict resolution and having a system for performing wallets and crypto/blockchain infrastructure. In embodiments, provided herein is a platform for self-curated single source of truth about the contact or profile of an individual having a system configured to facilitate manual contact attribute conflict resolution and having a system for performing persistent, self-curated contact and profile information of a user. In embodiments, provided herein is a platform for self-curated single source of truth about the contact or profile of an individual having a system configured to facilitate manual contact attribute conflict resolution and having a system configured to score and grade quality of contact information. In embodiments, provided herein is a platform for self-curated single source of truth about the contact or profile of an individual having a system configured to facilitate manual contact attribute conflict resolution and having a system for integrating with self-curated single source of truth about the contact or profile of an individual system. In embodiments, provided herein is a platform for self-curated single source of truth about the contact or profile of an individual having a system configured to facilitate manual contact attribute conflict resolution and having a connection suggestion system configured to perform scoring of backgrounds and identifiers. In embodiments, provided herein is a platform for self-curated single source of truth about the contact or profile of an individual having a system configured to facilitate manual contact attribute conflict resolution and having a search function system. In embodiments, provided herein is a platform for self-curated single source of truth about the contact or profile of an individual having a system configured to facilitate manual contact attribute conflict resolution and having an identity management and digital identity ownership system. In embodiments, provided herein is a platform for self-curated single source of truth about the contact or profile of an individual having a system configured to facilitate manual contact attribute conflict resolution and having a systems integration system. In embodiments, provided herein is a platform for self-curated single source of truth about the contact or profile of an individual having a system configured to facilitate manual contact attribute conflict resolution and having a system for performing "token" or other more unique ways to identify me. In embodiments, provided herein is a platform for self-curated single source of truth about the contact or profile of an individual having a system configured to facilitate manual contact attribute conflict resolution and having a system for performing user-controlled/sender-controlled contact or profile data object. In embodiments, provided herein is a platform for self-curated single source of truth about the contact or profile of an individual having a system configured to facilitate manual contact attribute conflict resolution and having a plurality of tools for managing contacts and profiles. In embodiments, provided herein is a platform for self-curated single source of truth about the contact or profile of an individual having a system configured to facilitate manual contact attribute conflict resolution and having a system configured to facilitate individual self-curation of contact information. In embodiments, provided herein is a platform for self-curated single source of truth about the contact or profile of an individual having a system configured to facilitate manual contact attribute conflict resolution and having a user interface. In embodiments, provided herein is a platform for self-curated single source of truth about the contact or profile of an individual having a system configured to facilitate manual contact attribute conflict resolution and having a system configured to facilitate split control of personal-level and enterprise-level contact information. In embodiments, provided herein is a platform for self-curated single source of truth about the contact or profile of an individual having a system configured to facilitate manual contact attribute conflict resolution and having a system configured to facilitate user-controlled sale of contact information. In embodiments, provided herein is a platform for self-curated single source of truth about the contact or profile of an individual having a system configured to facilitate manual contact attribute conflict resolution and having a system for performing validation. In embodiments, provided herein is a platform for self-curated single source of truth about the contact or profile of an individual having a system configured to facilitate manual contact attribute conflict resolution and having a system for performing automated synchronization of contact information. In embodiments, provided herein is a platform for self-curated single source of truth about the contact or profile of an individual having a system configured to facilitate manual contact attribute conflict resolution and having a system configured to facilitate blocking and managing of invite permissions. In embodiments, provided herein is a platform for self-curated single source of truth about the contact or profile of an individual having a system configured to facilitate manual contact attribute conflict resolution and having a connection system configured to connect users via search.

Curation of Data and Analytics and Profiles on People Based on Input being Changes Occurring in Contact Details In embodiments, provided herein is a platform for self-curated single source of truth about the contact or profile of an individual having a system for performing curation of data and analytics and profiles on people. In embodiments, provided herein is a platform for self-curated single source of truth about the contact or profile of an individual having a system for performing curation of data and analytics and profiles on people and having a deduplication system. In embodiments, provided herein is a platform for self-curated single source of truth about the contact or profile of an individual having a system for performing curation of data and analytics and profiles on people and having a knowledge base system. In embodiments, provided herein is a platform for self-curated single source of truth about the contact or profile of an individual having a system for performing curation of data and analytics and profiles on people and having a machine learning/artificial intelligence system configured for classification. In embodiments, provided herein is a platform for self-curated single source of truth about the contact or profile of an individual having a system for performing curation of data and analytics and profiles on people and having a machine learning/artificial intelligence system configured for configuration and/or control. In embodiments, provided herein is a platform for self-curated single source of truth about the contact or profile of an individual having a system for performing curation of data and analytics and profiles on people and having a machine learning/artificial intelligence system configured to provide decision support. In embodiments, provided herein is a platform for self-curated single source of truth about the contact or profile of an individual having a system for performing curation of data and analytics and profiles on people and having a machine learning/artificial intelligence system configured for detection. In embodiments, provided herein is a platform for self-curated single source of truth about the contact or profile of an individual having a system for performing curation of data and analytics and profiles on people and having a machine learning/artificial intelligence system configured to perform an optimization. In embodiments, provided herein is a platform for self-curated single source of truth about the contact or profile of an individual having a system for performing curation of data and analytics and profiles on people and having a machine learning/artificial intelligence system configured to generate a prediction. In embodiments, provided herein is a platform for self-curated single source of truth about the contact or profile of an individual having a system for performing curation of data and analytics and profiles on people and having a matching system. In embodiments, provided herein is a platform for self-curated single source of truth about the contact or profile of an individual having a system for performing curation of data and analytics and profiles on people and having a system for resolving differences. In embodiments, provided herein is a platform for self-curated single source of truth about the contact or profile of an individual having a system for performing curation of data and analytics and profiles on people and having a system for managing jurisdiction-based privacy domains. In embodiments, provided herein is a platform for self-curated single source of truth about the contact or profile of an individual having a system for performing curation of data and analytics and profiles on people and having a similarity and/or clustering system. In embodiments, provided herein is a platform for self-curated single source of truth about the contact or profile of an individual having a system for performing curation of data and analytics and profiles on people and having a plurality of models and structures for contact data. In embodiments, provided herein is a platform for self-curated single source of truth about the contact or profile of an individual having a system for performing curation of data and analytics and profiles on people and having an e-commerce login/checkout ID control system. In embodiments, provided herein is a platform for self-curated single source of truth about the contact or profile of an individual having a system for performing curation of data and analytics and profiles on people and having a host interface system. In embodiments, provided herein is a platform for self-curated single source of truth about the contact or profile of an individual having a system for performing curation of data and analytics and profiles on people and having an incentives system configured to provide incentives for encouraging adoption and/or expansion. In embodiments, provided herein is a platform for self-curated single source of truth about the contact or profile of an individual having a system for performing curation of data and analytics and profiles on people and having a license management system. In embodiments, provided herein is a platform for self-curated single source of truth about the contact or profile of an individual having a system for performing curation of data and analytics and profiles on people and having a calendar system configured to organize calendars and tasks of users by identity and relevant network. In embodiments, provided herein is a platform for self-curated single source of truth about the contact or profile of an individual having a system for performing curation of data and analytics and profiles on people and having a policy violation management system. In embodiments, provided herein is a platform for self-curated single source of truth about the contact or profile of an individual having a system for performing curation of data and analytics and profiles on people and having a system for facilitating granular self-curation of identity via multiple identities and profiles. In embodiments, provided herein is a platform for self-curated single source of truth about the contact or profile of an individual having a system for performing curation of data and analytics and profiles on people and having a location factors system. In embodiments, provided herein is a platform for self-curated single source of truth about the contact or profile of an individual having a system for performing curation of data and analytics and profiles on people and having a system for performing outbound versus inbound contact management. In embodiments, provided herein is a platform for self-curated single source of truth about the contact or profile of an individual having a system for performing curation of data and analytics and profiles on people and having a QR code system. In embodiments, provided herein is a platform for self-curated single source of truth about the contact or profile of an individual having a system for performing curation of data and analytics and profiles on people and having a system configured to facilitate owner-controlled utilization of self-curated contact information including permission setting by use case. In embodiments, provided herein is a platform for self-curated single source of truth about the contact or profile of an individual having a system for performing curation of data and analytics and profiles on people and having a system for performing wallets and crypto/blockchain infrastructure. In embodiments, provided herein is a platform for self-curated single source of truth about the contact or profile of an individual having a system for performing curation of data and analytics and profiles on people and having a system for performing persistent, self-curated contact and profile information of a user. In embodiments, provided herein is a platform for self-curated single source of truth about the contact or profile of an individual having a system for performing curation of data and analytics and profiles on people and having a system configured to score and grade quality of contact information. In embodiments, provided herein is a platform for self-curated single source of truth about the contact or profile of an individual having a system for performing curation of data and analytics and profiles on people and having a system for integrating with self-curated single source of truth about the contact or profile of an individual system. In embodiments, provided herein is a platform for self-curated single source of truth about the contact or profile of an individual having a system for performing curation of data and analytics and profiles on people and having a connection suggestion system configured to perform scoring of backgrounds and identifiers. In embodiments, provided herein is a platform for self-curated single source of truth about the contact or profile of an individual having a system for performing curation of data and analytics and profiles on people and having a search function system. In embodiments, provided herein is a platform for self-curated single source of truth about the contact or profile of an individual having a system for performing curation of data and analytics and profiles on people and having an identity management and digital identity ownership system. In embodiments, provided herein is a platform for self-curated single source of truth about the contact or profile of an individual having a system for performing curation of data and analytics and profiles on people and having a systems integration system. In embodiments, provided herein is a platform for self-curated single source of truth about the contact or profile of an individual having a system for performing curation of data and analytics and profiles on people and having a system for performing "token" or other more unique ways to identify me. In embodiments, provided herein is a platform for self-curated single source of truth about the contact or profile of an individual having a system for performing curation of data and analytics and profiles on people and having a system for performing user-controlled/sender-controlled contact or profile data object. In embodiments, provided herein is a platform for self-curated single source of truth about the contact or profile of an individual having a system for performing curation of data and analytics and profiles on people and having a plurality of tools for managing contacts and profiles. In embodiments, provided herein is a platform for self-curated single source of truth about the contact or profile of an individual having a system for performing curation of data and analytics and profiles on people and having a system configured to facilitate individual self-curation of contact information. In embodiments, provided herein is a platform for self-curated single source of truth about the contact or profile of an individual having a system for performing curation of data and analytics and profiles on people and having a user interface. In embodiments, provided herein is a platform for self-curated single source of truth about the contact or profile of an individual having a system for performing curation of data and analytics and profiles on people and having a system configured to facilitate split control of personal-level and enterprise-level contact information. In embodiments, provided herein is a platform for self-curated single source of truth about the contact or profile of an individual having a system for performing curation of data and analytics and profiles on people and having a system configured to facilitate user-controlled sale of contact information. In embodiments, provided herein is a platform for self-curated single source of truth about the contact or profile of an individual having a system for performing curation of data and analytics and profiles on people and having a system for performing validation. In embodiments, provided herein is a platform for self-curated single source of truth about the contact or profile of an individual having a system for performing curation of data and analytics and profiles on people and having a system for performing automated synchronization of contact information. In embodiments, provided herein is a platform for self-curated single source of truth about the contact or profile of an individual having a system for performing curation of data and analytics and profiles on people and having a system configured to facilitate blocking and managing of invite permissions. In embodiments, provided herein is a platform for self-curated single source of truth about the contact or profile of an individual having a system for performing curation of data and analytics and profiles on people and having a connection system configured to connect users via search.

Deduplication of Contact Data at the Recipient

In embodiments, provided herein is a platform for self-curated single source of truth about the contact or profile of an individual having a deduplication system. In embodiments, provided herein is a platform for self-curated single source of truth about the contact or profile of an individual having a deduplication system and having a knowledge base system. In embodiments, provided herein is a platform for self-curated single source of truth about the contact or profile of an individual having a deduplication system and having a machine learning/artificial intelligence system configured for classification. In embodiments, provided herein is a platform for self-curated single source of truth about the contact or profile of an individual having a deduplication system and having a machine learning/artificial intelligence system configured for configuration and/or control. In embodiments, provided herein is a platform for self-curated single source of truth about the contact or profile of an individual having a deduplication system and having a machine learning/artificial intelligence system configured to provide decision support. In embodiments, provided herein is a platform for self-curated single source of truth about the contact or profile of an individual having a deduplication system and having a machine learning/artificial intelligence system configured for detection. In embodiments, provided herein is a platform for self-curated single source of truth about the contact or profile of an individual having a deduplication system and having a machine learning/artificial intelligence system configured to perform an optimization. In embodiments, provided herein is a platform for self-curated single source of truth about the contact or profile of an individual having a deduplication system and having a machine learning/artificial intelligence system configured to generate a prediction. In embodiments, provided herein is a platform for self-curated single source of truth about the contact or profile of an individual having a deduplication system and having a matching system. In embodiments, provided herein is a platform for self-curated single source of truth about the contact or profile of an individual having a deduplication system and having a system for resolving differences. In embodiments, provided herein is a platform for self-curated single source of truth about the contact or profile of an individual having a deduplication system and having a system for managing jurisdiction-based privacy domains. In embodiments, provided herein is a platform for self-curated single source of truth about the contact or profile of an individual having a deduplication system and having a similarity and/or clustering system. In embodiments, provided herein is a platform for self-curated single source of truth about the contact or profile of an individual having a deduplication system and having a plurality of models and structures for contact data. In embodiments, provided herein is a platform for self-curated single source of truth about the contact or profile of an individual having a deduplication system and having an e-commerce login/checkout ID control system. In embodiments, provided herein is a platform for self-curated single source of truth about the contact or profile of an individual having a deduplication system and having a host interface system. In embodiments, provided herein is a platform for self-curated single source of truth about the contact or profile of an individual having a deduplication system and having an incentives system configured to provide incentives for encouraging adoption and/or expansion. In embodiments, provided herein is a platform for self-curated single source of truth about the contact or profile of an individual having a deduplication system and having a license management system. In embodiments, provided herein is a platform for self-curated single source of truth about the contact or profile of an individual having a deduplication system and having a calendar system configured to organize calendars and tasks of users by identity and relevant network. In embodiments, provided herein is a platform for self-curated single source of truth about the contact or profile of an individual having a deduplication system and having a policy violation management system. In embodiments, provided herein is a platform for self-curated single source of truth about the contact or profile of an individual having a deduplication system and having a system for facilitating granular self-curation of identity via multiple identities and profiles. In embodiments, provided herein is a platform for self-curated single source of truth about the contact or profile of an individual having a deduplication system and having a location factors system. In embodiments, provided herein is a platform for self-curated single source of truth about the contact or profile of an individual having a deduplication system and having a system for performing outbound versus inbound contact management. In embodiments, provided herein is a platform for self-curated single source of truth about the contact or profile of an individual having a deduplication system and having a QR code system. In embodiments, provided herein is a platform for self-curated single source of truth about the contact or profile of an individual having a deduplication system and having a system configured to facilitate owner-controlled utilization of self-curated contact information including permission setting by use case. In embodiments, provided herein is a platform for self-curated single source of truth about the contact or profile of an individual having a deduplication system and having a system for performing wallets and crypto/blockchain infrastructure. In embodiments, provided herein is a platform for self-curated single source of truth about the contact or profile of an individual having a deduplication system and having a system for performing persistent, self-curated contact and profile information of a user. In embodiments, provided herein is a platform for self-curated single source of truth about the contact or profile of an individual having a deduplication system and having a system configured to score and grade quality of contact information. In embodiments, provided herein is a platform for self-curated single source of truth about the contact or profile of an individual having a deduplication system and having a system for integrating with self-curated single source of truth about the contact or profile of an individual system. In embodiments, provided herein is a platform for self-curated single source of truth about the contact or profile of an individual having a deduplication system and having a connection suggestion system configured to perform scoring of backgrounds and identifiers. In embodiments, provided herein is a platform for self-curated single source of truth about the contact or profile of an individual having a deduplication system and having a search function system. In embodiments, provided herein is a platform for self-curated single source of truth about the contact or profile of an individual having a deduplication system and having an identity management and digital identity ownership system. In embodiments, provided herein is a platform for self-curated single source of truth about the contact or profile of an individual having a deduplication system and having a systems integration system. In embodiments, provided herein is a platform for self-curated single source of truth about the contact or profile of an individual having a deduplication system and having a system for performing "token" or other more unique ways to identify me. In embodiments, provided herein is a platform for self-curated single source of truth about the contact or profile of an individual having a deduplication system and having a system for performing user-controlled/sender-controlled contact or profile data object. In embodiments, provided herein is a platform for self-curated single source of truth about the contact or profile of an individual having a deduplication system and having a plurality of tools for managing contacts and profiles. In embodiments, provided herein is a platform for self-curated single source of truth about the contact or profile of an individual having a deduplication system and having a system configured to facilitate individual self-curation of contact information. In embodiments, provided herein is a platform for self-curated single source of truth about the contact or profile of an individual having a deduplication system and having a user interface. In embodiments, provided herein is a platform for self-curated single source of truth about the contact or profile of an individual having a deduplication system and having a system configured to facilitate split control of personal-level and enterprise-level contact information. In embodiments, provided herein is a platform for self-curated single source of truth about the contact or profile of an individual having a deduplication system and having a system configured to facilitate user-controlled sale of contact information. In embodiments, provided herein is a platform for self-curated single source of truth about the contact or profile of an individual having a deduplication system and having a system for performing validation. In embodiments, provided herein is a platform for self-curated single source of truth about the contact or profile of an individual having a deduplication system and having a system for performing automated synchronization of contact information. In embodiments, provided herein is a platform for self-curated single source of truth about the contact or profile of an individual having a deduplication system and having a system configured to facilitate blocking and managing of invite permissions. In embodiments, provided herein is a platform for self-curated single source of truth about the contact or profile of an individual having a deduplication system and having a connection system configured to connect users via search.

Knowledge Base

In embodiments, provided herein is a platform for self-curated single source of truth about the contact or profile of an individual having a knowledge base system. In embodiments, provided herein is a platform for self-curated single source of truth about the contact or profile of an individual having a knowledge base system and having a machine learning/artificial intelligence system configured for classification. In embodiments, provided herein is a platform for self-curated single source of truth about the contact or profile of an individual having a knowledge base system and having a machine learning/artificial intelligence system configured for configuration and/or control. In embodiments, provided herein is a platform for self-curated single source of truth about the contact or profile of an individual having a knowledge base system and having a machine learning/artificial intelligence system configured to provide decision support. In embodiments, provided herein is a platform for self-curated single source of truth about the contact or profile of an individual having a knowledge base system and having a machine learning/artificial intelligence system configured for detection. In embodiments, provided herein is a platform for self-curated single source of truth about the contact or profile of an individual having a knowledge base system and having a machine learning/artificial intelligence system configured to perform an optimization. In embodiments, provided herein is a platform for self-curated single source of truth about the contact or profile of an individual having a knowledge base system and having a machine learning/artificial intelligence system configured to generate a prediction. In embodiments, provided herein is a platform for self-curated single source of truth about the contact or profile of an individual having a knowledge base system and having a matching system. In embodiments, provided herein is a platform for self-curated single source of truth about the contact or profile of an individual having a knowledge base system and having a system for resolving differences. In embodiments, provided herein is a platform for self-curated single source of truth about the contact or profile of an individual having a knowledge base system and having a system for managing jurisdiction-based privacy domains. In embodiments, provided herein is a platform for self-curated single source of truth about the contact or profile of an individual having a knowledge base system and having a similarity and/or clustering system. In embodiments, provided herein is a platform for self-curated single source of truth about the contact or profile of an individual having a knowledge base system and having a plurality of models and structures for contact data. In embodiments, provided herein is a platform for self-curated single source of truth about the contact or profile of an individual having a knowledge base system and having an e-commerce login/checkout ID control system. In embodiments, provided herein is a platform for self-curated single source of truth about the contact or profile of an individual having a knowledge base system and having a host interface system. In embodiments, provided herein is a platform for self-curated single source of truth about the contact or profile of an individual having a knowledge base system and having an incentives system configured to provide incentives for encouraging adoption and/or expansion. In embodiments, provided herein is a platform for self-curated single source of truth about the contact or profile of an individual having a knowledge base system and having a license management system. In embodiments, provided herein is a platform for self-curated single source of truth about the contact or profile of an individual having a knowledge base system and having a calendar system configured to organize calendars and tasks of users by identity and relevant network. In embodiments, provided herein is a platform for self-curated single source of truth about the contact or profile of an individual having a knowledge base system and having a policy violation management system. In embodiments, provided herein is a platform for self-curated single source of truth about the contact or profile of an individual having a knowledge base system and having a system for facilitating granular self-curation of identity via multiple identities and profiles. In embodiments, provided herein is a platform for self-curated single source of truth about the contact or profile of an individual having a knowledge base system and having a location factors system. In embodiments, provided herein is a platform for self-curated single source of truth about the contact or profile of an individual having a knowledge base system and having a system for performing outbound versus inbound contact management. In embodiments, provided herein is a platform for self-curated single source of truth about the contact or profile of an individual having a knowledge base system and having a QR code system. In embodiments, provided herein is a platform for self-curated single source of truth about the contact or profile of an individual having a knowledge base system and having a system configured to facilitate owner-controlled utilization of self-curated contact information including permission setting by use case. In embodiments, provided herein is a platform for self-curated single source of truth about the contact or profile of an individual having a knowledge base system and having a system for performing wallets and crypto/blockchain infrastructure. In embodiments, provided herein is a platform for self-curated single source of truth about the contact or profile of an individual having a knowledge base system and having a system for performing persistent, self-curated contact and profile information of a user. In embodiments, provided herein is a platform for self-curated single source of truth about the contact or profile of an individual having a knowledge base system and having a system configured to score and grade quality of contact information. In embodiments, provided herein is a platform for self-curated single source of truth about the contact or profile of an individual having a knowledge base system and having a system for integrating with self-curated single source of truth about the contact or profile of an individual system. In embodiments, provided herein is a platform for self-curated single source of truth about the contact or profile of an individual having a knowledge base system and having a connection suggestion system configured to perform scoring of backgrounds and identifiers. In embodiments, provided herein is a platform for self-curated single source of truth about the contact or profile of an individual having a knowledge base system and having a search function system. In embodiments, provided herein is a platform for self-curated single source of truth about the contact or profile of an individual having a knowledge base system and having an identity management and digital identity ownership system. In embodiments, provided herein is a platform for self-curated single source of truth about the contact or profile of an individual having a knowledge base system and having a systems integration system. In embodiments, provided herein is a platform for self-curated single source of truth about the contact or profile of an individual having a knowledge base system and having a system for performing "token" or other more unique ways to identify me. In embodiments, provided herein is a platform for self-curated single source of truth about the contact or profile of an individual having a knowledge base system and having a system for performing user-controlled/sender-controlled contact or profile data object. In embodiments, provided herein is a platform for self-curated single source of truth about the contact or profile of an individual having a knowledge base system and having a plurality of tools for managing contacts and profiles. In embodiments, provided herein is a platform for self-curated single source of truth about the contact or profile of an individual having a knowledge base system and having a system configured to facilitate individual self-curation of contact information. In embodiments, provided herein is a platform for self-curated single source of truth about the contact or profile of an individual having a knowledge base system and having a user interface. In embodiments, provided herein is a platform for self-curated single source of truth about the contact or profile of an individual having a knowledge base system and having a system configured to facilitate split control of personal-level and enterprise-level contact information. In embodiments, provided herein is a platform for self-curated single source of truth about the contact or profile of an individual having a knowledge base system and having a system configured to facilitate user-controlled sale of contact information. In embodiments, provided herein is a platform for self-curated single source of truth about the contact or profile of an individual having a knowledge base system and having a system for performing validation. In embodiments, provided herein is a platform for self-curated single source of truth about the contact or profile of an individual having a knowledge base system and having a system for performing automated synchronization of contact information. In embodiments, provided herein is a platform for self-curated single source of truth about the contact or profile of an individual having a knowledge base system and having a system configured to facilitate blocking and managing of invite permissions. In embodiments, provided herein is a platform for self-curated single source of truth about the contact or profile of an individual having a knowledge base system and having a connection system configured to connect users via search.

ML/AI for Classification

In embodiments, provided herein is a platform for self-curated single source of truth about the contact or profile of an individual having a machine learning/artificial intelligence system configured for classification. In embodiments, provided herein is a platform for self-curated single source of truth about the contact or profile of an individual having a machine learning/artificial intelligence system configured for classification and having a machine learning/artificial intelligence system configured for configuration and/or control. In embodiments, provided herein is a platform for self-curated single source of truth about the contact or profile of an individual having a machine learning/artificial intelligence system configured for classification and having a machine learning/artificial intelligence system configured to provide decision support. In embodiments, provided herein is a platform for self-curated single source of truth about the contact or profile of an individual having a machine learning/artificial intelligence system configured for classification and having a machine learning/artificial intelligence system configured for detection. In embodiments, provided herein is a platform for self-curated single source of truth about the contact or profile of an individual having a machine learning/artificial intelligence system configured for classification and having a machine learning/artificial intelligence system configured to perform an optimization. In embodiments, provided herein is a platform for self-curated single source of truth about the contact or profile of an individual having a machine learning/artificial intelligence system configured for classification and having a machine learning/artificial intelligence system configured to generate a prediction. In embodiments, provided herein is a platform for self-curated single source of truth about the contact or profile of an individual having a machine learning/artificial intelligence system configured for classification and having a matching system. In embodiments, provided herein is a platform for self-curated single source of truth about the contact or profile of an individual having a machine learning/artificial intelligence system configured for classification and having a system for resolving differences. In embodiments, provided herein is a platform for self-curated single source of truth about the contact or profile of an individual having a machine learning/artificial intelligence system configured for classification and having a system for managing jurisdiction-based privacy domains. In embodiments, provided herein is a platform for self-curated single source of truth about the contact or profile of an individual having a machine learning/artificial intelligence system configured for classification and having a similarity and/or clustering system. In embodiments, provided herein is a platform for self-curated single source of truth about the contact or profile of an individual having a machine learning/artificial intelligence system configured for classification and having a plurality of models and structures for contact data. In embodiments, provided herein is a platform for self-curated single source of truth about the contact or profile of an individual having a machine learning/artificial intelligence system configured for classification and having an e-commerce login/checkout ID control system. In embodiments, provided herein is a platform for self-curated single source of truth about the contact or profile of an individual having a machine learning/artificial intelligence system configured for classification and having a host interface system. In embodiments, provided herein is a platform for self-curated single source of truth about the contact or profile of an individual having a machine learning/artificial intelligence system configured for classification and having an incentives system configured to provide incentives for encouraging adoption and/or expansion. In embodiments, provided herein is a platform for self-curated single source of truth about the contact or profile of an individual having a machine learning/artificial intelligence system configured for classification and having a license management system. In embodiments, provided herein is a platform for self-curated single source of truth about the contact or profile of an individual having a machine learning/artificial intelligence system configured for classification and having a calendar system configured to organize calendars and tasks of users by identity and relevant network. In embodiments, provided herein is a platform for self-curated single source of truth about the contact or profile of an individual having a machine learning/artificial intelligence system configured for classification and having a policy violation management system. In embodiments, provided herein is a platform for self-curated single source of truth about the contact or profile of an individual having a machine learning/artificial intelligence system configured for classification and having a system for facilitating granular self-curation of identity via multiple identities and profiles. In embodiments, provided herein is a platform for self-curated single source of truth about the contact or profile of an individual having a machine learning/artificial intelligence system configured for classification and having a location factors system. In embodiments, provided herein is a platform for self-curated single source of truth about the contact or profile of an individual having a machine learning/artificial intelligence system configured for classification and having a system for performing outbound versus inbound contact management. In embodiments, provided herein is a platform for self-curated single source of truth about the contact or profile of an individual having a machine learning/artificial intelligence system configured for classification and having a QR code system. In embodiments, provided herein is a platform for self-curated single source of truth about the contact or profile of an individual having a machine learning/artificial intelligence system configured for classification and having a system configured to facilitate owner-controlled utilization of self-curated contact information including permission setting by use case. In embodiments, provided herein is a platform for self-curated single source of truth about the contact or profile of an individual having a machine learning/artificial intelligence system configured for classification and having a system for performing wallets and crypto/blockchain infrastructure. In embodiments, provided herein is a platform for self-curated single source of truth about the contact or profile of an individual having a machine learning/artificial intelligence system configured for classification and having a system for performing persistent, self-curated contact and profile information of a user. In embodiments, provided herein is a platform for self-curated single source of truth about the contact or profile of an individual having a machine learning/artificial intelligence system configured for classification and having a system configured to score and grade quality of contact information. In embodiments, provided herein is a platform for self-curated single source of truth about the contact or profile of an individual having a machine learning/artificial intelligence system configured for classification and having a system for integrating with self-curated single source of truth about the contact or profile of an individual system. In embodiments, provided herein is a platform for self-curated single source of truth about the contact or profile of an individual having a machine learning/artificial intelligence system configured for classification and having a connection suggestion system configured to perform scoring of backgrounds and identifiers. In embodiments, provided herein is a platform for self-curated single source of truth about the contact or profile of an individual having a machine learning/artificial intelligence system configured for classification and having a search function system. In embodiments, provided herein is a platform for self-curated single source of truth about the contact or profile of an individual having a machine learning/artificial intelligence system configured for classification and having an identity management and digital identity ownership system. In embodiments, provided herein is a platform for self-curated single source of truth about the contact or profile of an individual having a machine learning/artificial intelligence system configured for classification and having a systems integration system. In embodiments, provided herein is a platform for self-curated single source of truth about the contact or profile of an individual having a machine learning/artificial intelligence system configured for classification and having a system for performing "token" or other more unique ways to identify me. In embodiments, provided herein is a platform for self-curated single source of truth about the contact or profile of an individual having a machine learning/artificial intelligence system configured for classification and having a system for performing user-controlled/sender-controlled contact or profile data object. In embodiments, provided herein is a platform for self-curated single source of truth about the contact or profile of an individual having a machine learning/artificial intelligence system configured for classification and having a plurality of tools for managing contacts and profiles. In embodiments, provided herein is a platform for self-curated single source of truth about the contact or profile of an individual having a machine learning/artificial intelligence system configured for classification and having a system configured to facilitate individual self-curation of contact information. In embodiments, provided herein is a platform for self-curated single source of truth about the contact or profile of an individual having a machine learning/artificial intelligence system configured for classification and having a user interface. In embodiments, provided herein is a platform for self-curated single source of truth about the contact or profile of an individual having a machine learning/artificial intelligence system configured for classification and having a system configured to facilitate split control of personal-level and enterprise-level contact information. In embodiments, provided herein is a platform for self-curated single source of truth about the contact or profile of an individual having a machine learning/artificial intelligence system configured for classification and having a system configured to facilitate user-controlled sale of contact information. In embodiments, provided herein is a platform for self-curated single source of truth about the contact or profile of an individual having a machine learning/artificial intelligence system configured for classification and having a system for performing validation. In embodiments, provided herein is a platform for self-curated single source of truth about the contact or profile of an individual having a machine learning/artificial intelligence system configured for classification and having a system for performing automated synchronization of contact information. In embodiments, provided herein is a platform for self-curated single source of truth about the contact or profile of an individual having a machine learning/artificial intelligence system configured for classification and having a system configured to facilitate blocking and managing of invite permissions. In embodiments, provided herein is a platform for self-curated single source of truth about the contact or profile of an individual having a machine learning/artificial intelligence system configured for classification and having a connection system configured to connect users via search.

ML/AI for Configuration/Control

In embodiments, provided herein is a platform for self-curated single source of truth about the contact or profile of an individual having a machine learning/artificial intelligence system configured for configuration and/or control. In embodiments, provided herein is a platform for self-curated single source of truth about the contact or profile of an individual having a machine learning/artificial intelligence system configured for configuration and/or control and having a machine learning/artificial intelligence system configured to provide decision support. In embodiments, provided herein is a platform for self-curated single source of truth about the contact or profile of an individual having a machine learning/artificial intelligence system configured for configuration and/or control and having a machine learning/artificial intelligence system configured for detection. In embodiments, provided herein is a platform for self-curated single source of truth about the contact or profile of an individual having a machine learning/artificial intelligence system configured for configuration and/or control and having a machine learning/artificial intelligence system configured to perform an optimization. In embodiments, provided herein is a platform for self-curated single source of truth about the contact or profile of an individual having a machine learning/artificial intelligence system configured for configuration and/or control and having a machine learning/artificial intelligence system configured to generate a prediction. In embodiments, provided herein is a platform for self-curated single source of truth about the contact or profile of an individual having a machine learning/artificial intelligence system configured for configuration and/or control and having a matching system. In embodiments, provided herein is a platform for self-curated single source of truth about the contact or profile of an individual having a machine learning/artificial intelligence system configured for configuration and/or control and having a system for resolving differences. In embodiments, provided herein is a platform for self-curated single source of truth about the contact or profile of an individual having a machine learning/artificial intelligence system configured for configuration and/or control and having a system for managing jurisdiction-based privacy domains. In embodiments, provided herein is a platform for self-curated single source of truth about the contact or profile of an individual having a machine learning/artificial intelligence system configured for configuration and/or control and having a similarity and/or clustering system. In embodiments, provided herein is a platform for self-curated single source of truth about the contact or profile of an individual having a machine learning/artificial intelligence system configured for configuration and/or control and having a plurality of models and structures for contact data. In embodiments, provided herein is a platform for self-curated single source of truth about the contact or profile of an individual having a machine learning/artificial intelligence system configured for configuration and/or control and having an e-commerce login/checkout ID control system. In embodiments, provided herein is a platform for self-curated single source of truth about the contact or profile of an individual having a machine learning/artificial intelligence system configured for configuration and/or control and having a host interface system. In embodiments, provided herein is a platform for self-curated single source of truth about the contact or profile of an individual having a machine learning/artificial intelligence system configured for configuration and/or control and having an incentives system configured to provide incentives for encouraging adoption and/or expansion. In embodiments, provided herein is a platform for self-curated single source of truth about the contact or profile of an individual having a machine learning/artificial intelligence system configured for configuration and/or control and having a license management system. In embodiments, provided herein is a platform for self-curated single source of truth about the contact or profile of an individual having a machine learning/artificial intelligence system configured for configuration and/or control and having a calendar system configured to organize calendars and tasks of users by identity and relevant network. In embodiments, provided herein is a platform for self-curated single source of truth about the contact or profile of an individual having a machine learning/artificial intelligence system configured for configuration and/or control and having a policy violation management system. In embodiments, provided herein is a platform for self-curated single source of truth about the contact or profile of an individual having a machine learning/artificial intelligence system configured for configuration and/or control and having a system for facilitating granular self-curation of identity via multiple identities and profiles. In embodiments, provided herein is a platform for self-curated single source of truth about the contact or profile of an individual having a machine learning/artificial intelligence system configured for configuration and/or control and having a location factors system. In embodiments, provided herein is a platform for self-curated single source of truth about the contact or profile of an individual having a machine learning/artificial intelligence system configured for configuration and/or control and having a system for performing outbound versus inbound contact management. In embodiments, provided herein is a platform for self-curated single source of truth about the contact or profile of an individual having a machine learning/artificial intelligence system configured for configuration and/or control and having a QR code system. In embodiments, provided herein is a platform for self-curated single source of truth about the contact or profile of an individual having a machine learning/artificial intelligence system configured for configuration and/or control and having a system configured to facilitate owner-controlled utilization of self-curated contact information including permission setting by use case. In embodiments, provided herein is a platform for self-curated single source of truth about the contact or profile of an individual having a machine learning/artificial intelligence system configured for configuration and/or control and having a system for performing wallets and crypto/blockchain infrastructure. In embodiments, provided herein is a platform for self-curated single source of truth about the contact or profile of an individual having a machine learning/artificial intelligence system configured for configuration and/or control and having a system for performing persistent, self-curated contact and profile information of a user. In embodiments, provided herein is a platform for self-curated single source of truth about the contact or profile of an individual having a machine learning/artificial intelligence system configured for configuration and/or control and having a system configured to score and grade quality of contact information. In embodiments, provided herein is a platform for self-curated single source of truth about the contact or profile of an individual having a machine learning/artificial intelligence system configured for configuration and/or control and having a system for integrating with self-curated single source of truth about the contact or profile of an individual system. In embodiments, provided herein is a platform for self-curated single source of truth about the contact or profile of an individual having a machine learning/artificial intelligence system configured for configuration and/or control and having a connection suggestion system configured to perform scoring of backgrounds and identifiers. In embodiments, provided herein is a platform for self-curated single source of truth about the contact or profile of an individual having a machine learning/artificial intelligence system configured for configuration and/or control and having a search function system. In embodiments, provided herein is a platform for self-curated single source of truth about the contact or profile of an individual having a machine learning/artificial intelligence system configured for configuration and/or control and having an identity management and digital identity ownership system. In embodiments, provided herein is a platform for self-curated single source of truth about the contact or profile of an individual having a machine learning/artificial intelligence system configured for configuration and/or control and having a systems integration system. In embodiments, provided herein is a platform for self-curated single source of truth about the contact or profile of an individual having a machine learning/artificial intelligence system configured for configuration and/or control and having a system for performing "token" or other more unique ways to identify me. In embodiments, provided herein is a platform for self-curated single source of truth about the contact or profile of an individual having a machine learning/artificial intelligence system configured for configuration and/or control and having a system for performing user-controlled/sender-controlled contact or profile data object. In embodiments, provided herein is a platform for self-curated single source of truth about the contact or profile of an individual having a machine learning/artificial intelligence system configured for configuration and/or control and having a plurality of tools for managing contacts and profiles. In embodiments, provided herein is a platform for self-curated single source of truth about the contact or profile of an individual having a machine learning/artificial intelligence system configured for configuration and/or control and having a system configured to facilitate individual self-curation of contact information. In embodiments, provided herein is a platform for self-curated single source of truth about the contact or profile of an individual having a machine learning/artificial intelligence system configured for configuration and/or control and having a user interface. In embodiments, provided herein is a platform for self-curated single source of truth about the contact or profile of an individual having a machine learning/artificial intelligence system configured for configuration and/or control and having a system configured to facilitate split control of personal-level and enterprise-level contact information. In embodiments, provided herein is a platform for self-curated single source of truth about the contact or profile of an individual having a machine learning/artificial intelligence system configured for configuration and/or control and having a system configured to facilitate user-controlled sale of contact information. In embodiments, provided herein is a platform for self-curated single source of truth about the contact or profile of an individual having a machine learning/artificial intelligence system configured for configuration and/or control and having a system for performing validation. In embodiments, provided herein is a platform for self-curated single source of truth about the contact or profile of an individual having a machine learning/artificial intelligence system configured for configuration and/or control and having a system for performing automated synchronization of contact information. In embodiments, provided herein is a platform for self-curated single source of truth about the contact or profile of an individual having a machine learning/artificial intelligence system configured for configuration and/or control and having a system configured to facilitate blocking and managing of invite permissions. In embodiments, provided herein is a platform for self-curated single source of truth about the contact or profile of an individual having a machine learning/artificial intelligence system configured for configuration and/or control and having a connection system configured to connect users via search.

ML/AI for Decision Support

In embodiments, provided herein is a platform for self-curated single source of truth about the contact or profile of an individual having a machine learning/artificial intelligence system configured to provide decision support. In embodiments, provided herein is a platform for self-curated single source of truth about the contact or profile of an individual having a machine learning/artificial intelligence system configured to provide decision support and having a machine learning/artificial intelligence system configured for detection. In embodiments, provided herein is a platform for self-curated single source of truth about the contact or profile of an individual having a machine learning/artificial intelligence system configured to provide decision support and having a machine learning/artificial intelligence system configured to perform an optimization. In embodiments, provided herein is a platform for self-curated single source of truth about the contact or profile of an individual having a machine learning/artificial intelligence system configured to provide decision support and having a machine learning/artificial intelligence system configured to generate a prediction. In embodiments, provided herein is a platform for self-curated single source of truth about the contact or profile of an individual having a machine learning/artificial intelligence system configured to provide decision support and having a matching system. In embodiments, provided herein is a platform for self-curated single source of truth about the contact or profile of an individual having a machine learning/artificial intelligence system configured to provide decision support and having a system for resolving differences. In embodiments, provided herein is a platform for self-curated single source of truth about the contact or profile of an individual having a machine learning/artificial intelligence system configured to provide decision support and having a system for managing jurisdiction-based privacy domains. In embodiments, provided herein is a platform for self-curated single source of truth about the contact or profile of an individual having a machine learning/artificial intelligence system configured to provide decision support and having a similarity and/or clustering system. In embodiments, provided herein is a platform for self-curated single source of truth about the contact or profile of an individual having a machine learning/artificial intelligence system configured to provide decision support and having a plurality of models and structures for contact data. In embodiments, provided herein is a platform for self-curated single source of truth about the contact or profile of an individual having a machine learning/artificial intelligence system configured to provide decision support and having an e-commerce login/checkout ID control system. In embodiments, provided herein is a platform for self-curated single source of truth about the contact or profile of an individual having a machine learning/artificial intelligence system configured to provide decision support and having a host interface system. In embodiments, provided herein is a platform for self-curated single source of truth about the contact or profile of an individual having a machine learning/artificial intelligence system configured to provide decision support and having an incentives system configured to provide incentives for encouraging adoption and/or expansion. In embodiments, provided herein is a platform for self-curated single source of truth about the contact or profile of an individual having a machine learning/artificial intelligence system configured to provide decision support and having a license management system. In embodiments, provided herein is a platform for self-curated single source of truth about the contact or profile of an individual having a machine learning/artificial intelligence system configured to provide decision support and having a calendar system configured to organize calendars and tasks of users by identity and relevant network. In embodiments, provided herein is a platform for self-curated single source of truth about the contact or profile of an individual having a machine learning/artificial intelligence system configured to provide decision support and having a policy violation management system. In embodiments, provided herein is a platform for self-curated single source of truth about the contact or profile of an individual having a machine learning/artificial intelligence system configured to provide decision support and having a system for facilitating granular self-curation of identity via multiple identities and profiles. In embodiments, provided herein is a platform for self-curated single source of truth about the contact or profile of an individual having a machine learning/artificial intelligence system configured to provide decision support and having a location factors system. In embodiments, provided herein is a platform for self-curated single source of truth about the contact or profile of an individual having a machine learning/artificial intelligence system configured to provide decision support and having a system for performing outbound versus inbound contact management. In embodiments, provided herein is a platform for self-curated single source of truth about the contact or profile of an individual having a machine learning/artificial intelligence system configured to provide decision support and having a QR code system. In embodiments, provided herein is a platform for self-curated single source of truth about the contact or profile of an individual having a machine learning/artificial intelligence system configured to provide decision support and having a system configured to facilitate owner-controlled utilization of self-curated contact information including permission setting by use case. In embodiments, provided herein is a platform for self-curated single source of truth about the contact or profile of an individual having a machine learning/artificial intelligence system configured to provide decision support and having a system for performing wallets and crypto/blockchain infrastructure. In embodiments, provided herein is a platform for self-curated single source of truth about the contact or profile of an individual having a machine learning/artificial intelligence system configured to provide decision support and having a system for performing persistent, self-curated contact and profile information of a user. In embodiments, provided herein is a platform for self-curated single source of truth about the contact or profile of an individual having a machine learning/artificial intelligence system configured to provide decision support and having a system configured to score and grade quality of contact information. In embodiments, provided herein is a platform for self-curated single source of truth about the contact or profile of an individual having a machine learning/artificial intelligence system configured to provide decision support and having a system for integrating with self-curated single source of truth about the contact or profile of an individual system. In embodiments, provided herein is a platform for self-curated single source of truth about the contact or profile of an individual having a machine learning/artificial intelligence system configured to provide decision support and having a connection suggestion system configured to perform scoring of backgrounds and identifiers. In embodiments, provided herein is a platform for self-curated single source of truth about the contact or profile of an individual having a machine learning/artificial intelligence system configured to provide decision support and having a search function system. In embodiments, provided herein is a platform for self-curated single source of truth about the contact or profile of an individual having a machine learning/artificial intelligence system configured to provide decision support and having an identity management and digital identity ownership system. In embodiments, provided herein is a platform for self-curated single source of truth about the contact or profile of an individual having a machine learning/artificial intelligence system configured to provide decision support and having a systems integration system. In embodiments, provided herein is a platform for self-curated single source of truth about the contact or profile of an individual having a machine learning/artificial intelligence system configured to provide decision support and having a system for performing "token" or other more unique ways to identify me. In embodiments, provided herein is a platform for self-curated single source of truth about the contact or profile of an individual having a machine learning/artificial intelligence system configured to provide decision support and having a system for performing user-controlled/sender-controlled contact or profile data object. In embodiments, provided herein is a platform for self-curated single source of truth about the contact or profile of an individual having a machine learning/artificial intelligence system configured to provide decision support and having a plurality of tools for managing contacts and profiles. In embodiments, provided herein is a platform for self-curated single source of truth about the contact or profile of an individual having a machine learning/artificial intelligence system configured to provide decision support and having a system configured to facilitate individual self-curation of contact information. In embodiments, provided herein is a platform for self-curated single source of truth about the contact or profile of an individual having a machine learning/artificial intelligence system configured to provide decision support and having a user interface. In embodiments, provided herein is a platform for self-curated single source of truth about the contact or profile of an individual having a machine learning/artificial intelligence system configured to provide decision support and having a system configured to facilitate split control of personal-level and enterprise-level contact information. In embodiments, provided herein is a platform for self-curated single source of truth about the contact or profile of an individual having a machine learning/artificial intelligence system configured to provide decision support and having a system configured to facilitate user-controlled sale of contact information. In embodiments, provided herein is a platform for self-curated single source of truth about the contact or profile of an individual having a machine learning/artificial intelligence system configured to provide decision support and having a system for performing validation. In embodiments, provided herein is a platform for self-curated single source of truth about the contact or profile of an individual having a machine learning/artificial intelligence system configured to provide decision support and having a system for performing automated synchronization of contact information. In embodiments, provided herein is a platform for self-curated single source of truth about the contact or profile of an individual having a machine learning/artificial intelligence system configured to provide decision support and having a system configured to facilitate blocking and managing of invite permissions. In embodiments, provided herein is a platform for self-curated single source of truth about the contact or profile of an individual having a machine learning/artificial intelligence system configured to provide decision support and having a connection system configured to connect users via search.

ML/AI for Detection

In embodiments, provided herein is a platform for self-curated single source of truth about the contact or profile of an individual having a machine learning/artificial intelligence system configured for detection. In embodiments, provided herein is a platform for self-curated single source of truth about the contact or profile of an individual having a machine learning/artificial intelligence system configured for detection and having a machine learning/artificial intelligence system configured to perform an optimization. In embodiments, provided herein is a platform for self-curated single source of truth about the contact or profile of an individual having a machine learning/artificial intelligence system configured for detection and having a machine learning/artificial intelligence system configured to generate a prediction. In embodiments, provided herein is a platform for self-curated single source of truth about the contact or profile of an individual having a machine learning/artificial intelligence system configured for detection and having a matching system. In embodiments, provided herein is a platform for self-curated single source of truth about the contact or profile of an individual having a machine learning/artificial intelligence system configured for detection and having a system for resolving differences. In embodiments, provided herein is a platform for self-curated single source of truth about the contact or profile of an individual having a machine learning/artificial intelligence system configured for detection and having a system for managing jurisdiction-based privacy domains. In embodiments, provided herein is a platform for self-curated single source of truth about the contact or profile of an individual having a machine learning/artificial intelligence system configured for detection and having a similarity and/or clustering system. In embodiments, provided herein is a platform for self-curated single source of truth about the contact or profile of an individual having a machine learning/artificial intelligence system configured for detection and having a plurality of models and structures for contact data. In embodiments, provided herein is a platform for self-curated single source of truth about the contact or profile of an individual having a machine learning/artificial intelligence system configured for detection and having an e-commerce login/checkout ID control system. In embodiments, provided herein is a platform for self-curated single source of truth about the contact or profile of an individual having a machine learning/artificial intelligence system configured for detection and having a host interface system. In embodiments, provided herein is a platform for self-curated single source of truth about the contact or profile of an individual having a machine learning/artificial intelligence system configured for detection and having an incentives system configured to provide incentives for encouraging adoption and/or expansion. In embodiments, provided herein is a platform for self-curated single source of truth about the contact or profile of an individual having a machine learning/artificial intelligence system configured for detection and having a license management system. In embodiments, provided herein is a platform for self-curated single source of truth about the contact or profile of an individual having a machine learning/artificial intelligence system configured for detection and having a calendar system configured to organize calendars and tasks of users by identity and relevant network. In embodiments, provided herein is a platform for self-curated single source of truth about the contact or profile of an individual having a machine learning/artificial intelligence system configured for detection and having a policy violation management system. In embodiments, provided herein is a platform for self-curated single source of truth about the contact or profile of an individual having a machine learning/artificial intelligence system configured for detection and having a system for facilitating granular self-curation of identity via multiple identities and profiles. In embodiments, provided herein is a platform for self-curated single source of truth about the contact or profile of an individual having a machine learning/artificial intelligence system configured for detection and having a location factors system. In embodiments, provided herein is a platform for self-curated single source of truth about the contact or profile of an individual having a machine learning/artificial intelligence system configured for detection and having a system for performing outbound versus inbound contact management. In embodiments, provided herein is a platform for self-curated single source of truth about the contact or profile of an individual having a machine learning/artificial intelligence system configured for detection and having a QR code system. In embodiments, provided herein is a platform for self-curated single source of truth about the contact or profile of an individual having a machine learning/artificial intelligence system configured for detection and having a system configured to facilitate owner-controlled utilization of self-curated contact information including permission setting by use case. In embodiments, provided herein is a platform for self-curated single source of truth about the contact or profile of an individual having a machine learning/artificial intelligence system configured for detection and having a system for performing wallets and crypto/blockchain infrastructure. In embodiments, provided herein is a platform for self-curated single source of truth about the contact or profile of an individual having a machine learning/artificial intelligence system configured for detection and having a system for performing persistent, self-curated contact and profile information of a user. In embodiments, provided herein is a platform for self-curated single source of truth about the contact or profile of an individual having a machine learning/artificial intelligence system configured for detection and having a system configured to score and grade quality of contact information. In embodiments, provided herein is a platform for self-curated single source of truth about the contact or profile of an individual having a machine learning/artificial intelligence system configured for detection and having a system for integrating with self-curated single source of truth about the contact or profile of an individual system. In embodiments, provided herein is a platform for self-curated single source of truth about the contact or profile of an individual having a machine learning/artificial intelligence system configured for detection and having a connection suggestion system configured to perform scoring of backgrounds and identifiers. In embodiments, provided herein is a platform for self-curated single source of truth about the contact or profile of an individual having a machine learning/artificial intelligence system configured for detection and having a search function system. In embodiments, provided herein is a platform for self-curated single source of truth about the contact or profile of an individual having a machine learning/artificial intelligence system configured for detection and having an identity management and digital identity ownership system. In embodiments, provided herein is a platform for self-curated single source of truth about the contact or profile of an individual having a machine learning/artificial intelligence system configured for detection and having a systems integration system. In embodiments, provided herein is a platform for self-curated single source of truth about the contact or profile of an individual having a machine learning/artificial intelligence system configured for detection and having a system for performing "token" or other more unique ways to identify me. In embodiments, provided herein is a platform for self-curated single source of truth about the contact or profile of an individual having a machine learning/artificial intelligence system configured for detection and having a system for performing user-controlled/sender-controlled contact or profile data object. In embodiments, provided herein is a platform for self-curated single source of truth about the contact or profile of an individual having a machine learning/artificial intelligence system configured for detection and having a plurality of tools for managing contacts and profiles. In embodiments, provided herein is a platform for self-curated single source of truth about the contact or profile of an individual having a machine learning/artificial intelligence system configured for detection and having a system configured to facilitate individual self-curation of contact information. In embodiments, provided herein is a platform for self-curated single source of truth about the contact or profile of an individual having a machine learning/artificial intelligence system configured for detection and having a user interface. In embodiments, provided herein is a platform for self-curated single source of truth about the contact or profile of an individual having a machine learning/artificial intelligence system configured for detection and having a system configured to facilitate split control of personal-level and enterprise-level contact information. In embodiments, provided herein is a platform for self-curated single source of truth about the contact or profile of an individual having a machine learning/artificial intelligence system configured for detection and having a system configured to facilitate user-controlled sale of contact information. In embodiments, provided herein is a platform for self-curated single source of truth about the contact or profile of an individual having a machine learning/artificial intelligence system configured for detection and having a system for performing validation. In embodiments, provided herein is a platform for self-curated single source of truth about the contact or profile of an individual having a machine learning/artificial intelligence system configured for detection and having a system for performing automated synchronization of contact information. In embodiments, provided herein is a platform for self-curated single source of truth about the contact or profile of an individual having a machine learning/artificial intelligence system configured for detection and having a system configured to facilitate blocking and managing of invite permissions. In embodiments, provided herein is a platform for self-curated single source of truth about the contact or profile of an individual having a machine learning/artificial intelligence system configured for detection and having a connection system configured to connect users via search.

ML/AI for Optimization

In embodiments, provided herein is a platform for self-curated single source of truth about the contact or profile of an individual having a machine learning/artificial intelligence system configured to perform an optimization. In embodiments, provided herein is a platform for self-curated single source of truth about the contact or profile of an individual having a machine learning/artificial intelligence system configured to perform an optimization and having a machine learning/artificial intelligence system configured to generate a prediction. In embodiments, provided herein is a platform for self-curated single source of truth about the contact or profile of an individual having a machine learning/artificial intelligence system configured to perform an optimization and having a matching system. In embodiments, provided herein is a platform for self-curated single source of truth about the contact or profile of an individual having a machine learning/artificial intelligence system configured to perform an optimization and having a system for resolving differences. In embodiments, provided herein is a platform for self-curated single source of truth about the contact or profile of an individual having a machine learning/artificial intelligence system configured to perform an optimization and having a system for managing jurisdiction-based privacy domains. In embodiments, provided herein is a platform for self-curated single source of truth about the contact or profile of an individual having a machine learning/artificial intelligence system configured to perform an optimization and having a similarity and/or clustering system. In embodiments, provided herein is a platform for self-curated single source of truth about the contact or profile of an individual having a machine learning/artificial intelligence system configured to perform an optimization and having a plurality of models and structures for contact data. In embodiments, provided herein is a platform for self-curated single source of truth about the contact or profile of an individual having a machine learning/artificial intelligence system configured to perform an optimization and having an e-commerce login/checkout ID control system. In embodiments, provided herein is a platform for self-curated single source of truth about the contact or profile of an individual having a machine learning/artificial intelligence system configured to perform an optimization and having a host interface system. In embodiments, provided herein is a platform for self-curated single source of truth about the contact or profile of an individual having a machine learning/artificial intelligence system configured to perform an optimization and having an incentives system configured to provide incentives for encouraging adoption and/or expansion. In embodiments, provided herein is a platform for self-curated single source of truth about the contact or profile of an individual having a machine learning/artificial intelligence system configured to perform an optimization and having a license management system. In embodiments, provided herein is a platform for self-curated single source of truth about the contact or profile of an individual having a machine learning/artificial intelligence system configured to perform an optimization and having a calendar system configured to organize calendars and tasks of users by identity and relevant network. In embodiments, provided herein is a platform for self-curated single source of truth about the contact or profile of an individual having a machine learning/artificial intelligence system configured to perform an optimization and having a policy violation management system. In embodiments, provided herein is a platform for self-curated single source of truth about the contact or profile of an individual having a machine learning/artificial intelligence system configured to perform an optimization and having a system for facilitating granular self-curation of identity via multiple identities and profiles. In embodiments, provided herein is a platform for self-curated single source of truth about the contact or profile of an individual having a machine learning/artificial intelligence system configured to perform an optimization and having a location factors system. In embodiments, provided herein is a platform for self-curated single source of truth about the contact or profile of an individual having a machine learning/artificial intelligence system configured to perform an optimization and having a system for performing outbound versus inbound contact management. In embodiments, provided herein is a platform for self-curated single source of truth about the contact or profile of an individual having a machine learning/artificial intelligence system configured to perform an optimization and having a QR code system. In embodiments, provided herein is a platform for self-curated single source of truth about the contact or profile of an individual having a machine learning/artificial intelligence system configured to perform an optimization and having a system configured to facilitate owner-controlled utilization of self-curated contact information including permission setting by use case. In embodiments, provided herein is a platform for self-curated single source of truth about the contact or profile of an individual having a machine learning/artificial intelligence system configured to perform an optimization and having a system for performing wallets and crypto/blockchain infrastructure. In embodiments, provided herein is a platform for self-curated single source of truth about the contact or profile of an individual having a machine learning/artificial intelligence system configured to perform an optimization and having a system for performing persistent, self-curated contact and profile information of a user. In embodiments, provided herein is a platform for self-curated single source of truth about the contact or profile of an individual having a machine learning/artificial intelligence system configured to perform an optimization and having a system configured to score and grade quality of contact information. In embodiments, provided herein is a platform for self-curated single source of truth about the contact or profile of an individual having a machine learning/artificial intelligence system configured to perform an optimization and having a system for integrating with self-curated single source of truth about the contact or profile of an individual system. In embodiments, provided herein is a platform for self-curated single source of truth about the contact or profile of an individual having a machine learning/artificial intelligence system configured to perform an optimization and having a connection suggestion system configured to perform scoring of backgrounds and identifiers. In embodiments, provided herein is a platform for self-curated single source of truth about the contact or profile of an individual having a machine learning/artificial intelligence system configured to perform an optimization and having a search function system. In embodiments, provided herein is a platform for self-curated single source of truth about the contact or profile of an individual having a machine learning/artificial intelligence system configured to perform an optimization and having an identity management and digital identity ownership system. In embodiments, provided herein is a platform for self-curated single source of truth about the contact or profile of an individual having a machine learning/artificial intelligence system configured to perform an optimization and having a systems integration system. In embodiments, provided herein is a platform for self-curated single source of truth about the contact or profile of an individual having a machine learning/artificial intelligence system configured to perform an optimization and having a system for performing "token" or other more unique ways to identify me. In embodiments, provided herein is a platform for self-curated single source of truth about the contact or profile of an individual having a machine learning/artificial intelligence system configured to perform an optimization and having a system for performing user-controlled/sender-controlled contact or profile data object. In embodiments, provided herein is a platform for self-curated single source of truth about the contact or profile of an individual having a machine learning/artificial intelligence system configured to perform an optimization and having a plurality of tools for managing contacts and profiles. In embodiments, provided herein is a platform for self-curated single source of truth about the contact or profile of an individual having a machine learning/artificial intelligence system configured to perform an optimization and having a system configured to facilitate individual self-curation of contact information. In embodiments, provided herein is a platform for self-curated single source of truth about the contact or profile of an individual having a machine learning/artificial intelligence system configured to perform an optimization and having a user interface. In embodiments, provided herein is a platform for self-curated single source of truth about the contact or profile of an individual having a machine learning/artificial intelligence system configured to perform an optimization and having a system configured to facilitate split control of personal-level and enterprise-level contact information. In embodiments, provided herein is a platform for self-curated single source of truth about the contact or profile of an individual having a machine learning/artificial intelligence system configured to perform an optimization and having a system configured to facilitate user-controlled sale of contact information. In embodiments, provided herein is a platform for self-curated single source of truth about the contact or profile of an individual having a machine learning/artificial intelligence system configured to perform an optimization and having a system for performing validation. In embodiments, provided herein is a platform for self-curated single source of truth about the contact or profile of an individual having a machine learning/artificial intelligence system configured to perform an optimization and having a system for performing automated synchronization of contact information. In embodiments, provided herein is a platform for self-curated single source of truth about the contact or profile of an individual having a machine learning/artificial intelligence system configured to perform an optimization and having a system configured to facilitate blocking and managing of invite permissions. In embodiments, provided herein is a platform for self-curated single source of truth about the contact or profile of an individual having a machine learning/artificial intelligence system configured to perform an optimization and having a connection system configured to connect users via search.

ML/AI for Prediction

In embodiments, provided herein is a platform for self-curated single source of truth about the contact or profile of an individual having a machine learning/artificial intelligence system configured to generate a prediction. In embodiments, provided herein is a platform for self-curated single source of truth about the contact or profile of an individual having a machine learning/artificial intelligence system configured to generate a prediction and having a matching system. In embodiments, provided herein is a platform for self-curated single source of truth about the contact or profile of an individual having a machine learning/artificial intelligence system configured to generate a prediction and having a system for resolving differences. In embodiments, provided herein is a platform for self-curated single source of truth about the contact or profile of an individual having a machine learning/artificial intelligence system configured to generate a prediction and having a system for managing jurisdiction-based privacy domains. In embodiments, provided herein is a platform for self-curated single source of truth about the contact or profile of an individual having a machine learning/artificial intelligence system configured to generate a prediction and having a similarity and/or clustering system. In embodiments, provided herein is a platform for self-curated single source of truth about the contact or profile of an individual having a machine learning/artificial intelligence system configured to generate a prediction and having a plurality of models and structures for contact data. In embodiments, provided herein is a platform for self-curated single source of truth about the contact or profile of an individual having a machine learning/artificial intelligence system configured to generate a prediction and having an e-commerce login/checkout ID control system. In embodiments, provided herein is a platform for self-curated single source of truth about the contact or profile of an individual having a machine learning/artificial intelligence system configured to generate a prediction and having a host interface system. In embodiments, provided herein is a platform for self-curated single source of truth about the contact or profile of an individual having a machine learning/artificial intelligence system configured to generate a prediction and having an incentives system configured to provide incentives for encouraging adoption and/or expansion. In embodiments, provided herein is a platform for self-curated single source of truth about the contact or profile of an individual having a machine learning/artificial intelligence system configured to generate a prediction and having a license management system. In embodiments, provided herein is a platform for self-curated single source of truth about the contact or profile of an individual having a machine learning/artificial intelligence system configured to generate a prediction and having a calendar system configured to organize calendars and tasks of users by identity and relevant network. In embodiments, provided herein is a platform for self-curated single source of truth about the contact or profile of an individual having a machine learning/artificial intelligence system configured to generate a prediction and having a policy violation management system. In embodiments, provided herein is a platform for self-curated single source of truth about the contact or profile of an individual having a machine learning/artificial intelligence system configured to generate a prediction and having a system for facilitating granular self-curation of identity via multiple identities and profiles.

In embodiments, provided herein is a platform for self-curated single source of truth about the contact or profile of an individual having a machine learning/artificial intelligence system configured to generate a prediction and having a location factors system. In embodiments, provided herein is a platform for self-curated single source of truth about the contact or profile of an individual having a machine learning/artificial intelligence system configured to generate a prediction and having a system for performing outbound versus inbound contact management. In embodiments, provided herein is a platform for self-curated single source of truth about the contact or profile of an individual having a machine learning/artificial intelligence system configured to generate a prediction and having a QR code system. In embodiments, provided herein is a platform for self-curated single source of truth about the contact or profile of an individual having a machine learning/artificial intelligence system configured to generate a prediction and having a system configured to facilitate owner-controlled utilization of self-curated contact information including permission setting by use case. In embodiments, provided herein is a platform for self-curated single source of truth about the contact or profile of an individual having a machine learning/artificial intelligence system configured to generate a prediction and having a system for performing wallets and crypto/blockchain infrastructure. In embodiments, provided herein is a platform for self-curated single source of truth about the contact or profile of an individual having a machine learning/artificial intelligence system configured to generate a prediction and having a system for performing persistent, self-curated contact and profile information of a user. In embodiments, provided herein is a platform for self-curated single source of truth about the contact or profile of an individual having a machine learning/artificial intelligence system configured to generate a prediction and having a system configured to score and grade quality of contact information. In embodiments, provided herein is a platform for self-curated single source of truth about the contact or profile of an individual having a machine learning/artificial intelligence system configured to generate a prediction and having a system for integrating with self-curated single source of truth about the contact or profile of an individual system. In embodiments, provided herein is a platform for self-curated single source of truth about the contact or profile of an individual having a machine learning/artificial intelligence system configured to generate a prediction and having a connection suggestion system configured to perform scoring of backgrounds and identifiers. In embodiments, provided herein is a platform for self-curated single source of truth about the contact or profile of an individual having a machine learning/artificial intelligence system configured to generate a prediction and having a search function system. In embodiments, provided herein is a platform for self-curated single source of truth about the contact or profile of an individual having a machine learning/artificial intelligence system configured to generate a prediction and having an identity management and digital identity ownership system. In embodiments, provided herein is a platform for self-curated single source of truth about the contact or profile of an individual having a machine learning/artificial intelligence system configured to generate a prediction and having a systems integration system. In embodiments, provided herein is a platform for self-curated single source of truth about the contact or profile of an individual having a machine learning/artificial intelligence system configured to generate a prediction and having a system for performing "token" or other more unique ways to identify me. In embodiments, provided herein is a platform for self-curated single source of truth about the contact or profile of an individual having a machine learning/artificial intelligence system configured to generate a prediction and having a system for performing user-controlled/sender-controlled contact or profile data object. In embodiments, provided herein is a platform for self-curated single source of truth about the contact or profile of an individual having a machine learning/artificial intelligence system configured to generate a prediction and having a plurality of tools for managing contacts and profiles. In embodiments, provided herein is a platform for self-curated single source of truth about the contact or profile of an individual having a machine learning/artificial intelligence system configured to generate a prediction and having a system configured to facilitate individual self-curation of contact information. In embodiments, provided herein is a platform for self-curated single source of truth about the contact or profile of an individual having a machine learning/artificial intelligence system configured to generate a prediction and having a user interface. In embodiments, provided herein is a platform for self-curated single source of truth about the contact or profile of an individual having a machine learning/artificial intelligence system configured to generate a prediction and having a system configured to facilitate split control of personal-level and enterprise-level contact information. In embodiments, provided herein is a platform for self-curated single source of truth about the contact or profile of an individual having a machine learning/artificial intelligence system configured to generate a prediction and having a system configured to facilitate user-controlled sale of contact information. In embodiments, provided herein is a platform for self-curated single source of truth about the contact or profile of an individual having a machine learning/artificial intelligence system configured to generate a prediction and having a system for performing validation. In embodiments, provided herein is a platform for self-curated single source of truth about the contact or profile of an individual having a machine learning/artificial intelligence system configured to generate a prediction and having a system for performing automated synchronization of contact information. In embodiments, provided herein is a platform for self-curated single source of truth about the contact or profile of an individual having a machine learning/artificial intelligence system configured to generate a prediction and having a system configured to facilitate blocking and managing of invite permissions. In embodiments, provided herein is a platform for self-curated single source of truth about the contact or profile of an individual having a machine learning/artificial intelligence system configured to generate a prediction and having a connection system configured to connect users via search.

Matching System

In embodiments, provided herein is a platform for self-curated single source of truth about the contact or profile of an individual having a matching system. In embodiments, provided herein is a platform for self-curated single source of truth about the contact or profile of an individual having a matching system and having a system for resolving differences. In embodiments, provided herein is a platform for self-curated single source of truth about the contact or profile of an individual having a matching system and having a system for managing jurisdiction-based privacy domains. In embodiments, provided herein is a platform for self-curated single source of truth about the contact or profile of an individual having a matching system and having a similarity and/or clustering system. In embodiments, provided herein is a platform for self-curated single source of truth about the contact or profile of an individual having a matching system and having a plurality of models and structures for contact data. In embodiments, provided herein is a platform for self-curated single source of truth about the contact or profile of an individual having a matching system and having an e-commerce login/checkout ID control system. In embodiments, provided herein is a platform for self-curated single source of truth about the contact or profile of an individual having a matching system and having a host interface system. In embodiments, provided herein is a platform for self-curated single source of truth about the contact or profile of an individual having a matching system and having an incentives system configured to provide incentives for encouraging adoption and/or expansion. In embodiments, provided herein is a platform for self-curated single source of truth about the contact or profile of an individual having a matching system and having a license management system. In embodiments, provided herein is a platform for self-curated single source of truth about the contact or profile of an individual having a matching system and having a calendar system configured to organize calendars and tasks of users by identity and relevant network. In embodiments, provided herein is a platform for self-curated single source of truth about the contact or profile of an individual having a matching system and having a policy violation management system. In embodiments, provided herein is a platform for self-curated single source of truth about the contact or profile of an individual having a matching system and having a system for facilitating granular self-curation of identity via multiple identities and profiles. In embodiments, provided herein is a platform for self-curated single source of truth about the contact or profile of an individual having a matching system and having a location factors system. In embodiments, provided herein is a platform for self-curated single source of truth about the contact or profile of an individual having a matching system and having a system for performing outbound versus inbound contact management. In embodiments, provided herein is a platform for self-curated single source of truth about the contact or profile of an individual having a matching system and having a QR code system. In embodiments, provided herein is a platform for self-curated single source of truth about the contact or profile of an individual having a matching system and having a system configured to facilitate owner-controlled utilization of self-curated contact information including permission setting by use case. In embodiments, provided herein is a platform for self-curated single source of truth about the contact or profile of an individual having a matching system and having a system for performing wallets and crypto/blockchain infrastructure. In embodiments, provided herein is a platform for self-curated single source of truth about the contact or profile of an individual having a matching system and having a system for performing persistent, self-curated contact and profile information of a user. In embodiments, provided herein is a platform for self-curated single source of truth about the contact or profile of an individual having a matching system and having a system configured to score and grade quality of contact information. In embodiments, provided herein is a platform for self-curated single source of truth about the contact or profile of an individual having a matching system and having a system for integrating with self-curated single source of truth about the contact or profile of an individual system. In embodiments, provided herein is a platform for self-curated single source of truth about the contact or profile of an individual having a matching system and having a connection suggestion system configured to perform scoring of backgrounds and identifiers. In embodiments, provided herein is a platform for self-curated single source of truth about the contact or profile of an individual having a matching system and having a search function system. In embodiments, provided herein is a platform for self-curated single source of truth about the contact or profile of an individual having a matching system and having an identity management and digital identity ownership system. In embodiments, provided herein is a platform for self-curated single source of truth about the contact or profile of an individual having a matching system and having a systems integration system. In embodiments, provided herein is a platform for self-curated single source of truth about the contact or profile of an individual having a matching system and having a system for performing "token" or other more unique ways to identify me. In embodiments, provided herein is a platform for self-curated single source of truth about the contact or profile of an individual having a matching system and having a system for performing user-controlled/sender-controlled contact or profile data object. In embodiments, provided herein is a platform for self-curated single source of truth about the contact or profile of an individual having a matching system and having a plurality of tools for managing contacts and profiles. In embodiments, provided herein is a platform for self-curated single source of truth about the contact or profile of an individual having a matching system and having a system configured to facilitate individual self-curation of contact information. In embodiments, provided herein is a platform for self-curated single source of truth about the contact or profile of an individual having a matching system and having a user interface. In embodiments, provided herein is a platform for self-curated single source of truth about the contact or profile of an individual having a matching system and having a system configured to facilitate split control of personal-level and enterprise-level contact information. In embodiments, provided herein is a platform for self-curated single source of truth about the contact or profile of an individual having a matching system and having a system configured to facilitate user-controlled sale of contact information. In embodiments, provided herein is a platform for self-curated single source of truth about the contact or profile of an individual having a matching system and having a system for performing validation. In embodiments, provided herein is a platform for self-curated single source of truth about the contact or profile of an individual having a matching system and having a system for performing automated synchronization of contact information. In embodiments, provided herein is a platform for self-curated single source of truth about the contact or profile of an individual having a matching system and having a system configured to facilitate blocking and managing of invite permissions. In embodiments, provided herein is a platform for self-curated single source of truth about the contact or profile of an individual having a matching system and having a connection system configured to connect users via search.

Methods for Resolution of Differences (Inbound and Outbound)

In embodiments, provided herein is a platform for self-curated single source of truth about the contact or profile of an individual having a system for resolving differences. In embodiments, provided herein is a platform for self-curated single source of truth about the contact or profile of an individual having a system for resolving differences and having a system for managing jurisdiction-based privacy domains. In embodiments, provided herein is a platform for self-curated single source of truth about the contact or profile of an individual having a system for resolving differences and having a similarity and/or clustering system. In embodiments, provided herein is a platform for self-curated single source of truth about the contact or profile of an individual having a system for resolving differences and having a plurality of models and structures for contact data. In embodiments, provided herein is a platform for self-curated single source of truth about the contact or profile of an individual having a system for resolving differences and having an e-commerce login/checkout ID control system. In embodiments, provided herein is a platform for self-curated single source of truth about the contact or profile of an individual having a system for resolving differences and having a host interface system. In embodiments, provided herein is a platform for self-curated single source of truth about the contact or profile of an individual having a system for resolving differences and having an incentives system configured to provide incentives for encouraging adoption and/or expansion. In embodiments, provided herein is a platform for self-curated single source of truth about the contact or profile of an individual having a system for resolving differences and having a license management system. In embodiments, provided herein is a platform for self-curated single source of truth about the contact or profile of an individual having a system for resolving differences and having a calendar system configured to organize calendars and tasks of users by identity and relevant network. In embodiments, provided herein is a platform for self-curated single source of truth about the contact or profile of an individual having a system for resolving differences and having a policy violation management system. In embodiments, provided herein is a platform for self-curated single source of truth about the contact or profile of an individual having a system for resolving differences and having a system for facilitating granular self-curation of identity via multiple identities and profiles. In embodiments, provided herein is a platform for self-curated single source of truth about the contact or profile of an individual having a system for resolving differences and having a location factors system. In embodiments, provided herein is a platform for self-curated single source of truth about the contact or profile of an individual having a system for resolving differences and having a system for performing outbound versus inbound contact management. In embodiments, provided herein is a platform for self-curated single source of truth about the contact or profile of an individual having a system for resolving differences and having a QR code system. In embodiments, provided herein is a platform for self-curated single source of truth about the contact or profile of an individual having a system for resolving differences and having a system configured to facilitate owner-controlled utilization of self-curated contact information including permission setting by use case. In embodiments, provided herein is a platform for self-curated single source of truth about the contact or profile of an individual having a system for resolving differences and having a system for performing wallets and crypto/blockchain infrastructure. In embodiments, provided herein is a platform for self-curated single source of truth about the contact or profile of an individual having a system for resolving differences and having a system for performing persistent, self-curated contact and profile information of a user. In embodiments, provided herein is a platform for self-curated single source of truth about the contact or profile of an individual having a system for resolving differences and having a system configured to score and grade quality of contact information. In embodiments, provided herein is a platform for self-curated single source of truth about the contact or profile of an individual having a system for resolving differences and having a system for integrating with self-curated single source of truth about the contact or profile of an individual system. In embodiments, provided herein is a platform for self-curated single source of truth about the contact or profile of an individual having a system for resolving differences and having a connection suggestion system configured to perform scoring of backgrounds and identifiers. In embodiments, provided herein is a platform for self-curated single source of truth about the contact or profile of an individual having a system for resolving differences and having a search function system. In embodiments, provided herein is a platform for self-curated single source of truth about the contact or profile of an individual having a system for resolving differences and having an identity management and digital identity ownership system. In embodiments, provided herein is a platform for self-curated single source of truth about the contact or profile of an individual having a system for resolving differences and having a systems integration system. In embodiments, provided herein is a platform for self-curated single source of truth about the contact or profile of an individual having a system for resolving differences and having a system for performing "token" or other more unique ways to identify me. In embodiments, provided herein is a platform for self-curated single source of truth about the contact or profile of an individual having a system for resolving differences and having a system for performing user-controlled/sender-controlled contact or profile data object. In embodiments, provided herein is a platform for self-curated single source of truth about the contact or profile of an individual having a system for resolving differences and having a plurality of tools for managing contacts and profiles. In embodiments, provided herein is a platform for self-curated single source of truth about the contact or profile of an individual having a system for resolving differences and having a system configured to facilitate individual self-curation of contact information. In embodiments, provided herein is a platform for self-curated single source of truth about the contact or profile of an individual having a system for resolving differences and having a user interface. In embodiments, provided herein is a platform for self-curated single source of truth about the contact or profile of an individual having a system for resolving differences and having a system configured to facilitate split control of personal-level and enterprise-level contact information. In embodiments, provided herein is a platform for self-curated single source of truth about the contact or profile of an individual having a system for resolving differences and having a system configured to facilitate user-controlled sale of contact information. In embodiments, provided herein is a platform for self-curated single source of truth about the contact or profile of an individual having a system for resolving differences and having a system for performing validation. In embodiments, provided herein is a platform for self-curated single source of truth about the contact or profile of an individual having a system for resolving differences and having a system for performing automated synchronization of contact information. In embodiments, provided herein is a platform for self-curated single source of truth about the contact or profile of an individual having a system for resolving differences and having a system configured to facilitate blocking and managing of invite permissions. In embodiments, provided herein is a platform for self-curated single source of truth about the contact or profile of an individual having a system for resolving differences and having a connection system configured to connect users via search.

Jurisdiction-Based Privacy Domains

In embodiments, provided herein is a platform for self-curated single source of truth about the contact or profile of an individual having a system for managing jurisdiction-based privacy domains. In embodiments, provided herein is a platform for self-curated single source of truth about the contact or profile of an individual having a system for managing jurisdiction-based privacy domains and having a similarity and/or clustering system. In embodiments, provided herein is a platform for self-curated single source of truth about the contact or profile of an individual having a system for managing jurisdiction-based privacy domains and having a plurality of models and structures for contact data. In embodiments, provided herein is a platform for self-curated single source of truth about the contact or profile of an individual having a system for managing jurisdiction-based privacy domains and having an e-commerce login/checkout ID control system. In embodiments, provided herein is a platform for self-curated single source of truth about the contact or profile of an individual having a system for managing jurisdiction-based privacy domains and having a host interface system. In embodiments, provided herein is a platform for self-curated single source of truth about the contact or profile of an individual having a system for managing jurisdiction-based privacy domains and having an incentives system configured to provide incentives for encouraging adoption and/or expansion. In embodiments, provided herein is a platform for self-curated single source of truth about the contact or profile of an individual having a system for managing jurisdiction-based privacy domains and having a license management system. In embodiments, provided herein is a platform for self-curated single source of truth about the contact or profile of an individual having a system for managing jurisdiction-based privacy domains and having a calendar system configured to organize calendars and tasks of users by identity and relevant network. In embodiments, provided herein is a platform for self-curated single source of truth about the contact or profile of an individual having a system for managing jurisdiction-based privacy domains and having a policy violation management system. In embodiments, provided herein is a platform for self-curated single source of truth about the contact or profile of an individual having a system for managing jurisdiction-based privacy domains and having a system for facilitating granular self-curation of identity via multiple identities and profiles. In embodiments, provided herein is a platform for self-curated single source of truth about the contact or profile of an individual having a system for managing jurisdiction-based privacy domains and having a location factors system. In embodiments, provided herein is a platform for self-curated single source of truth about the contact or profile of an individual having a system for managing jurisdiction-based privacy domains and having a system for performing outbound versus inbound contact management. In embodiments, provided herein is a platform for self-curated single source of truth about the contact or profile of an individual having a system for managing jurisdiction-based privacy domains and having a QR code system. In embodiments, provided herein is a platform for self-curated single source of truth about the contact or profile of an individual having a system for managing jurisdiction-based privacy domains and having a system configured to facilitate owner-controlled utilization of self-curated contact information including permission setting by use case. In embodiments, provided herein is a platform for self-curated single source of truth about the contact or profile of an individual having a system for managing jurisdiction-based privacy domains and having a system for performing wallets and crypto/blockchain infrastructure. In embodiments, provided herein is a platform for self-curated single source of truth about the contact or profile of an individual having a system for managing jurisdiction-based privacy domains and having a system for performing persistent, self-curated contact and profile information of a user. In embodiments, provided herein is a platform for self-curated single source of truth about the contact or profile of an individual having a system for managing jurisdiction-based privacy domains and having a system configured to score and grade quality of contact information. In embodiments, provided herein is a platform for self-curated single source of truth about the contact or profile of an individual having a system for managing jurisdiction-based privacy domains and having a system for integrating with self-curated single source of truth about the contact or profile of an individual system. In embodiments, provided herein is a platform for self-curated single source of truth about the contact or profile of an individual having a system for managing jurisdiction-based privacy domains and having a connection suggestion system configured to perform scoring of backgrounds and identifiers. In embodiments, provided herein is a platform for self-curated single source of truth about the contact or profile of an individual having a system for managing jurisdiction-based privacy domains and having a search function system. In embodiments, provided herein is a platform for self-curated single source of truth about the contact or profile of an individual having a system for managing jurisdiction-based privacy domains and having an identity management and digital identity ownership system. In embodiments, provided herein is a platform for self-curated single source of truth about the contact or profile of an individual having a system for managing jurisdiction-based privacy domains and having a systems integration system. In embodiments, provided herein is a platform for self-curated single source of truth about the contact or profile of an individual having a system for managing jurisdiction-based privacy domains and having a system for performing "token" or other more unique ways to identify me. In embodiments, provided herein is a platform for self-curated single source of truth about the contact or profile of an individual having a system for managing jurisdiction-based privacy domains and having a system for performing user-controlled/sender-controlled contact or profile data object. In embodiments, provided herein is a platform for self-curated single source of truth about the contact or profile of an individual having a system for managing jurisdiction-based privacy domains and having a plurality of tools for managing contacts and profiles. In embodiments, provided herein is a platform for self-curated single source of truth about the contact or profile of an individual having a system for managing jurisdiction-based privacy domains and having a system configured to facilitate individual self-curation of contact information. In embodiments, provided herein is a platform for self-curated single source of truth about the contact or profile of an individual having a system for managing jurisdiction-based privacy domains and having a user interface. In embodiments, provided herein is a platform for self-curated single source of truth about the contact or profile of an individual having a system for managing jurisdiction-based privacy domains and having a system configured to facilitate split control of personal-level and enterprise-level contact information. In embodiments, provided herein is a platform for self-curated single source of truth about the contact or profile of an individual having a system for managing jurisdiction-based privacy domains and having a system configured to facilitate user-controlled sale of contact information. In embodiments, provided herein is a platform for self-curated single source of truth about the contact or profile of an individual having a system for managing jurisdiction-based privacy domains and having a system for performing validation. In embodiments, provided herein is a platform for self-curated single source of truth about the contact or profile of an individual having a system for managing jurisdiction-based privacy domains and having a system for performing automated synchronization of contact information. In embodiments, provided herein is a platform for self-curated single source of truth about the contact or profile of an individual having a system for managing jurisdiction-based privacy domains and having a system configured to facilitate blocking and managing of invite permissions. In embodiments, provided herein is a platform for self-curated single source of truth about the contact or profile of an individual having a system for managing jurisdiction-based privacy domains and having a connection system configured to connect users via search.

Similarity and Clustering Systems

In embodiments, provided herein is a platform for self-curated single source of truth about the contact or profile of an individual having a similarity and/or clustering system. In embodiments, provided herein is a platform for self-curated single source of truth about the contact or profile of an individual having a similarity and/or clustering system and having a plurality of models and structures for contact data. In embodiments, provided herein is a platform for self-curated single source of truth about the contact or profile of an individual having a similarity and/or clustering system and having an e-commerce login/checkout ID control system. In embodiments, provided herein is a platform for self-curated single source of truth about the contact or profile of an individual having a similarity and/or clustering system and having a host interface system. In embodiments, provided herein is a platform for self-curated single source of truth about the contact or profile of an individual having a similarity and/or clustering system and having an incentives system configured to provide incentives for encouraging adoption and/or expansion. In embodiments, provided herein is a platform for self-curated single source of truth about the contact or profile of an individual having a similarity and/or clustering system and having a license management system. In embodiments, provided herein is a platform for self-curated single source of truth about the contact or profile of an individual having a similarity and/or clustering system and having a calendar system configured to organize calendars and tasks of users by identity and relevant network. In embodiments, provided herein is a platform for self-curated single source of truth about the contact or profile of an individual having a similarity and/or clustering system and having a policy violation management system. In embodiments, provided herein is a platform for self-curated single source of truth about the contact or profile of an individual having a similarity and/or clustering system and having a system for facilitating granular self-curation of identity via multiple identities and profiles. In embodiments, provided herein is a platform for self-curated single source of truth about the contact or profile of an individual having a similarity and/or clustering system and having a location factors system. In embodiments, provided herein is a platform for self-curated single source of truth about the contact or profile of an individual having a similarity and/or clustering system and having a system for performing outbound versus inbound contact management. In embodiments, provided herein is a platform for self-curated single source of truth about the contact or profile of an individual having a similarity and/or clustering system and having a QR code system. In embodiments, provided herein is a platform for self-curated single source of truth about the contact or profile of an individual having a similarity and/or clustering system and having a system configured to facilitate owner-controlled utilization of self-curated contact information including permission setting by use case. In embodiments, provided herein is a platform for self-curated single source of truth about the contact or profile of an individual having a similarity and/or clustering system and having a system for performing wallets and crypto/blockchain infrastructure. In embodiments, provided herein is a platform for self-curated single source of truth about the contact or profile of an individual having a similarity and/or clustering system and having a system for performing persistent, self-curated contact and profile information of a user. In embodiments, provided herein is a platform for self-curated single source of truth about the contact or profile of an individual having a similarity and/or clustering system and having a system configured to score and grade quality of contact information. In embodiments, provided herein is a platform for self-curated single source of truth about the contact or profile of an individual having a similarity and/or clustering system and having a system for integrating with self-curated single source of truth about the contact or profile of an individual system. In embodiments, provided herein is a platform for self-curated single source of truth about the contact or profile of an individual having a similarity and/or clustering system and having a connection suggestion system configured to perform scoring of backgrounds and identifiers. In embodiments, provided herein is a platform for self-curated single source of truth about the contact or profile of an individual having a similarity and/or clustering system and having a search function system. In embodiments, provided herein is a platform for self-curated single source of truth about the contact or profile of an individual having a similarity and/or clustering system and having an identity management and digital identity ownership system. In embodiments, provided herein is a platform for self-curated single source of truth about the contact or profile of an individual having a similarity and/or clustering system and having a systems integration system. In embodiments, provided herein is a platform for self-curated single source of truth about the contact or profile of an individual having a similarity and/or clustering system and having a system for performing "token" or other more unique ways to identify me. In embodiments, provided herein is a platform for self-curated single source of truth about the contact or profile of an individual having a similarity and/or clustering system and having a system for performing user-controlled/sender-controlled contact or profile data object. In embodiments, provided herein is a platform for self-curated single source of truth about the contact or profile of an individual having a similarity and/or clustering system and having a plurality of tools for managing contacts and profiles. In embodiments, provided herein is a platform for self-curated single source of truth about the contact or profile of an individual having a similarity and/or clustering system and having a system configured to facilitate individual self-curation of contact information. In embodiments, provided herein is a platform for self-curated single source of truth about the contact or profile of an individual having a similarity and/or clustering system and having a user interface. In embodiments, provided herein is a platform for self-curated single source of truth about the contact or profile of an individual having a similarity and/or clustering system and having a system configured to facilitate split control of personal-level and enterprise-level contact information. In embodiments, provided herein is a platform for self-curated single source of truth about the contact or profile of an individual having a similarity and/or clustering system and having a system configured to facilitate user-controlled sale of contact information. In embodiments, provided herein is a platform for self-curated single source of truth about the contact or profile of an individual having a similarity and/or clustering system and having a system for performing validation. In embodiments, provided herein is a platform for self-curated single source of truth about the contact or profile of an individual having a similarity and/or clustering system and having a system for performing automated synchronization of contact information. In embodiments, provided herein is a platform for self-curated single source of truth about the contact or profile of an individual having a similarity and/or clustering system and having a system configured to facilitate blocking and managing of invite permissions. In embodiments, provided herein is a platform for self-curated single source of truth about the contact or profile of an individual having a similarity and/or clustering system and having a connection system configured to connect users via search.

Data Models and Structures for Contact Data

In embodiments, provided herein is a platform for self-curated single source of truth about the contact or profile of an individual having a plurality of models and structures for contact data. In embodiments, provided herein is a platform for self-curated single source of truth about the contact or profile of an individual having a plurality of models and structures for contact data and having an e-commerce login/checkout ID control system. In embodiments, provided herein is a platform for self-curated single source of truth about the contact or profile of an individual having a plurality of models and structures for contact data and having a host interface system. In embodiments, provided herein is a platform for self-curated single source of truth about the contact or profile of an individual having a plurality of models and structures for contact data and having an incentives system configured to provide incentives for encouraging adoption and/or expansion. In embodiments, provided herein is a platform for self-curated single source of truth about the contact or profile of an individual having a plurality of models and structures for contact data and having a license management system. In embodiments, provided herein is a platform for self-curated single source of truth about the contact or profile of an individual having a plurality of models and structures for contact data and having a calendar system configured to organize calendars and tasks of users by identity and relevant network. In embodiments, provided herein is a platform for self-curated single source of truth about the contact or profile of an individual having a plurality of models and structures for contact data and having a policy violation management system. In embodiments, provided herein is a platform for self-curated single source of truth about the contact or profile of an individual having a plurality of models and structures for contact data and having a system for facilitating granular self-curation of identity via multiple identities and profiles. In embodiments, provided herein is a platform for self-curated single source of truth about the contact or profile of an individual having a plurality of models and structures for contact data and having a location factors system. In embodiments, provided herein is a platform for self-curated single source of truth about the contact or profile of an individual having a plurality of models and structures for contact data and having a system for performing outbound versus inbound contact management. In embodiments, provided herein is a platform for self-curated single source of truth about the contact or profile of an individual having a plurality of models and structures for contact data and having a QR code system. In embodiments, provided herein is a platform for self-curated single source of truth about the contact or profile of an individual having a plurality of models and structures for contact data and having a system configured to facilitate owner-controlled utilization of self-curated contact information including permission setting by use case. In embodiments, provided herein is a platform for self-curated single source of truth about the contact or profile of an individual having a plurality of models and structures for contact data and having a system for performing wallets and crypto/blockchain infrastructure. In embodiments, provided herein is a platform for self-curated single source of truth about the contact or profile of an individual having a plurality of models and structures for contact data and having a system for performing persistent, self-curated contact and profile information of a user. In embodiments, provided herein is a platform for self-curated single source of truth about the contact or profile of an individual having a plurality of models and structures for contact data and having a system configured to score and grade quality of contact information. In embodiments, provided herein is a platform for self-curated single source of truth about the contact or profile of an individual having a plurality of models and structures for contact data and having a system for integrating with self-curated single source of truth about the contact or profile of an individual system. In embodiments, provided herein is a platform for self-curated single source of truth about the contact or profile of an individual having a plurality of models and structures for contact data and having a connection suggestion system configured to perform scoring of backgrounds and identifiers. In embodiments, provided herein is a platform for self-curated single source of truth about the contact or profile of an individual having a plurality of models and structures for contact data and having a search function system. In embodiments, provided herein is a platform for self-curated single source of truth about the contact or profile of an individual having a plurality of models and structures for contact data and having an identity management and digital identity ownership system. In embodiments, provided herein is a platform for self-curated single source of truth about the contact or profile of an individual having a plurality of models and structures for contact data and having a systems integration system. In embodiments, provided herein is a platform for self-curated single source of truth about the contact or profile of an individual having a plurality of models and structures for contact data and having a system for performing "token" or other more unique ways to identify me. In embodiments, provided herein is a platform for self-curated single source of truth about the contact or profile of an individual having a plurality of models and structures for contact data and having a system for performing user-controlled/sender-controlled contact or profile data object. In embodiments, provided herein is a platform for self-curated single source of truth about the contact or profile of an individual having a plurality of models and structures for contact data and having a plurality of tools for managing contacts and profiles. In embodiments, provided herein is a platform for self-curated single source of truth about the contact or profile of an individual having a plurality of models and structures for contact data and having a system configured to facilitate individual self-curation of contact information. In embodiments, provided herein is a platform for self-curated single source of truth about the contact or profile of an individual having a plurality of models and structures for contact data and having a user interface. In embodiments, provided herein is a platform for self-curated single source of truth about the contact or profile of an individual having a plurality of models and structures for contact data and having a system configured to facilitate split control of personal-level and enterprise-level contact information. In embodiments, provided herein is a platform for self-curated single source of truth about the contact or profile of an individual having a plurality of models and structures for contact data and having a system configured to facilitate user-controlled sale of contact information. In embodiments, provided herein is a platform for self-curated single source of truth about the contact or profile of an individual having a plurality of models and structures for contact data and having a system for performing validation. In embodiments, provided herein is a platform for self-curated single source of truth about the contact or profile of an individual having a plurality of models and structures for contact data and having a system for performing automated synchronization of contact information. In embodiments, provided herein is a platform for self-curated single source of truth about the contact or profile of an individual having a plurality of models and structures for contact data and having a system configured to facilitate blocking and managing of invite permissions. In embodiments, provided herein is a platform for self-curated single source of truth about the contact or profile of an individual having a plurality of models and structures for contact data and having a connection system configured to connect users via search.

E-Commerce Login/Checkout ID Control

In embodiments, provided herein is a platform for self-curated single source of truth about the contact or profile of an individual having an e-commerce login/checkout ID control system. In embodiments, provided herein is a platform for self-curated single source of truth about the contact or profile of an individual having an e-commerce login/checkout ID control system and having a host interface system. In embodiments, provided herein is a platform for self-curated single source of truth about the contact or profile of an individual having an e-commerce login/checkout ID control system and having an incentives system configured to provide incentives for encouraging adoption and/or expansion. In embodiments, provided herein is a platform for self-curated single source of truth about the contact or profile of an individual having an e-commerce login/checkout ID control system and having a license management system. In embodiments, provided herein is a platform for self-curated single source of truth about the contact or profile of an individual having an e-commerce login/checkout ID control system and having a calendar system configured to organize calendars and tasks of users by identity and relevant network. In embodiments, provided herein is a platform for self-curated single source of truth about the contact or profile of an individual having an e-commerce login/checkout ID control system and having a policy violation management system. In embodiments, provided herein is a platform for self-curated single source of truth about the contact or profile of an individual having an e-commerce login/checkout ID control system and having a system for facilitating granular self-curation of identity via multiple identities and profiles. In embodiments, provided herein is a platform for self-curated single source of truth about the contact or profile of an individual having an e-commerce login/checkout ID control system and having a location factors system. In embodiments, provided herein is a platform for self-curated single source of truth about the contact or profile of an individual having an e-commerce login/checkout ID control system and having a system for performing outbound versus inbound contact management. In embodiments, provided herein is a platform for self-curated single source of truth about the contact or profile of an individual having an e-commerce login/checkout ID control system and having a QR code system. In embodiments, provided herein is a platform for self-curated single source of truth about the contact or profile of an individual having an e-commerce login/checkout ID control system and having a system configured to facilitate owner-controlled utilization of self-curated contact information including permission setting by use case. In embodiments, provided herein is a platform for self-curated single source of truth about the contact or profile of an individual having an e-commerce login/checkout ID control system and having a system for performing wallets and crypto/blockchain infrastructure. In embodiments, provided herein is a platform for self-curated single source of truth about the contact or profile of an individual having an e-commerce login/checkout ID control system and having a system for performing persistent, self-curated contact and profile information of a user. In embodiments, provided herein is a platform for self-curated single source of truth about the contact or profile of an individual having an e-commerce login/checkout ID control system and having a system configured to score and grade quality of contact information. In embodiments, provided herein is a platform for self-curated single source of truth about the contact or profile of an individual having an e-commerce login/checkout ID control system and having a system for integrating with self-curated single source of truth about the contact or profile of an individual system. In embodiments, provided herein is a platform for self-curated single source of truth about the contact or profile of an individual having an e-commerce login/checkout ID control system and having a connection suggestion system configured to perform scoring of backgrounds and identifiers. In embodiments, provided herein is a platform for self-curated single source of truth about the contact or profile of an individual having an e-commerce login/checkout ID control system and having a search function system. In embodiments, provided herein is a platform for self-curated single source of truth about the contact or profile of an individual having an c-commerce login/checkout ID control system and having an identity management and digital identity ownership system. In embodiments, provided herein is a platform for self-curated single source of truth about the contact or profile of an individual having an e-commerce login/checkout ID control system and having a systems integration system. In embodiments, provided herein is a platform for self-curated single source of truth about the contact or profile of an individual having an e-commerce login/checkout ID control system and having a system for performing "token" or other more unique ways to identify me. In embodiments, provided herein is a platform for self-curated single source of truth about the contact or profile of an individual having an e-commerce login/checkout ID control system and having a system for performing user-controlled/sender-controlled contact or profile data object. In embodiments, provided herein is a platform for self-curated single source of truth about the contact or profile of an individual having an e-commerce login/checkout ID control system and having a plurality of tools for managing contacts and profiles. In embodiments, provided herein is a platform for self-curated single source of truth about the contact or profile of an individual having an e-commerce login/checkout ID control system and having a system configured to facilitate individual self-curation of contact information. In embodiments, provided herein is a platform for self-curated single source of truth about the contact or profile of an individual having an e-commerce login/checkout ID control system and having a user interface. In embodiments, provided herein is a platform for self-curated single source of truth about the contact or profile of an individual having an e-commerce login/checkout ID control system and having a system configured to facilitate split control of personal-level and enterprise-level contact information. In embodiments, provided herein is a platform for self-curated single source of truth about the contact or profile of an individual having an e-commerce login/checkout ID control system and having a system configured to facilitate user-controlled sale of contact information. In embodiments, provided herein is a platform for self-curated single source of truth about the contact or profile of an individual having an e-commerce login/checkout ID control system and having a system for performing validation. In embodiments, provided herein is a platform for self-curated single source of truth about the contact or profile of an individual having an e-commerce login/checkout ID control system and having a system for performing automated synchronization of contact information. In embodiments, provided herein is a platform for self-curated single source of truth about the contact or profile of an individual having an e-commerce login/checkout ID control system and having a system configured to facilitate blocking and managing of invite permissions. In embodiments, provided herein is a platform for self-curated single source of truth about the contact or profile of an individual having an e-commerce login/checkout ID control system and having a connection system configured to connect users via search.

Host/Admin Interfaces and Systems

In embodiments, provided herein is a platform for self-curated single source of truth about the contact or profile of an individual having a host interface system. In embodiments, provided herein is a platform for self-curated single source of truth about the contact or profile of an individual having a host interface system and having an incentives system configured to provide incentives for encouraging adoption and/or expansion. In embodiments, provided herein is a platform for self-curated single source of truth about the contact or profile of an individual having a host interface system and having a license management system. In embodiments, provided herein is a platform for self-curated single source of truth about the contact or profile of an individual having a host interface system and having a calendar system configured to organize calendars and tasks of users by identity and relevant network. In embodiments, provided herein is a platform for self-curated single source of truth about the contact or profile of an individual having a host interface system and having a policy violation management system. In embodiments, provided herein is a platform for self-curated single source of truth about the contact or profile of an individual having a host interface system and having a system for facilitating granular self-curation of identity via multiple identities and profiles. In embodiments, provided herein is a platform for self-curated single source of truth about the contact or profile of an individual having a host interface system and having a location factors system. In embodiments, provided herein is a platform for self-curated single source of truth about the contact or profile of an individual having a host interface system and having a system for performing outbound versus inbound contact management. In embodiments, provided herein is a platform for self-curated single source of truth about the contact or profile of an individual having a host interface system and having a QR code system. In embodiments, provided herein is a platform for self-curated single source of truth about the contact or profile of an individual having a host interface system and having a system configured to facilitate owner-controlled utilization of self-curated contact information including permission setting by use case. In embodiments, provided herein is a platform for self-curated single source of truth about the contact or profile of an individual having a host interface system and having a system for performing wallets and crypto/blockchain infrastructure. In embodiments, provided herein is a platform for self-curated single source of truth about the contact or profile of an individual having a host interface system and having a system for performing persistent, self-curated contact and profile information of a user. In embodiments, provided herein is a platform for self-curated single source of truth about the contact or profile of an individual having a host interface system and having a system configured to score and grade quality of contact information. In embodiments, provided herein is a platform for self-curated single source of truth about the contact or profile of an individual having a host interface system and having a system for integrating with self-curated single source of truth about the contact or profile of an individual system. In embodiments, provided herein is a platform for self-curated single source of truth about the contact or profile of an individual having a host interface system and having a connection suggestion system configured to perform scoring of backgrounds and identifiers. In embodiments, provided herein is a platform for self-curated single source of truth about the contact or profile of an individual having a host interface system and having a search function system. In embodiments, provided herein is a platform for self-curated single source of truth about the contact or profile of an individual having a host interface system and having an identity management and digital identity ownership system. In embodiments, provided herein is a platform for self-curated single source of truth about the contact or profile of an individual having a host interface system and having a systems integration system. In embodiments, provided herein is a platform for self-curated single source of truth about the contact or profile of an individual having a host interface system and having a system for performing "token" or other more unique ways to identify me. In embodiments, provided herein is a platform for self-curated single source of truth about the contact or profile of an individual having a host interface system and having a system for performing user-controlled/sender-controlled contact or profile data object. In embodiments, provided herein is a platform for self-curated single source of truth about the contact or profile of an individual having a host interface system and having a plurality of tools for managing contacts and profiles. In embodiments, provided herein is a platform for self-curated single source of truth about the contact or profile of an individual having a host interface system and having a system configured to facilitate individual self-curation of contact information. In embodiments, provided herein is a platform for self-curated single source of truth about the contact or profile of an individual having a host interface system and having a user interface. In embodiments, provided herein is a platform for self-curated single source of truth about the contact or profile of an individual having a host interface system and having a system configured to facilitate split control of personal-level and enterprise-level contact information. In embodiments, provided herein is a platform for self-curated single source of truth about the contact or profile of an individual having a host interface system and having a system configured to facilitate user-controlled sale of contact information. In embodiments, provided herein is a platform for self-curated single source of truth about the contact or profile of an individual having a host interface system and having a system for performing validation. In embodiments, provided herein is a platform for self-curated single source of truth about the contact or profile of an individual having a host interface system and having a system for performing automated synchronization of contact information. In embodiments, provided herein is a platform for self-curated single source of truth about the contact or profile of an individual having a host interface system and having a system configured to facilitate blocking and managing of invite permissions. In embodiments, provided herein is a platform for self-curated single source of truth about the contact or profile of an individual having a host interface system and having a connection system configured to connect users via search.

Incentives for Encouraging Adoption/Expansion

In embodiments, provided herein is a platform for self-curated single source of truth about the contact or profile of an individual having an incentives system configured to provide incentives for encouraging adoption and/or expansion. In embodiments, provided herein is a platform for self-curated single source of truth about the contact or profile of an individual having an incentives system configured to provide incentives for encouraging adoption and/or expansion and having a license management system. In embodiments, provided herein is a platform for self-curated single source of truth about the contact or profile of an individual having an incentives system configured to provide incentives for encouraging adoption and/or expansion and having a calendar system configured to organize calendars and tasks of users by identity and relevant network. In embodiments, provided herein is a platform for self-curated single source of truth about the contact or profile of an individual having an incentives system configured to provide incentives for encouraging adoption and/or expansion and having a policy violation management system. In embodiments, provided herein is a platform for self-curated single source of truth about the contact or profile of an individual having an incentives system configured to provide incentives for encouraging adoption and/or expansion and having a system for facilitating granular self-curation of identity via multiple identities and profiles. In embodiments, provided herein is a platform for self-curated single source of truth about the contact or profile of an individual having an incentives system configured to provide incentives for encouraging adoption and/or expansion and having a location factors system. In embodiments, provided herein is a platform for self-curated single source of truth about the contact or profile of an individual having an incentives system configured to provide incentives for encouraging adoption and/or expansion and having a system for performing outbound versus inbound contact management. In embodiments, provided herein is a platform for self-curated single source of truth about the contact or profile of an individual having an incentives system configured to provide incentives for encouraging adoption and/or expansion and having a QR code system. In embodiments, provided herein is a platform for self-curated single source of truth about the contact or profile of an individual having an incentives system configured to provide incentives for encouraging adoption and/or expansion and having a system configured to facilitate owner-controlled utilization of self-curated contact information including permission setting by use case. In embodiments, provided herein is a platform for self-curated single source of truth about the contact or profile of an individual having an incentives system configured to provide incentives for encouraging adoption and/or expansion and having a system for performing wallets and crypto/blockchain infrastructure. In embodiments, provided herein is a platform for self-curated single source of truth about the contact or profile of an individual having an incentives system configured to provide incentives for encouraging adoption and/or expansion and having a system for performing persistent, self-curated contact and profile information of a user. In embodiments, provided herein is a platform for self-curated single source of truth about the contact or profile of an individual having an incentives system configured to provide incentives for encouraging adoption and/or expansion and having a system configured to score and grade quality of contact information. In embodiments, provided herein is a platform for self-curated single source of truth about the contact or profile of an individual having an incentives system configured to provide incentives for encouraging adoption and/or expansion and having a system for integrating with self-curated single source of truth about the contact or profile of an individual system. In embodiments, provided herein is a platform for self-curated single source of truth about the contact or profile of an individual having an incentives system configured to provide incentives for encouraging adoption and/or expansion and having a connection suggestion system configured to perform scoring of backgrounds and identifiers. In embodiments, provided herein is a platform for self-curated single source of truth about the contact or profile of an individual having an incentives system configured to provide incentives for encouraging adoption and/or expansion and having a search function system. In embodiments, provided herein is a platform for self-curated single source of truth about the contact or profile of an individual having an incentives system configured to provide incentives for encouraging adoption and/or expansion and having an identity management and digital identity ownership system. In embodiments, provided herein is a platform for self-curated single source of truth about the contact or profile of an individual having an incentives system configured to provide incentives for encouraging adoption and/or expansion and having a systems integration system. In embodiments, provided herein is a platform for self-curated single source of truth about the contact or profile of an individual having an incentives system configured to provide incentives for encouraging adoption and/or expansion and having a system for performing "token" or other more unique ways to identify me. In embodiments, provided herein is a platform for self-curated single source of truth about the contact or profile of an individual having an incentives system configured to provide incentives for encouraging adoption and/or expansion and having a system for performing user-controlled/sender-controlled contact or profile data object. In embodiments, provided herein is a platform for self-curated single source of truth about the contact or profile of an individual having an incentives system configured to provide incentives for encouraging adoption and/or expansion and having a plurality of tools for managing contacts and profiles. In embodiments, provided herein is a platform for self-curated single source of truth about the contact or profile of an individual having an incentives system configured to provide incentives for encouraging adoption and/or expansion and having a system configured to facilitate individual self-curation of contact information. In embodiments, provided herein is a platform for self-curated single source of truth about the contact or profile of an individual having an incentives system configured to provide incentives for encouraging adoption and/or expansion and having a user interface. In embodiments, provided herein is a platform for self-curated single source of truth about the contact or profile of an individual having an incentives system configured to provide incentives for encouraging adoption and/or expansion and having a system configured to facilitate split control of personal-level and enterprise-level contact information. In embodiments, provided herein is a platform for self-curated single source of truth about the contact or profile of an individual having an incentives system configured to provide incentives for encouraging adoption and/or expansion and having a system configured to facilitate user-controlled sale of contact information. In embodiments, provided herein is a platform for self-curated single source of truth about the contact or profile of an individual having an incentives system configured to provide incentives for encouraging adoption and/or expansion and having a system for performing validation. In embodiments, provided herein is a platform for self-curated single source of truth about the contact or profile of an individual having an incentives system configured to provide incentives for encouraging adoption and/or expansion and having a system for performing automated synchronization of contact information. In embodiments, provided herein is a platform for self-curated single source of truth about the contact or profile of an individual having an incentives system configured to provide incentives for encouraging adoption and/or expansion and having a system configured to facilitate blocking and managing of invite permissions. In embodiments, provided herein is a platform for self-curated single source of truth about the contact or profile of an individual having an incentives system configured to provide incentives for encouraging adoption and/or expansion and having a connection system configured to connect users via search.

License Management

In embodiments, provided herein is a platform for self-curated single source of truth about the contact or profile of an individual having a license management system. In embodiments, provided herein is a platform for self-curated single source of truth about the contact or profile of an individual having a license management system and having a calendar system configured to organize calendars and tasks of users by identity and relevant network. In embodiments, provided herein is a platform for self-curated single source of truth about the contact or profile of an individual having a license management system and having a policy violation management system. In embodiments, provided herein is a platform for self-curated single source of truth about the contact or profile of an individual having a license management system and having a system for facilitating granular self-curation of identity via multiple identities and profiles. In embodiments, provided herein is a platform for self-curated single source of truth about the contact or profile of an individual having a license management system and having a location factors system. In embodiments, provided herein is a platform for self-curated single source of truth about the contact or profile of an individual having a license management system and having a system for performing outbound versus inbound contact management. In embodiments, provided herein is a platform for self-curated single source of truth about the contact or profile of an individual having a license management system and having a QR code system. In embodiments, provided herein is a platform for self-curated single source of truth about the contact or profile of an individual having a license management system and having a system configured to facilitate owner-controlled utilization of self-curated contact information including permission setting by use case. In embodiments, provided herein is a platform for self-curated single source of truth about the contact or profile of an individual having a license management system and having a system for performing wallets and crypto/blockchain infrastructure. In embodiments, provided herein is a platform for self-curated single source of truth about the contact or profile of an individual having a license management system and having a system for performing persistent, self-curated contact and profile information of a user. In embodiments, provided herein is a platform for self-curated single source of truth about the contact or profile of an individual having a license management system and having a system configured to score and grade quality of contact information. In embodiments, provided herein is a platform for self-curated single source of truth about the contact or profile of an individual having a license management system and having a system for integrating with self-curated single source of truth about the contact or profile of an individual system. In embodiments, provided herein is a platform for self-curated single source of truth about the contact or profile of an individual having a license management system and having a connection suggestion system configured to perform scoring of backgrounds and identifiers. In embodiments, provided herein is a platform for self-curated single source of truth about the contact or profile of an individual having a license management system and having a search function system. In embodiments, provided herein is a platform for self-curated single source of truth about the contact or profile of an individual having a license management system and having an identity management and digital identity ownership system. In embodiments, provided herein is a platform for self-curated single source of truth about the contact or profile of an individual having a license management system and having a systems integration system. In embodiments, provided herein is a platform for self-curated single source of truth about the contact or profile of an individual having a license management system and having a system for performing "token" or other more unique ways to identify me. In embodiments, provided herein is a platform for self-curated single source of truth about the contact or profile of an individual having a license management system and having a system for performing user-controlled/sender-controlled contact or profile data object. In embodiments, provided herein is a platform for self-curated single source of truth about the contact or profile of an individual having a license management system and having a plurality of tools for managing contacts and profiles. In embodiments, provided herein is a platform for self-curated single source of truth about the contact or profile of an individual having a license management system and having a system configured to facilitate individual self-curation of contact information. In embodiments, provided herein is a platform for self-curated single source of truth about the contact or profile of an individual having a license management system and having a user interface. In embodiments, provided herein is a platform for self-curated single source of truth about the contact or profile of an individual having a license management system and having a system configured to facilitate split control of personal-level and enterprise-level contact information. In embodiments, provided herein is a platform for self-curated single source of truth about the contact or profile of an individual having a license management system and having a system configured to facilitate user-controlled sale of contact information. In embodiments, provided herein is a platform for self-curated single source of truth about the contact or profile of an individual having a license management system and having a system for performing validation. In embodiments, provided herein is a platform for self-curated single source of truth about the contact or profile of an individual having a license management system and having a system for performing automated synchronization of contact information. In embodiments, provided herein is a platform for self-curated single source of truth about the contact or profile of an individual having a license management system and having a system configured to facilitate blocking and managing of invite permissions. In embodiments, provided herein is a platform for self-curated single source of truth about the contact or profile of an individual having a license management system and having a connection system configured to connect users via search.

Organization of Calendars and Tasks by Identity and Relevant Network

In embodiments, provided herein is a platform for self-curated single source of truth about the contact or profile of an individual having a calendar system configured to organize calendars and tasks of users by identity and relevant network. In embodiments, provided herein is a platform for self-curated single source of truth about the contact or profile of an individual having a calendar system configured to organize calendars and tasks of users by identity and relevant network and having a policy violation management system. In embodiments, provided herein is a platform for self-curated single source of truth about the contact or profile of an individual having a calendar system configured to organize calendars and tasks of users by identity and relevant network and having a system for facilitating granular self-curation of identity via multiple identities and profiles. In embodiments, provided herein is a platform for self-curated single source of truth about the contact or profile of an individual having a calendar system configured to organize calendars and tasks of users by identity and relevant network and having a location factors system. In embodiments, provided herein is a platform for self-curated single source of truth about the contact or profile of an individual having a calendar system configured to organize calendars and tasks of users by identity and relevant network and having a system for performing outbound versus inbound contact management. In embodiments, provided herein is a platform for self-curated single source of truth about the contact or profile of an individual having a calendar system configured to organize calendars and tasks of users by identity and relevant network and having a QR code system. In embodiments, provided herein is a platform for self-curated single source of truth about the contact or profile of an individual having a calendar system configured to organize calendars and tasks of users by identity and relevant network and having a system configured to facilitate owner-controlled utilization of self-curated contact information including permission setting by use case. In embodiments, provided herein is a platform for self-curated single source of truth about the contact or profile of an individual having a calendar system configured to organize calendars and tasks of users by identity and relevant network and having a system for performing wallets and crypto/blockchain infrastructure. In embodiments, provided herein is a platform for self-curated single source of truth about the contact or profile of an individual having a calendar system configured to organize calendars and tasks of users by identity and relevant network and having a system for performing persistent, self-curated contact and profile information of a user. In embodiments, provided herein is a platform for self-curated single source of truth about the contact or profile of an individual having a calendar system configured to organize calendars and tasks of users by identity and relevant network and having a system configured to score and grade quality of contact information. In embodiments, provided herein is a platform for self-curated single source of truth about the contact or profile of an individual having a calendar system configured to organize calendars and tasks of users by identity and relevant network and having a system for integrating with self-curated single source of truth about the contact or profile of an individual system. In embodiments, provided herein is a platform for self-curated single source of truth about the contact or profile of an individual having a calendar system configured to organize calendars and tasks of users by identity and relevant network and having a connection suggestion system configured to perform scoring of backgrounds and identifiers. In embodiments, provided herein is a platform for self-curated single source of truth about the contact or profile of an individual having a calendar system configured to organize calendars and tasks of users by identity and relevant network and having a search function system. In embodiments, provided herein is a platform for self-curated single source of truth about the contact or profile of an individual having a calendar system configured to organize calendars and tasks of users by identity and relevant network and having an identity management and digital identity ownership system. In embodiments, provided herein is a platform for self-curated single source of truth about the contact or profile of an individual having a calendar system configured to organize calendars and tasks of users by identity and relevant network and having a systems integration system. In embodiments, provided herein is a platform for self-curated single source of truth about the contact or profile of an individual having a calendar system configured to organize calendars and tasks of users by identity and relevant network and having a system for performing "token" or other more unique ways to identify me. In embodiments, provided herein is a platform for self-curated single source of truth about the contact or profile of an individual having a calendar system configured to organize calendars and tasks of users by identity and relevant network and having a system for performing user-controlled/sender-controlled contact or profile data object. In embodiments, provided herein is a platform for self-curated single source of truth about the contact or profile of an individual having a calendar system configured to organize calendars and tasks of users by identity and relevant network and having a plurality of tools for managing contacts and profiles. In embodiments, provided herein is a platform for self-curated single source of truth about the contact or profile of an individual having a calendar system configured to organize calendars and tasks of users by identity and relevant network and having a system configured to facilitate individual self-curation of contact information. In embodiments, provided herein is a platform for self-curated single source of truth about the contact or profile of an individual having a calendar system configured to organize calendars and tasks of users by identity and relevant network and having a user interface. In embodiments, provided herein is a platform for self-curated single source of truth about the contact or profile of an individual having a calendar system configured to organize calendars and tasks of users by identity and relevant network and having a system configured to facilitate split control of personal-level and enterprise-level contact information. In embodiments, provided herein is a platform for self-curated single source of truth about the contact or profile of an individual having a calendar system configured to organize calendars and tasks of users by identity and relevant network and having a system configured to facilitate user-controlled sale of contact information. In embodiments, provided herein is a platform for self-curated single source of truth about the contact or profile of an individual having a calendar system configured to organize calendars and tasks of users by identity and relevant network and having a system for performing validation. In embodiments, provided herein is a platform for self-curated single source of truth about the contact or profile of an individual having a calendar system configured to organize calendars and tasks of users by identity and relevant network and having a system for performing automated synchronization of contact information. In embodiments, provided herein is a platform for self-curated single source of truth about the contact or profile of an individual having a calendar system configured to organize calendars and tasks of users by identity and relevant network and having a system configured to facilitate blocking and managing of invite permissions. In embodiments, provided herein is a platform for self-curated single source of truth about the contact or profile of an individual having a calendar system configured to organize calendars and tasks of users by identity and relevant network and having a connection system configured to connect users via search.

Policy Violation Management

In embodiments, provided herein is a platform for self-curated single source of truth about the contact or profile of an individual having a policy violation management system. In embodiments, provided herein is a platform for self-curated single source of truth about the contact or profile of an individual having a policy violation management system and having a system for facilitating granular self-curation of identity via multiple identities and profiles. In embodiments, provided herein is a platform for self-curated single source of truth about the contact or profile of an individual having a policy violation management system and having a location factors system. In embodiments, provided herein is a platform for self-curated single source of truth about the contact or profile of an individual having a policy violation management system and having a system for performing outbound versus inbound contact management. In embodiments, provided herein is a platform for self-curated single source of truth about the contact or profile of an individual having a policy violation management system and having a QR code system. In embodiments, provided herein is a platform for self-curated single source of truth about the contact or profile of an individual having a policy violation management system and having a system configured to facilitate owner-controlled utilization of self-curated contact information including permission setting by use case. In embodiments, provided herein is a platform for self-curated single source of truth about the contact or profile of an individual having a policy violation management system and having a system for performing wallets and crypto/blockchain infrastructure. In embodiments, provided herein is a platform for self-curated single source of truth about the contact or profile of an individual having a policy violation management system and having a system for performing persistent, self-curated contact and profile information of a user. In embodiments, provided herein is a platform for self-curated single source of truth about the contact or profile of an individual having a policy violation management system and having a system configured to score and grade quality of contact information. In embodiments, provided herein is a platform for self-curated single source of truth about the contact or profile of an individual having a policy violation management system and having a system for integrating with self-curated single source of truth about the contact or profile of an individual system. In embodiments, provided herein is a platform for self-curated single source of truth about the contact or profile of an individual having a policy violation management system and having a connection suggestion system configured to perform scoring of backgrounds and identifiers. In embodiments, provided herein is a platform for self-curated single source of truth about the contact or profile of an individual having a policy violation management system and having a search function system. In embodiments, provided herein is a platform for self-curated single source of truth about the contact or profile of an individual having a policy violation management system and having an identity management and digital identity ownership system. In embodiments, provided herein is a platform for self-curated single source of truth about the contact or profile of an individual having a policy violation management system and having a systems integration system. In embodiments, provided herein is a platform for self-curated single source of truth about the contact or profile of an individual having a policy violation management system and having a system for performing "token" or other more unique ways to identify me. In embodiments, provided herein is a platform for self-curated single source of truth about the contact or profile of an individual having a policy violation management system and having a system for performing user-controlled/sender-controlled contact or profile data object. In embodiments, provided herein is a platform for self-curated single source of truth about the contact or profile of an individual having a policy violation management system and having a plurality of tools for managing contacts and profiles. In embodiments, provided herein is a platform for self-curated single source of truth about the contact or profile of an individual having a policy violation management system and having a system configured to facilitate individual self-curation of contact information. In embodiments, provided herein is a platform for self-curated single source of truth about the contact or profile of an individual having a policy violation management system and having a user interface. In embodiments, provided herein is a platform for self-curated single source of truth about the contact or profile of an individual having a policy violation management system and having a system configured to facilitate split control of personal-level and enterprise-level contact information. In embodiments, provided herein is a platform for self-curated single source of truth about the contact or profile of an individual having a policy violation management system and having a system configured to facilitate user-controlled sale of contact information. In embodiments, provided herein is a platform for self-curated single source of truth about the contact or profile of an individual having a policy violation management system and having a system for performing validation.

In embodiments, provided herein is a platform for self-curated single source of truth about the contact or profile of an individual having a policy violation management system and having a system for performing automated synchronization of contact information. In embodiments, provided herein is a platform for self-curated single source of truth about the contact or profile of an individual having a policy violation management system and having a system configured to facilitate blocking and managing of invite permissions. In embodiments, provided herein is a platform for self-curated single source of truth about the contact or profile of an individual having a policy violation management system and having a connection system configured to connect users via search.

Granular Self-Curation of Identity Via Multiple Identities and Profiles

In embodiments, provided herein is a platform for self-curated single source of truth about the contact or profile of an individual having a system for facilitating granular self-curation of identity via multiple identities and profiles. In embodiments, provided herein is a platform for self-curated single source of truth about the contact or profile of an individual having a system for facilitating granular self-curation of identity via multiple identities and profiles and having a location factors system. In embodiments, provided herein is a platform for self-curated single source of truth about the contact or profile of an individual having a system for facilitating granular self-curation of identity via multiple identities and profiles and having a system for performing outbound versus inbound contact management. In embodiments, provided herein is a platform for self-curated single source of truth about the contact or profile of an individual having a system for facilitating granular self-curation of identity via multiple identities and profiles and having a QR code system. In embodiments, provided herein is a platform for self-curated single source of truth about the contact or profile of an individual having a system for facilitating granular self-curation of identity via multiple identities and profiles and having a system configured to facilitate owner-controlled utilization of self-curated contact information including permission setting by use case. In embodiments, provided herein is a platform for self-curated single source of truth about the contact or profile of an individual having a system for facilitating granular self-curation of identity via multiple identities and profiles and having a system for performing wallets and crypto/blockchain infrastructure. In embodiments, provided herein is a platform for self-curated single source of truth about the contact or profile of an individual having a system for facilitating granular self-curation of identity via multiple identities and profiles and having a system for performing persistent, self-curated contact and profile information of a user. In embodiments, provided herein is a platform for self-curated single source of truth about the contact or profile of an individual having a system for facilitating granular self-curation of identity via multiple identities and profiles and having a system configured to score and grade quality of contact information. In embodiments, provided herein is a platform for self-curated single source of truth about the contact or profile of an individual having a system for facilitating granular self-curation of identity via multiple identities and profiles and having a system for integrating with self-curated single source of truth about the contact or profile of an individual system. In embodiments, provided herein is a platform for self-curated single source of truth about the contact or profile of an individual having a system for facilitating granular self-curation of identity via multiple identities and profiles and having a connection suggestion system configured to perform scoring of backgrounds and identifiers. In embodiments, provided herein is a platform for self-curated single source of truth about the contact or profile of an individual having a system for facilitating granular self-curation of identity via multiple identities and profiles and having a search function system. In embodiments, provided herein is a platform for self-curated single source of truth about the contact or profile of an individual having a system for facilitating granular self-curation of identity via multiple identities and profiles and having an identity management and digital identity ownership system. In embodiments, provided herein is a platform for self-curated single source of truth about the contact or profile of an individual having a system for facilitating granular self-curation of identity via multiple identities and profiles and having a systems integration system. In embodiments, provided herein is a platform for self-curated single source of truth about the contact or profile of an individual having a system for facilitating granular self-curation of identity via multiple identities and profiles and having a system for performing "token" or other more unique ways to identify me. In embodiments, provided herein is a platform for self-curated single source of truth about the contact or profile of an individual having a system for facilitating granular self-curation of identity via multiple identities and profiles and having a system for performing user-controlled/sender-controlled contact or profile data object. In embodiments, provided herein is a platform for self-curated single source of truth about the contact or profile of an individual having a system for facilitating granular self-curation of identity via multiple identities and profiles and having a plurality of tools for managing contacts and profiles. In embodiments, provided herein is a platform for self-curated single source of truth about the contact or profile of an individual having a system for facilitating granular self-curation of identity via multiple identities and profiles and having a system configured to facilitate individual self-curation of contact information. In embodiments, provided herein is a platform for self-curated single source of truth about the contact or profile of an individual having a system for facilitating granular self-curation of identity via multiple identities and profiles and having a user interface. In embodiments, provided herein is a platform for self-curated single source of truth about the contact or profile of an individual having a system for facilitating granular self-curation of identity via multiple identities and profiles and having a system configured to facilitate split control of personal-level and enterprise-level contact information. In embodiments, provided herein is a platform for self-curated single source of truth about the contact or profile of an individual having a system for facilitating granular self-curation of identity via multiple identities and profiles and having a system configured to facilitate user-controlled sale of contact information. In embodiments, provided herein is a platform for self-curated single source of truth about the contact or profile of an individual having a system for facilitating granular self-curation of identity via multiple identities and profiles and having a system for performing validation. In embodiments, provided herein is a platform for self-curated single source of truth about the contact or profile of an individual having a system for facilitating granular self-curation of identity via multiple identities and profiles and having a system for performing automated synchronization of contact information. In embodiments, provided herein is a platform for self-curated single source of truth about the contact or profile of an individual having a system for facilitating granular self-curation of identity via multiple identities and profiles and having a system configured to facilitate blocking and managing of invite permissions. In embodiments, provided herein is a platform for self-curated single source of truth about the contact or profile of an individual having a system for facilitating granular self-curation of identity via multiple identities and profiles and having a connection system configured to connect users via search.

Location Factors

In embodiments, provided herein is a platform for self-curated single source of truth about the contact or profile of an individual having a location factors system. In embodiments, provided herein is a platform for self-curated single source of truth about the contact or profile of an individual having a location factors system and having a system for performing outbound versus inbound contact management. In embodiments, provided herein is a platform for self-curated single source of truth about the contact or profile of an individual having a location factors system and having a QR code system. In embodiments, provided herein is a platform for self-curated single source of truth about the contact or profile of an individual having a location factors system and having a system configured to facilitate owner-controlled utilization of self-curated contact information including permission setting by use case. In embodiments, provided herein is a platform for self-curated single source of truth about the contact or profile of an individual having a location factors system and having a system for performing wallets and crypto/blockchain infrastructure. In embodiments, provided herein is a platform for self-curated single source of truth about the contact or profile of an individual having a location factors system and having a system for performing persistent, self-curated contact and profile information of a user. In embodiments, provided herein is a platform for self-curated single source of truth about the contact or profile of an individual having a location factors system and having a system configured to score and grade quality of contact information. In embodiments, provided herein is a platform for self-curated single source of truth about the contact or profile of an individual having a location factors system and having a system for integrating with self-curated single source of truth about the contact or profile of an individual system. In embodiments, provided herein is a platform for self-curated single source of truth about the contact or profile of an individual having a location factors system and having a connection suggestion system configured to perform scoring of backgrounds and identifiers. In embodiments, provided herein is a platform for self-curated single source of truth about the contact or profile of an individual having a location factors system and having a search function system. In embodiments, provided herein is a platform for self-curated single source of truth about the contact or profile of an individual having a location factors system and having an identity management and digital identity ownership system. In embodiments, provided herein is a platform for self-curated single source of truth about the contact or profile of an individual having a location factors system and having a systems integration system. In embodiments, provided herein is a platform for self-curated single source of truth about the contact or profile of an individual having a location factors system and having a system for performing "token" or other more unique ways to identify me. In embodiments, provided herein is a platform for self-curated single source of truth about the contact or profile of an individual having a location factors system and having a system for performing user-controlled/sender-controlled contact or profile data object. In embodiments, provided herein is a platform for self-curated single source of truth about the contact or profile of an individual having a location factors system and having a plurality of tools for managing contacts and profiles. In embodiments, provided herein is a platform for self-curated single source of truth about the contact or profile of an individual having a location factors system and having a system configured to facilitate individual self-curation of contact information. In embodiments, provided herein is a platform for self-curated single source of truth about the contact or profile of an individual having a location factors system and having a user interface. In embodiments, provided herein is a platform for self-curated single source of truth about the contact or profile of an individual having a location factors system and having a system configured to facilitate split control of personal-level and enterprise-level contact information. In embodiments, provided herein is a platform for self-curated single source of truth about the contact or profile of an individual having a location factors system and having a system configured to facilitate user-controlled sale of contact information. In embodiments, provided herein is a platform for self-curated single source of truth about the contact or profile of an individual having a location factors system and having a system for performing validation. In embodiments, provided herein is a platform for self-curated single source of truth about the contact or profile of an individual having a location factors system and having a system for performing automated synchronization of contact information. In embodiments, provided herein is a platform for self-curated single source of truth about the contact or profile of an individual having a location factors system and having a system configured to facilitate blocking and managing of invite permissions. In embodiments, provided herein is a platform for self-curated single source of truth about the contact or profile of an individual having a location factors system and having a connection system configured to connect users via search.

Outbound Versus Inbound Contact Management

In embodiments, provided herein is a platform for self-curated single source of truth about the contact or profile of an individual having a system for performing outbound versus inbound contact management. In embodiments, provided herein is a platform for self-curated single source of truth about the contact or profile of an individual having a system for performing outbound versus inbound contact management and having a QR code system. In embodiments, provided herein is a platform for self-curated single source of truth about the contact or profile of an individual having a system for performing outbound versus inbound contact management and having a system configured to facilitate owner-controlled utilization of self-curated contact information including permission setting by use case. In embodiments, provided herein is a platform for self-curated single source of truth about the contact or profile of an individual having a system for performing outbound versus inbound contact management and having a system for performing wallets and crypto/blockchain infrastructure. In embodiments, provided herein is a platform for self-curated single source of truth about the contact or profile of an individual having a system for performing outbound versus inbound contact management and having a system for performing persistent, self-curated contact and profile information of a user. In embodiments, provided herein is a platform for self-curated single source of truth about the contact or profile of an individual having a system for performing outbound versus inbound contact management and having a system configured to score and grade quality of contact information. In embodiments, provided herein is a platform for self-curated single source of truth about the contact or profile of an individual having a system for performing outbound versus inbound contact management and having a system for integrating with self-curated single source of truth about the contact or profile of an individual system. In embodiments, provided herein is a platform for self-curated single source of truth about the contact or profile of an individual having a system for performing outbound versus inbound contact management and having a connection suggestion system configured to perform scoring of backgrounds and identifiers. In embodiments, provided herein is a platform for self-curated single source of truth about the contact or profile of an individual having a system for performing outbound versus inbound contact management and having a search function system. In embodiments, provided herein is a platform for self-curated single source of truth about the contact or profile of an individual having a system for performing outbound versus inbound contact management and having an identity management and digital identity ownership system. In embodiments, provided herein is a platform for self-curated single source of truth about the contact or profile of an individual having a system for performing outbound versus inbound contact management and having a systems integration system. In embodiments, provided herein is a platform for self-curated single source of truth about the contact or profile of an individual having a system for performing outbound versus inbound contact management and having a system for performing "token" or other more unique ways to identify me. In embodiments, provided herein is a platform for self-curated single source of truth about the contact or profile of an individual having a system for performing outbound versus inbound contact management and having a system for performing user-controlled/sender-controlled contact or profile data object. In embodiments, provided herein is a platform for self-curated single source of truth about the contact or profile of an individual having a system for performing outbound versus inbound contact management and having a plurality of tools for managing contacts and profiles. In embodiments, provided herein is a platform for self-curated single source of truth about the contact or profile of an individual having a system for performing outbound versus inbound contact management and having a system configured to facilitate individual self-curation of contact information. In embodiments, provided herein is a platform for self-curated single source of truth about the contact or profile of an individual having a system for performing outbound versus inbound contact management and having a user interface. In embodiments, provided herein is a platform for self-curated single source of truth about the contact or profile of an individual having a system for performing outbound versus inbound contact management and having a system configured to facilitate split control of personal-level and enterprise-level contact information. In embodiments, provided herein is a platform for self-curated single source of truth about the contact or profile of an individual having a system for performing outbound versus inbound contact management and having a system configured to facilitate user-controlled sale of contact information. In embodiments, provided herein is a platform for self-curated single source of truth about the contact or profile of an individual having a system for performing outbound versus inbound contact management and having a system for performing validation. In embodiments, provided herein is a platform for self-curated single source of truth about the contact or profile of an individual having a system for performing outbound versus inbound contact management and having a system for performing automated synchronization of contact information. In embodiments, provided herein is a platform for self-curated single source of truth about the contact or profile of an individual having a system for performing outbound versus inbound contact management and having a system configured to facilitate blocking and managing of invite permissions. In embodiments, provided herein is a platform for self-curated single source of truth about the contact or profile of an individual having a system for performing outbound versus inbound contact management and having a connection system configured to connect users via search.

QR Code Examples

In embodiments, provided herein is a platform for self-curated single source of truth about the contact or profile of an individual having a QR code system and having a system configured to facilitate owner-controlled utilization of self-curated contact information including permission setting by use case. In embodiments, provided herein is a platform for self-curated single source of truth about the contact or profile of an individual having a QR code system and having a system for performing wallets and crypto/blockchain infrastructure. In embodiments, provided herein is a platform for self-curated single source of truth about the contact or profile of an individual having a QR code system and having a system for performing persistent, self-curated contact and profile information of a user. In embodiments, provided herein is a platform for self-curated single source of truth about the contact or profile of an individual having a QR code system and having a system configured to score and grade quality of contact information. In embodiments, provided herein is a platform for self-curated single source of truth about the contact or profile of an individual having a QR code system and having a system for integrating with self-curated single source of truth about the contact or profile of an individual system. In embodiments, provided herein is a platform for self-curated single source of truth about the contact or profile of an individual having a QR code system and having a connection suggestion system configured to perform scoring of backgrounds and identifiers. In embodiments, provided herein is a platform for self-curated single source of truth about the contact or profile of an individual having a QR code system and having a search function system. In embodiments, provided herein is a platform for self-curated single source of truth about the contact or profile of an individual having a QR code system and having an identity management and digital identity ownership system. In embodiments, provided herein is a platform for self-curated single source of truth about the contact or profile of an individual having a QR code system and having a systems integration system. In embodiments, provided herein is a platform for self-curated single source of truth about the contact or profile of an individual having a QR code system and having a system for performing "token" or other more unique ways to identify me. In embodiments, provided herein is a platform for self-curated single source of truth about the contact or profile of an individual having a QR code system and having a system for performing user-controlled/sender-controlled contact or profile data object. In embodiments, provided herein is a platform for self-curated single source of truth about the contact or profile of an individual having a QR code system and having a plurality of tools for managing contacts and profiles. In embodiments, provided herein is a platform for self-curated single source of truth about the contact or profile of an individual having a QR code system and having a system configured to facilitate individual self-curation of contact information. In embodiments, provided herein is a platform for self-curated single source of truth about the contact or profile of an individual having a QR code system and having a user interface. In embodiments, provided herein is a platform for self-curated single source of truth about the contact or profile of an individual having a QR code system and having a system configured to facilitate split control of personal-level and enterprise-level contact information. In embodiments, provided herein is a platform for self-curated single source of truth about the contact or profile of an individual having a QR code system and having a system configured to facilitate user-controlled sale of contact information. In embodiments, provided herein is a platform for self-curated single source of truth about the contact or profile of an individual having a QR code system and having a system for performing validation. In embodiments, provided herein is a platform for self-curated single source of truth about the contact or profile of an individual having a QR code system and having a system for performing automated synchronization of contact information. In embodiments, provided herein is a platform for self-curated single source of truth about the contact or profile of an individual having a QR code system and having a system configured to facilitate blocking and managing of invite permissions. In embodiments, provided herein is a platform for self-curated single source of truth about the contact or profile of an individual having a QR code system and having a connection system configured to connect users via search.

Permission Setting by Use Case

In embodiments, provided herein is a platform for self-curated single source of truth about the contact or profile of an individual having a system configured to facilitate owner-controlled utilization of self-curated contact information including permission setting by use case. In embodiments, provided herein is a platform for self-curated single source of truth about the contact or profile of an individual having a system configured to facilitate owner-controlled utilization of self-curated contact information including permission setting by use case and having a system for performing wallets and crypto/blockchain infrastructure. In embodiments, provided herein is a platform for self-curated single source of truth about the contact or profile of an individual having a system configured to facilitate owner-controlled utilization of self-curated contact information including permission setting by use case and having a system for performing persistent, self-curated contact and profile information of a user. In embodiments, provided herein is a platform for self-curated single source of truth about the contact or profile of an individual having a system configured to facilitate owner-controlled utilization of self-curated contact information including permission setting by use case and having a system configured to score and grade quality of contact information. In embodiments, provided herein is a platform for self-curated single source of truth about the contact or profile of an individual having a system configured to facilitate owner-controlled utilization of self-curated contact information including permission setting by use case and having a system for integrating with self-curated single source of truth about the contact or profile of an individual system. In embodiments, provided herein is a platform for self-curated single source of truth about the contact or profile of an individual having a system configured to facilitate owner-controlled utilization of self-curated contact information including permission setting by use case and having a connection suggestion system configured to perform scoring of backgrounds and identifiers. In embodiments, provided herein is a platform for self-curated single source of truth about the contact or profile of an individual having a system configured to facilitate owner-controlled utilization of self-curated contact information including permission setting by use case and having a search function system. In embodiments, provided herein is a platform for self-curated single source of truth about the contact or profile of an individual having a system configured to facilitate owner-controlled utilization of self-curated contact information including permission setting by use case and having an identity management and digital identity ownership system. In embodiments, provided herein is a platform for self-curated single source of truth about the contact or profile of an individual having a system configured to facilitate owner-controlled utilization of self-curated contact information including permission setting by use case and having a systems integration system. In embodiments, provided herein is a platform for self-curated single source of truth about the contact or profile of an individual having a system configured to facilitate owner-controlled utilization of self-curated contact information including permission setting by use case and having a system for performing "token" or other more unique ways to identify me. In embodiments, provided herein is a platform for self-curated single source of truth about the contact or profile of an individual having a system configured to facilitate owner-controlled utilization of self-curated contact information including permission setting by use case and having a system for performing user-controlled/sender-controlled contact or profile data object. In embodiments, provided herein is a platform for self-curated single source of truth about the contact or profile of an individual having a system configured to facilitate owner-controlled utilization of self-curated contact information including permission setting by use case and having a plurality of tools for managing contacts and profiles. In embodiments, provided herein is a platform for self-curated single source of truth about the contact or profile of an individual having a system configured to facilitate owner-controlled utilization of self-curated contact information including permission setting by use case and having a system configured to facilitate individual self-curation of contact information. In embodiments, provided herein is a platform for self-curated single source of truth about the contact or profile of an individual having a system configured to facilitate owner-controlled utilization of self-curated contact information including permission setting by use case and having a user interface. In embodiments, provided herein is a platform for self-curated single source of truth about the contact or profile of an individual having a system configured to facilitate owner-controlled utilization of self-curated contact information including permission setting by use case and having a system configured to facilitate split control of personal-level and enterprise-level contact information. In embodiments, provided herein is a platform for self-curated single source of truth about the contact or profile of an individual having a system configured to facilitate owner-controlled utilization of self-curated contact information including permission setting by use case and having a system configured to facilitate user-controlled sale of contact information. In embodiments, provided herein is a platform for self-curated single source of truth about the contact or profile of an individual having a system configured to facilitate owner-controlled utilization of self-curated contact information including permission setting by use case and having a system for performing validation. In embodiments, provided herein is a platform for self-curated single source of truth about the contact or profile of an individual having a system configured to facilitate owner-controlled utilization of self-curated contact information including permission setting by use case and having a system for performing automated synchronization of contact information. In embodiments, provided herein is a platform for self-curated single source of truth about the contact or profile of an individual having a system configured to facilitate owner-controlled utilization of self-curated contact information including permission setting by use case and having a system configured to facilitate blocking and managing of invite permissions. In embodiments, provided herein is a platform for self-curated single source of truth about the contact or profile of an individual having a system configured to facilitate owner-controlled utilization of self-curated contact information including permission setting by use case and having a connection system configured to connect users via search.

Wallets and Crypto/Blockchain Infrastructure

In embodiments, provided herein is a platform for self-curated single source of truth about the contact or profile of an individual having a system for performing wallets and crypto/blockchain infrastructure. In embodiments, provided herein is a platform for self-curated single source of truth about the contact or profile of an individual having a system for performing wallets and crypto/blockchain infrastructure and having a system for performing persistent, self-curated contact and profile information of a user. In embodiments, provided herein is a platform for self-curated single source of truth about the contact or profile of an individual having a system for performing wallets and crypto/blockchain infrastructure and having a system configured to score and grade quality of contact information. In embodiments, provided herein is a platform for self-curated single source of truth about the contact or profile of an individual having a system for performing wallets and crypto/blockchain infrastructure and having a system for integrating with self-curated single source of truth about the contact or profile of an individual system. In embodiments, provided herein is a platform for self-curated single source of truth about the contact or profile of an individual having a system for performing wallets and crypto/blockchain infrastructure and having a connection suggestion system configured to perform scoring of backgrounds and identifiers. In embodiments, provided herein is a platform for self-curated single source of truth about the contact or profile of an individual having a system for performing wallets and crypto/blockchain infrastructure and having a search function system. In embodiments, provided herein is a platform for self-curated single source of truth about the contact or profile of an individual having a system for performing wallets and crypto/blockchain infrastructure and having an identity management and digital identity ownership system. In embodiments, provided herein is a platform for self-curated single source of truth about the contact or profile of an individual having a system for performing wallets and crypto/blockchain infrastructure and having a systems integration system. In embodiments, provided herein is a platform for self-curated single source of truth about the contact or profile of an individual having a system for performing wallets and crypto/blockchain infrastructure and having a system for performing "token" or other more unique ways to identify me. In embodiments, provided herein is a platform for self-curated single source of truth about the contact or profile of an individual having a system for performing wallets and crypto/blockchain infrastructure and having a system for performing user-controlled/sender-controlled contact or profile data object. In embodiments, provided herein is a platform for self-curated single source of truth about the contact or profile of an individual having a system for performing wallets and crypto/blockchain infrastructure and having a plurality of tools for managing contacts and profiles. In embodiments, provided herein is a platform for self-curated single source of truth about the contact or profile of an individual having a system for performing wallets and crypto/blockchain infrastructure and having a system configured to facilitate individual self-curation of contact information. In embodiments, provided herein is a platform for self-curated single source of truth about the contact or profile of an individual having a system for performing wallets and crypto/blockchain infrastructure and having a user interface. In embodiments, provided herein is a platform for self-curated single source of truth about the contact or profile of an individual having a system for performing wallets and crypto/blockchain infrastructure and having a system configured to facilitate split control of personal-level and enterprise-level contact information. In embodiments, provided herein is a platform for self-curated single source of truth about the contact or profile of an individual having a system for performing wallets and crypto/blockchain infrastructure and having a system configured to facilitate user-controlled sale of contact information. In embodiments, provided herein is a platform for self-curated single source of truth about the contact or profile of an individual having a system for performing wallets and crypto/blockchain infrastructure and having a system for performing validation. In embodiments, provided herein is a platform for self-curated single source of truth about the contact or profile of an individual having a system for performing wallets and crypto/blockchain infrastructure and having a system for performing automated synchronization of contact information. In embodiments, provided herein is a platform for self-curated single source of truth about the contact or profile of an individual having a system for performing wallets and crypto/blockchain infrastructure and having a system configured to facilitate blocking and managing of invite permissions. In embodiments, provided herein is a platform for self-curated single source of truth about the contact or profile of an individual having a system for performing wallets and crypto/blockchain infrastructure and having a connection system configured to connect users via search.

Persistent, Self-Curated Contact and Profile Information of a User

In embodiments, provided herein is a platform for self-curated single source of truth about the contact or profile of an individual having a system for performing persistent, self-curated contact and profile information of a user. In embodiments, provided herein is a platform for self-curated single source of truth about the contact or profile of an individual having a system for performing persistent, self-curated contact and profile information of a user and having a system configured to score and grade quality of contact information. In embodiments, provided herein is a platform for self-curated single source of truth about the contact or profile of an individual having a system for performing persistent, self-curated contact and profile information of a user and having a system for integrating with self-curated single source of truth about the contact or profile of an individual system. In embodiments, provided herein is a platform for self-curated single source of truth about the contact or profile of an individual having a system for performing persistent, self-curated contact and profile information of a user and having a connection suggestion system configured to perform scoring of backgrounds and identifiers. In embodiments, provided herein is a platform for self-curated single source of truth about the contact or profile of an individual having a system for performing persistent, self-curated contact and profile information of a user and having a search function system. In embodiments, provided herein is a platform for self-curated single source of truth about the contact or profile of an individual having a system for performing persistent, self-curated contact and profile information of a user and having an identity management and digital identity ownership system. In embodiments, provided herein is a platform for self-curated single source of truth about the contact or profile of an individual having a system for performing persistent, self-curated contact and profile information of a user and having a systems integration system. In embodiments, provided herein is a platform for self-curated single source of truth about the contact or profile of an individual having a system for performing persistent, self-curated contact and profile information of a user and having a system for performing "token" or other more unique ways to identify me. In embodiments, provided herein is a platform for self-curated single source of truth about the contact or profile of an individual having a system for performing persistent, self-curated contact and profile information of a user and having a system for performing user-controlled/sender-controlled contact or profile data object. In embodiments, provided herein is a platform for self-curated single source of truth about the contact or profile of an individual having a system for performing persistent, self-curated contact and profile information of a user and having a plurality of tools for managing contacts and profiles. In embodiments, provided herein is a platform for self-curated single source of truth about the contact or profile of an individual having a system for performing persistent, self-curated contact and profile information of a user and having a system configured to facilitate individual self-curation of contact information. In embodiments, provided herein is a platform for self-curated single source of truth about the contact or profile of an individual having a system for performing persistent, self-curated contact and profile information of a user and having a user interface. In embodiments, provided herein is a platform for self-curated single source of truth about the contact or profile of an individual having a system for performing persistent, self-curated contact and profile information of a user and having a system configured to facilitate split control of personal-level and enterprise-level contact information. In embodiments, provided herein is a platform for self-curated single source of truth about the contact or profile of an individual having a system for performing persistent, self-curated contact and profile information of a user and having a system configured to facilitate user-controlled sale of contact information. In embodiments, provided herein is a platform for self-curated single source of truth about the contact or profile of an individual having a system for performing persistent, self-curated contact and profile information of a user and having a system for performing validation. In embodiments, provided herein is a platform for self-curated single source of truth about the contact or profile of an individual having a system for performing persistent, self-curated contact and profile information of a user and having a system for performing automated synchronization of contact information. In embodiments, provided herein is a platform for self-curated single source of truth about the contact or profile of an individual having a system for performing persistent, self-curated contact and profile information of a user and having a system configured to facilitate blocking and managing of invite permissions. In embodiments, provided herein is a platform for self-curated single source of truth about the contact or profile of an individual having a system for performing persistent, self-curated contact and profile information of a user and having a connection system configured to connect users via search.

Scoring and Grading Contact Quality

In embodiments, provided herein is a platform for self-curated single source of truth about the contact or profile of an individual having a system configured to score and grade quality of contact information. In embodiments, provided herein is a platform for self-curated single source of truth about the contact or profile of an individual having a system configured to score and grade quality of contact information and having a system for integrating with self-curated single source of truth about the contact or profile of an individual system. In embodiments, provided herein is a platform for self-curated single source of truth about the contact or profile of an individual having a system configured to score and grade quality of contact information and having a connection suggestion system configured to perform scoring of backgrounds and identifiers. In embodiments, provided herein is a platform for self-curated single source of truth about the contact or profile of an individual having a system configured to score and grade quality of contact information and having a search function system. In embodiments, provided herein is a platform for self-curated single source of truth about the contact or profile of an individual having a system configured to score and grade quality of contact information and having an identity management and digital identity ownership system. In embodiments, provided herein is a platform for self-curated single source of truth about the contact or profile of an individual having a system configured to score and grade quality of contact information and having a systems integration system. In embodiments, provided herein is a platform for self-curated single source of truth about the contact or profile of an individual having a system configured to score and grade quality of contact information and having a system for performing "token" or other more unique ways to identify me. In embodiments, provided herein is a platform for self-curated single source of truth about the contact or profile of an individual having a system configured to score and grade quality of contact information and having a system for performing user-controlled/sender-controlled contact or profile data object. In embodiments, provided herein is a platform for self-curated single source of truth about the contact or profile of an individual having a system configured to score and grade quality of contact information and having a plurality of tools for managing contacts and profiles. In embodiments, provided herein is a platform for self-curated single source of truth about the contact or profile of an individual having a system configured to score and grade quality of contact information and having a system configured to facilitate individual self-curation of contact information. In embodiments, provided herein is a platform for self-curated single source of truth about the contact or profile of an individual having a system configured to score and grade quality of contact information and having a user interface. In embodiments, provided herein is a platform for self-curated single source of truth about the contact or profile of an individual having a system configured to score and grade quality of contact information and having a system configured to facilitate split control of personal-level and enterprise-level contact information. In embodiments, provided herein is a platform for self-curated single source of truth about the contact or profile of an individual having a system configured to score and grade quality of contact information and having a system configured to facilitate user-controlled sale of contact information. In embodiments, provided herein is a platform for self-curated single source of truth about the contact or profile of an individual having a system configured to score and grade quality of contact information and having a system for performing validation. In embodiments, provided herein is a platform for self-curated single source of truth about the contact or profile of an individual having a system configured to score and grade quality of contact information and having a system for performing automated synchronization of contact information. In embodiments, provided herein is a platform for self-curated single source of truth about the contact or profile of an individual having a system configured to score and grade quality of contact information and having a system configured to facilitate blocking and managing of invite permissions. In embodiments, provided herein is a platform for self-curated single source of truth about the contact or profile of an individual having a system configured to score and grade quality of contact information and having a connection system configured to connect users via search.

Integration with Self-Curated Single Source of Truth about the Contact or Profile of an Individual System In embodiments, provided herein is a platform for self-curated single source of truth about the contact or profile of an individual having a system for integrating with self-curated single source of truth about the contact or profile of an individual system. In embodiments, provided herein is a platform for self-curated single source of truth about the contact or profile of an individual having a system for integrating with self-curated single source of truth about the contact or profile of an individual system and having a connection suggestion system configured to perform scoring of backgrounds and identifiers. In embodiments, provided herein is a platform for self-curated single source of truth about the contact or profile of an individual having a system for integrating with self-curated single source of truth about the contact or profile of an individual system and having a search function system. In embodiments, provided herein is a platform for self-curated single source of truth about the contact or profile of an individual having a system for integrating with self-curated single source of truth about the contact or profile of an individual system and having an identity management and digital identity ownership system. In embodiments, provided herein is a platform for self-curated single source of truth about the contact or profile of an individual having a system for integrating with self-curated single source of truth about the contact or profile of an individual system and having a systems integration system. In embodiments, provided herein is a platform for self-curated single source of truth about the contact or profile of an individual having a system for integrating with self-curated single source of truth about the contact or profile of an individual system and having a system for performing "token" or other more unique ways to identify me. In embodiments, provided herein is a platform for self-curated single source of truth about the contact or profile of an individual having a system for integrating with self-curated single source of truth about the contact or profile of an individual system and having a system for performing user-controlled/sender-controlled contact or profile data object. In embodiments, provided herein is a platform for self-curated single source of truth about the contact or profile of an individual having a system for integrating with self-curated single source of truth about the contact or profile of an individual system and having a plurality of tools for managing contacts and profiles. In embodiments, provided herein is a platform for self-curated single source of truth about the contact or profile of an individual having a system for integrating with self-curated single source of truth about the contact or profile of an individual system and having a system configured to facilitate individual self-curation of contact information. In embodiments, provided herein is a platform for self-curated single source of truth about the contact or profile of an individual having a system for integrating with self-curated single source of truth about the contact or profile of an individual system and having a user interface. In embodiments, provided herein is a platform for self-curated single source of truth about the contact or profile of an individual having a system for integrating with self-curated single source of truth about the contact or profile of an individual system and having a system configured to facilitate split control of personal-level and enterprise-level contact information. In embodiments, provided herein is a platform for self-curated single source of truth about the contact or profile of an individual having a system for integrating with self-curated single source of truth about the contact or profile of an individual system and having a system configured to facilitate user-controlled sale of contact information. In embodiments, provided herein is a platform for self-curated single source of truth about the contact or profile of an individual having a system for integrating with self-curated single source of truth about the contact or profile of an individual system and having a system for performing validation. In embodiments, provided herein is a platform for self-curated single source of truth about the contact or profile of an individual having a system for integrating with self-curated single source of truth about the contact or profile of an individual system and having a system for performing automated synchronization of contact information. In embodiments, provided herein is a platform for self-curated single source of truth about the contact or profile of an individual having a system for integrating with self-curated single source of truth about the contact or profile of an individual system and having a system configured to facilitate blocking and managing of invite permissions. In embodiments, provided herein is a platform for self-curated single source of truth about the contact or profile of an individual having a system for integrating with self-curated single source of truth about the contact or profile of an individual system and having a connection system configured to connect users via search.

Scoring of Backgrounds and Identifiers to Make Connection Suggestions

In embodiments, provided herein is a platform for self-curated single source of truth about the contact or profile of an individual having a connection suggestion system configured to perform scoring of backgrounds and identifiers. In embodiments, provided herein is a platform for self-curated single source of truth about the contact or profile of an individual having a connection suggestion system configured to perform scoring of backgrounds and identifiers and having a search function system. In embodiments, provided herein is a platform for self-curated single source of truth about the contact or profile of an individual having a connection suggestion system configured to perform scoring of backgrounds and identifiers and having an identity management and digital identity ownership system. In embodiments, provided herein is a platform for self-curated single source of truth about the contact or profile of an individual having a connection suggestion system configured to perform scoring of backgrounds and identifiers and having a systems integration system. In embodiments, provided herein is a platform for self-curated single source of truth about the contact or profile of an individual having a connection suggestion system configured to perform scoring of backgrounds and identifiers and having a system for performing "token" or other more unique ways to identify me. In embodiments, provided herein is a platform for self-curated single source of truth about the contact or profile of an individual having a connection suggestion system configured to perform scoring of backgrounds and identifiers and having a system for performing user-controlled/sender-controlled contact or profile data object. In embodiments, provided herein is a platform for self-curated single source of truth about the contact or profile of an individual having a connection suggestion system configured to perform scoring of backgrounds and identifiers and having a plurality of tools for managing contacts and profiles. In embodiments, provided herein is a platform for self-curated single source of truth about the contact or profile of an individual having a connection suggestion system configured to perform scoring of backgrounds and identifiers and having a system configured to facilitate individual self-curation of contact information. In embodiments, provided herein is a platform for self-curated single source of truth about the contact or profile of an individual having a connection suggestion system configured to perform scoring of backgrounds and identifiers and having a user interface. In embodiments, provided herein is a platform for self-curated single source of truth about the contact or profile of an individual having a connection suggestion system configured to perform scoring of backgrounds and identifiers and having a system configured to facilitate split control of personal-level and enterprise-level contact information. In embodiments, provided herein is a platform for self-curated single source of truth about the contact or profile of an individual having a connection suggestion system configured to perform scoring of backgrounds and identifiers and having a system configured to facilitate user-controlled sale of contact information. In embodiments, provided herein is a platform for self-curated single source of truth about the contact or profile of an individual having a connection suggestion system configured to perform scoring of backgrounds and identifiers and having a system for performing validation. In embodiments, provided herein is a platform for self-curated single source of truth about the contact or profile of an individual having a connection suggestion system configured to perform scoring of backgrounds and identifiers and having a system for performing automated synchronization of contact information. In embodiments, provided herein is a platform for self-curated single source of truth about the contact or profile of an individual having a connection suggestion system configured to perform scoring of backgrounds and identifiers and having a system configured to facilitate blocking and managing of invite permissions. In embodiments, provided herein is a platform for self-curated single source of truth about the contact or profile of an individual having a connection suggestion system configured to perform scoring of backgrounds and identifiers and having a connection system configured to connect users via search.

Search Functions within a Contact Data Item

In embodiments, provided herein is a platform for self-curated single source of truth about the contact or profile of an individual having a search function system. In embodiments, provided herein is a platform for self-curated single source of truth about the contact or profile of an individual having a search function system and having an identity management and digital identity ownership system. In embodiments, provided herein is a platform for self-curated single source of truth about the contact or profile of an individual having a search function system and having a systems integration system. In embodiments, provided herein is a platform for self-curated single source of truth about the contact or profile of an individual having a search function system and having a system for performing "token" or other more unique ways to identify me. In embodiments, provided herein is a platform for self-curated single source of truth about the contact or profile of an individual having a search function system and having a system for performing user-controlled/sender-controlled contact or profile data object. In embodiments, provided herein is a platform for self-curated single source of truth about the contact or profile of an individual having a search function system and having a plurality of tools for managing contacts and profiles. In embodiments, provided herein is a platform for self-curated single source of truth about the contact or profile of an individual having a search function system and having a system configured to facilitate individual self-curation of contact information. In embodiments, provided herein is a platform for self-curated single source of truth about the contact or profile of an individual having a search function system and having a user interface. In embodiments, provided herein is a platform for self-curated single source of truth about the contact or profile of an individual having a search function system and having a system configured to facilitate split control of personal-level and enterprise-level contact information. In embodiments, provided herein is a platform for self-curated single source of truth about the contact or profile of an individual having a search function system and having a system configured to facilitate user-controlled sale of contact information. In embodiments, provided herein is a platform for self-curated single source of truth about the contact or profile of an individual having a search function system and having a system for performing validation. In embodiments, provided herein is a platform for self-curated single source of truth about the contact or profile of an individual having a search function system and having a system for performing automated synchronization of contact information. In embodiments, provided herein is a platform for self-curated single source of truth about the contact or profile of an individual having a search function system and having a system configured to facilitate blocking and managing of invite permissions. In embodiments, provided herein is a platform for self-curated single source of truth about the contact or profile of an individual having a search function system and having a connection system configured to connect users via search.

Identity Management and Digital Identity Ownership

In embodiments, provided herein is a platform for self-curated single source of truth about the contact or profile of an individual having an identity management and digital identity ownership system. In embodiments, provided herein is a platform for self-curated single source of truth about the contact or profile of an individual having an identity management and digital identity ownership system and having a systems integration system. In embodiments, provided herein is a platform for self-curated single source of truth about the contact or profile of an individual having an identity management and digital identity ownership system and having a system for performing "token" or other more unique ways to identify me. In embodiments, provided herein is a platform for self-curated single source of truth about the contact or profile of an individual having an identity management and digital identity ownership system and having a system for performing user-controlled/sender-controlled contact or profile data object. In embodiments, provided herein is a platform for self-curated single source of truth about the contact or profile of an individual having an identity management and digital identity ownership system and having a plurality of tools for managing contacts and profiles. In embodiments, provided herein is a platform for self-curated single source of truth about the contact or profile of an individual having an identity management and digital identity ownership system and having a system configured to facilitate individual self-curation of contact information. In embodiments, provided herein is a platform for self-curated single source of truth about the contact or profile of an individual having an identity management and digital identity ownership system and having a user interface. In embodiments, provided herein is a platform for self-curated single source of truth about the contact or profile of an individual having an identity management and digital identity ownership system and having a system configured to facilitate split control of personal-level and enterprise-level contact information. In embodiments, provided herein is a platform for self-curated single source of truth about the contact or profile of an individual having an identity management and digital identity ownership system and having a system configured to facilitate user-controlled sale of contact information. In embodiments, provided herein is a platform for self-curated single source of truth about the contact or profile of an individual having an identity management and digital identity ownership system and having a system for performing validation. In embodiments, provided herein is a platform for self-curated single source of truth about the contact or profile of an individual having an identity management and digital identity ownership system and having a system for performing automated synchronization of contact information. In embodiments, provided herein is a platform for self-curated single source of truth about the contact or profile of an individual having an identity management and digital identity ownership system and having a system configured to facilitate blocking and managing of invite permissions. In embodiments, provided herein is a platform for self-curated single source of truth about the contact or profile of an individual having an identity management and digital identity ownership system and having a connection system configured to connect users via search.

Systems Integration (Via Private Label, License, API, Etc.) with Other Systems

In embodiments, provided herein is a platform for self-curated single source of truth about the contact or profile of an individual having a systems integration system. In embodiments, provided herein is a platform for self-curated single source of truth about the contact or profile of an individual having a systems integration system and having a system for performing "token" or other more unique ways to identify me. In embodiments, provided herein is a platform for self-curated single source of truth about the contact or profile of an individual having a systems integration system and having a system for performing user-controlled/sender-controlled contact or profile data object. In embodiments, provided herein is a platform for self-curated single source of truth about the contact or profile of an individual having a systems integration system and having a plurality of tools for managing contacts and profiles. In embodiments, provided herein is a platform for self-curated single source of truth about the contact or profile of an individual having a systems integration system and having a system configured to facilitate individual self-curation of contact information. In embodiments, provided herein is a platform for self-curated single source of truth about the contact or profile of an individual having a systems integration system and having a user interface. In embodiments, provided herein is a platform for self-curated single source of truth about the contact or profile of an individual having a systems integration system and having a system configured to facilitate split control of personal-level and enterprise-level contact information. In embodiments, provided herein is a platform for self-curated single source of truth about the contact or profile of an individual having a systems integration system and having a system configured to facilitate user-controlled sale of contact information. In embodiments, provided herein is a platform for self-curated single source of truth about the contact or profile of an individual having a systems integration system and having a system for performing validation. In embodiments, provided herein is a platform for self-curated single source of truth about the contact or profile of an individual having a systems integration system and having a system for performing automated synchronization of contact information. In embodiments, provided herein is a platform for self-curated single source of truth about the contact or profile of an individual having a systems integration system and having a system configured to facilitate blocking and managing of invite permissions. In embodiments, provided herein is a platform for self-curated single source of truth about the contact or profile of an individual having a systems integration system and having a connection system configured to connect users via search.

Tokenization of Identity Information

In embodiments, provided herein is a platform for self-curated single source of truth about the contact or profile of an individual having a system for performing "token" or other more unique ways to identify me. In embodiments, provided herein is a platform for self-curated single source of truth about the contact or profile of an individual having a system for performing "token" or other more unique ways to identify me and having a system for performing user-controlled/sender-controlled contact or profile data object. In embodiments, provided herein is a platform for self-curated single source of truth about the contact or profile of an individual having a system for performing "token" or other more unique ways to identify me and having a plurality of tools for managing contacts and profiles. In embodiments, provided herein is a platform for self-curated single source of truth about the contact or profile of an individual having a system for performing "token" or other more unique ways to identify me and having a system configured to facilitate individual self-curation of contact information. In embodiments, provided herein is a platform for self-curated single source of truth about the contact or profile of an individual having a system for performing "token" or other more unique ways to identify me and having a user interface. In embodiments, provided herein is a platform for self-curated single source of truth about the contact or profile of an individual having a system for performing "token" or other more unique ways to identify me and having a system configured to facilitate split control of personal-level and enterprise-level contact information. In embodiments, provided herein is a platform for self-curated single source of truth about the contact or profile of an individual having a system for performing "token" or other more unique ways to identify me and having a system configured to facilitate user-controlled sale of contact information. In embodiments, provided herein is a platform for self-curated single source of truth about the contact or profile of an individual having a system for performing "token" or other more unique ways to identify me and having a system for performing validation. In embodiments, provided herein is a platform for self-curated single source of truth about the contact or profile of an individual having a system for performing "token" or other more unique ways to identify me and having a system for performing automated synchronization of contact information. In embodiments, provided herein is a platform for self-curated single source of truth about the contact or profile of an individual having a system for performing "token" or other more unique ways to identify me and having a system configured to facilitate blocking and managing of invite permissions. In embodiments, provided herein is a platform for self-curated single source of truth about the contact or profile of an individual having a system for performing "token" or other more unique ways to identify me and having a connection system configured to connect users via search.

User-Controlled/Sender-Controlled Contact or Profile Data Object that Allows a Sender of a Contact Object to Turn it on and Off and/or Modify it In embodiments, provided herein is a platform for self-curated single source of truth about the contact or profile of an individual having a system for performing user-controlled/sender-controlled contact or profile data object. In embodiments, provided herein is a platform for self-curated single source of truth about the contact or profile of an individual having a system for performing user-controlled/sender-controlled contact or profile data object and having a plurality of tools for managing contacts and profiles. In embodiments, provided herein is a platform for self-curated single source of truth about the contact or profile of an individual having a system for performing user-controlled/sender-controlled contact or profile data object and having a system configured to facilitate individual self-curation of contact information. In embodiments, provided herein is a platform for self-curated single source of truth about the contact or profile of an individual having a system for performing user-controlled/sender-controlled contact or profile data object and having a user interface. In embodiments, provided herein is a platform for self-curated single source of truth about the contact or profile of an individual having a system for performing user-controlled/sender-controlled contact or profile data object and having a system configured to facilitate split control of personal-level and enterprise-level contact information. In embodiments, provided herein is a platform for self-curated single source of truth about the contact or profile of an individual having a system for performing user-controlled/sender-controlled contact or profile data object and having a system configured to facilitate user-controlled sale of contact information. In embodiments, provided herein is a platform for self-curated single source of truth about the contact or profile of an individual having a system for performing user-controlled/sender-controlled contact or profile data object and having a system for performing validation. In embodiments, provided herein is a platform for self-curated single source of truth about the contact or profile of an individual having a system for performing user-controlled/sender-controlled contact or profile data object and having a system for performing automated synchronization of contact information. In embodiments, provided herein is a platform for self-curated single source of truth about the contact or profile of an individual having a system for performing user-controlled/sender-controlled contact or profile data object and having a system configured to facilitate blocking and managing of invite permissions. In embodiments, provided herein is a platform for self-curated single source of truth about the contact or profile of an individual having a system for performing user-controlled/sender-controlled contact or profile data object and having a connection system configured to connect users via search.

Tools for Managing Contacts and Profiles

In embodiments, provided herein is a platform for self-curated single source of truth about the contact or profile of an individual having a plurality of tools for managing contacts and profiles. In embodiments, provided herein is a platform for self-curated single source of truth about the contact or profile of an individual having a plurality of tools for managing contacts and profiles and having a system configured to facilitate individual self-curation of contact information. In embodiments, provided herein is a platform for self-curated single source of truth about the contact or profile of an individual having a plurality of tools for managing contacts and profiles and having a user interface. In embodiments, provided herein is a platform for self-curated single source of truth about the contact or profile of an individual having a plurality of tools for managing contacts and profiles and having a system configured to facilitate split control of personal-level and enterprise-level contact information. In embodiments, provided herein is a platform for self-curated single source of truth about the contact or profile of an individual having a plurality of tools for managing contacts and profiles and having a system configured to facilitate user-controlled sale of contact information. In embodiments, provided herein is a platform for self-curated single source of truth about the contact or profile of an individual having a plurality of tools for managing contacts and profiles and having a system for performing validation. In embodiments, provided herein is a platform for self-curated single source of truth about the contact or profile of an individual having a plurality of tools for managing contacts and profiles and having a system for performing automated synchronization of contact information. In embodiments, provided herein is a platform for self-curated single source of truth about the contact or profile of an individual having a plurality of tools for managing contacts and profiles and having a system configured to facilitate blocking and managing of invite permissions. In embodiments, provided herein is a platform for self-curated single source of truth about the contact or profile of an individual having a plurality of tools for managing contacts and profiles and having a connection system configured to connect users via search.

Individual Self-Curation of Contact Information

In embodiments, provided herein is a platform for self-curated single source of truth about the contact or profile of an individual having a system configured to facilitate individual self-curation of contact information. In embodiments, provided herein is a platform for self-curated single source of truth about the contact or profile of an individual having a system configured to facilitate individual self-curation of contact information and having a user interface. In embodiments, provided herein is a platform for self-curated single source of truth about the contact or profile of an individual having a system configured to facilitate individual self-curation of contact information and having a system configured to facilitate split control of personal-level and enterprise-level contact information. In embodiments, provided herein is a platform for self-curated single source of truth about the contact or profile of an individual having a system configured to facilitate individual self-curation of contact information and having a system configured to facilitate user-controlled sale of contact information. In embodiments, provided herein is a platform for self-curated single source of truth about the contact or profile of an individual having a system configured to facilitate individual self-curation of contact information and having a system for performing validation. In embodiments, provided herein is a platform for self-curated single source of truth about the contact or profile of an individual having a system configured to facilitate individual self-curation of contact information and having a system for performing automated synchronization of contact information. In embodiments, provided herein is a platform for self-curated single source of truth about the contact or profile of an individual having a system configured to facilitate individual self-curation of contact information and having a system configured to facilitate blocking and managing of invite permissions. In embodiments, provided herein is a platform for self-curated single source of truth about the contact or profile of an individual having a system configured to facilitate individual self-curation of contact information and having a connection system configured to connect users via search.

User Interface Examples

In embodiments, provided herein is a platform for self-curated single source of truth about the contact or profile of an individual having a user interface. In embodiments, provided herein is a platform for self-curated single source of truth about the contact or profile of an individual having a user interface and having a system configured to facilitate split control of personal-level and enterprise-level contact information. In embodiments, provided herein is a platform for self-curated single source of truth about the contact or profile of an individual having a user interface and having a system configured to facilitate user-controlled sale of contact information. In embodiments, provided herein is a platform for self-curated single source of truth about the contact or profile of an individual having a user interface and having a system for performing validation. In embodiments, provided herein is a platform for self-curated single source of truth about the contact or profile of an individual having a user interface and having a system for performing automated synchronization of contact information. In embodiments, provided herein is a platform for self-curated single source of truth about the contact or profile of an individual having a user interface and having a system configured to facilitate blocking and managing of invite permissions. In embodiments, provided herein is a platform for self-curated single source of truth about the contact or profile of an individual having a user interface and having a connection system configured to connect users via search.

Split Control of Personal and Enterprise-Level Contact Information

In embodiments, provided herein is a platform for self-curated single source of truth about the contact or profile of an individual having a system configured to facilitate split control of personal-level and enterprise-level contact information. In embodiments, provided herein is a platform for self-curated single source of truth about the contact or profile of an individual having a system configured to facilitate split control of personal-level and enterprise-level contact information and having a system configured to facilitate user-controlled sale of contact information. In embodiments, provided herein is a platform for self-curated single source of truth about the contact or profile of an individual having a system configured to facilitate split control of personal-level and enterprise-level contact information and having a system for performing validation. In embodiments, provided herein is a platform for self-curated single source of truth about the contact or profile of an individual having a system configured to facilitate split control of personal-level and enterprise-level contact information and having a system for performing automated synchronization of contact information. In embodiments, provided herein is a platform for self-curated single source of truth about the contact or profile of an individual having a system configured to facilitate split control of personal-level and enterprise-level contact information and having a system configured to facilitate blocking and managing of invite permissions. In embodiments, provided herein is a platform for self-curated single source of truth about the contact or profile of an individual having a system configured to facilitate split control of personal-level and enterprise-level contact information and having a connection system configured to connect users via search.

User-Controlled Sale of Contact Information

In embodiments, provided herein is a platform for self-curated single source of truth about the contact or profile of an individual having a system configured to facilitate user-controlled sale of contact information. In embodiments, provided herein is a platform for self-curated single source of truth about the contact or profile of an individual having a system configured to facilitate user-controlled sale of contact information and having a system for performing validation. In embodiments, provided herein is a platform for self-curated single source of truth about the contact or profile of an individual having a system configured to facilitate user-controlled sale of contact information and having a system for performing automated synchronization of contact information. In embodiments, provided herein is a platform for self-curated single source of truth about the contact or profile of an individual having a system configured to facilitate user-controlled sale of contact information and having a system configured to facilitate blocking and managing of invite permissions. In embodiments, provided herein is a platform for self-curated single source of truth about the contact or profile of an individual having a system configured to facilitate user-controlled sale of contact information and having a connection system configured to connect users via search.

Validation of "Who You Are" (Augmentation of User-Generated Information Used for Voting, Government Licenses, for Use with Biometrics, Etc.)

In embodiments, provided herein is a platform for self-curated single source of truth about the contact or profile of an individual having a system for performing validation. In embodiments, provided herein is a platform for self-curated single source of truth about the contact or profile of an individual having a system for performing validation and having a system for performing automated synchronization of contact information. In embodiments, provided herein is a platform for self-curated single source of truth about the contact or profile of an individual having a system for performing validation and having a system configured to facilitate blocking and managing of invite permissions. In embodiments, provided herein is a platform for self-curated single source of truth about the contact or profile of an individual having a system for performing validation and having a connection system configured to connect users via search.

Automated Synchronization of Contact Information Updates

In embodiments, provided herein is a platform for self-curated single source of truth about the contact or profile of an individual having a system for performing automated synchronization of contact information. In embodiments, provided herein is a platform for self-curated single source of truth about the contact or profile of an individual having a system for performing automated synchronization of contact information and having a system configured to facilitate blocking and managing of invite permissions. In embodiments, provided herein is a platform for self-curated single source of truth about the contact or profile of an individual having a system for performing automated synchronization of contact information and having a connection system configured to connect users via search.

Blocking/Managing Invite Permissions

In embodiments, provided herein is a platform for self-curated single source of truth about the contact or profile of an individual having a system configured to facilitate blocking and managing of invite permissions. In embodiments, provided herein is a platform for self-curated single source of truth about the contact or profile of an individual having a system configured to facilitate blocking and managing of invite permissions and having a connection system configured to connect users via search.

Connection Making Via Search

In embodiments, provided herein is a platform for self-curated single source of truth about the contact or profile of an individual having a connection system configured to connect users via search.

CONCLUSION

The background description is presented simply for context, and is not necessarily well-understood, routine, or conventional. Further, the background description is not an admission of what does or does not qualify as prior art. In fact, some or all of the background description may be work attributable to the named inventors that is otherwise unknown in the art.

Physical (such as spatial and/or electrical) and functional relationships between elements (for example, between modules, circuit elements, semiconductor layers, etc.) are described using various terms. Unless explicitly described as being "direct," when a relationship between first and second elements is described, that relationship encompasses both (i) a direct relationship where no other intervening elements are present between the first and second elements and (ii) an indirect relationship where one or more intervening elements are present between the first and second elements.

Example relationship terms include "adjoining," "transmitting," "receiving," "connected," "engaged," "coupled," "adjacent," "next to," "on top of," "above," "below," "abutting," and "disposed."

The detailed description includes specific examples for illustration only, and not to limit the disclosure or its applicability. The examples are not intended to be an exhaustive list, but instead simply demonstrate possession by the inventors of the full scope of the currently presented and envisioned future claims. Variations, combinations, and equivalents of the examples are within the scope of the disclosure.

No language in the specification should be construed as indicating that any non-claimed element is essential or critical to the practice of the disclosure.

The term "exemplary" simply means "example" and does not indicate a best or preferred example.

The term "set" does not necessarily exclude the empty set—in other words, in some circumstances a "set" may have zero elements. A "set" may in other cases contain a single member. The term "non-empty set" may be used to indicate exclusion of the empty set—that is, a non-empty set must have one or more elements.

The term "subset" does not necessarily require a proper subset. In other words, a "subset" of a first set may be coextensive with (equal to) the first set. Further, the term "subset" does not necessarily exclude the empty set-in some circumstances a "subset" may have zero elements.

The phrase "at least one of A, B, and C" should be construed to mean a logical (A OR B OR C), using a non-exclusive logical OR, and should not be construed to mean "at least one of A, at least one of B, and at least one of C."

The use of the terms "a," "an," "the," and similar referents in the context of describing the disclosure and claims encompasses both the singular and the plural, unless contradicted explicitly or by context.

Unless otherwise specified, the terms "comprising," "having," "with," "including," and "containing," and their variants, are open-ended terms, meaning "including, but not limited to."

Each publication referenced in this disclosure, including foreign and domestic patent applications and patents, is hereby incorporated by reference in its entirety.

Although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of multiple embodiments remain within the scope of this disclosure.

One or more elements (for example, steps within a method, instructions, actions, or operations) may be executed in a different order (and/or concurrently) without altering the principles of the present disclosure.

Unless technically infeasible, elements described as being in series may be implemented partially or fully in parallel. Similarly, unless technically infeasible, elements described as being in parallel may be implemented partially or fully in series.

While the disclosure describes structures corresponding to claimed elements, those elements do not necessarily invoke a means plus function interpretation unless they explicitly use the signifier "means for."

While the drawings divide elements of the disclosure into different functional blocks or action blocks, these divisions are for illustration only. According to the principles of the present disclosure, functionality can be combined in other ways such that some or all functionality from multiple separately depicted blocks can be implemented in a single functional block; similarly, functionality depicted in a single block may be separated into multiple blocks.

Unless explicitly stated as mutually exclusive, features depicted in different drawings can be combined consistent with the principles of the present disclosure.

In the drawings, reference numbers may be reused to identify identical elements or may simply identify elements that implement similar functionality.

Numbering or other labeling of instructions or method steps is done for convenient reference, not to indicate a fixed order.

In the drawings, the direction of an arrow, as indicated by the arrowhead, generally demonstrates the flow of information (such as data or instructions) that is of interest to the illustration; for example, when element A and element B exchange a variety of information, but information transmitted from element A to element B is relevant to the illustration, the arrow may point from element A to element B. This unidirectional arrow does not imply that no other information is transmitted from element B to element A. As just one example, for information sent from element A to element B, element B may send requests and/or acknowledgements to element A.

Unless otherwise indicated, recitations of ranges of values are merely intended to serve as a shorthand way of referring individually to each separate value falling within the range, and each separate value is hereby incorporated into the specification as if it were individually recited.

Special-Purpose System

A special-purpose system includes hardware and/or software and may be described in terms of an apparatus, a method, or a computer-readable medium. In various embodiments, functionality may be apportioned differently between software and hardware. For example, some functionality may be implemented by hardware in one embodiment and by software in another embodiment. Further, software may be encoded by hardware structures, and hardware may be defined by software, such as in software-defined networking or software-defined radio.

In this application, including the claims, the term module refers to a special-purpose system. The module may be implemented by one or more special-purpose systems. The one or more special-purpose systems may also implement some or all of the other modules.

In this application, including the claims, the term module may be replaced with the terms "controller" or "circuit."

In this application, including the claims, the term platform refers to one or more modules that offer a set of functions.

In this application, including the claims, the term system may be used interchangeably with module or with the term special-purpose system.

The special-purpose system may be directed or controlled by an operator. The special-purpose system may be hosted by one or more of assets owned by the operator, assets leased by the operator, and third-party assets. The assets may be referred to as a private, community, or hybrid cloud computing network or cloud computing environment.

For example, the special-purpose system may be partially or fully hosted by a third-party offering software as a service (SaaS), platform as a service (PaaS), and/or infrastructure as a service (IaaS).

The special-purpose system may be implemented using agile development and operations (DevOps) principles. In embodiments, some or all of the special-purpose system may be implemented in a multiple-environment architecture. For example, the multiple environments may include one or more production environments, one or more integration environments, one or more development environments, etc.

Device Examples

A special-purpose system may be partially or fully implemented using or by a mobile device. Examples of mobile devices include navigation devices, cell phones, smart phones, mobile phones, mobile personal digital assistants, palmtops, netbooks, pagers, electronic book readers, tablets, music players, etc.

A special-purpose system may be partially or fully implemented using or by a network device. Examples of network devices include switches, routers, firewalls, gateways, hubs, base stations, access points, repeaters, head-ends, user equipment, cell sites, antennas, towers, etc.

A special-purpose system may be partially or fully implemented using a computer having a variety of form factors and other characteristics. For example, the computer may be characterized as a personal computer, as a server, etc. The computer may be portable, as in the case of a laptop, netbook, etc. The computer may or may not have any output device, such as a monitor, line printer, liquid crystal display (LCD), light emitting diodes (LEDs), etc. The computer may or may not have any input device, such as a keyboard, mouse, touchpad, trackpad, computer vision system, barcode scanner, button array, etc. The computer may run a general-purpose operating system, such as the WINDOWS operating system from Microsoft Corporation, the MACOS operating system from Apple, Inc., or a variant of the LINUX operating system.

Examples of servers include a file server, print server, domain server, internet server, intranet server, cloud server, infrastructure-as-a-service server, platform-as-a-service server, web server, secondary server, host server, distributed server, failover server, and backup server.

Hardware

The term hardware encompasses components such as processing hardware, storage hardware, networking hardware, and other general-purpose and special-purpose components. Note that these are not mutually-exclusive categories. For example, processing hardware may integrate storage hardware and vice versa.

Examples of a component are integrated circuits (ICs), application specific integrated circuit (ASICs), digital circuit elements, analog circuit elements, combinational logic circuits, gate arrays such as field programmable gate arrays (FPGAs), digital signal processors (DSPs), complex programmable logic devices (CPLDs), etc.

Multiple components of the hardware may be integrated, such as on a single die, in a single package, or on a single printed circuit board or logic board. For example, multiple components of the hardware may be implemented as a system-on-chip. A component, or a set of integrated components, may be referred to as a chip, chipset, chiplet, or chip stack.

Examples of a system-on-chip include a radio frequency (RF) system-on-chip, an artificial intelligence (AI) system-on-chip, a video processing system-on-chip, an organ-on-chip, a quantum algorithm system-on-chip, etc.

The hardware may integrate and/or receive signals from sensors. The sensors may allow observation and measurement of conditions including temperature, pressure, wear, light, humidity, deformation, expansion, contraction, deflection, bending, stress, strain, load-bearing, shrinkage, power, energy, mass, location, temperature, humidity, pressure, viscosity, liquid flow, chemical/gas presence, sound, and air quality. A sensor may include image and/or video capture in visible and/or non-visible (such as thermal) wavelengths, such as a charge-coupled device (CCD) or complementary metal-oxide semiconductor (CMOS) sensor.

Processing Hardware

Examples of processing hardware include a central processing unit (CPU), a graphics processing unit (GPU), an approximate computing processor, a quantum computing processor, a parallel computing processor, a neural network processor, a signal processor, a digital processor, a data processor, an embedded processor, a microprocessor, and a co-processor. The co-processor may provide additional processing functions and/or optimizations, such as for speed or power consumption. Examples of a co-processor include a math co-processor, a graphics co-processor, a communication co-processor, a video co-processor, and an artificial intelligence (AI) co-processor.

Processor Architecture

The processor may enable execution of multiple threads. These multiple threads may correspond to different programs. In various embodiments, a single program may be implemented as multiple threads by the programmer or may be decomposed into multiple threads by the processing hardware. The threads may be executed simultaneously to enhance the performance of the processor and to facilitate simultaneous operations of the application.

A processor may be implemented as a packaged semiconductor die. The die includes one or more processing cores and may include additional functional blocks, such as cache. In various embodiments, the processor may be implemented by multiple dies, which may be combined in a single package or packaged separately.

Networking Hardware

The networking hardware may include one or more interface circuits. In some examples, the interface circuit(s) may implement wired or wireless interfaces that connect, directly or indirectly, to one or more networks. Examples of networks include a cellular network, a local area network (LAN), a wireless personal area network (WPAN), a metropolitan area network (MAN), and/or a wide area network (WAN). The networks may include one or more of point-to-point and mesh technologies. Data transmitted or received by the networking components may traverse the same or different networks. Networks may be connected to each other over a WAN or point-to-point leased lines using technologies such as Multiprotocol Label Switching (MPLS) and virtual private networks (VPNs).

Examples of cellular networks include GSM, GPRS, 3G, 4G, 5G, LTE, and EVDO. The cellular network may be implemented using frequency division multiple access (FDMA) network or code division multiple access (CDMA) network.

Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard).

Examples of a WPAN include IEEE Standard 802.15.4, including the ZIGBEE standard from the ZigBee Alliance. Further examples of a WPAN include the BLUETOOTH wireless networking standard, including Core Specification versions 3.0, 4.0, 4.1, 4.2, 5.0, and 5.1 from the Bluetooth Special Interest Group (SIG).

A WAN may also be referred to as a distributed communications system (DCS). One example of a WAN is the internet.

Storage Hardware

Storage hardware is or includes a computer-readable medium. The term computer-readable medium, as used in this disclosure, encompasses both nonvolatile storage and volatile storage, such as dynamic random access memory (DRAM). The term computer-readable medium only excludes transitory electrical or electromagnetic signals propagating through a medium (such as on a carrier wave). A computer-readable medium in this disclosure is therefore non-transitory, and may also be considered to be tangible.

EXAMPLES

Examples of storage implemented by the storage hardware include a database (such as a relational database or a NoSQL database), a data store, a data lake, a column store, a data warehouse.

Example of storage hardware include nonvolatile memory devices, volatile memory devices, magnetic storage media, a storage area network (SAN), network-attached storage (NAS), optical storage media, printed media (such as bar codes and magnetic ink), and paper media (such as punch cards and paper tape). The storage hardware may include cache memory, which may be collocated with or integrated with processing hardware.

Storage hardware may have read-only, write-once, or read/write properties. Storage hardware may be random access or sequential access. Storage hardware may be location-addressable, file-addressable, and/or content-addressable.

Example of nonvolatile memory devices include flash memory (including NAND and NOR technologies), solid state drives (SSDs), an erasable programmable read-only memory device such as an electrically erasable programmable read-only memory (EEPROM) device, and a mask read-only memory device (ROM).

Example of volatile memory devices include processor registers and random access memory (RAM), such as static RAM (SRAM), dynamic RAM (DRAM), synchronous DRAM (SDRAM), synchronous graphics RAM (SGRAM), and video RAM (VRAM).

Example of magnetic storage media include analog magnetic tape, digital magnetic tape, and rotating hard disk drive (HDDs).

Examples of optical storage media include a CD (such as a CD-R, CD-RW, or CD-ROM), a DVD, a Blu-ray disc, and an Ultra HD Blu-ray disc.

Examples of storage implemented by the storage hardware include a distributed ledger, such as a permissioned or permissionless blockchain.

Entities recording transactions, such as in a blockchain, may reach consensus using an algorithm such as proof-of-stake, proof-of-work, and proof-of-storage.

Elements of the present disclosure may be represented by or encoded as non-fungible tokens (NFTs). Ownership rights related to the non-fungible tokens may be recorded in or referenced by a distributed ledger.

Transactions initiated by or relevant to the present disclosure may use one or both of fiat currency and cryptocurrencies, examples of which include bitcoin and ether.

Some or all features of hardware may be defined using a language for hardware description, such as IEEE Standard 1364-2005 (commonly called "Verilog") and IEEE Standard 1076-2008 (commonly called "VHDL"). The hardware description language may be used to manufacture and/or program hardware.

A special-purpose system may be distributed across multiple different software and hardware entities. Communication within a special-purpose system and between special-purpose systems may be performed using networking hardware. The distribution may vary across embodiments and may vary over time. For example, the distribution may vary based on demand, with additional hardware and/or software entities invoked to handle higher demand. In various embodiments, a load balancer may direct requests to one of multiple instantiations of the special purpose system. The hardware and/or software entities may be physically distinct and/or may share some hardware and/or software, such as in a virtualized environment. Multiple hardware entities may be referred to as a server rack, server farm, data center, etc.

Software

Software includes instructions that are machine-readable and/or executable. Instructions may be logically grouped into programs, codes, methods, steps, actions, routines, functions, libraries, objects, classes, etc. Software may be stored by storage hardware or encoded in other hardware. Software encompasses (i) descriptive text to be parsed, such as HTML (hypertext markup language), XML (extensible markup language), and JSON (JavaScript Object Notation), (ii) assembly code, (iii) object code generated from source code by a compiler, (iv) source code for execution by an interpreter, (v) bytecode, (vi) source code for compilation and execution by a just-in-time compiler, etc. As examples only, source code may be written using syntax from languages including C, C++, JavaScript, Java, Python, R, etc.

Software also includes data. However, data and instructions are not mutually-exclusive categories. In various embodiments, the instructions may be used as data in one or more operations. As another example, instructions may be derived from data.

The functional blocks and flowchart elements in this disclosure serve as software specifications, which can be translated into software by the routine work of a skilled technician or programmer.

Software may include and/or rely on firmware, processor microcode, an operating system (OS), a basic input/output system (BIOS), application programming interfaces (APIs), libraries such as dynamic-link libraries (DLLs), device drivers, hypervisors, user applications, background services, background applications, etc. Software includes native applications and web applications. For example, a web application may be served to a device through a browser using hypertext markup language 5th revision (HTML5).

Software may include artificial intelligence systems, which may include machine learning or other computational intelligence. For example, artificial intelligence may include one or more models used for one or more problem domains.

When presented with many data features, identification of a subset of features that are relevant to a problem domain may improve prediction accuracy, reduce storage space, and increase processing speed. This identification may be referred to as feature engineering. Feature engineering may be performed by users or may only be guided by users. In various implementations, a machine learning system may computationally identify relevant features, such as by performing singular value decomposition on the contributions of different features to outputs.

Examples of the models include recurrent neural networks (RNNs) such as long short-term memory (LSTM), deep learning models such as transformers, decision trees, support-vector machines, genetic algorithms, Bayesian networks, and regression analysis. Examples of systems based on a transformer model include bidirectional encoder representations from transformers (BERT) and generative pre-trained transformer (GPT).

Training a machine-learning model may include supervised learning (for example, based on labelled input data), unsupervised learning, and reinforcement learning. In various embodiments, a machine-learning model may be pre-trained by their operator or by a third party.

Problem domains include nearly any situation where structured data can be collected, and includes natural language processing (NLP), computer vision (CV), classification, image recognition, etc.

Architectures

Some or all of the software may run in a virtual environment rather than directly on hardware. The virtual environment may include a hypervisor, emulator, sandbox, container engine, etc. The software may be built as a virtual machine, a container, etc. Virtualized resources may be controlled using, for example, a DOCKER container platform, a pivotal cloud foundry (PCF) platform, etc.

In a client-server model, some of the software executes on first hardware identified functionally as a server, while other of the software executes on second hardware identified functionally as a client. The identity of the client and server is not fixed: for some functionality, the first hardware may act as the server while for other functionality, the first hardware may act as the client. In different embodiments and in different scenarios, functionality may be shifted between the client and the server. In one dynamic example, some functionality normally performed by the second hardware is shifted to the first hardware when the second hardware has less capability. In various embodiments, the term "local" may be used in place of "client," and the term "remote" may be used in place of "server."

Some or all of the software may be logically partitioned into microservices. Each microservice offers a reduced subset of functionality. In various embodiments, each microservice may be scaled independently depending on load, either by devoting more resources to the microservice or by instantiating more instances of the microservice. In various embodiments, functionality offered by one or more microservices may be combined with each other and/or with other software not adhering to a microservices model.

Some or all of the software may be arranged logically into layers. In a layered architecture, a second layer may be logically placed between a first layer and a third layer. The first layer and the third layer would then generally interact with the second layer and not with each other. In various embodiments, this is not strictly enforced—that is, some direct communication may occur between the first and third layers.

The invention claimed is:

1. A method of updating and distributing information associated with an individual, the method comprising:
storing an application program;
controlling a plurality of modules to execute instructions of the application program;
generating, via the application program, one or more profiles, each profile containing personal or professional information of an individual,
identifying at least one of the one or more profiles to transmit to one or more recipients;
obtaining at least one update to the one or more profiles;
transmitting the at least one update;
transmitting at least one profile template to a mobile device;
receiving the one or more profiles generated in connection with the at least one profile template;
validating data fields of received one or more profiles generated based on the at least one profile template;
storing the received one or more profiles that are validated;
receiving the at least one update;
updating the one or more profiles according to the received at least one update;
generating an identifier of the one or more profiles; and
selectively transmitting the identifier and data associated with the updated one or more profiles to a computing device of a first recipient of the one or more recipients, including:
determining whether the first recipient is an existing user of a system associated with the application program,
in response to a determination that the first recipient is an existing user of the system, transmitting a first invitation via a push service system to the computing device,
in response to a determination that the first recipient is not an existing user of the system, transmitting a second invitation to the first recipient via a mail service system, determining whether the application program has been downloaded on the computing device, and in response to a determination that the application program has not been downloaded on the computing device, transmitting a prompt to download the application program on the computing device.

2. The method of claim 1, wherein the application program includes a mobile or web-based application.

3. The method of claim 1, wherein a processor of the mobile device is configured to validate the data fields of the received one or more profiles generated based on a defined length of each data field, a defined threshold size of a file, a media type and related file header information.

4. The method of claim 1, wherein:

the information saved on the computing device of the one or more recipients includes data associated with native applications of the computing device, and the method further comprises identifying and updating the data associated with the native applications based on the identifier and the at least one update.

5. The method of claim 1, further comprising:

generating and transmitting an invitation identifier and hash to the mobile device in response to detecting that the one or more recipients is identified for receiving the one or more profiles, wherein a processor of the mobile device is configured to generate and transmit a machine-readable code or label and a unique uniform resource identifier (URI) to the computing device based on the invitation identifier and hash.

6. The method of claim 5, wherein the computing device of the one or more recipients is configured to obtain the one or more profiles based on the machine-readable code or label and the URI.

7. The method of claim 1, further comprising:

in response to the determination that the first recipient is not an existing user, generating and transmitting an invitation identifier, hash, and invitation URI to the computing device of the first recipient via the mail service system, wherein the invitation URI identifies a resource including the prompt to download the application program on the computing device.

8. The method of claim 1, wherein a processor of the mobile device is configured to identify:

a first profile of the one or more profiles to transmit to a first group of recipients, and a second profile of the one or more profiles to transmit to a second group of recipients.

9. The method of claim 1, wherein selectively transmitting the identifier and data associated with the updated one or more profiles to the first recipient includes:

determining whether the first recipient is associated with an set of credentials that is authorized to receive the data associated with the updated one or more profiles, in response to a determination that the first recipient is not associated with the set of credentials, preventing transmission of the identifier and data associated with the updated one or more profiles to the computing device of the first recipient, and in response to a determination that the first recipient is associated with the set of credentials, transmitting the identifier and data associated with the updated one or more profiles to the computing device of the first recipient.

10. A method for updating and distributing information associated with an individual, the method comprising:

storing an application program, controlling a plurality of modules to execute instructions of the application program, generating a personal user profile containing professional information of the individual, generating a professional user profile containing professional information of the individual, transmitting the professional user profile to one or more recipients, obtaining at least one update, updating the professional user profile based on the at least one update, transmitting the at least one update to the one or more recipients, identifying a plurality of recipient profiles of recipients having a professional relationship with the individual, grouping the plurality of recipient profiles with one another, transmitting at least one profile template to a mobile device, receiving the personal user profile and professional user profile generated in connection with the at least one profile template, validating data fields of the received personal user profile and the received professional user profile generated based on the at least one profile template, storing the received personal user profile and the received professional user profile that are validated, receiving the at least one update and updating the stored professional user profile accordingly, generating an identifier of the personal user profile and an identifier of the professional user profile, receiving the grouped plurality of recipient profiles, receiving a request to not share information with a recipient profile of the grouped plurality of recipient profiles, and selectively transmitting the identifier and data associated with the updated professional user profile to a computing device of the one or more recipients other than the recipient associated with the request to not share information, wherein selectively transmitting the identifier and data associated with the updated professional user profile includes:

determining whether a first recipient of the one or more recipients is an existing user of a system associated with the application program, in response to a determination that the first recipient is an existing user of the system, transmitting a first invitation via a push service system to the computing device, and in response to a determination that the first recipient is not an existing user of the system, transmitting a second invitation to the first recipient via a mail service system.

11. The method of claim 10, wherein the application program includes a mobile or web-based application.

12. The method of claim 10, wherein a processor of the mobile device is configured to validate the data fields of received one or more profiles generated based on a defined length of each data field, a defined threshold size of a file, a media type, and related file header information.

13. The method of claim 10, wherein:

the information saved on the computing device of the one or more recipients includes data associated with native applications of the computing device, and the method further comprises identifying and updating the data associated with the native applications based on the identifier and the at least one update.

14. The method of claim 10, further comprising:
transmitting an invitation identifier and hash to the mobile device in response to detecting that the one or more recipients is identified for receiving the professional user profile or the personal user profile,
wherein a processor of the mobile device is configured to generate and transmit a machine-readable code or label and a unique uniform resource identifier (URI) to the computing device based on the invitation identifier and hash.

15. The method of claim 14, wherein the computing device of the one or more recipients is configured to obtain the professional user profile or the personal user profile based on the machine-readable code or label and the URI.

16. The method of claim 10, further comprising:
in response to the determination that the first recipient is not an existing user, generating and transmitting an invitation identifier, hash, and invitation URI to the computing device of the first recipient via the mail service system, and
the invitation URI identifies a response including a prompt to download the application program on the computing device.

17. The method of claim 10, further comprising:
determining whether the application program has been downloaded on the computing device, and
in response to a determination that the application program has not been downloaded on the computing device, transmitting a prompt to download the application program on the computing device.

18. The method of claim 10, wherein selectively transmitting the identifier and data associated with the updated professional user profile to the first recipient includes:
determining whether the first recipient is associated with a set of credentials that is authorized to receive the data associated with the updated professional user profile,
in response to a determination that the first recipient is not associated with the set of credentials, preventing transmission of the identifier and data associated with the updated professional user profile to the computing device of the first recipient, and
in response to a determination that the first recipient is associated with the set of credentials, transmitting the identifier and data associated with the updated professional user profile to the computing device of the first recipient.

19. A non-transitory computer-readable storage medium comprising processor-executable instructions, the instructions including:
storing an application program;
controlling a plurality of modules to execute instructions of the application program;
generating, via the application program, one or more profiles, each profile containing personal or professional information of an individual,
identifying at least one of the one or more profiles to transmit to one or more recipients;
obtaining at least one update to the one or more profiles;
transmitting the at least one update;
transmitting at least one profile template to a mobile device;
receiving the one or more profiles generated in connection with the at least one profile template;
validating data fields of received one or more profiles generated based on the at least one profile template;
storing the received one or more profiles that are validated;
receiving the at least one update;
updating the one or more profiles according to the received at least one update;
generating an identifier of the one or more profiles; and
selectively transmitting the identifier and data associated with the updated one or more profiles to a computing device of a first recipient of the one or more recipients, including:
determining whether the first recipient is an existing user of a system associated with the application program,
in response to a determination that the first recipient is an existing user of the system, transmitting a first invitation via a push service system to the computing device,
in response to a determination that the first recipient is not an existing user of the system, transmitting a second invitation to the first recipient via a mail service system,
determining whether the application program has been downloaded on the computing device, and
in response to a determination that the application program has not been downloaded on the computing device, transmitting a prompt to download the application program on the computing device.

20. The non-transitory computer-readable storage medium of claim 19, wherein:
the application program includes a mobile or web-based application,
a processor of the mobile device is configured to validate the data fields of the received one or more profiles generated based on a defined length of each data field, a defined threshold size of a file, a media type and related file header information,
the information saved on the computing device of the one or more recipients includes data associated with native applications of the computing device, and
the instructions include identifying and updating the data associated with the native applications based on the identifier and the at least one update.

21. The non-transitory computer-readable storage medium of claim 19, wherein:
the instructions include, in response to the determination that the first recipient is not an existing user, generating and transmitting an invitation identifier, hash, and invitation URI to the computing device of the first recipient via the mail service system, and
the invitation URI identifies a resource including the prompt to download the application program on the computing device.

* * * * *